US011843261B2

(12) United States Patent
Sawa et al.

(10) Patent No.: US 11,843,261 B2
(45) Date of Patent: Dec. 12, 2023

(54) WIRELESS POWER TRANSMISSION DEVICE

(71) Applicant: Mitsubishi Electric Corporation, Tokyo (JP)

(72) Inventors: Manabu Sawa, Tokyo (JP); Yukihiro Homma, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/912,858

(22) PCT Filed: Mar. 31, 2021

(86) PCT No.: PCT/JP2021/013968
§ 371 (c)(1),
(2) Date: Sep. 20, 2022

(87) PCT Pub. No.: WO2021/201147
PCT Pub. Date: Oct. 7, 2021

(65) Prior Publication Data

US 2023/0147179 A1 May 11, 2023

(30) Foreign Application Priority Data

Mar. 31, 2020 (JP) ................................ 2020-061917

(51) Int. Cl.
*H02J 50/20* (2016.01)
*H02J 50/90* (2016.01)
(Continued)

(52) U.S. Cl.
CPC ................ *H02J 50/20* (2016.02); *G01S 3/42* (2013.01); *H01Q 1/27* (2013.01); *H01Q 3/26* (2013.01); *H02J 50/40* (2016.02); *H02J 50/90* (2016.02)

(58) Field of Classification Search
CPC . H02J 50/20; H02J 50/40; H02J 50/90; G01S 3/42; H01Q 1/27; H01Q 3/26
See application file for complete search history.

(56) References Cited

U.S. PATENT DOCUMENTS

| | | | | |
|---|---|---|---|---|
| 10,962,579 | B2 * | 3/2021 | Homma | H02J 50/20 |
| 2016/0028245 | A1 * | 1/2016 | Von Novak | H02J 50/05 307/104 |

(Continued)

FOREIGN PATENT DOCUMENTS

| | | | |
|---|---|---|---|
| JP | 1-37882 | B2 | 8/1989 |
| JP | 2019-75984 | A | 5/2019 |

(Continued)

OTHER PUBLICATIONS

Notice of Reasons for Refusal dated Jan. 18, 2022 in Japanese Patent Application No. 2021-548261, 6 pages.

(Continued)

*Primary Examiner* — Daniel Kessie
*Assistant Examiner* — Brian K Baxter
(74) *Attorney, Agent, or Firm* — XSENSUS LLP

(57) ABSTRACT

A power transmission device includes: a power transmission antenna including element antennas to radiate a radio wave and element modules each provided for a predetermine number of element antennas and including a phase shifter to change a phase of a transmission signal radiated as the radio wave and an amplifier to amplify the transmission signal; and an REV method phase controller to change the phase of the transmission signal by a phase shift amount obtained by adding an operation phase shift amount for executing the REV method and a direction change phase shift amount for changing a transmission direction, for an operating phase shifter being part of the phase shifters, such that operation of changing the phase shift amount of the operating phase shifters is repeated while changing the operating phase (Continued)

shifters in a state in which at least some element antennas radiate the radio wave.

34 Claims, 97 Drawing Sheets

(51) Int. Cl.

| | |
|---|---|
| ***H02J 50/40*** | (2016.01) |
| ***G01S 3/42*** | (2006.01) |
| ***H01Q 1/27*** | (2006.01) |
| ***H01Q 3/26*** | (2006.01) |

(56) References Cited

U.S. PATENT DOCUMENTS

| | | | | |
|---|---|---|---|---|
| 2017/0288475 | A1* | 10/2017 | Lee | H04W 8/005 |
| 2020/0174052 | A1* | 6/2020 | Homma | H01Q 3/267 |
| 2020/0355734 | A1* | 11/2020 | Homma | G01S 13/32 |
| 2021/0396798 | A1* | 12/2021 | Homma | B64C 39/024 |

FOREIGN PATENT DOCUMENTS

| | | | |
|---|---|---|---|
| JP | 2019-135900 | A | 8/2019 |
| WO | 2018/221022 | A1 | 12/2018 |

OTHER PUBLICATIONS

Decision to Grant a Patent dated Apr. 12, 2022 in Japanese Patent Application No. 2021-548261, 5 pages.

International Search Report and Written Opinion dated Jun. 8, 2021, received for PCT Application PCT/JP2021/013968, filed on Mar. 31, 2021, 11 pages including English Translation.

Makino et al., "Development and Demonstration of the High-Precision Beam Steering Controller for Microwave Power Transmission, which takes account of applying to SSPS (Space Solar Power Systems)", The Institute of Electronics, Information and Communication Engineers (IEICE) Technical Report, SANE 2015-22, Jun. 2015, pp. 37-42 (6 pages including English Abstract).

Notice of Reasons for Refusal dated Oct. 19, 2021, received for JP Application 2021-548261, 18 pages including English Translation.

* cited by examiner (A)

(B)

(A)

(B)

WIRELESS POWER TRANSMISSION DEVICE

CROSS-REFERENCE TO RELATED APPLICATIONS

The present application is based on PCT filing PCT/JP2021/013968, filed Mar. 31, 2021, which claims priority to JP 2020-061917, filed Mar. 31, 2020, the entire contents of each are incorporated herein by reference.

TECHNICAL FIELD

The present disclosure relates to a wireless power transmission device to transmit electric power wirelessly to a movable body by radio waves.

BACKGROUND ART

A system in which a direction of a transmitted microwave beam for the power transmission is controlled by controlling the microwaves radiated from a plurality of element antennas is developed (see NPL 1). This system is developed for the purpose of the remote power transmission using the radio waves in a frequency band such as a microwave. In this system, an amplitude mono-pulse method and a rotating element electric field vector (REV) method (REV method) are adopted for beam control. High-efficient wireless power transmission using microwaves is provided by adopting the amplitude mono-pulse method and the REV method. A pilot signal guiding a transmission direction of a power transmission microwave is transmitted from the power-receiving side, each power transmission panel detects an arrival direction of the pilot signal using the amplitude mono-pulse method, and microwave is radiated in the arrival direction of the pilot signal. An optical path length difference corresponding to a level difference between the power transmission panels is detected and corrected by the REV method. A monitor antenna is attached to an XY scanner movable in two dimensions, thereby measuring a beam direction or a radiation pattern of the microwave with which the power is transmitted.

A wireless power transmission system is proposed which transmits power wirelessly to a movable body such as a drone using a phased array antenna as a power transmission antenna. In a wireless power transmission device using a phased array antenna, the phase of a radio wave radiated by each element antenna included in the power transmission antenna is controlled to form a power transmission beam in the direction in which a power reception device included in the movable body is present. In a state in which the phase references of element antennas are not equalized, a beam is unable to be formed in the transmission direction. In order to equalize the phase references of element antennas included in the phased array antenna before power is transmitted to a movable body, measurement is performed by the REV method based on the electric power received by a movable body hovering in the air (see PTL 1). The method of equalizing the phase references of element antennas by the REV method is a well-known technique (see PTL 2).

CITATION LIST

Patent Literature

PTL 1: Japanese Patent Laying-Open No. 2019-75984

PTL 2: Japanese Examined Patent Application Publication No. H1-37882

Non Patent Literature

NPL 1: Katsumi Makino et al. "Development and Demonstration of the High-Precision Beam Steering Controller for Microwave Power Transmission, which takes account of applying to SSPS (Space Solar Power Systems)", the Institute of Electronics, Information and Communication Engineers (IEICE) Technical Report, SANE 2015-22, pp. 37-42, June 2015.

SUMMARY OF INVENTION

Technical Problem

In the wireless power transmission device in which radio waves are radiated from a power transmission antenna being a phased array antenna to transmit electric power wirelessly, the phase of a radio wave radiated by each element antenna deviates due to various reasons, leading to deterioration in power transmission efficiency. When the power transmission efficiency is deteriorated, the REV method is executed to equalize the phase references of radio waves radiated by element antennas. In the REV method, the phase references of radio waves radiated by element antennas are equalized based on the received power strength obtained by measuring radio waves received by a measurement antenna having a fixed position. When a moving movable body is equipped with a measurement antenna, the measurement antenna measures the received power strength, including deterioration in received power strength due to movement of the movable body. This deteriorates the accuracy of executing the REV method. Despite executing the REV method, the phase references of radio waves radiated by the element antennas sometimes fail to be equalized.

The present disclosure is made to solve the problem described above and an object of the present disclosure is to obtain a wireless power transmission device that can execute the REV method more accurately than by the conventional method when the REV method is executed for a moving movable body.

Solution to Problem

A wireless power transmission device according to the present disclosure includes: a power transmission antenna to transmit electric power by radiating a radio wave and being capable of changing a radiation direction being a direction in which the radio wave is radiated, the power transmission antenna being a phased array antenna including a plurality of element antennas to radiate the radio wave and a plurality of element modules each provided for a predetermined number of the element antennas, each of the plurality of element modules including a phase shifter to change a phase of a transmission signal radiated as the radio wave and an amplifier to amplify the transmission signal, the power transmission antenna; a transmission signal generator to generate the transmission signal radiated from the power transmission antenna as the radio wave; a presence direction determiner to determine a presence direction being a direction in which a movable body is present, the movable body being equipped with a power reception device to receive the radio wave, a measurement antenna to receive the radio wave, a radio wave measurer to measure received radio wave data including an electric field strength being an amplitude of the radio wave received by the measurement antenna, and a movable body communication device; a radiation direction changer to direct the radiation direction of the power transmission antenna to the presence direction by controlling a phase shift amount being an amount by which the phase shifter changes the phase of the transmission signal; an REV method phase controller to change the phase of the transmission signal by the phase shift amount obtained by adding an operation phase shift amount being the phase shift amount defined by a phase operating pattern and a direction change phase shift amount being the phase shift amount changed by the radiation direction changer, for an operating phase shifter being part of the phase shifters, based on an REV method scenario, the operation phase shift amount being the phase shift amount defined by a phase operating pattern, the phase operating pattern being defined by the REV method scenario and describing operation of changing the phase shift amount of the operating phase shifter, the operation being repeated while changing the operating phase shifter, and being performed in a state in which at least some of the element antennas radiate the radio wave; a phase reference adjuster to equalize phase references of the transmission signals outputted by the element modules, based on element electric field phases, each of the element electric field phases being a phase of an element electric field vector detected by the measurement antenna receiving the radio wave radiated by the element antenna supplied with the transmission signal outputted by one element module, the element electric field phase being calculated based on electric field change data generated based on REV method run-time radio wave data being the received radio wave data received by the movable body, in a state in which the REV method phase controller changes the phase shift amount of the operating phase shifter based on the REV method scenario; and a power transmitting-side communication device to communicate with the movable body communication device.

A wireless power transmission device includes: a power transmission antenna to transmit electric power by radiating a radio wave and being capable of changing a radiation target position being a range of position in three-dimensional space set to be a target for radiating the radio wave, the power transmission antenna being a phased array antenna including a plurality of element antennas to radiate the radio wave and a plurality of element modules each provided for a predetermined number of the element antennas, each of the plurality of element modules including a phase shifter to change a phase of a transmission signal radiated as the radio wave and an amplifier to amplify the transmission signal; a transmission signal generator to generate the transmission signal radiated from the power transmission antenna as the radio wave; a presence direction determiner to determine a presence direction being a direction in which a movable body is present, the movable body being equipped with a power reception device to receive the radio wave, a measurement antenna to receive the radio wave, a radio wave measurer to measure received radio wave data including an electric field strength being an amplitude of the radio wave received by the measurement antenna, and a movable body communication device; a movable body distance measurer to measure a movable body distance being a distance from the power transmission antenna to the movable body; a radiation target position determiner to determine the radiation target position as a relative position to a power transmission antenna position being a position of the power transmission antenna, and including a movable body position being a position in three-dimensional space determined by the presence direction and the movable body distance; a radiation target position changer to radiate the radio waves such that phases are matched at the radiation target position by controlling phase shift amounts, each of the phase shift amounts being an amount by which the phase shifter changes the phase of the transmission signal; an REV method phase controller to change the phase of the transmission signal by the phase shift amount obtained by adding an operation phase shift amount and a target position change phase shift amount being the phase shift amount changed by the radiation target position changer, for an operating phase shifter being part of the phase shifters, based on an REV method scenario, the operation phase shift amount being the phase shift amount defined by a phase operating pattern, the phase operating pattern being defined by the REV method scenario and describing operation of changing the phase shift amount of the operating phase shifter, the operation being repeated while changing the operating phase shifter, and being performed in a state in which at least some of the element antennas radiate the radio wave; a phase reference adjuster to equalize phase references of the transmission signals outputted by the element modules, based on element electric field phases, each of the element electric phases being a phase of an element electric field vector detected by the measurement antenna receiving the radio wave radiated by the element antenna supplied with the transmission signal outputted by one element module, the element electric field phase being calculated based on electric field change data generated based on REV method run-time radio wave data being the received radio wave data received by the movable body, in a state in which the REV method phase controller changes the operation phase shift amount of the operating phase shifter based on the REV method scenario; and a power transmitting-side communication device to communicate with the movable body communication device.

Advantageous Effects of Invention

The wireless power transmission device according to the present disclosure can execute the REV method more accurately than by the conventional method when the REV method is executed for a moving movable body.

DESCRIPTION OF EMBODIMENTS

First Embodiment

Figure 1:
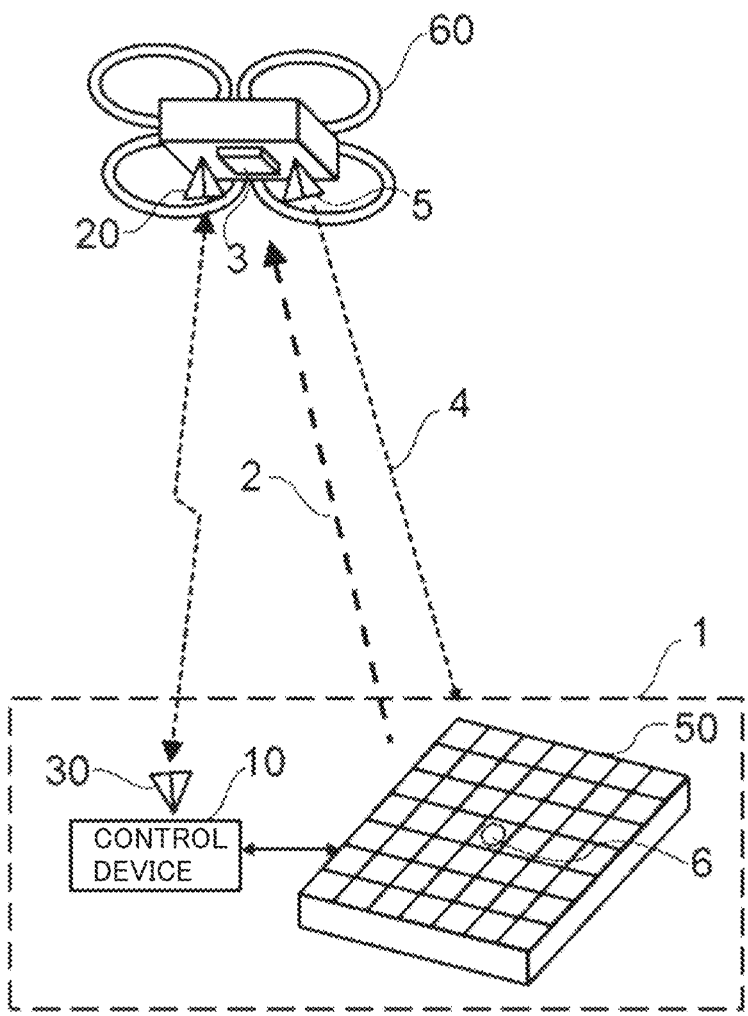
FIG. 1 is a schematic diagram illustrating a configuration of a wireless power transmission system for a movable body using a wireless power transmission device according to a first embodiment.

FIG. 1 is a schematic diagram illustrating a configuration of a wireless power transmission system to a movable body using a wireless power transmission device according to the present disclosure. A wireless power transmission device 1 supplies (transmits) electric power wirelessly to a movable body 60 (for example, drones, other unmanned movable bodies moving in the air, etc.) by a power transmission radio wave 2 such as microwave. Wireless power transmission device 1 includes a power transmission antenna 50 to radiate power transmission radio wave 2 and a control device 10. Power transmission antenna 50 is a phased array antenna. Control device 10 controls power transmission antenna 50. Movable body 60 has a power reception device 3 on its lower surface. Power reception device 3 receives power transmission radio wave 2 and converts the received power transmission radio wave 2 into electric power. The electric power transmitted by power transmission radio wave 2 is consumed by movable body 60. Movable body 60 has a pilot transmitter 5 to transmit a pilot signal 4. Pilot signal 5 is transmitted to notify wireless power transmission device 1 of the direction in which movable body 60 (strictly speaking, power reception device 3) is present. Wireless power transmission device 1 includes a pilot antenna 6 to receive pilot signal 5 and an arrival direction detecting device 7 (depicted in FIG. 2) to determine the arrival direction in which pilot signal 4 arrives. Wireless power transmission device 1 radiates power transmission radio wave 2 in the direction toward the arrival direction. In order to perform communication necessary for executing the REV method, movable body 60 includes a movable body communication device 20, and wireless power transmission device 1 includes a communication device 30. A pilot antenna 6 is installed, for example, at the center of an opening area of power transmission antenna 50. The arrival direction is also the presence direction that is the direction in which movable body 60 is present viewed from wireless power transmission device 1. Arrival direction detecting device 7 is a presence direction determiner that detects the presence direction. Movable body communication device 20 and communication device 30 communicate by radio waves. Radio waves used for communication are called communication radio waves.

Figure 2:
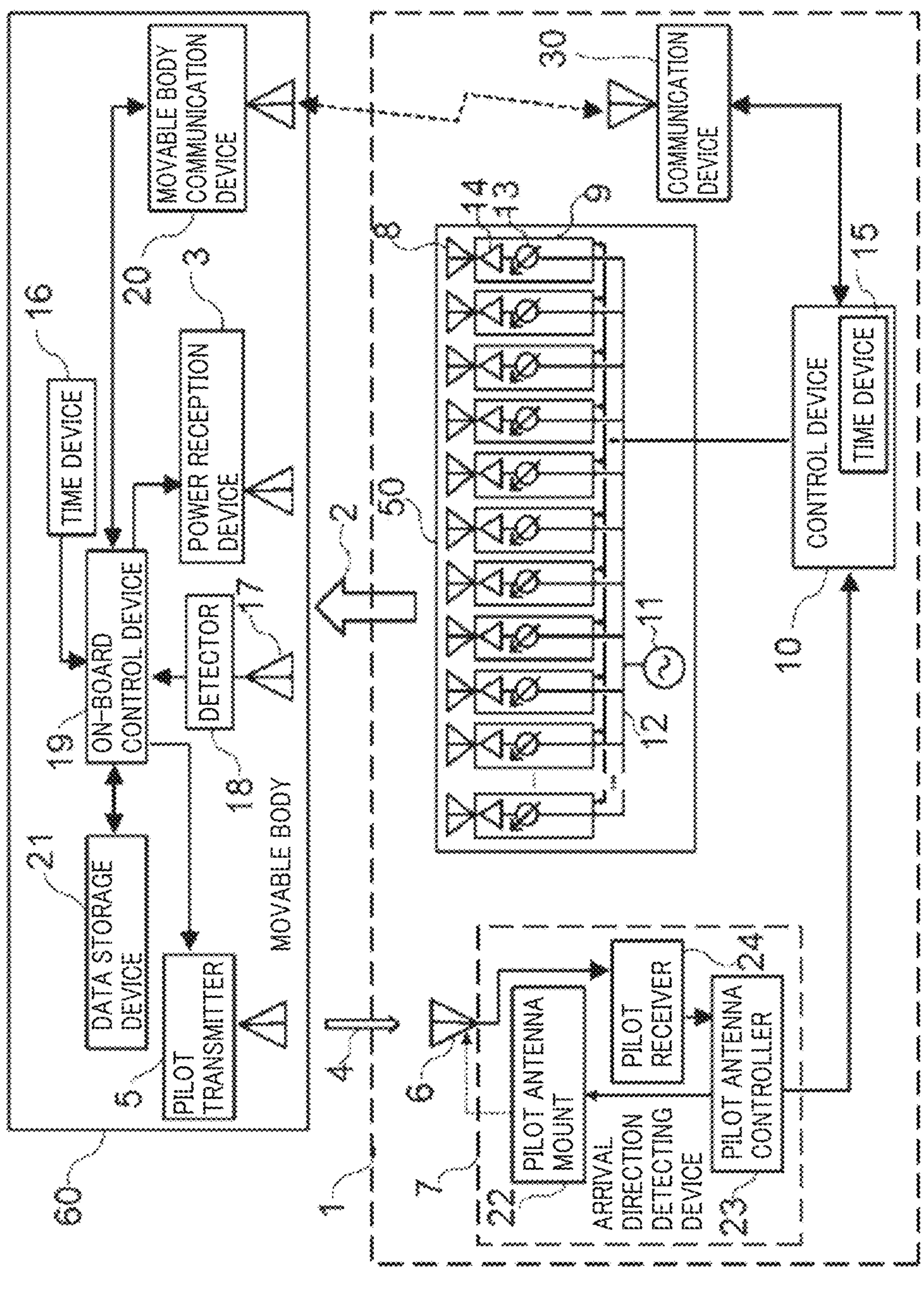
FIG. 2 is a diagram illustrating an overall configuration of the wireless power transmission system for a movable body using the wireless power transmission device according to the first embodiment.

Referring to FIG. 2, a configuration of wireless power transmission device 1 and movable body 60 is described. FIG. 2 is a diagram illustrating a configuration of a wireless power transmission system to a movable body using the wireless power transmission device according to a first embodiment.

Wireless power transmission device 1 radiates power transmission radio wave 2 toward movable body 60 by power transmission antenna 50. Power transmission antenna 50 that is a phased array antenna includes a plurality of element antennas 8, element modules 9 provided for corresponding element antennas 8, a transmission signal generator 11, and a distribution circuit 12. Each of element antennas 8 radiate an element radio wave 2E (not illustrated) having phase and amplitude adjusted. Element antennas 8 are arranged in a two-dimensional grid pattern at predetermined distances. Each element antenna 8 radiates element radio wave 2E having a phase difference in accordance with the distance between adjacent element antennas 8. Power transmission antenna 50 as a whole radiates power transmission radio wave 2 (also called power transmission beam) in a power transmission direction. Element radio wave 2E radiated by element antenna 8 is a part of power transmission radio wave 2. Element antenna 8 radiates power transmission radio wave 2.

The power transmission direction is a radiation direction in which a power transmission beam is radiated from power transmission antenna 50. The power transmission direction is determined in a direction toward the direction in which movable body 60 is present (presence direction). Element module 9 adjusts the phase and amplitude of an element transmission signal supplied to element antenna 8. Transmission signal generator 11 generates a transmission signal having a predetermined frequency to be radiated by each element antenna $\mathbf{8}_p$ as element radio wave $\mathbf{2}E_v$. Distribution circuit 12 distributes a transmission signal generated by transmission signal generator 11 and inputs a distributed transmission signal to each element module 9. Wireless power transmission device 1 includes control device 10 to control each element module 9.

Each element module 9 includes a phase shifter 13 and an amplifier 14. Phase shifter 13 changes the phase of a transmission signal by a command value. Phase shifter 13 changes the phase discretely at predetermined intervals. The intervals at which the phase is changed, that is, the resolution of the phase is determined by the number of bits that can be used by phase shifter 13 to represent a phase value. It is assumed that phase shifter 13 is a seven-bit phase shifter. Phase shifter 13 rotates the phase at intervals of $360°/2^7=360°/128=2.8125°$. Phase shifter 13 may change the phase continuously. Amplifier 14 amplifies a transmission signal at an instructed amplification factor. Control device 10 has a time device 15, and movable body 60 has a time device 16. Time device 15 and time device 16 are synchronized in time with required accuracy. For example, GPS receivers can be used as time device 15 and time device 16.

Movable body 60 includes power reception device 3, pilot transmitter 5, a monitor antenna 17, a detector 18, an on-board control device 19, a data storage device 21, and movable body communication device 20. Monitor antenna 17 is an antenna for measuring the amplitude and the like of power transmission radio wave 2. Monitor antenna 17 is a measurement antenna that receives a radio wave radiated by power transmission device 1. Detector 18 detects a radio wave received by monitor antenna 17 and measures the phase and amplitude of the radio wave. Detector 18 generates detection data 71. Detection data 71 is data representing the phase and amplitude of a radio wave received by monitor antenna 17. Detection data 71 is associated with the time of measurement. The time of measurement is time data 72 outputted by time device 16 at the time when measurement is performed. On-board control device 19 controls detector 18 and manages the measured detection data 71. Data storage device 21 is a storage device to store detection data 71 and the like. Movable body communication device 20 is a communication device that communicates with control device 10.

Wireless power transmission device 1 includes pilot antenna 6 and arrival direction detecting device 7 in order to receive pilot signal 4 and to determine an arrival direction. Pilot antenna 6 receives pilot signal 4 and generates a pilot reception signal. Pilot antenna 6 has directivity.

Arrival direction detecting device 7 includes a pilot antenna mount 22, a pilot antenna controller 23, and a pilot receiver 24. Pilot antenna mount 22 supports pilot antenna 6 such that the orientation direction of pilot antenna 6 is changeable. Pilot antenna controller 23 controls pilot antenna mount 22 such that the orientation direction of pilot antenna 6 is oriented in the arrival direction of pilot signal 4. Pilot receiver 24 receives a pilot reception signal. Pilot receiver 24 processes a pilot reception signal by mono-pulse angle measurement and outputs a mono-pulse error signal representing the difference between the arrival direction of pilot signal 4 and the orientation direction of pilot antenna 6. Pilot antenna controller 23 determines a command value of the orientation direction of pilot antenna 6 such that the mono-pulse error signal approaches zero. Pilot antenna controller 23 controls pilot antenna mount 22 such that the difference between the command value and the actual orientation direction of pilot antenna 6 approaches zero. The command value of the orientation direction of pilot antenna 6 is parallel to the arrival direction of pilot signal 4 or has a minute difference with the arrival direction. Pilot antenna controller 23 therefore notifies control device 10 of the command value of the orientation direction of pilot antenna 6 as the arrival direction of pilot signal 4. Control device 10 performs control such that wireless power transmission device 1 radiates power transmission radio wave 2 in a direction toward the arrival direction. Since pilot signal 4 arrives from the direction in which movable body 60 is present, the arrival direction of pilot signal 4 is the presence direction of movable body 60. Arrival direction detecting device 7 is a presence direction determiner that determines the presence direction that is the direction in which a movable body is present.

The common REV method is executed in a state in which the position of a measurement antenna receiving a radio wave radiated by a power transmission antenna is fixed. Thus, the phase shift amount of the part of phase shifters is changed in a state in which a power transmission beam is fixed in the direction in which the measurement antenna is present. Conventionally, the REV method is executed with a fixed direction of a power transmission beam even when the REV method is executed while movable body 60 is moving. When the REV method is executed with a fixed direction of a power transmission beam, the electric power received by the measurement antenna is changed due to the movement of movable body 60 to deteriorate the accuracy of the REV method.

Figure 3:
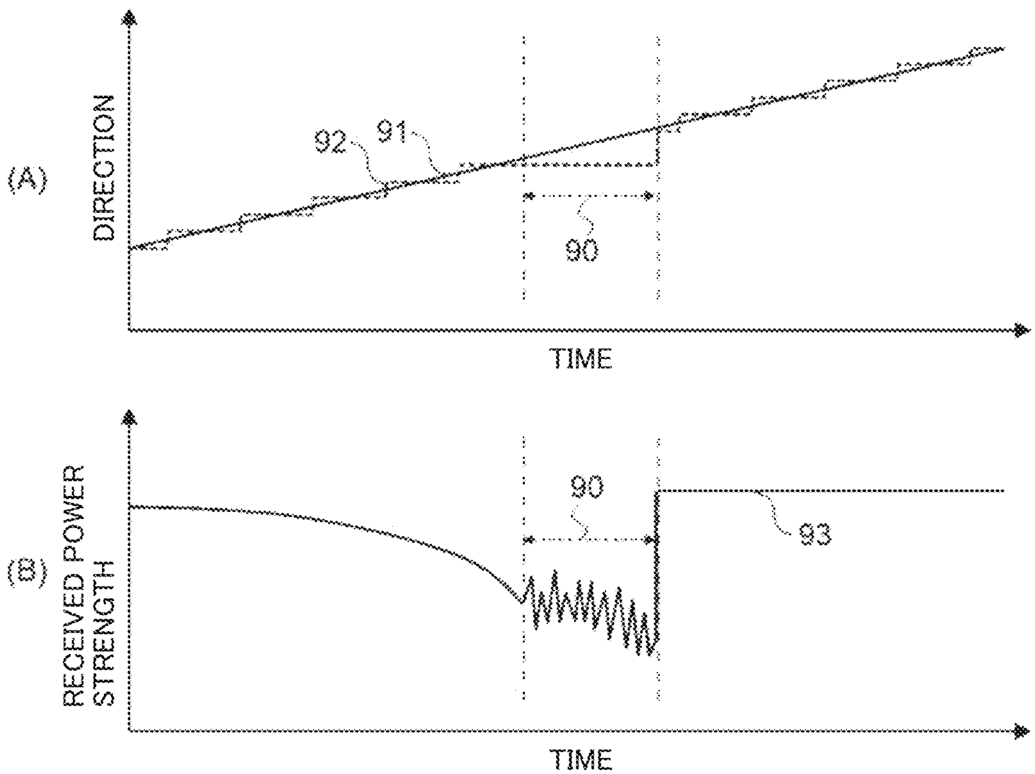
FIG. 3 is a diagram for explaining the operation in which a power transmission beam does not track a movable body when the REV method is executed for a moving movable body.
Figure 4:
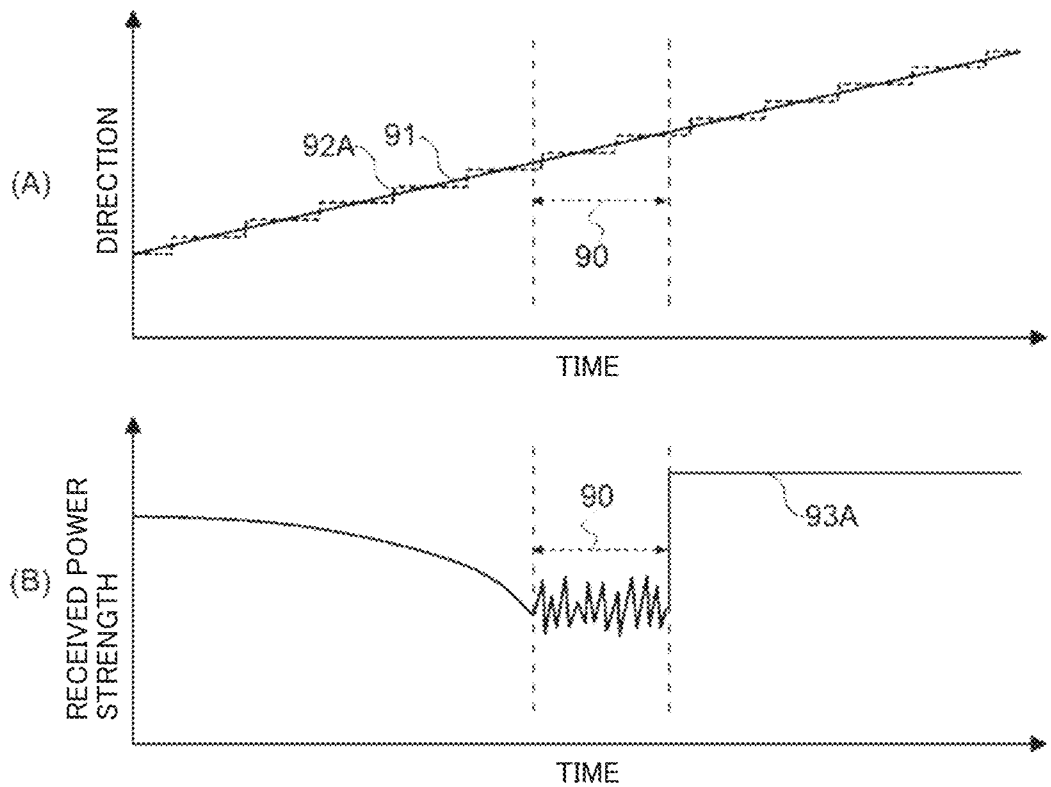
FIG. 4 is a diagram for explaining the operation in which a power transmission beam tracks a movable body when the REV method is executed for a moving movable body.

Referring to FIG. 3 and FIG. 4, the operation with a power transmission beam tracking a movable body and not tracking a movable body when the REV method is executed for a moving movable body is described. In FIG. 3, a power transmission beam does not track a movable body, and in FIG. 4, a power transmission beam tracks a movable body. In FIG. 3 and FIG. 4, the temporal change of the direction in which the movable body is present (abbreviated as movable body direction) and the power transmission direction (the direction in which a power transmission beam is radiated) is illustrated on the upper side, and the temporal change of received power strength measured by the measurement antenna is illustrated on the lower side. FIG. 3 is explained. A phase error of each element is changed as time elapsed after the previous execution of the REV method, and an error is generated in beam formation of a power transmission radio wave to decrease the received power strength. When the received power strength becomes smaller than a threshold, the REV method is executed again. The threshold may be determined in relation to the received power strength obtained by executing the REV method or may be set to a fixed value not depending on the received power strength. The period denoted by reference sign 90 is a period while the REV method is being executed.

Movable body direction 91 is changed smoothly with time. In a period while the REV method is not being executed, power transmission direction 92 is controlled such that the difference between power transmission direction 92 and movable body direction 91 is minute. Since phase shifter 13 changes the phase discretely, power transmission direction 92 is changed stepwise. In FIG. 3, in period 90 while the REV method is being executed, power transmission direction 92 is fixed to the movable body direction at the start of the REV method. Power transmission direction 92 in period 90 while the REV method is being executed may be fixed to a direction different from the movable body direction at the start of the REV method. In FIG. 4 in which the power transmission beam tracks the movable body during execution of the REV method, power transmission direction 92A is changed stepwise such that the difference from movable body direction 91 is reduced also in period 90 while the REV method is being executed.

In the REV method, the phase is changed in element radio waves 2E radiated by some of element antennas 8. Therefore, received power strength 93 measured by the measurement antenna varies in period 90 while the REV method is being executed. When period 90 while the REV method is being executed ends, the phase error of element radio wave 2$E_p$ radiated by each element antenna $\mathbf{8}_p$ is decreased, so that received power strength 93 becomes a value greater than the value before period 90.

In FIG. 3, the moving average of received power strength 93 is decreased while varying in period 90 while the REV method is being executed. This is because power transmission direction 93 does not follow movable body direction 91 and therefore power transmission direction 93 deviates from movable body direction 91. Thus, received power strength 93 is decreased in period 90 while the REV method is being executed.

By comparison, in FIG. 4, power transmission direction 92A tracks movable body direction 91, so that the moving average of received power strength 93A is not decreased in period 90 while the REV method is being executed. Since the accuracy of adjusting the phase error in the REV method is improved, received power strength 93A obtained by executing the REV method is greater than received power strength 93.

In FIG. 3 in which the power transmission direction is fixed during execution of the REV method, since the accuracy of adjusting the phase error in the REV method is low, received power strength 93 obtained by executing the REV method is smaller than received power strength 93A in FIG. 4. Thus, the period until the received power strength reaches the threshold or lower is shorter than when the power transmission direction tracks movable body 60 during execution of the REV method. The cycle of executing the REV method is therefore shorter. Since the power transmission ability is decreased during execution of the REV method, the frequent execution of the REV method causes the deterioration of the power transmission efficiency.

Figure 5:
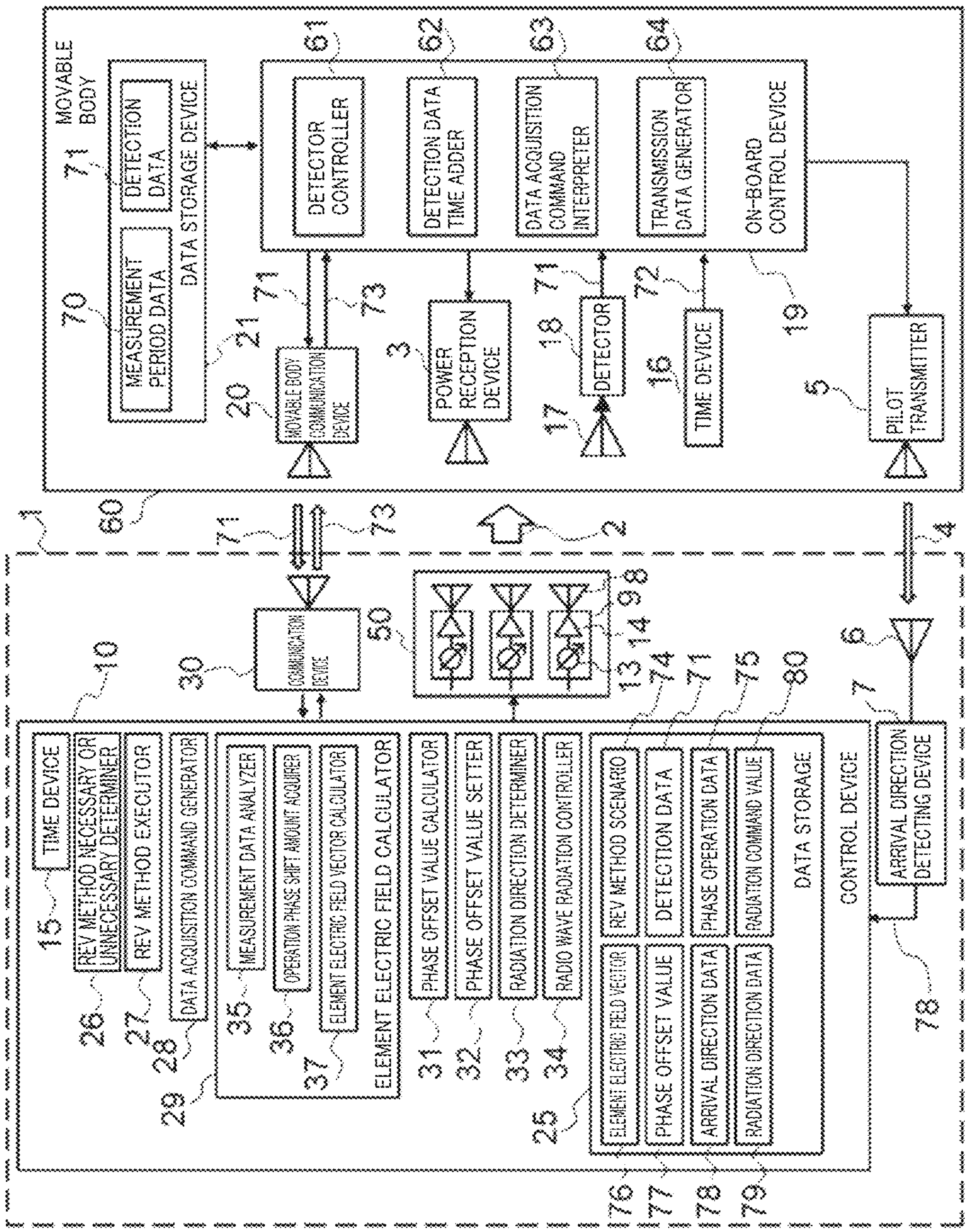
FIG. 5 is a block diagram illustrating a functional configuration of the wireless power transmission device and the movable body according to the first embodiment.

In wireless power transmission device 1, the power transmission beam tracks movable body 60 during execution of the REV method as illustrated in FIG. 4. Referring to FIG. 5, a functional configuration of wireless power transmission device 1 and movable body 60 is described. FIG. 5 is a block diagram illustrating a functional configuration of the wireless power transmission device and the movable body according to the first embodiment. Control device 10 generates a data acquisition command 73 to be sent to movable body 60. Data acquisition command 73 is a command for instructing on-board control device 19 to acquire electric field change data. The electric field change data is data representing change of the electric field vector measured by monitor antenna 17 that is obtained by executing the REV method. The electric field vector is a vector representing the amplitude and phase of power transmission radio wave 2. Data acquisition command 73 is transmitted from control device 10 to on-board control device 19 mounted on movable body 60. Upon receiving data acquisition command 73, on-board control device 19 sets a measurement period specified by data acquisition command 73. The measurement period is set in a period in which an REV method scenario 74 (described later) is scheduled to be executed. The measurement period may be one period or may be a plurality of separate periods. Detector 18 measures the electric field vector of a radio wave received by monitor antenna 17 in a period at least including a measurement period. The electric field vector may be measured as a vector represented by amplitude and phase, or only the amplitude of the electric field vector may be measured. The amplitude of the electric field vector is called electric field strength. Data acquisition command 73 may be sent, for example, in each measurement period.

REV method scenario 74 is data that defines a pattern of the amount by which the phase is changed (phase shift amount) for each phase shifter 13 in order to execute the REV method. REV method scenario 74 may change the phase shift amounts of phase shifters 13 one by one or may change the phases by the same phase shift amount for a plurality of phase shifters 13. In REV method scenario 74, element radio waves 2E may be radiated from all of element antennas 8 or element radio waves 2E may be radiated from some of element antennas 8. Any REV method scenario 74 can be used as long as it defines a phase operating pattern. The phase operating pattern is a pattern that describes operation of changing the phase shift amount of the part of phase shifters 13. The operation of changing the phase shift amount of the part of phase shifters 13 is repeated while changing the part of phase shifters 13, and is performed in a state in which at least some element antennas 8 radiate element radio waves 2E. Phase shifter 13 of which phase shift amount is changed is called operating phase shifter.

In wireless power transmission device 1, the phases of radio waves radiated by the part of element antennas 8 for execution of the REV method are changed while the moving movable body 60 is tracked and the radiation direction is changed to the direction in which movable body 60 is present. The sum of the phase operating amount (direction change phase shift amount) for changing the radiation direction toward the moving movable body 60 and the phase shift amount (operation phase shift amount) defined by REV method scenario 74 is the phase command value of each phase shifter 13. Control device 10 performs control by giving a command value to each element module 9, that is, each phase shifter 13 and each amplifier 14.

On-board control device 19 generates detection data 71 by adding time data 72 at a point of time when the electric field vector is measured by detector 18. Detection data 71 measured by detector 18 during execution of REV method scenario 74 is called REV method run-time radio wave data. Detection data 71 represents change of the electric field vector measured by monitor antenna 17. Detection data 71 measured at least in a measurement period is stored in data storage device 21. Detection data 71 measured during execution of REV method scenario 74 is transmitted from on-board control device 19 to control device 10. Data transmitted from movable body 60 to obtain an element electric field vector by control device 10 is electric field change data. In the first embodiment, detection data 71 that is the REV method run-time radio wave data is electric field change data.

In the REV method, in order to equalize (calibrate) the phase references of element modules 9, monitor antenna 17 measures change of the electric field vector repeatedly while changing the phase shift amount of the part of phase shifters 13 in a state in which at least some element antennas 8 radiate element radio waves 2E. The phase shift amount is the amount of changing the phase of a signal outputted by phase shifter 13 from the phase of an input signal. The element electric field vector is calculated for each element antenna 8, from change of the electric field vector. The element electric field vector is an electric field vector generated at the position of monitor antenna 17 by element radio wave 2E radiated by element antenna 8 supplied with a transmission signal outputted by one element module 9. Monitor antenna 17 receives element radio wave 2E to detect the element electric field vector. Element radio wave 2$E_p$ radiated by each element antenna $_p$8 is received by monitor antenna 17 whereby the element electric field vector is detected.

Control device 10 calculates a phase shift offset value 77 for equalizing the phase references of phase shifters 13, from the phase of the element electric field vector for each element antenna 8. The calculated phase shift offset value 77 is set in each phase shifter 13. The amplification factor of each amplifier 14 may be adjusted from the amplitude ratio of the element electric field vector for each element antenna 8 such that the amplitude of the element electric field vector is also matched. Only the element electric field phase that is the phase of the element electric field vector may be calculated, instead of the element electric field vector.

Control device 10 includes time device 15, a data storage 25, an REV method necessary or unnecessary determiner 26, an REV method executor 27, a data acquisition command generator 28, an element electric field calculator 29, communication device 30, a phase offset value calculator 31, a phase offset value setter 32, a radiation direction determiner 33, and a radio wave radiation controller 34. Element electric field calculator 29 includes a measurement data analyzer 35, an operation phase shift amount acquirer 36, and an element electric field vector calculator 37.

Data storage 25 stores data necessary for executing the REV method and data necessary for control device 10 to transmit power to movable body 60. REV method necessary or unnecessary determiner 26 determines whether execution of the REV method is necessary or not. REV method executor 27 controls each element module 9 during execution of the REV method. Data acquisition command generator 28 generates data acquisition command 73 to notify movable body 60 of the start of execution of the REV method. Communication device 30 communicates with movable body communication device 20 included in movable body 60. Element electric field calculator 29 calculates the element electric field vector generated by element radio wave 2$E_p$ radiated by each element antenna 8$_p$ by the REV method. Phase offset value calculator 31 calculates a phase offset value to be set in each phase shifter 13 from the element electric field vector. Radiation direction determiner 33 determines a radiation direction from the arrival direction of pilot signal 4. Radio wave radiation controller 34 controls each module 9 such that power transmission radio wave 2 is radiated in the radiation direction. The arrival direction is the presence direction that is the direction in which movable body 60 is present.

The phase offset value is a value to be subtracted from a phase command value given to phase shifter 1. Phase shifter 13 changes the phase by the amount obtained by subtracting the phase offset value from the phase command value. Thus, the amount of change of phase in a transmission signal outputted by phase shifter 13 actually is a value obtained by subtracting the phase offset value from the phase command value. The phase offset value is subtracted from the phase command value whereby each element antenna $8_p$ can radiate element radio wave $2E_p$ having the same phase when the same phase command value is given to each element module 9.

The phase difference between element electric field vectors generated by element radio waves $2E_p$ radiated by element antennas $8_p$ is measured by the REV method. In the REV method, the phase of element radio wave 2E radiated by any one of element antennas 8 is changed so that change in amplitude (electric field strength) of the electric field vector of the radio wave received by monitor antenna 17 is measured. Detection data 71 at least including the measured electric field strength is sent to control device 10 by movable body communication device 20. Time data 72 representing the time of measurement is added to detection data 71.

Control device 10 calculates the phase difference between the element electric field vector of a radio wave radiated by element antenna 8 corresponding to each element module 9 and the electric field vector (composite electric field vector) of power transmission radio wave 2 obtained by synthesizing element radio waves 2E radiated by all element antennas 8, from the change of the electric field vector conveyed by the received detection data 71. Control device 10 calculates a phase offset value to be set in each phase shifter 13, from the phase difference between the element electric field vector and the composite electric field vector.

The phase difference between element electric field vectors generated by element radio waves $2E_p$ radiated by element antennas $8_p$ is caused by a difference in path length in the inside of wireless power transmission device 1, a difference in distance between each element antenna 8 and monitor antenna 17, change in surrounding environment of wireless power transmission device 1, and the like. The phase difference caused by a difference in path length in the inside of wireless power transmission device 1 is obtained and corrected before wireless power transmission device 1 is used. A phase difference is changed with the temperature of wireless power transmission device 1 because a circuit for radio wave frequency includes phase error components having such as a difference in temperature characteristics, in addition to the path length difference. The change in surrounding environment of wireless power transmission device 1 is, for example, the influence of structures existing in the surroundings of wireless power transmission device 1 or change in state of the air through which power transmission radio wave 2 is transmitted. A phase difference caused by the change in surrounding environment of wireless power transmission device 1 deteriorates the power transmission efficiency. When the power transmission efficiency is deteriorated, the REV method is executed to obtain and correct the phase difference. By doing so, the power transmission efficiency of wireless power transmission device 1 can be recovered to the original value.

Data storage 25 stores REV method scenario 74, detection data 71, phase operation data 75, element electric field vector 76, phase offset value 77, arrival direction data 78, radiation direction data 79, and radiation command value 80.

REV method scenario 74 defines the order of phase shifters 13 for which the phase shift amount is changed for executing the REV method and a phase operating pattern that is a pattern representing temporal change in which the phase shift amount is changed for each phase shifter 13. The sum of the direction change phase shift amount for transmitting power in the power transmission direction and the operation phase shift amount determined from REV method scenario 74 is the phase command value of each phase shifter 13.

The phase operating pattern defines a sequence of changing the phase shift amount of each phase shifter 13 by a relative time from the start of REV method scenario 74. Change of the phase shift amount of each phase shifter 13 may be represented, for each phase shifter 13, by a relative time from the start of a period in which the phase shift amount is changed in phase shifter 13. In general, in REV method scenario 74, the phase operating pattern is represented by one or more reference events with a designated time and a non-reference event in which the time is represented by a relative time from any one reference event. In the REV method scenario, a phase operating pattern may be represented with a higher degree of freedom, for example, by defining only the order of events as a phase operating pattern. In REV method scenario 74 used in the present embodiment, the start is a reference event and other events are non-reference events.

Data acquisition command 73 is a command to notify on-board control device 19 of a measurement period that is a period in which detector 18 mounted on movable body 60 measures detection data 71. Data acquisition command 73 represents the measurement period, for example, by the start time and the elapsed time from the start time. The measurement period may be represented by the start time and the end time. Data acquisition command 73 may be a command sent at the timings of the start and the end of the measurement period.

Detection data 71 is data representing the electric field vector generated by detector 18 with the time. Detection data 71 is measured at predetermined time intervals. Phase operation data 75 is data representing the operation phase shift amount in each time interval of phase shifter 13 that is changed in accordance with REV method scenario 74.

Element electric field vector 76 is data representing the electric field vector generated by element radio wave $2E_p$ radiated by element antenna $8_p$ at the position where monitor antenna 17 is present. As is described later, element electric field calculator 29 calculates an element electric field phase that is the phase of the element electric field vector and an element electric field amplitude that is the amplitude of the element electric field vector. The element electric field calculator may calculate only an element electric field phase.

Phase offset value 77 is the phase shift amount, that is, a numerical value subtracted from the phase command value. Phase shift offset value 77 is set in each phase shifter 13. Each phase shifter 13 changes the phase by the phase shift amount obtained by subtracting phase offset value 77 from the phase command value. By doing so, when the same phase command value is given to each phase shifter 13, the phase of element electric field vector 27 generated by element radio wave $2E_p$ radiated by each element antenna $8_p$ becomes equal. Phase offset value 77 is calculated as a difference of the element electric field phase for each element module 9. Phase offset value 77 is data for equalizing the phase references of element modules 9 that are obtained based on the element electric field phases for element modules 9. To calculate phase offset value 77, it is necessary to calculate the element electric filed phase. When the element electric field phase can be calculated, phase offset value 77 can be calculated.

In order to equalize the phase references of element modules 9, a method different from the method of setting a phase offset value in phase shifter 13 may be used. This is applicable to the other embodiments.

Arrival direction data 78 is data representing the direction in which pilot signal 4 arrives. Arrival direction data 78 is obtained by arrival direction detecting device 7 from the pilot reception signal by the mono-pulse angle measurement method. Radiation direction data 79 is data that specifies the direction of a radio wave radiated from power transmission antenna 50. Radiation command value 80 is data representing a command value to instruct each phase shifter 13 and each amplifier 14 so that a radio wave can be radiated in the direction indicated by radiation direction data 79. Radiation command value 80 is sent as a power transmission control signal to wireless power transmission device 1.

REV method necessary or unnecessary determiner 26 determines whether execution of the REV method is necessary or not, from detection data 71 sent from movable body 60 periodically. Detection data 71 includes a received power value that is the value of electric power received by movable body 60. REV method necessary or unnecessary determiner 26 determines that execution of the REV method is necessary when the received power value at the same distance to movable body 60 is decreased to a value smaller than a predetermined threshold. It is determined that execution of the REV method is necessary also when a predetermined time has elapsed since the previous execution of the REV method. Whether execution of the REV method is necessary or not may be determined by either decrease of the received power value to a value less than a threshold or the elapse of time.

REV method executor 27 changes the operation phase shift amount of phase shifter 13 specified by REV method scenario 74 and generates phase operation data 75 that is a record of the result of change of the operation phase shift amount. REV method executor 27 is a REV method phase controller that changes the phase of a transmission signal with the phase shift amount obtained by adding the operation phase shift amount to the direction change phase shift amount for the operating phase shifter, based on the REV method scenario. REV method executor 27 is also a phase operation recorder that generates phase operation data 75 to record temporal change of the operation phase shift amount of phase shifter 13 that changes based on the REV method scenario. REV method scenario 74 may be written in a program that implements REV method executor 27, instead of being stored in data storage 25.

Data acquisition command generator 28 generates data acquisition command 73. Communication device 30 sends data acquisition command 73 to on-board control device 19 and receives detection data 71 sent from on-board control device 19. Movable body communication device 20 included in movable body 60 receives data acquisition command 73 sent by control device 10 and sends detection data 71 to control device 10.

Element electric field calculator 29 calculates element electric field vector 76 of each phase shifter 13, based on REV method scenario 74, phase operation data 75, and detection data 71. The method of calculating element electric field vector 76 is a conventional technique. For example, this technique is described in PTL 2. For example, the element electric field vector is calculated from the operation phase shift amount recorded in phase operation data 75 at the point of time when the amplitude of the electric field vector recorded in detection data 71 is largest or smallest and the ratio between the maximum value and the minimum value of the amplitude of the electric field vector. Element electric field calculator 29 is an REV method analyzer that obtains the element electric field phase for each element module 9. The internal configuration of element electric field calculator 29 is described later. Phase operation data 75 is generated based on REV method scenario 74. Element electric field calculator 29 therefore calculates element electric field vector 76 of each phase shifter 13, based on REV method scenario 74 and detection data 71.

Phase offset value calculator 31 calculates phase offset value 77 for each phase shifter 13 from element electric field vector 76 of each phase shifter 13. Phase offset value setter 32 sets phase offset value 77 for each phase shifter 13. Phase offset value calculator 31 and phase offset value setter 32 constitute a phase reference adjuster that equalizes the phase references of transmission signals outputted by element modules 9 based on the element electric field phases.

Radiation direction determiner 33 obtains a radiation direction based on arrival direction data 78 and sets the radiation direction in radiation direction data 79. Radio wave radiation controller 34 generates radiation command value 80 based on radiation direction data 79. When the radiation direction is not determined, that is, when radiation direction data 79 is not set, radio wave radiation controller 34 does not generate radiation command value 80. Radio wave radiation controller 34 is a radiation direction changer that directs the radiation direction of power transmission antenna 50 to the presence direction.

As illustrated in FIG. 5, data storage device 21 mounted on movable body 60 stores measurement period data 70 and detection data 71. Measurement period data 70 is data representing a period in which detection data 71 is recorded. Measurement period data 70 is specified by data acquisition command 73 sent from control device 10. Detection data 71 is data representing the electric field vector measured by monitor antenna 17 in a measurement period specified by measurement period data 70 and associated with time data 72 at the point of time when the electric field vector is measured.

On-board control device 19 includes time device 16, a detector controller 61, a detection data time adder 62, a data acquisition command interpreter 63, and a transmission data generator 64. Detection data time adder 62 adds time data 72 of the time when on-board control device 19 receives detection data 71 to detection data 71 outputted by detector 18.

Data acquisition command interpreter 63 extracts measurement period data 70 from data acquisition command 73 and stores the extracted measurement period data 70 into data storage device 21. Detector controller 61 controls detector 18 such that detection data 71 is generated in the measurement period specified by measurement period data 70. Detection data 71 is stored in data storage device 21.

Transmission data generator 64 generates detection data 71 to be sent by compressing detection data 71 in the measurement period defined by measurement period data 70. Movable body communication device 20 receives data acquisition command 73 and sends detection data 71 generated by transmission data generator 64 to control device 10.

Element electric field calculator 29 includes measurement data analyzer 35, operation phase shift amount acquirer 36, and element electric field vector calculator 37. Measurement data analyzer 35 analyzes detection data 71 sent from on-board control device 19 and detects the time when the electric field strength is largest, the time when the electric field strength is smallest, and the maximum value and the minimum value of the electric field strength, for each measurement period. Operation phase shift amount acquirer 36 refers to phase operation data 75 by the times when the electric field strength is largest or smallest to obtain the operation phase shift amount of the operating phase shifter for each measurement period. The time when the electric field strength is largest or smallest is the time to obtain the operation phase shift amount and is therefore also called the phase shift amount detection time.

Element electric field vector calculator 37 calculates the element electric field vector for each element module 9 based on the operation phase shift amount of each phase shifter 13. When the operation phase shift amount for a single phase shifters 13 is changed in REV method scenario 74, the element electric field vector can be calculated from the operation phase shift amount of each phase shifter 13 and the ratio between the maximum value and the minimum value of the electric field strength. When the operation phase shift amounts are measured by changing simultaneously the operation phase shift amounts for a plurality of phase shifters 13, the element electric field vector for each element module 9 can be calculated, for example, by solving simultaneous equations.

In order to obtain the operation phase shift amount of phase shifter 13 from the phase shift amount detection time, REV method scenario 74 may be referred to, although referring to phase operation data 75 is more accurate. In this case, the relative time is obtained by subtracting the start time of REV method scenario 74 from the phase shift amount detection time. The change pattern of the operation phase shift amount of each phase shifter 13 defined by the relative time from the start of REV method scenario 74 is referred to by the relative time to obtain the operation phase shift amount of phase shifter 13 at the phase shift amount detection time. The relative time written in REV method scenario 74 may be converted into the absolute time (time), and the REV method scenario converted in the absolute time may be referred to by the phase shift amount detection time.

How the electric power received by power reception device 3 mounted on movable body 60 is changed with the movement of movable body 60 is studied. The following is assumed.

(A) Power transmission antenna 50 has element antennas 8 arranged linearly in one dimension.

(B) Electric power transmitted by power transmission antenna 50 is calculated with a distance at which a far field is established.

(C) Change in power transmission direction in a plane including the direction in which element antennas 8 are arranged and the front direction of power transmission antenna 50 is studied. When the power transmission direction is matched with the front direction of power transmission antenna 50, the angle of the power transmission direction is zero degrees.

(D) Assuming that change in distance between wireless power transmission device 1 and power reception device 3 is small, change in electric power received by power reception device 3 for the change in distance is not taken into consideration.

Since the distance between wireless power transmission device 1 and power reception device 3 is a distance at which a far field is established, change in distance between wireless power transmission device 1 and power reception device 3 is generated similarly in all element antennas 8. Thus, change in distance between wireless power transmission device 1 and power reception device 3 does not change the phase difference of element radio wave 2$E_p$ radiated by each element antenna $\mathbf{8}_p$.

The following variables are defined as variables representing the characteristics of power transmission antenna 50.

N: the number of element antennas 8 included in power transmission antenna 50.

Nm: the middle number of N. Nm=(N+1)/2.

f: the frequency of power transmission radio wave 2 transmitted.

λ: the wavelength of power transmission radio wave 2 transmitted. λ=c/(2π*f). c is speed of light.

L: the distance between element antennas 8.

nd: the number of phases that can be changed by phase shifter 13.

θd: the interval at which the phase is changed by phase shifter 13. θd=2π/nd [rad]

p: the subscript for element antenna 8. Adjacent element antennas 8 are set to have numbers p in series.

φp: the phase error of element radio wave 2$E_p$ radiated by element antenna $\mathbf{8}_p$ numbered p. The adjustment target in the REV method.

ψ: the power transmission direction of power transmission antenna 50.

$\theta_p$: the direction change phase shift amount for element antenna 8 numbered p at the time of power transmission direction ψ.

$k_p$: the phase shift amount for phase shifter 13 numbered p for the direction change phase shift amount $\theta_p$.

δ: deviation angle from power transmission direction ψ.

ε: the phase difference between the element electric field vectors generated by element radio waves 2E radiated by adjacent element antennas 8 that is detected in the direction at deviation angle S.

γ: the ratio of the amplitude of the electric field vector detected in the direction at deviation angle δ to the amplitude of the electric field vector detected in the power transmission direction ψ. Called the amplitude attenuation ratio.

When power is transmitted in the power transmission direction ψ, the direction change phase shift amount $\theta_p$ of element radio wave 2$E_p$ radiated by each element antenna $\mathbf{8}_p$ is determined as follows. For each phase shifter 13$p$, the phase error φp=0 is assumed.

$$\theta_p(2*\pi)*(p-Nm)*(L/\lambda)*\sin(\psi)p=1, \ldots, N \quad (1)$$

Since the phase is changed every θd in phase shifter 13, kp is determined as follows such that $|\theta_p-k_p*\theta d|\leq(\theta d/2)$ is satisfied. Here, int(X) is a function that returns the maximum integer equal to or smaller than a real number X.

$$k_p=\mathrm{int}((\theta_p/\theta d)+0.5) \quad (2)$$

The phase difference ε between the element electric field vectors generated by element radio waves 2E radiated by adjacent element antennas 8 that is detected in a direction (ψ+δ) deviated from power transmission direction ψ by angle δ is determined as follows.

$$\varepsilon=(2*\pi)*(L/\lambda)*(\sin(\psi+\delta)-\sin(\psi)) \quad (3)$$

Equation (3) is approximated by sin(δ)≈δ and cos(δ)≈1 as follows, assuming that δ is minute.

$$\varepsilon=(2*\pi)*(L/\lambda)*\cos(\psi)*\delta \quad (4)$$

The amplitude attenuation ratio γ, which is the value obtained by dividing the amplitude of the electric field vector detected in the direction (ψ+δ) by the amplitude of the electric field vector detected in the power transmission direction ψ, can be calculated as follows. It is assumed that deterioration in power transmission efficiency caused by changing the phase every θd in phase shifter 13 is zero in the power transmission direction ψ.

$$\gamma=(1/N)*\Sigma\exp(j*(p-Nm)*\varepsilon) \quad (5)$$

In equation (5) and the like, Σ means summation with p=1, . . . , N. In equation (5), (p−Nm)*ε is set instead of p*ε in order to prevent the phase of the composite electric field vector from changing with the phase difference ε. Based on equation (5), the absolute value |γ| of γ can be calculated as follows.

$$|\gamma|=(1/N)*\surd((\Sigma\cos((P-Nm)*\varepsilon))^2+(\Sigma\sin((p-Nm)*\varepsilon))^2) \quad (6)$$

Figure 6:
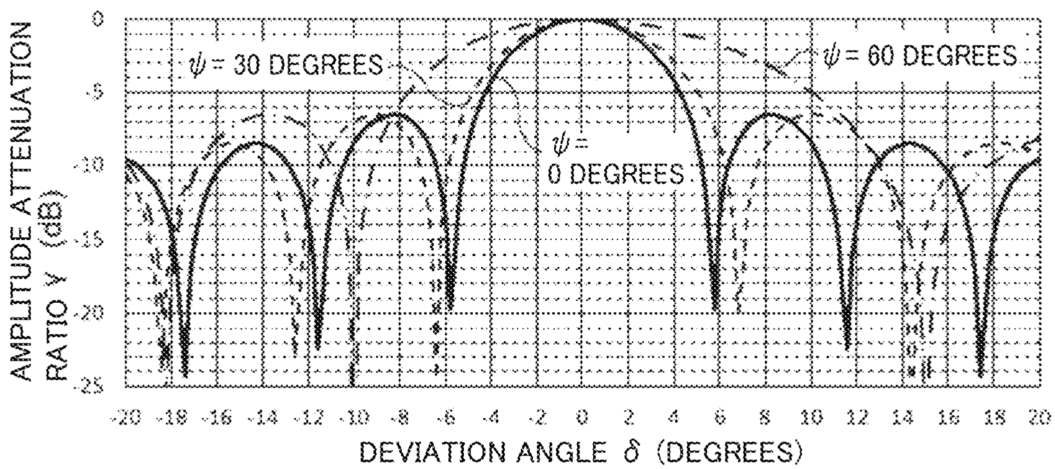
FIG. 6 is a graph illustrating change of an amplitude attenuation ratio $\gamma$ to change of a deviation angle $\delta$ in a phased array antenna included in the wireless power transmission device according to the first embodiment.

A case where power transmission antenna 50 is a phased array antenna with N=10, f=5 GHz, X=60 mm, L=60 mm, nd=128, and θd=2.8125 degrees is studied. FIG. 6 illustrates graphs representing change of the amplitude attenuation ratio γ to change of deviation angle δ when the power transmission direction ψ is set to be 0 degrees, 30 degrees, and 60 degrees. The graph satisfying ψ=0 degrees is depicted by a solid line, the graph satisfying ψ=30 degrees is depicted by a broken line, and the graph satisfying ψ=60 degrees is depicted by a long and short dashed line. When ψ is set to be 0 degrees, the half-width (full width at half maximum) in which the amplitude attenuates to half is approximately 6.8 degrees. As ψ is increased, the half-width is increased. When ψ is set to be 30 degrees, the half-width is approximately 8.0 degrees. When ψ is set to be 60 degrees, the half-width is approximately 14.1 degrees. When ψ is set to exceed 30 degrees, the degree of increase of half-width to the increase of ψ is increased. The width of the power transmission beam is larger on the side where deviation angle δ>0 is satisfied than on the side where δ<0 is satisfied. The side satisfying δ>0 is the side on which the angle with respect to the front direction is larger.

The following variables are defined in order to describe the conditions in which power is transmitted to the moving movable body 60. It is assumed that power transmission antenna 50 is installed such that the front direction is directed to the zenith.

ψ: the direction from wireless power transmission device 1 toward movable body 60. ψ=0 degrees when directed to the zenith. When ψ>0, movable body 60 is present in front of wireless power transmission device 1. ψ is called the altitude angle.

$\psi_0$: the power transmission direction ψ at the start of the REV method.

G: the distance from wireless power transmission device 1 to movable body 60.

$G_0$: the distance G at the start of the REV method.

$V_0$: the speed of movable body 60. Constant value.

$\xi_0$: the angle difference between the moving direction of movable body 60 and the direction toward the zenith. Constant value. $\xi_0$=0 degrees when directed to the zenith.

t: the elapsed time from the start of the REV method.

$P_t$: the position of movable body 60 at time t. The position of wireless power transmission device 1 is used as a reference.

$P_0$: the position of movable body 60 at the start of the REV method (t=0).

Figure 7:
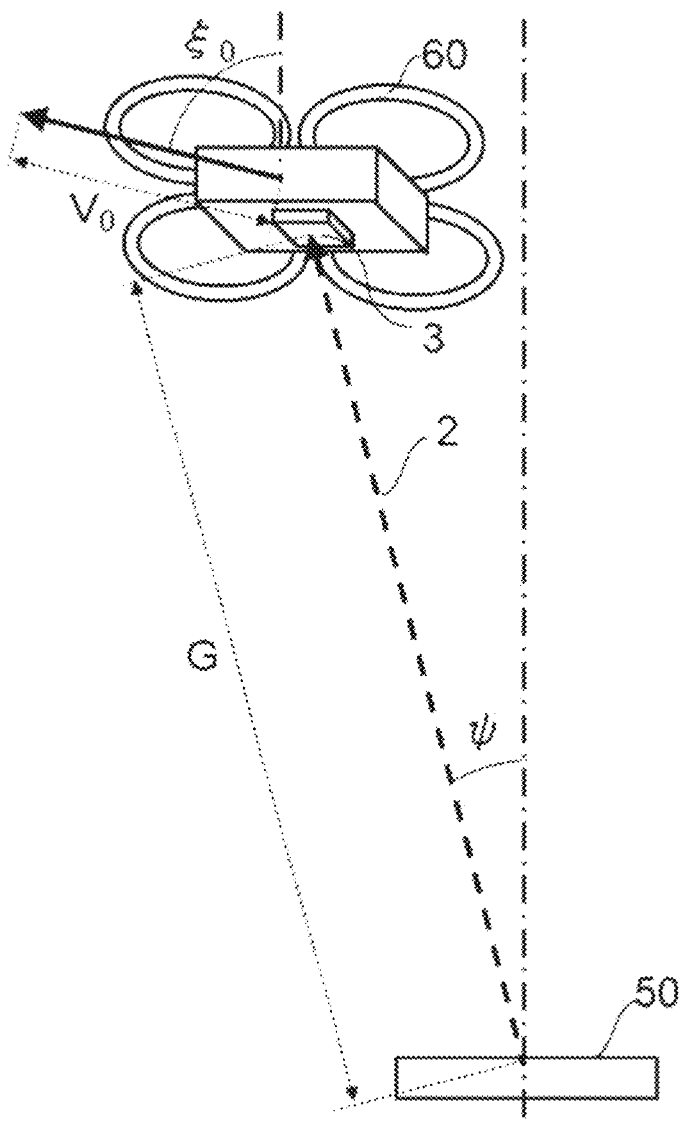
FIG. 7 is a diagram illustrating variables representing the positional relation between the movable body and the wireless power transmission device.

The following is satisfied for the distance to movable body 60 and the direction. FIG. 7 illustrates variables representing the positional relation between the movable body and the wireless power transmission device. In FIG. 7, the direction toward the zenith is depicted by a long and short dashed line. Equation (7) is an equation for the height of movable body 60, and Equation (8) is an equation for the distance in the horizontal direction of movable body 60.

$$G_0*\sin(\psi_0)+V_0*t*\sin(\xi_0)=G*\sin(\psi) \quad (7)$$

$$G_0*\cos(\psi_0)+V_0*t*\cos(\xi_0)=G*\cos(\psi) \quad (8)$$

Based on equation (7) and equation (8), G and ψ can be calculated by the following equations.

$$G=\surd(G_0^2+2*G_0*V_0*t*\cos(\xi_0-\psi_0)+(V_0*t)^2) \quad (9)$$

$$\psi=\sin^{-1}((G_0*\sin(\psi_0)+V_0*t*\sin(\xi_0))/G) \quad (10)$$

The variables used for explaining the process of the REV method are defined as follows.

Td: the length of time in which element radio wave 2E radiated by element antenna 8 has the specified operation phase shift amount specified during execution of the REV method.

m: the cumulative number of times the operation phase shift amount is changed in each element module 9 since the start of the REV method.

t is m*Td.

$\theta_{rp}$: the phase command value for phase shifter 13 numbered q during execution of the REV method.

q: the number of element antenna 8 in which the phase is to be changed in the REV method.

r: the number that specifies the phase to be changed in element antenna 8 numbered q in the REV method.

$E_0$: the amplitude of the element electric field vector generated by element radio wave 2E radiated by one element antenna 8.

$E_p$: the element electric field vector at the position of power reception device 3 that is generated by element radio wave 2$E_p$ radiated by element antenna 8$_p$ numbered p.

Esum: the electric field vector at the position of power reception device 3 that is generated by element radio waves 2E radiated by all element antennas 8.

$\theta_{sum}$: the phase of electric field vector Esum.

In the REV method, the phase is changed by r*θd in the order of r=1, nd every time Td in element antenna 8$_q$ numbered q in the order of q=1, . . . , N. Furthermore, the phase of element radio wave 2$E_p$ radiated by each element antenna 8$_p$ is controlled such that element radio wave 2$E_p$ can be radiated toward the power transmission direction ψ. The phase command value $\theta_m$ for each phase shifter 13 at time t=m*Td is determined as follows. $k_p$*θd indicated in equation (11-1) and equation (11-2) is the direction change phase shift amount, and r*θd is the operation phase shift amount. $k_p$ can be calculated from equation (2) and equation (1). ψ can be calculated from equation (10) and equation (9).

$$\text{When } p\neq q, \theta_{rp}=k_p*\theta d \quad (11\text{-}1)$$

$$\text{When } p=q, \theta_{rp}=(k_p+r)*\theta d \quad (11\text{-}2)$$

Here, q and r have the following relation with m. mod(X, Y) is a function that returns the remainder when a natural number X is divided by a natural number Y. q is incremented by one every time m is increased by nd. r is incremented by one every time m is increased by one. When r=nd, r=1 is set.

$$q=\text{int}((m-1)/nd)+1 \quad (12)$$

$$r=\text{mod}((m-1),nd)+1 \quad (13)$$

Here, a simulation is conducted in a case where the direction change phase shift amount is updated every 10 msec.

The phase of element radio wave 2$E_p$ radiated by element antenna 8$_p$ numbered p has the following three kinds of differences with respect to the direction change phase shift amount $\theta_p$.

(A) the phase error φp of element radio wave 2$E_p$ radiated by element antenna 8$_p$ numbered p.

(B) the error of approximating θp by an integer multiple of θd.

(C) the operation phase shift amount r*θd in executing the REV method.

The element electric field vectors $E_p$ and Esum therefore can be calculated as follows.

$$E_p=E_0*\exp(j(\varphi p+\theta_{rp}-\theta_p)) \quad (14)$$

$$Esum=\Sigma E_p=E_0*\Sigma\exp(j(\varphi p+\theta_{rp}-\theta_p) \quad (15)$$

$$|Esum|=\sqrt{}((\Sigma\cos(\varphi p+\theta_{rp}-\theta_p))^2+(\Sigma\sin(\varphi p+\theta_{rp}-\theta_p))^2) \quad (16)$$

$$\theta sum=\sin^{-1}(\Sigma\sin(\varphi p+\theta_{rp}-\theta_p)/|Esum|) \quad (17)$$

A comparative example in which movable body 60 is not tracked during execution of the REV method is studied. The following variables are defined.

$\theta_{0p}$: the direction change phase shift amount for element antenna 8 numbered p at the time of power transmission direction $\psi_0$.

$k_{0p}$: the phase shift amount for phase shifter 13 numbered p for the direction change phase shift amount $\theta_{0p}$.

ε2: the phase difference between the element electric field vectors generated by element radio waves 2$E_p$ radiated by adjacent element antennas 8$_p$ that is detected in the power transmission direction ψ.

$E2_p$: the element electric field vector generated by element radio wave 2$E_p$ radiated by element antenna 8$_p$ numbered p when movable body 60 is not tracked during execution of the REV method.

E2sum: the electric field vectors generated by element radio waves 2E radiated by all element antennas 8 when movable body 60 is not tracked during execution of the REV method.

θ2sum: the phase of electric field vector E2sum.

$\theta_{0p}$, $k_{0p}$, and ε2 can be calculated as follows.

$$\theta_{0p}=(2*\pi)*(p-Nm)*(L/\lambda)*\sin(\psi_0)p=1, \ldots, N \quad (18)$$

$$k_{0p}=\mathrm{int}((\theta_{0p}/\theta d)+0.5) \quad (19)$$

$$\varepsilon 2=(2*\pi)*(L/\lambda)*(\sin(\psi)-\sin(\psi_0)) \quad (20)$$

Equation (7) is substituted into equation (20) as follows.

$$\varepsilon 2=(2*\pi)*(L/\lambda)*(1/G)*((G_0-G)*\sin(\psi_0)+V_0*m*Td*\sin(\xi_0)) \quad (21)$$

When movable body 60 is not tracked during execution of the REV method, the phase command value $\theta_{rp}$ for each phase shifter 13 at time t=m*Td is determined as follows.

$$\text{When } p\neq q, \theta_{rp}=k_{0p}*\theta d \quad (22\text{-}1)$$

$$\text{When } p=q, \theta_{rp}=(k_{0p}+r)*\theta d \quad (22\text{-}2)$$

$E2_p$ and E2sum can be calculated by the following equations.

$$E2_P=E_0*\exp(j(\varphi p+\theta_{rp}-\theta_{0p}+(p-Nm)*\varepsilon 2) \quad (23)$$

$$E2\,\mathrm{sum}=\Sigma E2_p \quad (24)$$
$$=E_0*\Sigma\exp(j(\varphi p+\theta_{rp}-\theta_{0p}+(p-Nm)*\varepsilon 2)$$

$$|E2\,\mathrm{sum}|=\sqrt{((\Sigma\cos(\varphi p+\theta_{rp}-\theta_{0p}+(p-Nm)*\varepsilon 2))^2+(\Sigma\sin(\varphi p+\theta_{rp}-\theta_{0p}+(p-Nm)*\varepsilon 2))^2)} \quad (25)$$

$$\theta 2\,\mathrm{sum}=\sin^{-1}(\Sigma\sin(\varphi p+\theta_{rp}-\theta_{0p}+(p-Nm)*\varepsilon 2)/|E2\,\mathrm{sum}|) \quad (26)$$

Power transmission antenna 50 has element antennas 8 arranged in two dimensions. A case where the direction of arrangement of element antennas 8 and the locus of movable body 60 are not on a single plane is studied. Here, it is assumed that the directions in which element antennas 8 are arranged in power transmission antenna 50 being matched with a south-north direction and an east-west direction. The following variables are defined. Movable body 60 moves on a straight line extending in a predetermined direction.

$\psi_{AZ}$: the azimuth angle component of the direction from wireless power transmission device 1 toward movable body 60. $\psi_{AZ}$=0 when directed to the north. $\psi_{AZ}$>0 clockwise. Called azimuth angle.

$\psi_{EL}$: the elevation angle component of the direction from wireless power transmission device 1 toward movable body 60. $\psi_{EL}$=0 when directed to the zenith. Called altitude angle.

$\psi_{AZ0}$: the azimuth angle component of the direction from wireless power transmission device 1 toward movable body 60 at the start of the REV method.

$\psi_{EL0}$: the altitude angle of the direction from wireless power transmission device 1 toward movable body 60 at the start of the REV method.

$V_0$: the speed of movable body 60. Constant value.

$\xi_{AZ0}$: the angle difference between the moving direction of movable body 60 and the south-north direction.

$\xi_{EL0}$: the angle difference between the moving direction of movable body 60 and the direction toward the zenith.

The following is satisfied for the distance to movable body 60 and the direction. For the position of movable body 60 in the south-north direction, equation (27) is satisfied.

$$G_0*\sin(\psi_{EL0})*\cos(\psi_{AZ0})+V_0*t*\sin(\xi_{EL0})*\cos(\xi_{AZ0})=G*\sin(\psi_{EL})*\cos(\psi_{AZ}) \quad (27)$$

For the position of movable body 60 in the east-west direction, equation (28) is satisfied.

$$G_0*\sin(\psi_{EL0})*\sin(\psi_{AZ0})+V_0*t*\sin(\xi_{EL0})*\sin(\xi_{AZ0})=G*\sin(\psi_{EL})*\sin(\psi_{AZ}) \quad (28)$$

For the altitude where movable body 60 is present, equation (29) is satisfied.

$$G_0*\cos(\psi_{EL0})+V_0*t*\cos(\xi_{EL0})=G*\cos(\psi_{EL}) \qquad (29)$$

The following is obtained from equations (27) to (29).

$$\begin{aligned} G = {} & \sqrt{(G_0^2 + (V_0 * t)^2} \\ & +2 * G_0 * V_0 * t \\ & * (\sin(\psi_{EL0}) * \sin(\xi_{EL0}) * \cos(\psi_{AZ0} - \xi_{AZ0}) \\ & + \cos(\psi_{EL0}) * \cos(\xi_{EL0}))) \end{aligned} \qquad (30)$$

$$\begin{aligned} \psi_{EL} = {} & \sin^{-1}\Big(\sqrt{((G^2 - (G_0 * \cos(\psi_{EL0})} \\ & + V_0 * t * \cos(\xi_{EL0}))^2\Big) / G\Big) \end{aligned} \qquad (31)$$

$$\begin{aligned} \psi_{AZ} = {} & \sin^{-1}\Big(\sqrt{((G_0 * \sin(\psi_{EL0}) * \sin(\psi_{AZ0})} \\ & + V_0 * t * \sin(\xi_{EL0}) * \sin(\xi_{AZ0})) \\ & \Big/ \Big(G^2 - (G_0 * \cos(\psi_{EL0}) \\ & V_0 * t * \cos(\xi_{EL0}))^2\Big)\Big) \end{aligned} \qquad (32)$$

In power transmission antenna 50, $N^2$ element antennas 8 are arranged in N rows and N columns. The distance between element antennas 8 is L, which is the same in the vertical direction and the horizontal direction. In order to radiate power transmission radio wave 2 in a power transmission direction ($\psi_{AZ}$, $\psi_{EL}$), the following variables are defined to discuss the phase shift amount given to each element antenna 8.

xp: subscript in the horizontal direction (east-west direction) of element antenna 8.

yp: subscript in the vertical direction (south-north direction) of element antenna 8.

$\theta_{xp,yp}$: the direction change phase shift amount for element antenna 8 numbered (xp, yp) at the time of a power transmission direction ($\psi_{AZ}$, $\psi_{EL}$).

$k_{xp,yp}$: the phase shift amount for phase shifter 13 numbered (xp, yp) for the direction change phase shift amount $\theta_{xp,yp}$.

$\theta_{xp,yp}$ and $k_{xp,yp}$ can be calculated by the following equations.

$$\theta_{xp,yp}=(2*\pi)*(L/\lambda)*\sin(\psi_{EL})*((xp-Nm)*\sin(\psi_{AZ})+(yp-Nm)*\cos(\psi_{AZ})) \qquad (33)$$

$$k_{xp,yp}=\mathrm{int}((\theta_{xp,yp}/\theta d)+0.5) \qquad (34)$$

Figure 8:
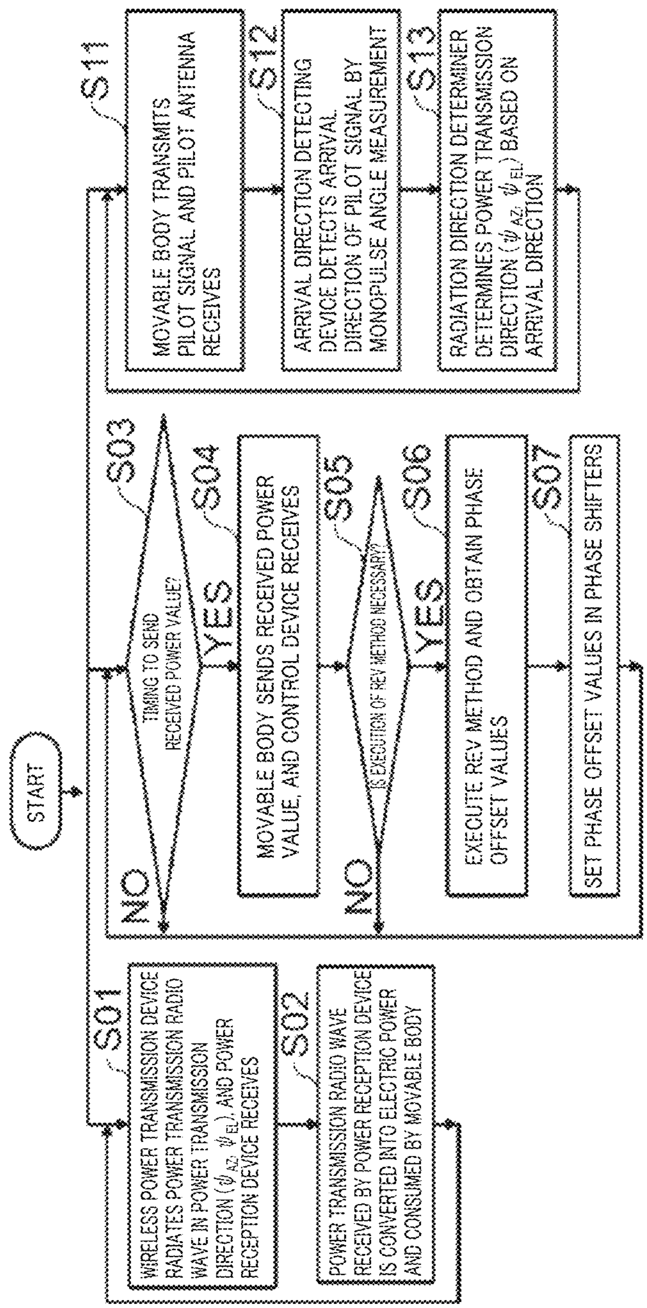
FIG. 8 is a flowchart illustrating a power transmission procedure to a movable body by the wireless power transmission device according to the first embodiment.

The operation is described. FIG. 8 is a flowchart illustrating a power transmission procedure to a movable body by the wireless power transmission device according to the first embodiment. At step S01, wireless power transmission device 1 radiates power transmission radio wave 2 in a power transmission direction ($\psi_{AZ}$, $\psi_{EL}$). Power reception device 3 included in movable body 60 receives power transmission radio wave 2.

The process of power transmission by power transmission radio wave 2 is described more specifically. Control device 10 calculates a command value of the phase and amplitude for each element module 9. The command value of the phase and amplitude for each element module 9 is calculated such that the radiation direction of power transmission antenna 50 is directed in the power transmission direction. A power transmission control signal is the command value of the phase and amplitude for each element module. Each element module 9 generates an element transmission signal with the phase and amplitude adjusted in accordance with the power transmission control signal and radiates the element transmission signal as element radio wave 2$E_p$ from the corresponding element antenna 8$_p$. Element antenna 8$_p$ supplied with a transmission signal from each element module 9 radiates element radio wave 2$E_p$ with the phase adjusted in accordance with the power transmission direction, whereby power transmission radio wave 2 radiated in the power transmission direction is enhanced. Furthermore, adjusting the amplitude of element radio wave 2$E_p$ radiated by each element antenna 8$_p$ can make a more desirable beam form. Thus, wireless power transmission device 1 can transmit power in the power transmission direction with high efficiency.

At step S02, power transmission radio wave 2 received by power reception device 3 is converted into electric power, which is consumed, for example, as power for movable body 60 to move. The transmission and reception of electric power between wireless power transmission device 1 and movable body 60 (S01) and the consumption of the received electric power in movable body 60 (S02) are performed concurrently. Since the electric power transmitted by wireless power transmission device 1 at a point in time is processed with S01 and S02 in this order, S02 is depicted after S01 in the illustration of the flowchart.

Concurrently with S01 and S02, at step S03, whether it is a timing for movable body 60 to send a received power value to wireless power transmission device 1. The received power value received by movable body 60 is sent to wireless power transmission device 1, for example, every 30 seconds. When it is not a timing to send a received power value (NO at S03), the process returns to S03.

When it is a timing to send a received power value (YES at S03), at step S04, movable body 60 sends a received power value to control device 10, and control device 10 receives the received power value. At step S05, control device 10 determines whether execution of the REV method is necessary or not, from temporal transition of the received power value. When it is determined that execution of the REV method is not necessary (NO at S05), the process returns to S03.

REV method necessary or unnecessary determiner 26 has a table of thresholds of received power values to the distance to movable body 60. REV method necessary or unnecessary determiner 26 searches the table by a current distance G to movable body 60 and acquires a threshold. Then, whether the current received power value is smaller than the threshold is checked. When the current received power value becomes smaller than the threshold, REV method necessary or unnecessary determiner 26 determines that execution of the REV method is necessary. It is determined that execution of the REV method is necessary also when a predetermined time has elapsed since the previous execution of the REV method. Whether execution of the REV method is necessary or not may be determined in the movable body to which power is transmitted wirelessly.

When it is determined that execution of the REV method is necessary (YES at S05), at step S06, the REV method is executed. By performing the REV method, the phase difference between element electric field vectors by element radio waves 2$E_p$ radiated by element antennas 8$_p$ is calculated, and a phase offset value for compensating for the phase difference is calculated. At step S07, the phase offset value obtained by the REV method is set in each phase shifter 13. After S07 is performed, the process returns to S03.

Concurrently with S01 to S02 and S03 to S07, the process at steps S11 to S13 is performed. At S11, pilot transmitter 5 included in movable body 60 transmits pilot signal 4. Pilot antenna 6 included in wireless power transmission device 1 receives pilot signal 4 and generates a pilot reception signal. At step S12, arrival direction detecting device 7 detects arrival direction 78 of pilot signal 4 by mono-pulse angle measurement for the pilot reception signal. At step S13, radiation direction determiner 33 determines a power transmission direction ($\psi_{AZ}$, $\psi_{EL}$) based on arrival direction 78. It is assumed that the power transmission direction is a direction opposite to the arrival direction. The position of movable body 60 after the elapse of a predetermined time may be predicted based on the arrival direction and the moving speed of movable body 60, and the direction toward the predicted direction may be set as a power transmission direction. Power transmission antenna 50 radiates power transmission radio wave 2 at S01 in the power transmission direction ($\psi_{AZ}$, $\psi_{EL}$) determined at S13.

After S13 is performed, the process returns to S11. The process at S11 to S13 is performed periodically in predetermined cycles. The length of one cycle is determined such that the difference between the arrival direction calculated last time and the current arrival direction is within an acceptable range even when movable body 60 moves at the possible maximum moving speed.

Since pilot signal 4 is transmitted from movable body 60 and wireless power transmission device 1 radiates power transmission radio wave 2 in the direction in which pilot signal 4 arrives, power reception device 3 included in movable body 60 can receive power transmission radio wave 2 efficiently.

Figure 9:
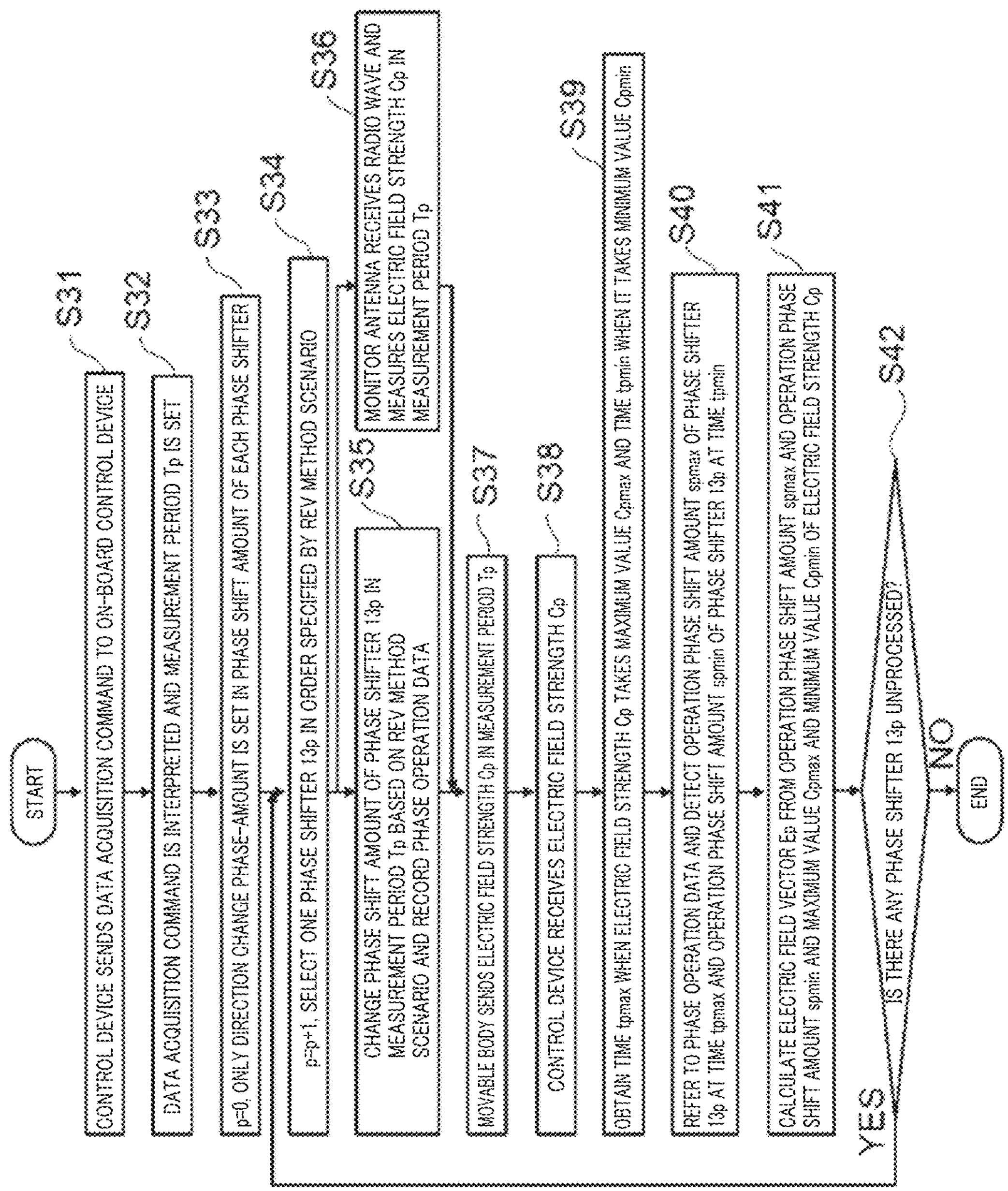
FIG. 9 is a flowchart illustrating the procedure of calculating an element electric field vector of a radio wave radiated by each element antenna by the REV method in the wireless power transmission device according to the first embodiment.

The procedure of executing the REV method is described referring to FIG. 9. FIG. 9 is a flowchart illustrating the procedure of calculating an element electric field vector of a radio wave radiated by each element antenna by the REV method in the wireless power transmission device according to the first embodiment.

First of all, at step S31, control device 10 sends data acquisition command 73 to on-board control device 19.

At step S32, data acquisition command interpreter 63 interprets data acquisition command 73 and stores a predetermined number of pieces of measurement period data 70 specifying the time to start and end of the measurement into data storage device 21. The pth measurement period is represented by a variable Tp. At step S33, p=0 is set, and REV method executor 27 sets only the direction change phase shift amount in the phase shift amount of each phase shifter 13. The measurement period Tp is a period including one REV method unit period. In the flowchart illustrated in FIG. 9, all measurement periods Tp required are set in one data acquisition command 73. At least one measurement period Tp may be set in one data acquisition command 73.

At step S34, p=p+1 is set, and REV method executor 27 selects one phase shifter 13 in the order specified by REV method scenario 74. The selected phase shifter 13 is denoted as phase shifter 13*p*. Phase shifter 13*p* is an operating phase shifter that is part of phase shifters of which phase shift amount is changed. At step S35, REV method executor 27 changes the operation phase shift amount of phase shifter 13*p* in measurement period Tp based on REV method scenario 74 and records phase operation data 75. Upon completion of a sequence of changing the operation phase shift amount of phase shifter 13*p*, the phase shift amount of phase shifter 13*p* is set to be only the direction change phase shift amount. In measurement period Tp, step S36 is performed as a process performed concurrently with S35. At S36, monitor antenna 17 receives a radio wave and measures an electric field strength Cp that is detection data 71 in measurement period Tp.

At step S37, movable body communication device 20 sends electric field strength Cp in measurement period Tp from movable body 60 to control device 10. Electric field strength Cp is compressed by transmission data generator 64 before being sent so that the same content can be sent with a smaller data volume. The process of sending electric field strength Cp at S37 may be performed before the process of measuring electric field strength Cp is completed at S36. Electric field strength Cp in measurement period Tp is electric field change data that represents change in electric field in measurement period Tp.

At step S38, communication device 30 receives electric field strength Cp.

At step S39, measurement data analyzer 35 determines time tpmax when electric field strength Cp measured in measurement period Tp takes maximum value Cpmax and time tpmin when it takes minimum value Cpmin. S39 may be performed after all of the electric field strengths Cp in measurement period Tp are input, or time tpmax and time tpmin may be detected by element electric field calculator 29 every time electric field strength Cp is input. Time tpmax and time tpmin are the phase shift amount detection time of phase shifter 13*p* that is the operating phase shifter. Electric field strength Cp in measurement period Tp is operating phase shifter-corresponding radio wave data that is a set of detection data 71 detected for each of the operation phase shift amounts for phase shifter 13*p* in an REV method unit period.

At step S40, operation phase shift amount acquirer 36 refers to phase operation data 75 and detects the operation phase shift amount spmax of phase shifter 13*p* at time tpmax and the operation phase shift amount spmin of phase shifter 13*p* at time tpmin.

At step S41, element electric field vector calculator 37 calculates the phase and amplitude of element electric field vector Ep from the operation phase shift amount spmax and the operation phase shift amount spmin and maximum value Cpmax and minimum value Cpmin of electric field strength Cp.

Here, the ratio of maximum value Cpmax to minimum value Cpmin of electric field strength Cp is defined as $r^2$, and the operation phase shift amount spmax or the operation phase shift amount spmin or the average value is defined as $\Delta_0$. $\Delta_0$ is the operation phase shift amount. The ratio of maximum value Cpmax to minimum value Cpmin is called electric field strength change ratio. In the method indicated in PTL 2, a value k obtained by dividing the phase offset value X and the amplitude of the element electric field vector by the amplitude of the composite electric field vector can be calculated as follows. r, p, and k are consistent with the variables in PTL 2. In other sections of the present description, r, p, and k are used in a different meaning.

$$k=p/\sqrt{(1+2*\cos\Delta_0+p^2)} \quad (35)$$

$$X=\tan^{-1}(\sin\Delta_0/(\cos\Delta_0+p) \quad (36)$$

Here, r, p, and AO are determined as follows.

$$r^2=|Cp\max|/|Cp\min| \quad (37)$$

$$p=(r-1)/(r+1) \quad (38)$$

$\Delta_0$ is determined by any one of the following three equations. Any equation yields $\Delta_0$ in a range of $0\le\Delta_0<180$.

$$\Delta_0=sp\max-180*\mathrm{int}(sp\max/180) \quad (39\text{-}1)$$

$$\Delta_0=sp\min-180*\mathrm{int}(sp\min/180) \quad (39\text{-}2)$$

$$\Delta_0=(sp\max-180*\mathrm{int}(sp\max/180)+sp\min-180*\mathrm{int}(sp\min/180))/2 \quad (39\text{-}3)$$

The phase offset value X may be calculated in an abbreviated way by the following equation. The phase offset value X is calculated at least based on $\Delta_0$.

$$X=\Delta_0 \tag{40}$$

At step S42, it is checked whether there is any phase shifter 13 not yet processed. When there exists phase shifter 13 not yet processed (YES at S42), the process returns to step S34.

When there exists no phase shifter 13 not yet processed (NO at S42), the process ends.

By executing the REV method, phase offset value 77 is calculated and set in phase shifter 13 included in each element module. The phase reference of each element module can be equalized (matched) by phase offset value 77.

The effect obtained by the power transmission beam tracking movable body 60 during execution of the REV method is explained with an operation example. Td=1.00 msec is set as a parameter of the REV method. The time required for one cycle of the REV method is N*nd*Td=10*128*1.00=1280 msec.

The parameters for movable body 60 are $G_0$=1000 m, $\psi_0$=0 degrees, $V_0$=−30 msec, and $\xi_0$=90 degrees. This is a case where movable body 60 moves horizontally at 30 m per second in the sky 1000 m just above wireless power transmission device 1. When $\psi_0$>0 degrees is satisfied, movable body 60 moves in the lifting direction.

It is assumed that the phase error $\varphi_p$ has the following pattern 1. The unit of phase error is denoted by degrees. The phase error $\varphi_p$ is a target to be calculated by the REV method.

$$(\varphi_1,\varphi_2,\varphi_3,\varphi_4,\varphi_5,\varphi_6,\varphi_7,\varphi_8,\varphi_9,\varphi_{10})=(-45,51,-36,39,-27,27,-18,15,-9,3) \quad \text{(Pattern 1 of Phase Error)}$$

Figure 10:
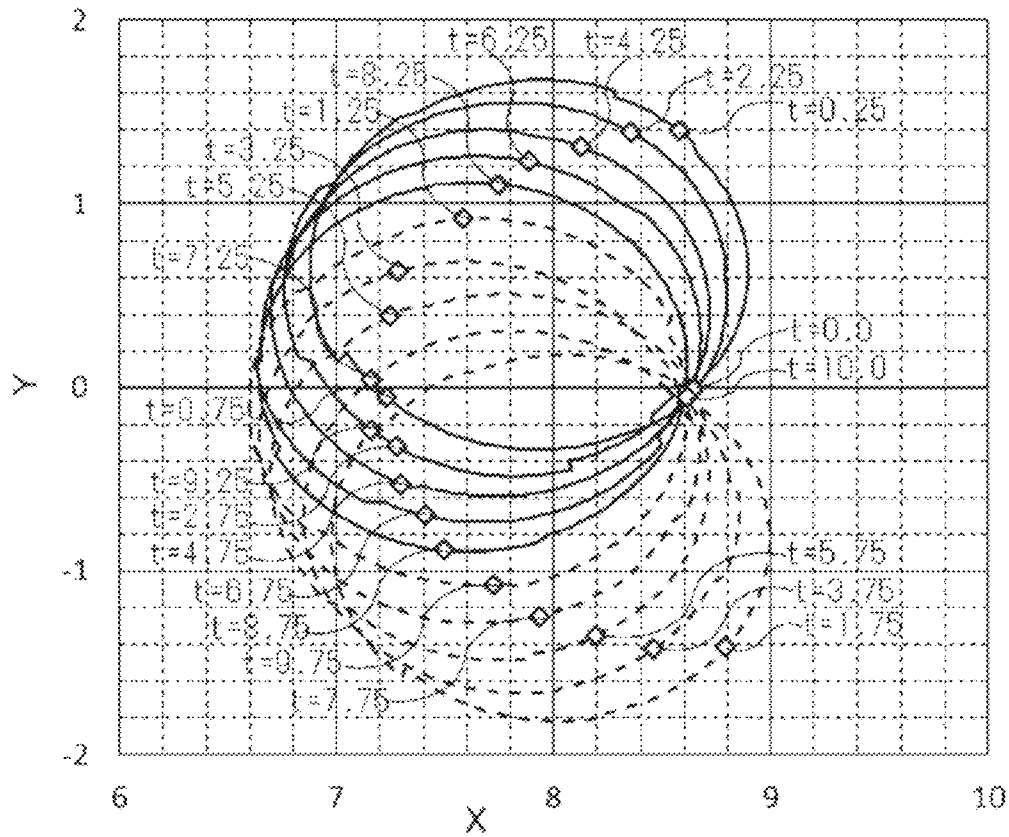
FIG. 10 is a diagram illustrating the loci of an electric field vector during execution of the REV method obtained in the wireless power transmission device according to the first embodiment in an operation example.
Figure 11:
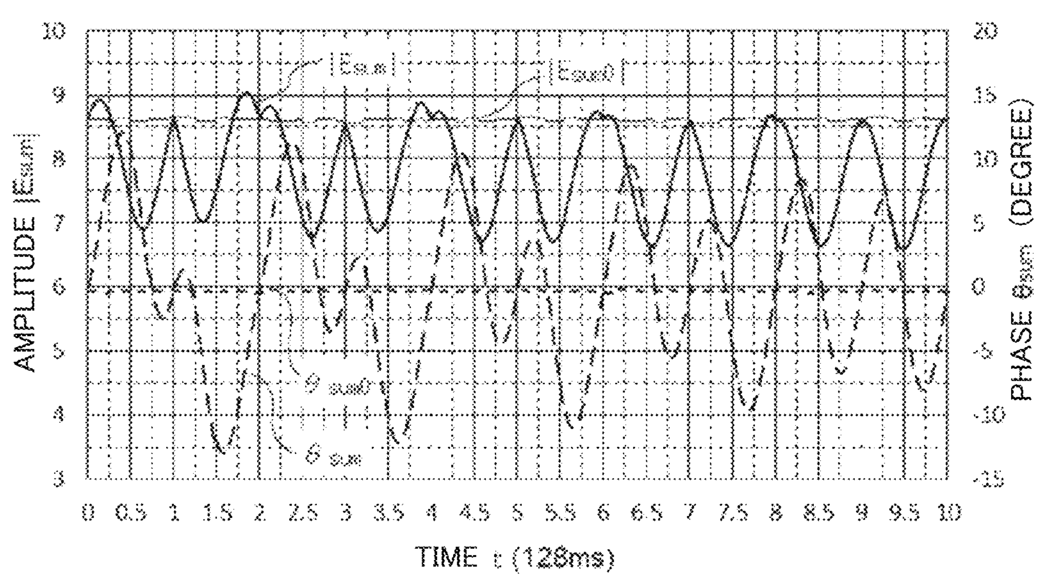
FIG. 11 is a diagram illustrating temporal change of the amplitude and phase of the electric field vector during execution of the REV method obtained in the wireless power transmission device according to the first embodiment in the operation example.

FIG. 10 illustrates the loci of the composite electric field vector Esum in wireless power transmission device 1, in which the power transmission direction tracks a movable body during execution of the REV method in an operation example. FIG. 11 illustrates temporal change of the amplitude |Esum| and the phase θsum of the composite electric field vector in wireless power transmission device 1 in the operation example. In FIG. 11, the time is expressed using a time period (128 msec) of changing the operation phase shift amount in one element module 9 as a unit. The time period in which the operation phase shift amount is changed in one element module 9 is called REV method unit period. In FIG. 10, the locus of the composite electric field vector in an odd-numbered REV method unit period is depicted by a solid line, and an even-numbered REV method unit period is depicted by a broken line. The starting point and the end point of the REV method and the time points of 0.25 and 0.75 in each REV method unit period are marked by rhombuses. In FIG. 11, the change of amplitude is depicted by a solid line, and the change of phase is depicted by a broken line. In FIG. 11, the amplitude |Esum0| and the phase θsum0 obtained when the REV method is not executed, that is, the phase shift amount of each phase shifter 13 is set only to be the direction change phase shift amount are also depicted by a thin solid line or broken line. The REV method unit period is the operating phase shifter-corresponding period that is a time period in which the operating phase shifter takes all of operation phase shift amounts.

The loci illustrated in FIG. 10 have a portion in which the amplitude of the composite electric field vector is changed sharply because the direction change phase shift amount is changed every 10 msec. When the phase error φp is not zero, the composite electric field vector Esum in one REV method unit period has an oval shape centered on a position deviating from the real axis. The center of the locus of the composite electric field vector Esum in one REV method unit period is called unit locus center. In an REV method unit period with a positive phase error φp, the imaginary part Y of the unit locus center is positive. In an REV method unit period with a negative phase error φp, the imaginary part Y of the unit locus center is negative. As the absolute value of the phase error φp is greater, the unit locus center is farther from the real axis (the straight line with Y=0). In each REV method unit period, the position where the oval locus intersects the real axis is substantially the same position. The composite electric field vector locus is changed significantly with the phase error φp of phase shifter 13*p* serving as the operating phase shifter in each REV method unit period. In FIG. 11, when the REV method unit period is changed, the state of change of the amplitude |Esum| and the phase θsum is changed significantly. When the movable body is tracked, the amplitude |Esum| of the composite electric field vector has a shape in which change by the operation phase shift amount is added to a substantially constant value.

Figure 12:
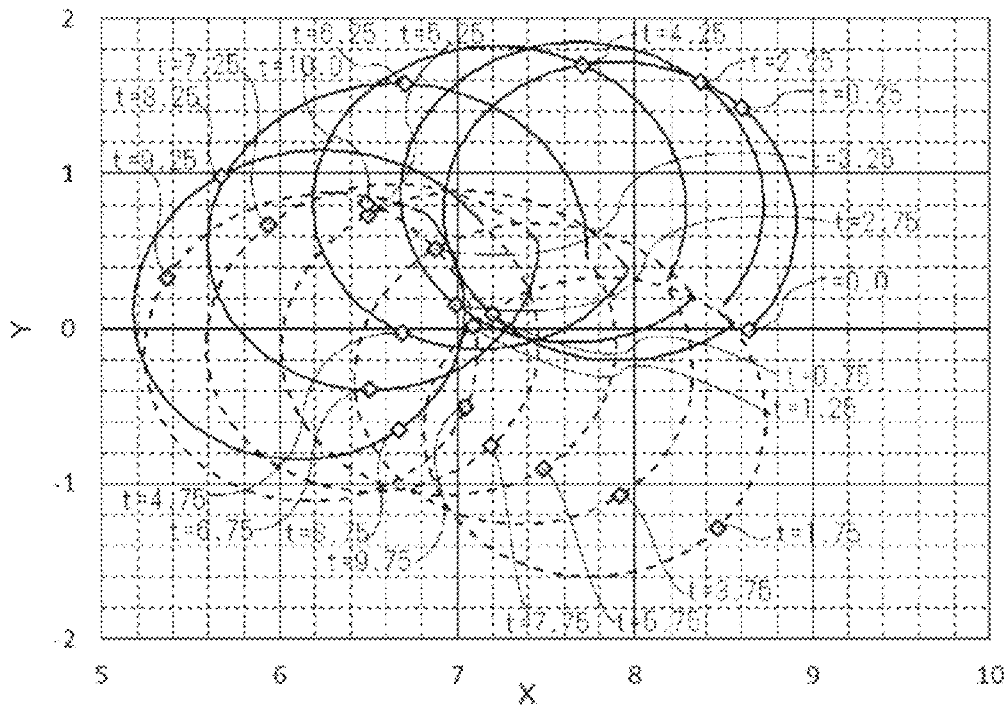
FIG. 12 is a diagram illustrating the loci of the electric field vector during execution of the REV method obtained when the movable body is not tracked during execution of the REV method as a comparative example.
Figure 13:
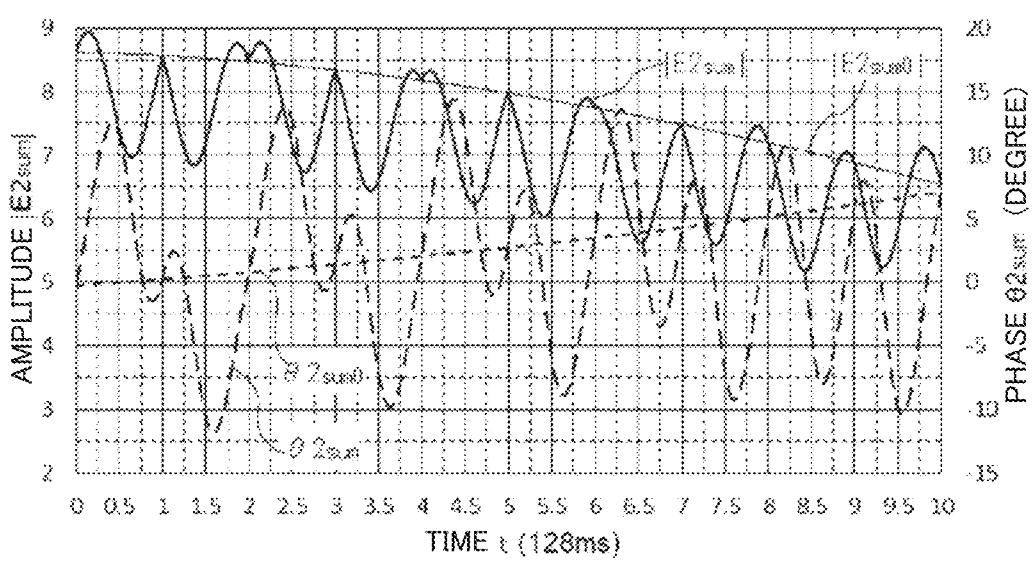
FIG. 13 is a diagram illustrating temporal change of the amplitude and phase of the electric field vector during execution of the REV method obtained in the comparative example in the operation example.

FIG. 12 illustrates the loci of the composite electric field vector E2sum in the wireless power transmission device when the power transmission direction does not track a movable body during execution of the REV method in a comparative example. FIG. 13 illustrates temporal change of the amplitude |E2sum| and the phase θ2sum of the composite electric field vector in the wireless power transmission device in a comparative example. In FIG. 13, the amplitude |E2sum0| and the phase θ2sum0 without variation by the operation phase shift amount are also depicted by a thin solid line or broken line. In the comparative example in which the power transmission direction does not track the movable body, the amplitude |E2sum0| of the composite electric field vector without variation by the operation phase shift amount is decreased gradually, and the locus of E2sum is moved to the left side in FIG. 12 with lapse of time.

As illustrated in FIG. 13, the amplitude |E2sum| of the composite electric field vector in the wireless power transmission device in the comparative example is increased or decreased, because the operation phase shift amount of the operating phase shifter is changed by the REV method, but is decreased gradually. The phase θ2sum of the composite electric field vector in the comparative example is increased gradually while varying.

Figure 14:
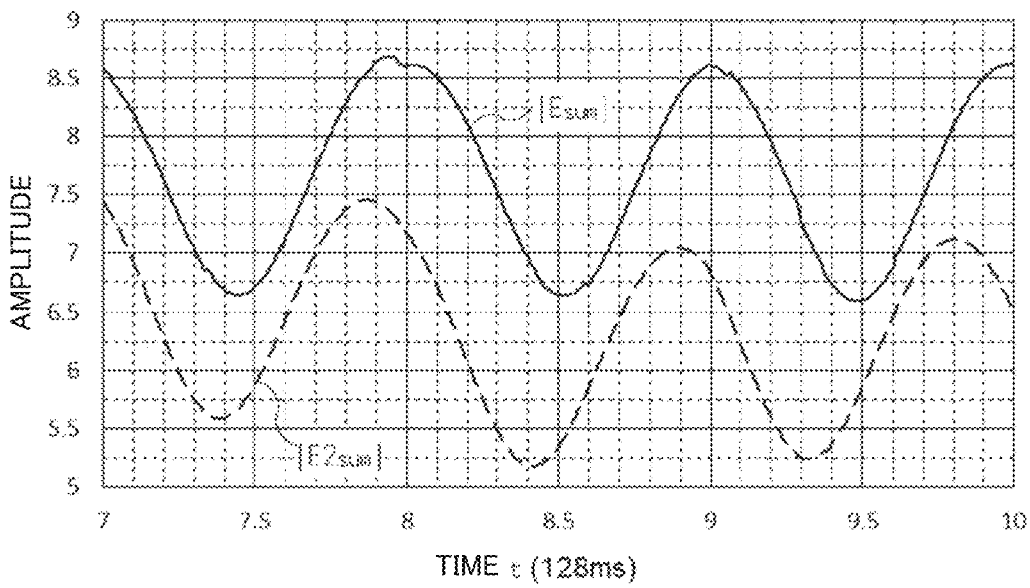
FIG. 14 is a diagram comparing temporal change of the amplitude of the electric field vector during execution of the REV method obtained in the wireless power transmission device according to the first embodiment and the comparative example in the operation example.

FIG. 14 is an enlarged diagram of temporal changes of the amplitude |Esum| of the composite electric field vector in wireless power transmission device 1 in the operation example and the amplitude |E2sum| of the composite electric field vector in the comparative example. |Esum| and |E2sum| differ in time when they take the maximum value or the minimum value. Therefore, the wireless power transmission device 1 and the comparative example differ in element electric field vector obtained by the REV method.

Figure 15:
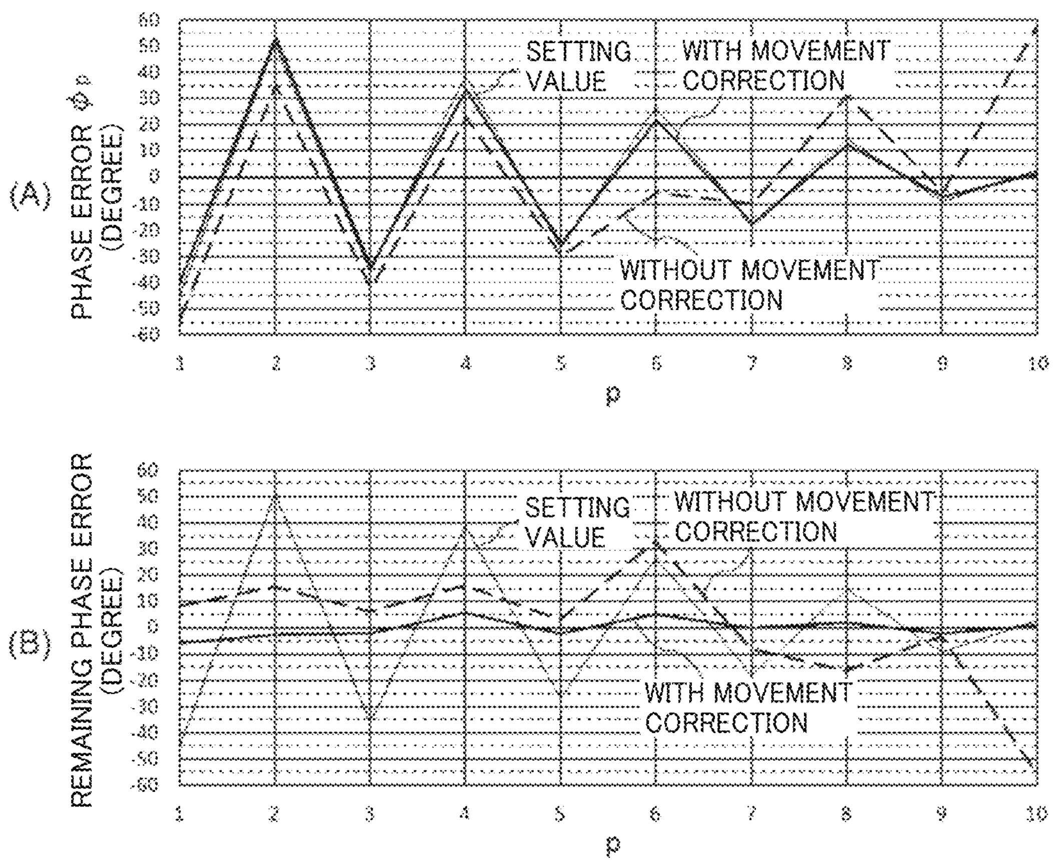
FIG. 15 is a diagram illustrating a phase offset value and a phase error remaining after correction obtained in the wireless power transmission device according to the first embodiment and the comparative example, in the operation example.

FIG. 15 is a diagram illustrating a phase offset value and a phase error remaining after correction obtained in the wireless power transmission device according to the first embodiment and the comparative example, in the operation example. FIG. 15(A) illustrates the set phase error and the phase offset value, and FIG. 15(B) illustrates the remaining phase error. The setting value of the phase error is depicted by a thin solid line, the phase offset value obtained when the power transmission direction tracks the movable body during execution of the REV method is depicted by a thick solid line, and the phase offset value obtained when the power transmission direction does not track the movable body (without movement correction) is depicted by a thick broken line. FIG. 15(B) illustrates the remaining phase error obtained by subtracting the phase offset value from the set phase error. In FIG. 15, the average value of the phase offset value for each phase shifter 13p and the average value of the remaining phase error are zero.

The phase offset value with movement correction is calculated such that the difference from the set phase error φp is approximately 5 degrees or less. In the phase offset value without movement correction, the difference between the phase offset value obtained by calculation and the set phase error φp is increased after the sixth REV method unit period. In the example illustrated in the drawing, an error of approximately −35 degrees is generated in the sixth REV method unit period, and an error of approximately +55 degrees is generated in the tenth REV method unit period.

Figure 16:
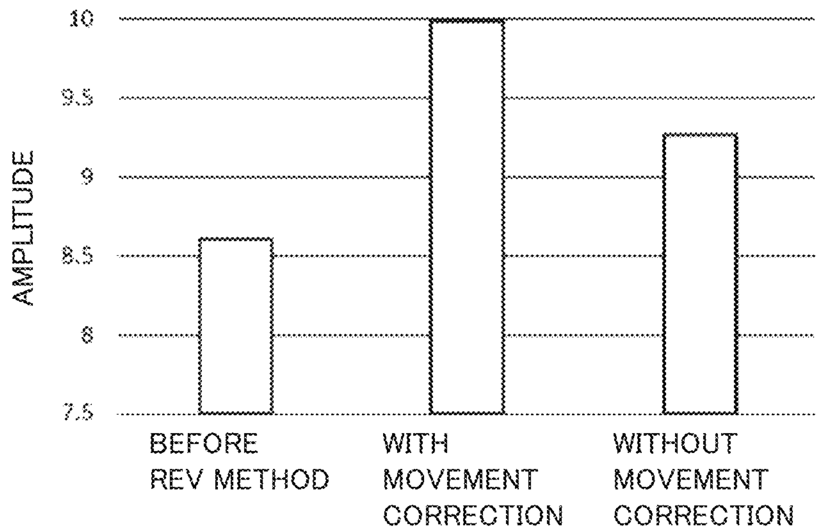
FIG. 16 is a diagram comparing the absolute values of the amplitude of the electric field vector after correction in the wireless power transmission device according to the first embodiment and the comparative example in the operation example.

FIG. 16 is a diagram comparing the absolute values of the amplitude of the composite electric field vector after correction in the wireless power transmission device according to the first embodiment and the comparative example in the operation example. When the phase of element radio wave 2$E_p$ radiated by each element antenna $8_p$ is matched, |Esum|=10 is satisfied. In the pattern 1 of the phase error illustrated in FIG. 15, |Esum| is decreased to 8.6 before execution of the REV method. In the REV method with movement correction, |Esum| is 9.95 after correction. In the REV method without movement correction, |E2sum| is 9.33 after correction. It can be understood that the power transmission direction tracks the movable body during execution of the REV method whereby the phase error can be eliminated accurately by the REV method. When the power transmission direction does not track the movable body during execution of the REV method, the amplitude of the composite electric field vector recovers only to the amplitude approximately 7% smaller than the original amplitude, after execution of the REV method. When the power transmission direction does not track the movable body during execution of the REV method, the accuracy of the REV method is not sufficient and the effect of the REV method is not sufficient, either.

Figure 17:
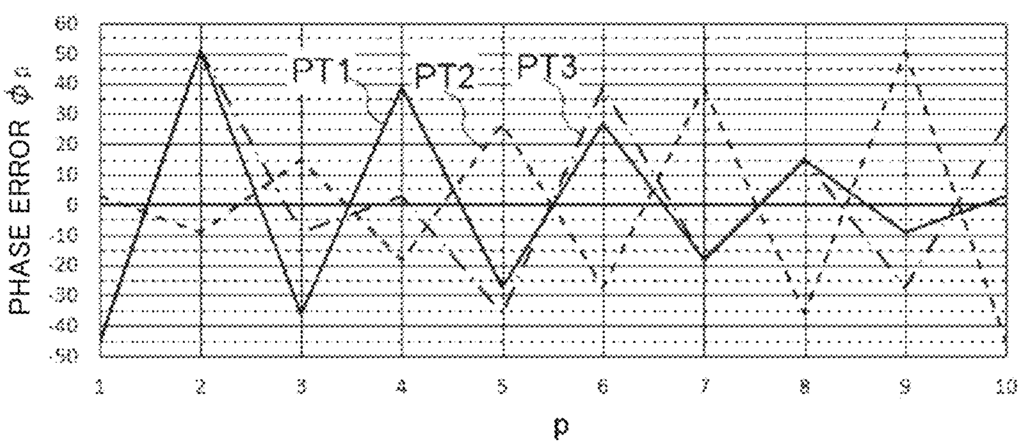
FIG. 17 is a diagram illustrating the pattern of phase errors used to analyze the influence of the pattern of phase errors in the wireless power transmission device according to the first embodiment and the comparative example.
Figure 18:
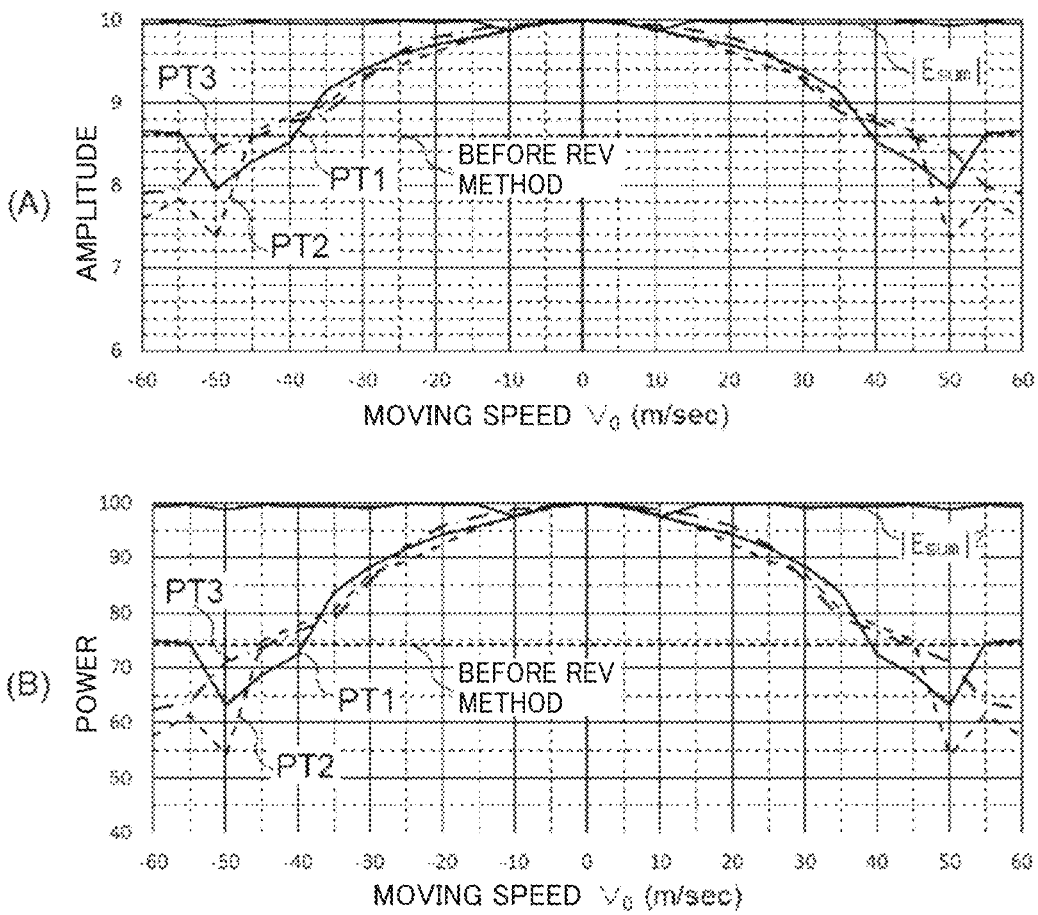
FIG. 18 is a diagram illustrating changes of the amplitude of the electric field vector and the power value after correction to change of the moving speed of the movable body in the wireless power transmission device according to the first embodiment and the comparative example, comparing for three patterns of phase errors.
Figure 19:
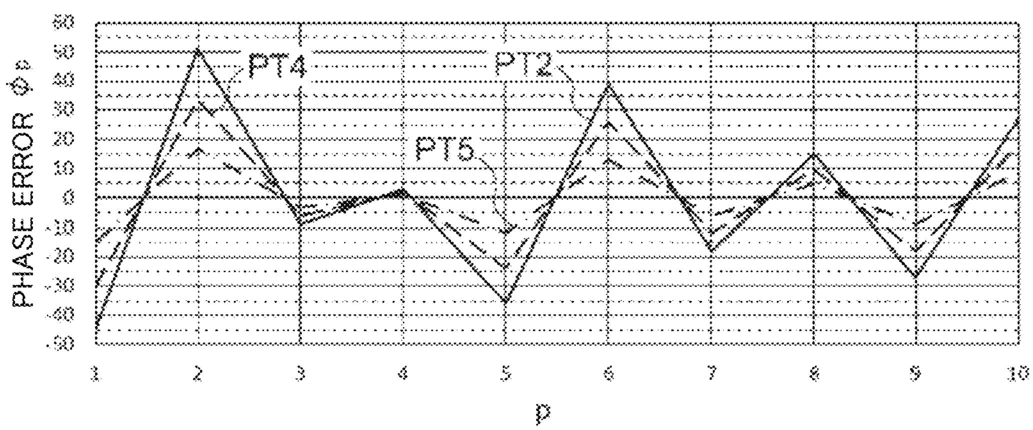
FIG. 19 is a diagram illustrating the patterns of phase errors used to analyze the influence of the magnitude of phase error in the wireless power transmission device according to the first embodiment and the comparative example.
Figure 20:
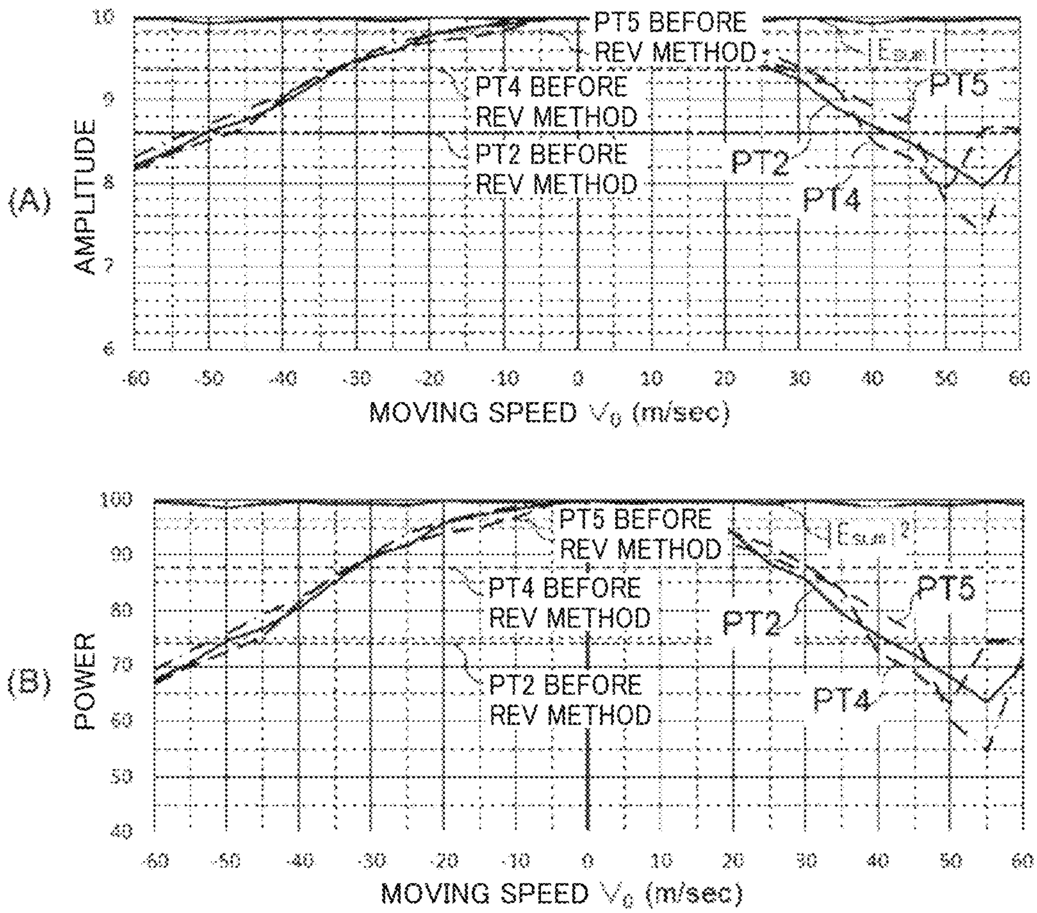
FIG. 20 is a diagram illustrating changes of the amplitude of the electric field vector and the power value after correction to change of the moving speed of the movable body in the wireless power transmission device according to the first embodiment and the comparative example, comparing for the magnitudes of phase error.

When the REV method is executed actually, the phase error φp is unknown before execution of the REV method. The difference in accuracy of the REV method with the patterns of phase error φp is described referring to FIG. 17 to FIG. 20. FIG. 17 is a diagram illustrating the patterns of phase error used to analyze the influence of the pattern of phase error in the wireless power transmission device according to the first embodiment and the comparative example. FIG. 18 is a diagram illustrating changes of the amplitude of the electric field vector and the power value after correction to change of the moving speed of the movable body in the wireless power transmission device according to the first embodiment and the comparative example, comparing for three patterns. FIG. 19 is a diagram illustrating the patterns of phase error used to analyze the influence of the magnitude of phase error in the wireless power transmission device according to the first embodiment and the comparative example. FIG. 20 is a diagram illustrating changes of the amplitude of the electric field vector and the power value after correction to change of the moving speed of the movable body in the wireless power transmission device according to the first embodiment and the comparative example, comparing for the magnitudes of phase error.

The patterns of phase error φp illustrated in FIG. 17 are the pattern 1 described above and two patterns described below. In FIG. 17 to FIG. 20, the pattern 1 is denoted by a reference sign PT1, the pattern 2 is denoted by a reference sign PT2, and the pattern 3 is denoted by a reference sign PT3. In FIG. 17, the pattern 1 is depicted by a solid line, the pattern 2 is depicted by a broken line, and the pattern 3 is depicted by a long and short dashed line.

$$(\varphi_1,\varphi_2,\varphi_3,\varphi_4,\varphi_5,\varphi_6,\varphi_7,\varphi_8,\varphi_9,\varphi_{10})=(-45,51,-9,3,-36,39,-18,15,-27,27) \quad \text{(Pattern 2 of Phase Error)}$$

$$(\varphi_1,\varphi_2,\varphi_3,\varphi_4,\varphi_5,\varphi_6,\varphi_7,\varphi_8,\varphi_9,\varphi_{10})=(3,-9,15,-18,27,-27,39,-36,51,-45) \quad \text{(Pattern 3 of Phase Error)}$$

The conditions for the movable body are $G_0$=1000 m, $\psi_0$=0 degrees, and $\xi_0$=90 degrees, and the moving speed $V_0$ of the movable body is changed in a range of 60 to −60 (m/sec). In FIG. 18, |Esum| and $|Esum|^2$ with movement correction are depicted by solid lines, and those before the REV method are depicted by broken lines. For |E2sum| and $|E2sum|^2$ without movement correction, the pattern 1 is depicted by a solid line, the pattern 2 is depicted by a broken line, and the pattern 3 is depicted by a long and short dashed line. |Esum| with movement correction is calculated such that |Esum|≥9.88 is satisfied in each pattern and at moving speed $|V_0|\leq 60$. |E2sum| without movement correction is decreased when $|V_0|$ is large. The range in which |E2sum| is equal to or greater than |Esum| before execution of the REV method is the range of 40>$V_0$>40 in the pattern 1, 40>$V_0$>40 in the pattern 2, and 50>$V_0$>50 in the pattern 3.

In the range of $|V_0|\leq 35$, the difference in |E2sum| due to the difference in pattern is approximately equal to or less than 0.14. The patterns with the largest |E2sum| and the patterns with the smallest |E2sum| change with the value of $V_0$. In the range of $|V_0|\geq 40$, the difference in |E2sum| due to the difference in pattern increase and the difference at most 1 is generated depending on the patterns. In the range of $|V_0|\geq 40$, the patterns with the largest |E2sum| and the patterns with the smallest |E2sum| change.

The influence of the magnitude of phase error φp in the same pattern is illustrated in FIG. 19 and FIG. 20. A pattern in which the amplitude in the pattern 2 is set to ⅔ is called pattern 4, and a pattern in which the amplitude in the pattern 2 is set to ⅓ is called pattern 5. In FIG. 19 and FIG. 20, the pattern 4 is denoted by a reference sign PT4, and the pattern 5 is denoted by a reference sign PT5. In FIG. 19, the pattern 2 is depicted by a solid line, the pattern 4 is depicted by a broken line, and the pattern 5 is depicted by a long and short dashed line. In FIG. 20, |Esum| and $|Esum|^2$ before execution of the REV method for the pattern 2, the pattern 4, and the pattern 5 are depicted by broken lines.

$$(\varphi_1,\varphi_2,\varphi_3,\varphi_4,\varphi_5,\varphi_6,\varphi_7,\varphi_8,\varphi_9,\varphi_{10})=(-30,34,-6,2,-24,26,-12,10,-18,18) \quad \text{(Pattern 4 of Phase Error)}$$

$$(\varphi_1,\varphi_2,\varphi_3,\varphi_4,\varphi_5,\varphi_6,\varphi_7,\varphi_8,\varphi_9,\varphi_{10})=(-15,17,-3,1,-12,13,-6,5,-9,9) \quad \text{(Pattern 5 of Phase Error)}$$

In FIG. 20, |Esum| with movement correction can be calculated such that |Esum|≥9.92 is satisfied in each pattern and the moving speed $|V_0|\leq 60$. The difference between patterns of |E2sum| without movement correction is approximately 0.19 or less in a range where $V_0\leq 30$ is satisfied. In a range where $V_0\geq 30$ is satisfied, the difference between patterns is increased and the magnitude of difference varies. In the case without movement correction, the correction accuracy of phase error is not good not depending on the magnitude of phase error φp. When the moving speed $|V_0|$ is large, execution of the REV method makes the power transmission efficiency lower than before the REV method, in the case without movement correction.

Figure 21:
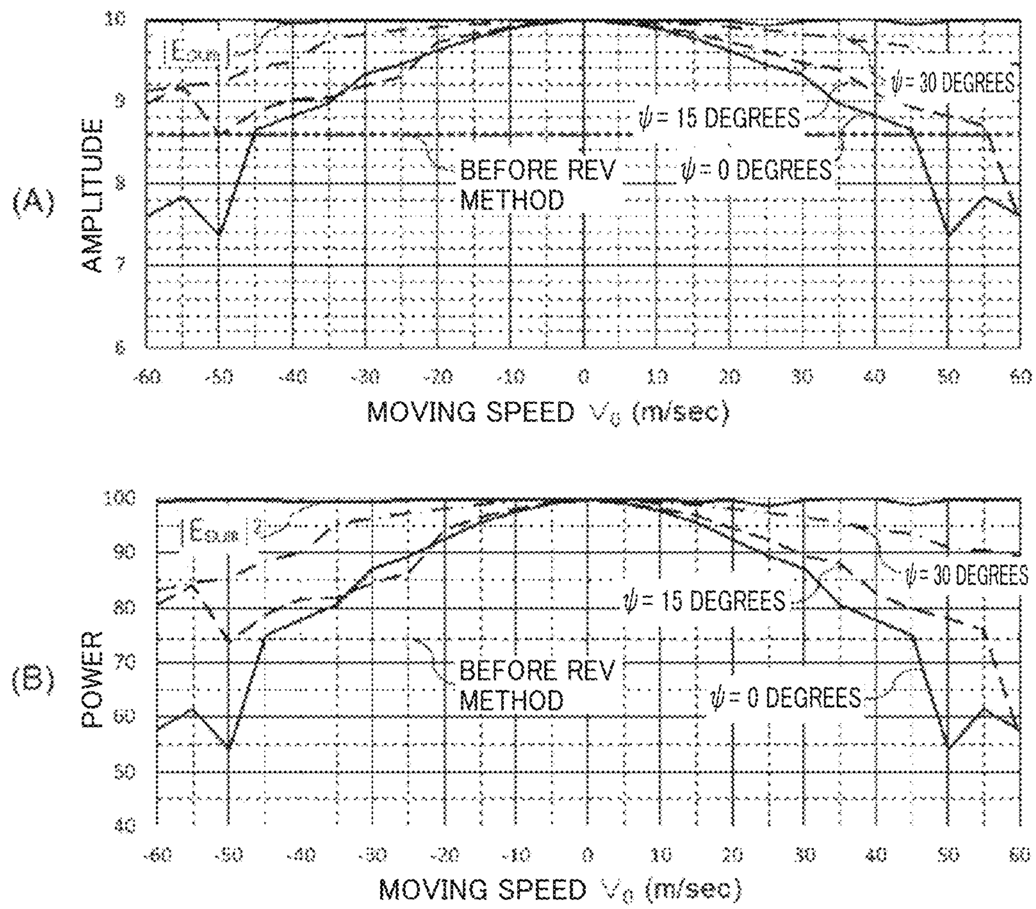
FIG. 21 is a diagram illustrating changes of the amplitude of the electric field vector and the power value after correction to change of the moving speed of the movable body in the wireless power transmission device according to the first embodiment and the comparative example, comparing for the directions in which the movable body is present at the start of the REV method.

Referring to FIG. 21, the influence of the presence direction of the movable body, that is, the power transmission direction $\psi_0$ at the start of the REV method is studied. FIG. 21 is a diagram illustrating changes of the amplitude of the electric field vector and the power value after correction to change of the moving speed of the movable body in the wireless power transmission device according to the first embodiment and the comparative example, comparing for the directions in which the movable body is present at the start of the REV method. In FIG. 21, the phase error φp is the pattern 3, and $G_0$ is 1000 m. The moving direction $\xi_0$ of the movable body is orthogonal to the power transmission direction $\psi_0$. The moving speed $V_0$ is changed in a range of 60 to −60 (m/sec) in the following three cases.

Case 1: ($\psi_0$, $\xi_0$)=(0 degrees, 90 degrees)

Case 2: ($\psi_0$, $\xi_0$)=(15 degrees, 105 degrees)

Case 3: ($\psi_0$, $\xi_0$)=(30 degrees, 120 degrees)

In FIG. 21, Case 1 is indicated by $\psi_0$=0 degrees, Case 2 is indicated by $\psi_0$=15 degrees, and Case 3 is indicated by $\psi_0$=30 degrees. In FIG. 21, |Esum| and $|Esum|^2$ with movement correction are indicated by solid lines, and those before the REV method are indicated by broken lines. For |E2sum| and $|E2sum|^2$ without movement correction, the graph satisfying $\psi_0$=0 degrees is depicted by a solid line, the graph satisfying $\psi_0$=15 degrees is depicted by a broken line, and the graph satisfying $\psi_0$=30 degrees is indicated by a long and short dashed line.

In FIG. 21, |Esum| with movement correction can be calculated such that |Esum|≥9.94 is satisfied in each angle of the power transmission direction $\psi_0$ of the movable body and the moving speed $|V_0|\le 60$. |E2sum| without movement correction is greater when $\psi_0$=30 degrees is satisfied than when $\psi_0$=0 degrees is satisfied and when $\psi_0$=15 degrees is satisfied in the whole speed range. At $V_0$=−35 degrees and $V_0$=−40 degrees, |E2sum| when $\psi_0$=15 degrees is satisfied is smaller than |E2sum| when $\psi_0$=0 degrees is satisfied. At the other speeds, |E2sum| when $\psi_0$=15 degrees is satisfied is greater than |E2sum| when $\psi_0$=0 degrees is satisfied. It can be thought that the amount of decrease of |E2sum| without phase correction compared with |Esum| is greater as $|\psi_0|$ is smaller. The effect obtained by the power transmission beam tracking the movable body during execution of the REV method is greater as $|\psi_0|$ is smaller.

Figure 22:
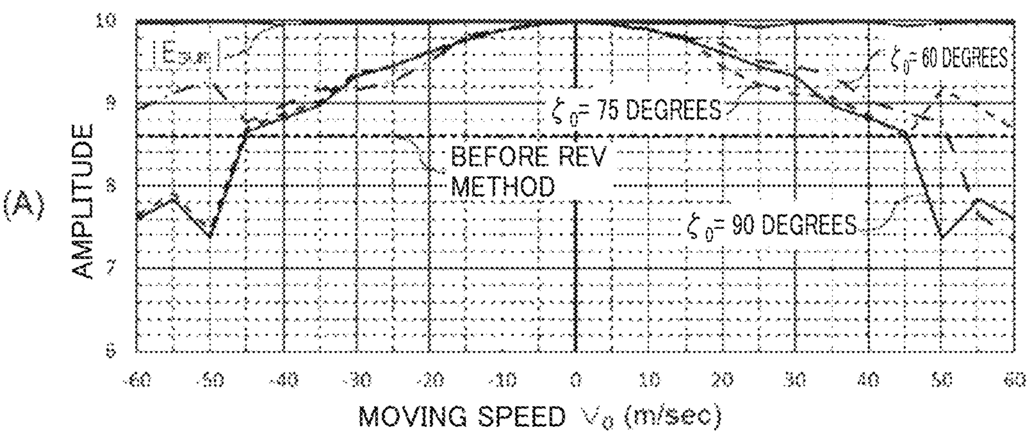
FIG. 22 is a diagram illustrating changes of the amplitude of the electric field vector and the power value after correction to change of the moving speed of the movable body in the wireless power transmission device according to the first embodiment and the comparative example, comparing for the angle differences between the direction in which the movable body is present at the start of the REV method and the moving direction of the movable body.
Figure 22:
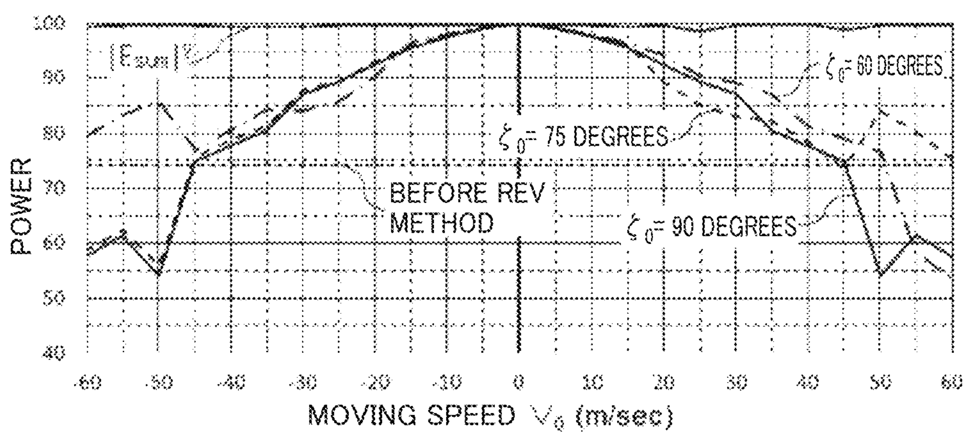

Referring to FIG. 22, the influence of the angle difference between the power transmission direction $\psi_0$ to the movable body and the moving direction of the movable body at the start of the REV method is studied. FIG. 22 is a diagram illustrating changes of the amplitude of the electric field vector and the power value after correction to change of the moving speed of the movable body in the wireless power transmission device according to the first embodiment and the comparative example, comparing for the angle differences between the direction in which the movable body is present at the start of the REV method and the moving direction of the movable body. In FIG. 22, the phase error φp is the pattern 3, $G_0$=1000 m, and $\psi_0$=0 degrees. The moving speed $V_0$ is changed in a range from 60 to −60 (m/sec) with three moving directions $\xi_0$ of movable body: $\xi_0$=90 degrees, $\xi_0$=75 degrees, and $\xi_0$=60 degrees. In FIG. 22, |Esum| and $|Esum|^2$ with movement correction are depicted by solid lines, and those before the REV method are depicted by broken lines. For |E2sum| and $|E2sum|^2$ without movement correction, the graph satisfying $\xi_0$=90 degrees is depicted by a solid line, the graph satisfying $\xi_0$=75 degrees is depicted by a broken line, and the graph satisfying $\xi_0$=60 degrees is depicted by a long and short dashed line.

In FIG. 22, |Esum| with movement correction can be calculated such that |Esum|≥9.94 is satisfied in each angle of moving direction $\xi_0$ and the moving speed $|V_0|\le 60$. |E2sum| without movement correction is substantially the same when $\xi_0$=90 degrees is satisfied and when $\xi_0$=75 degrees is satisfied, in V0≤15 is satisfied. The difference is approximately 0.07 or less. When $\xi_0$=60 degrees is satisfied, it is greater than when $\xi_0$=90 degrees is satisfied and when $\xi_0$=75 degrees is satisfied, except when $V_0$=60 is satisfied.

As illustrated in FIG. 18 and FIG. 20 to FIG. 22, the power transmission beam tracks the movable body during execution of the REV method, whereby the phase reference of each phase shifter 13*p* can be equalized by the REV method, not depending on the pattern of phase error φp, the power transmission direction $\psi_0$ to the movable body at the start of the REV method, the moving direction $\xi_0$ of the movable body, and the speed $V_0$ of the movable body. As a result, the amplitude |Esum| of the composite electric field vector obtained by executing the REV method can be set to be the theoretically possible largest value.

The power transmission direction of power transmission radio wave 2 is controlled such that it is directed in the direction of movable body 60 during execution of the REV method. Thus, the REV method can be executed accurately and power transmission radio wave 2 can be radiated accurately in the radiation direction during power transmission to the movable body. Further, since time data 72 is included in detection data 71 used in executing the REV method, the correspondence between the phase shift amount and the detection data 71 can be determined by the time data correctly, enabling the REV method to be executed accurately.

The power transmission direction of power transmission radio wave 2 is controlled such that it is pointed in the direction of movable body 60 during execution of the REV method. By doing so, the following effects can be expected.

(1) The influence on the reception strength during execution of the REV method due to a deviation of the power transmission direction from movable body 60 is reduced, and the accuracy of the REV method executed for the moving movable body is improved. The power transmission beam formed after execution of the REV method attains a more ideal form, thereby improving the power transmission efficiency.

(2) With improvement in accuracy of the result of the REV method, a beam closer to an ideal beam is formed, and radiation of a power transmission radio wave in an unnecessary direction is avoided. As a result, the influence of interference with others is reduced.

(3) Since the power transmission efficiency after execution of the REV method is increased, the period until the received power strength is decreased to such a degree that execution of REV method is necessary next time can be prolonged. With a longer interval of execution of the REV method, the proportion of the period for executing the REV method to the whole period in which power transmission is required to be performed is reduced. The power transmission efficiency is decreased during execution of the REV method. With a lower proportion of the period for executing the REV method to the whole period in which power transmission is required to be performed, the power transmission efficiency is improved.

The simulation results are described assuming that the distance from the wireless power transmission device to the power reception device is a distance at which a far field is established. Even when the distance is shorter than a distance at which a far field is established (near field), the power transmission direction of power transmission radio wave 2 is controlled to be directed in the direction of movable body 60 during execution of the REV method, whereby the accuracy of the REV method is improved compared with when the power transmission direction of power transmission radio wave 2 is not changed during execution of the REV method. When the distance from the wireless power transmission device to the power reception device is a distance at which a near field is established, the calculation of the phase difference of element radio wave 2$E_p$ radiated by each element antenna 8 that is received by the power reception device and the calculation in the REV method are done by calculation formulae for a near field.

Pilot signal 4 may be pulse-modulated so that detection data 71 is sent from movable body 60 by pilot signal 4. The communication between movable body 60 and control device 10 may be in any form that enables communication at a required speed.

Since pilot signal 4 is transmitted from movable body 60 and wireless power transmission device 1 radiates power transmission radio wave 2 in the direction in which pilot signal 4 arrives, power reception device 3 included in movable body 60 can receive power transmission radio wave 2 efficiently.

Electric field change data generated based on detection data 71 may be sent as electric field change data from on-board control device 19, instead of sending detection data 71 during execution of the REV method. By doing so, the data volume sent from the on-board control device to the wireless power transmission device can be reduced. The on-board control device may be equipped with an element electric field calculator to calculate the element electric field vector in the on-board control device. Detection data 71 itself is also included in the electric field change data generated based on detection data 71.

The power transmission antenna may have a mechanism that changes the radiation direction by mechanical driving. By combining mechanical driving with changing the radiation direction electrically to change the radiation direction, power can be transmitted to the movable body even when the movable body moves more largely.

The element module is provided for each element antenna, but one element module may be provided every two or more element antennas. The element module may be provided every predetermined number of element antennas.

These are applicable to the other embodiments.

Second Embodiment

Figure 23:
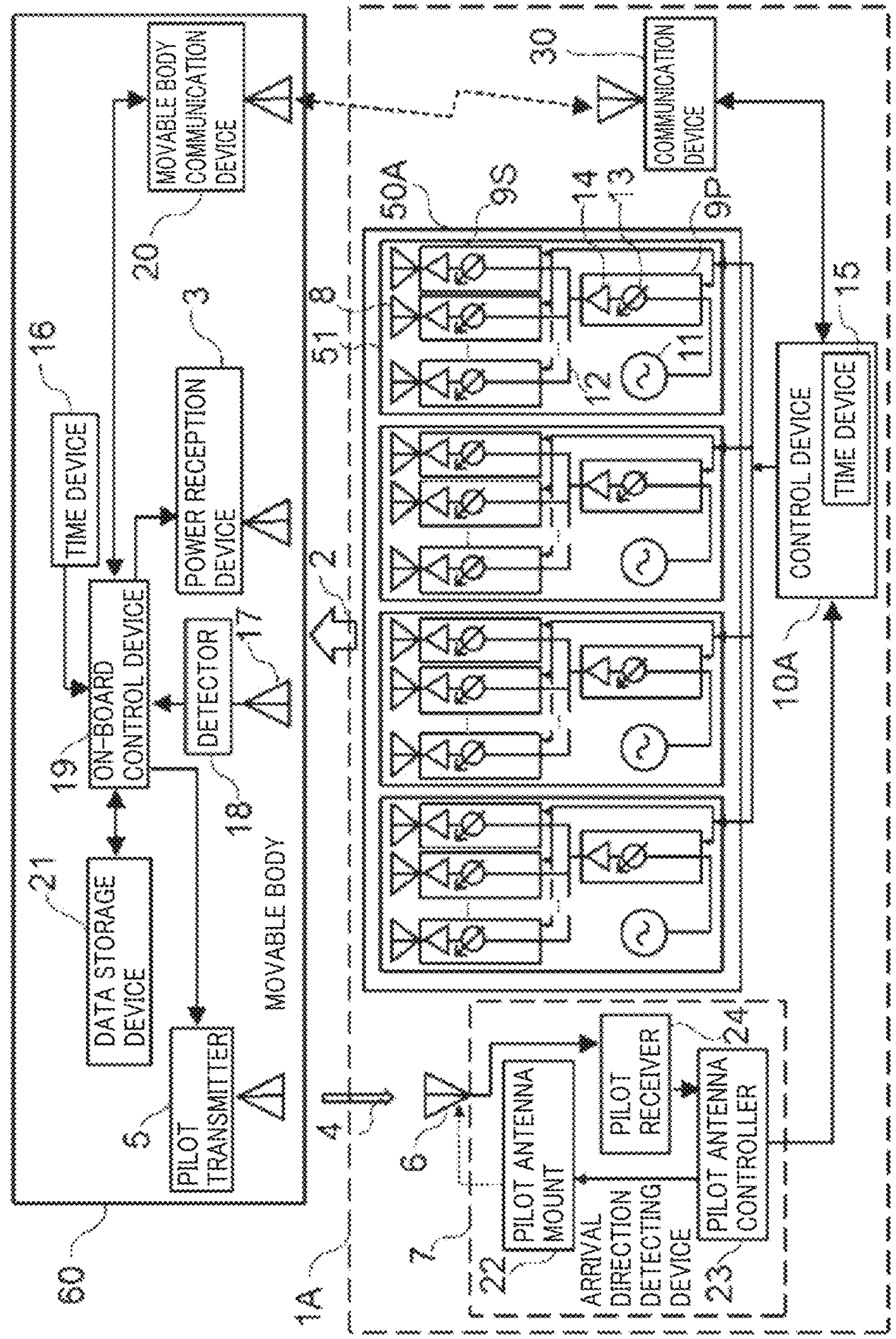
FIG. 23 is a diagram illustrating an overall configuration of a wireless power transmission system for a movable body using a wireless power transmission device according to a second embodiment.

In a wireless power transmission device according to a second embodiment, the power transmission antenna has a plurality of power transmission antenna units. FIG. 23 is a diagram illustrating an overall configuration of a wireless power transmission system for a movable body using a wireless power transmission device according to the second embodiment. A wireless power transmission device 1A includes a power transmission antenna 50A. Power transmission antenna 50A includes four power transmission antenna units 51. Four power transmission antenna units 51 are arranged in two rows and two columns close to each other. Four power transmission antenna units 51 constitute one power transmission antenna 50A. The power transmission antenna may be configured with two, three, or five or more power transmission antenna units.

Power transmission antenna units 51 each include two kinds of element modules 9, namely, a first-stage element module 9P and a second-stage element module 9S. Power transmission antenna unit 51 includes one transmission signal generator 11, one first-stage element module 9P, one distribution circuit 12, and second-stage element modules 9S as many as element antennas 8. First-stage element module 9P and second-stage element modules 9S have the same structure and each includes phase shifter 13 and amplifier 14. A transmission signal outputted by transmission signal generator 11 is inputted to first-stage element module 9P. A transmission signal outputted by first-stage element module 9P is distributed by distribution circuit 12 and inputted to each second-stage element module 9S. A transmission signal outputted by each second-stage element module 9S is inputted to the corresponding one element antenna 8.

Figure 24:
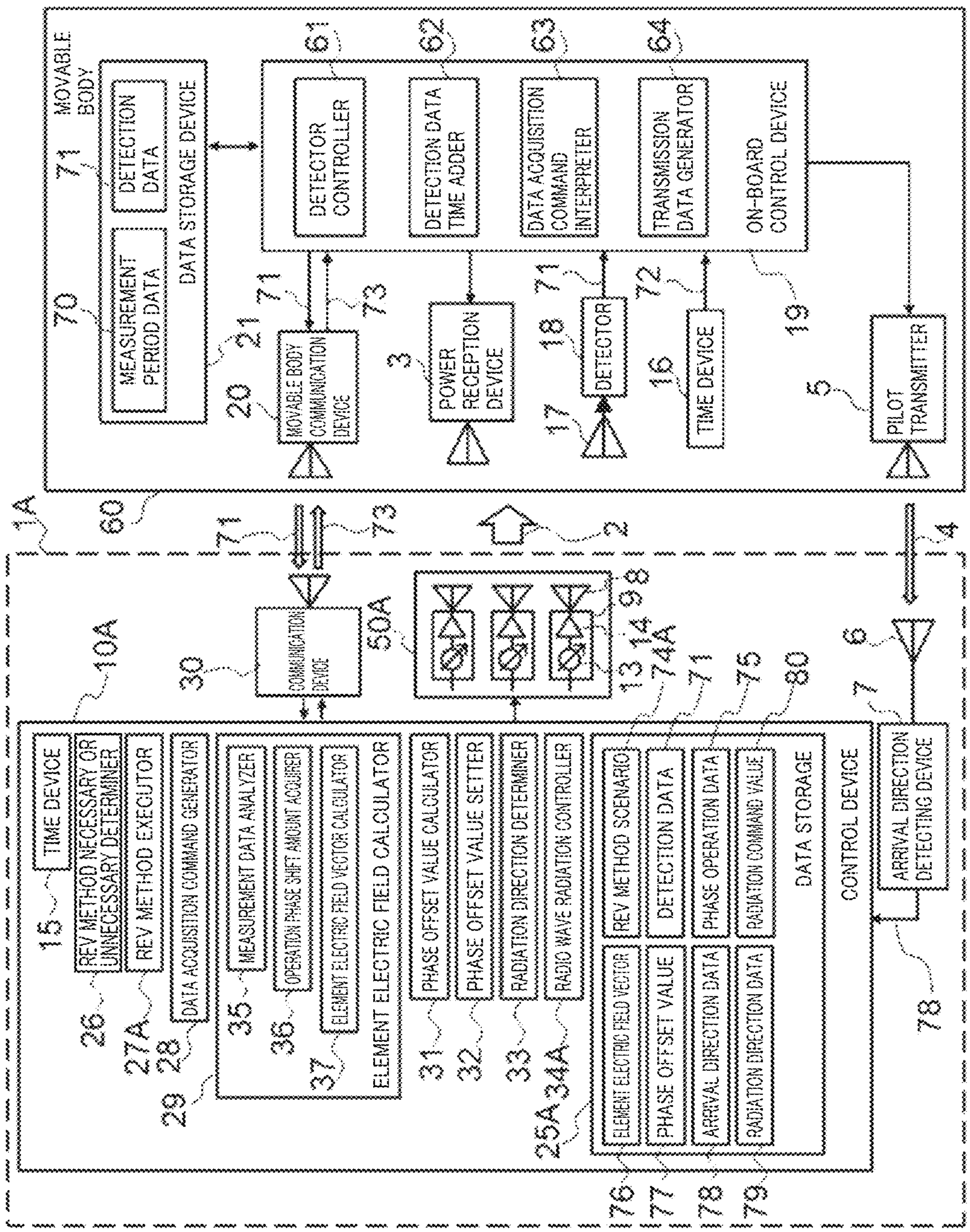
FIG. 24 is a block diagram illustrating a functional configuration of the wireless power transmission device and the movable body according to the second embodiment.

A control device 10A is also modified so that power is transmitted by power transmission antenna 50A having first-stage element modules 9P and second-stage element modules 9S and the REV method is executed. FIG. 24 is a block diagram illustrating a functional configuration of the wireless power transmission device and the movable body according to the second embodiment. In control device 10A, an REV method executor 27A, a data storage 25A, and a radio wave radiation controller 34A are modified. REV method executor 27A executes the REV method in two stages: the REV method for second-stage element modules 9S and the REV method for first-stage element modules 9P. REV method scenario 74A enables execution of the REV method for second-stage element modules 9S and the REV method for first-stage element modules 9P. Data storage 25A stores REV method scenario 74A. Radio wave radiation controller 34A set the phase shift amount for radiating power transmission radio wave 2 in the power transmission direction separately for first-stage element modules 9P and second-stage element modules 9S.

Figure 25:
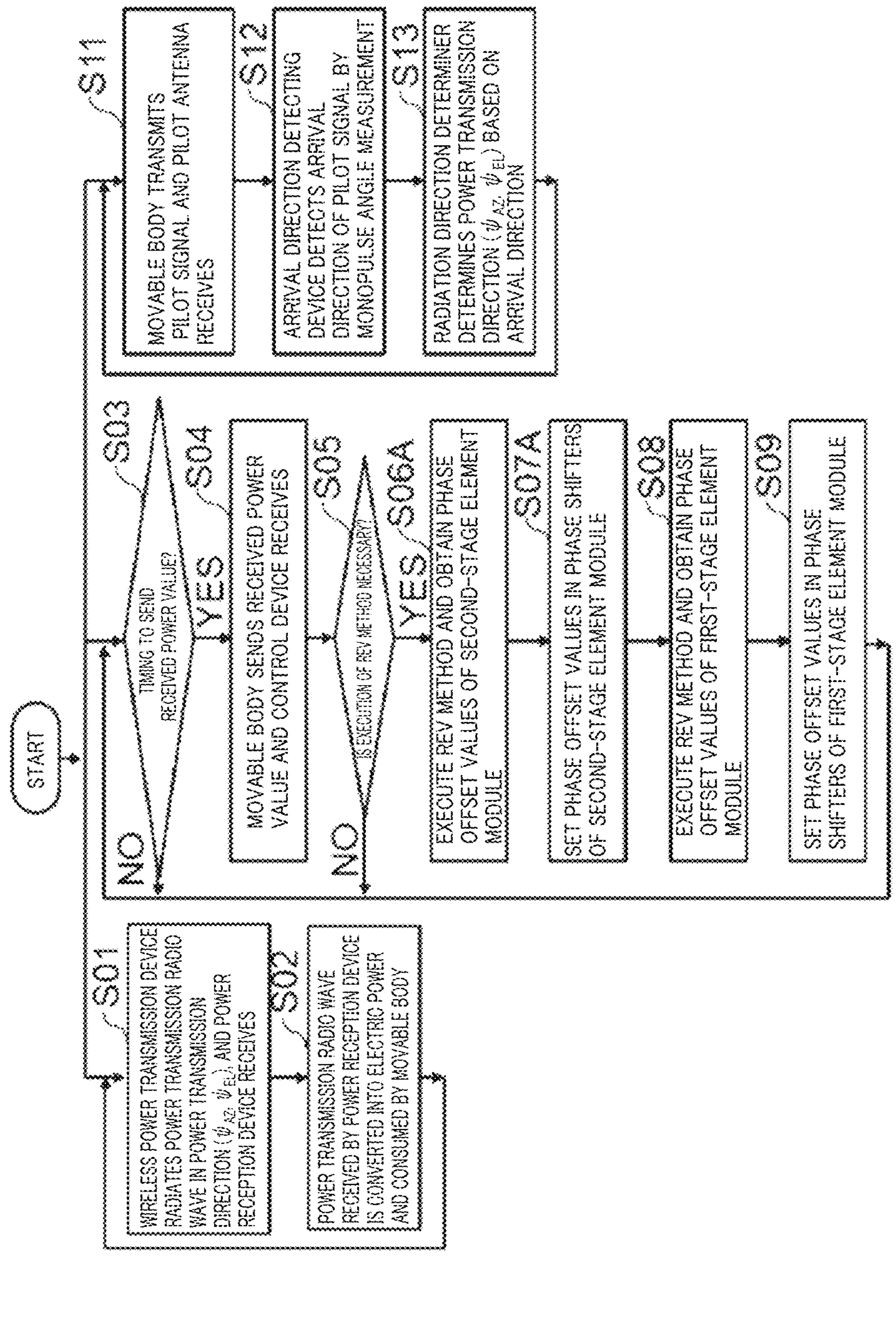
FIG. 25 is a flowchart illustrating a power transmission procedure to a movable body by the wireless power transmission device according to the second embodiment.

The operation is described. FIG. 25 is a flowchart illustrating a power transmission procedure to a movable body by the wireless power transmission device according to the second embodiment. In FIG. 25, points different from FIG. 8 in the first embodiment are described.

When it is determined that execution of the REV method is necessary (YES at S05), at step S06A, the REV method is executed for second-stage element module 9S. By executing the REV method, the phase difference between element electric field vectors by element radio waves 2$E_p$ radiated by element antennas $\mathbf{8}_p$ is calculated, and a phase offset value of second-stage element module 9S for compensating for the phase difference is calculated. At step S07A, the phase offset value obtained by the REV method is set in phase shifter 13 included in each second-stage element module 9S. At step S08, the REV method is executed for first-stage element module 9P. By executing the REV method, the phase difference between electric field vectors by radio waves radiated by power transmission antenna units 51 is calculated, and a phase offset value of first-stage element module 9P for compensating for the phase difference is calculated. At step S09, the phase offset value obtained by the REV method is set in phase shifter 13 included in each first-stage element module 9P. After S09 is performed, the process returns to S03.

The procedure of executing the REV method at S06A and S08 is similar to that in FIG. 9 in the first embodiment.

Wireless power transmission device 1A operates similarly to wireless power transmission device 1 and a similar effect can be obtained. Since the power transmission beam tracks movable body 60 during execution of the REV method, the accuracy of the REV method can be increased.

Third Embodiment

Figure 26:
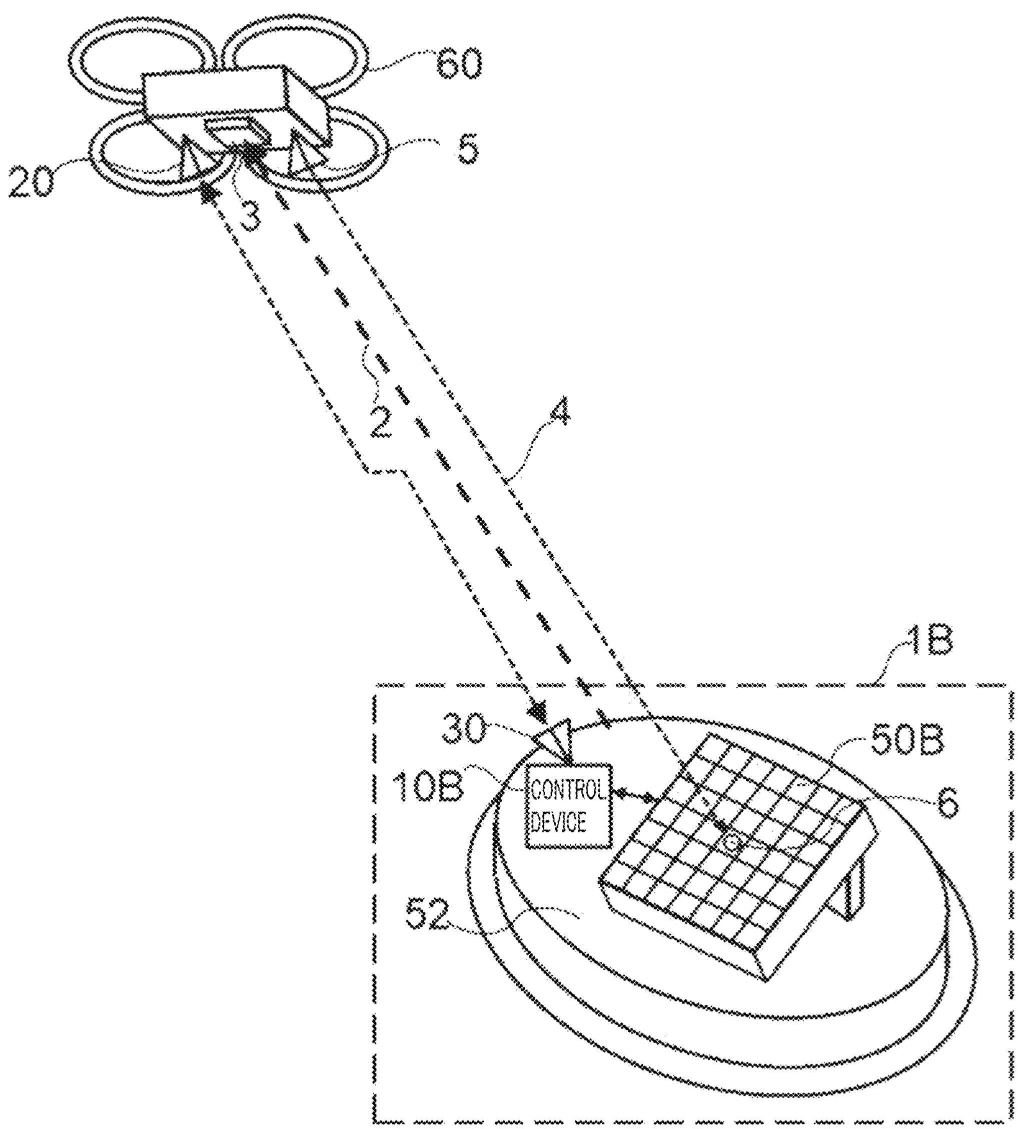
FIG. 26 is a schematic diagram illustrating a configuration of a wireless power transmission system for a movable body using a wireless power transmission device according to a third embodiment.

In a third embodiment, the first embodiment is modified such that the power transmission antenna is moved mechanically so that the power transmission direction can be changed. FIG. 26 is a schematic diagram illustrating a configuration of a wireless power transmission system for a movable body using a wireless power transmission device according to the third embodiment. In FIG. 26, points different from FIG. 1 in the first embodiment are described. A power transmission antenna 50B is installed on an azimuth rotating mount 52 capable of changing the azimuth angle such that its opening area is inclined. Power transmission antenna 50B is installed on azimuth rotating mount 52 such that the opening area forms an angle of 30 degrees, for example, relative to the horizontal plane. In FIG. 26, arrival direction detecting device 7 and control device 10B are also installed on azimuth rotating mount 52. Arrival direction detecting device 7 and control device 10B are not necessarily installed on azimuth rotating mount 52.

Figure 27:
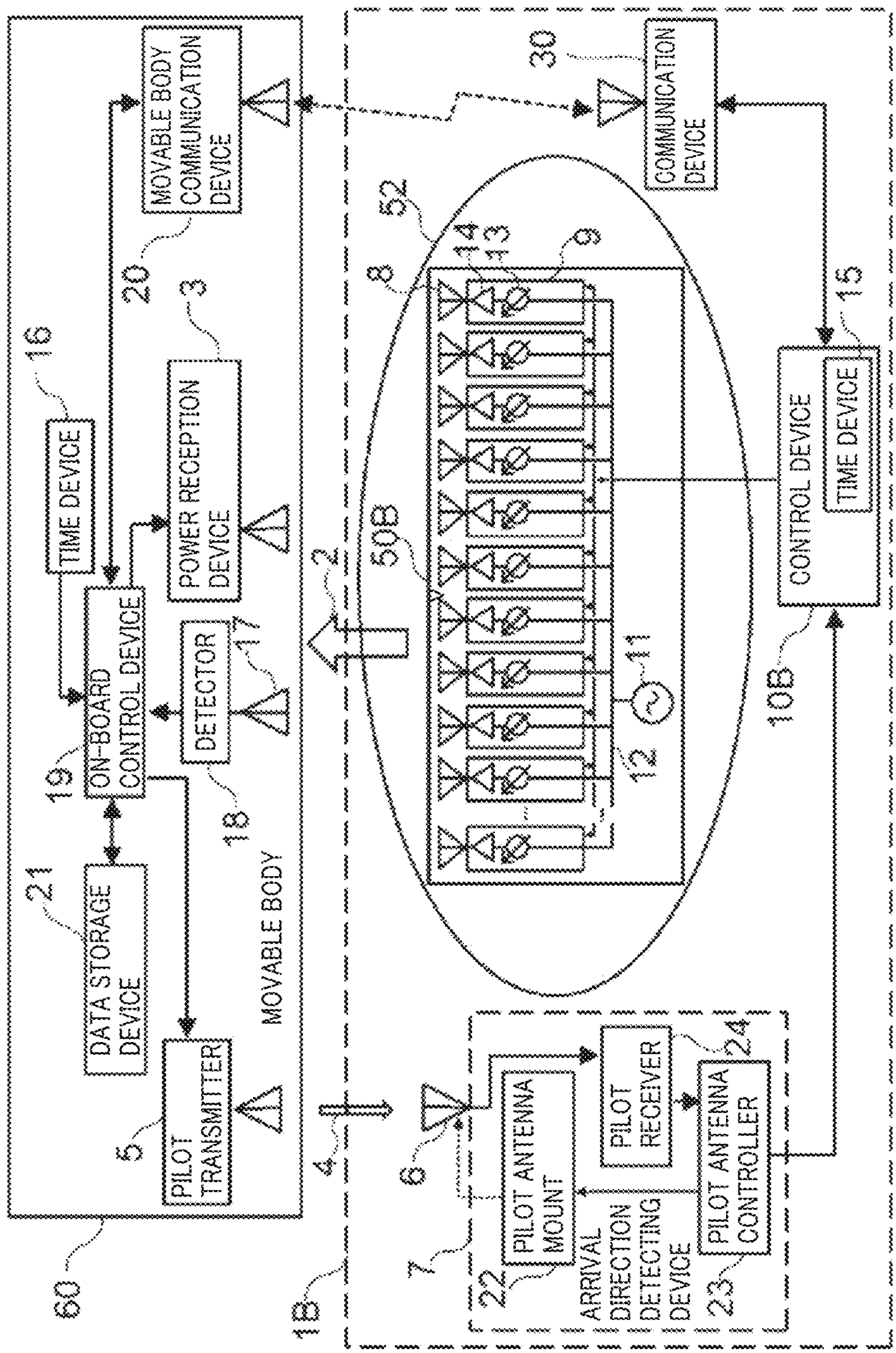
FIG. 27 is a diagram illustrating an overall configuration of the wireless power transmission system for a movable body using a wireless power transmission device according to the third embodiment.

FIG. 27 is a diagram illustrating an overall configuration of a wireless power transmission system for a movable body using a wireless power transmission device according to the third embodiment. In FIG. 27, points different from FIG. 2 in the first embodiment are described. A wireless power transmission device 1B includes azimuth rotating mount 52. Azimuth rotating mount 52 can rotate around the vertical azimuth rotation axis. Azimuth rotating mount 52 can rotate infinitely clockwise and counterclockwise. Power transmission antenna 50B (including pilot antenna 6) is installed on azimuth rotating mount 52. When azimuth rotating mount 52 rotates, power transmission antenna 50B and pilot antenna 6 rotate in the same way. Control device 10B also controls azimuth rotating mount 52. Pilot antenna 6 may be installed separately from power transmission antenna 50B.

Azimuth rotating mount 52 is a power transmission antenna driving device that moves power transmission antenna 50B mechanically to change the radiation direction. Azimuth rotating mount 52 supports power transmission antenna 50B such that power transmission antenna 50B is inclined relative to a reference plane, where the horizontal plane is the reference plane. Azimuth rotating mount 52 rotates power transmission antenna 50B around the azimuth rotation axis that is the rotation axis vertical to the reference plane.

Figure 28:
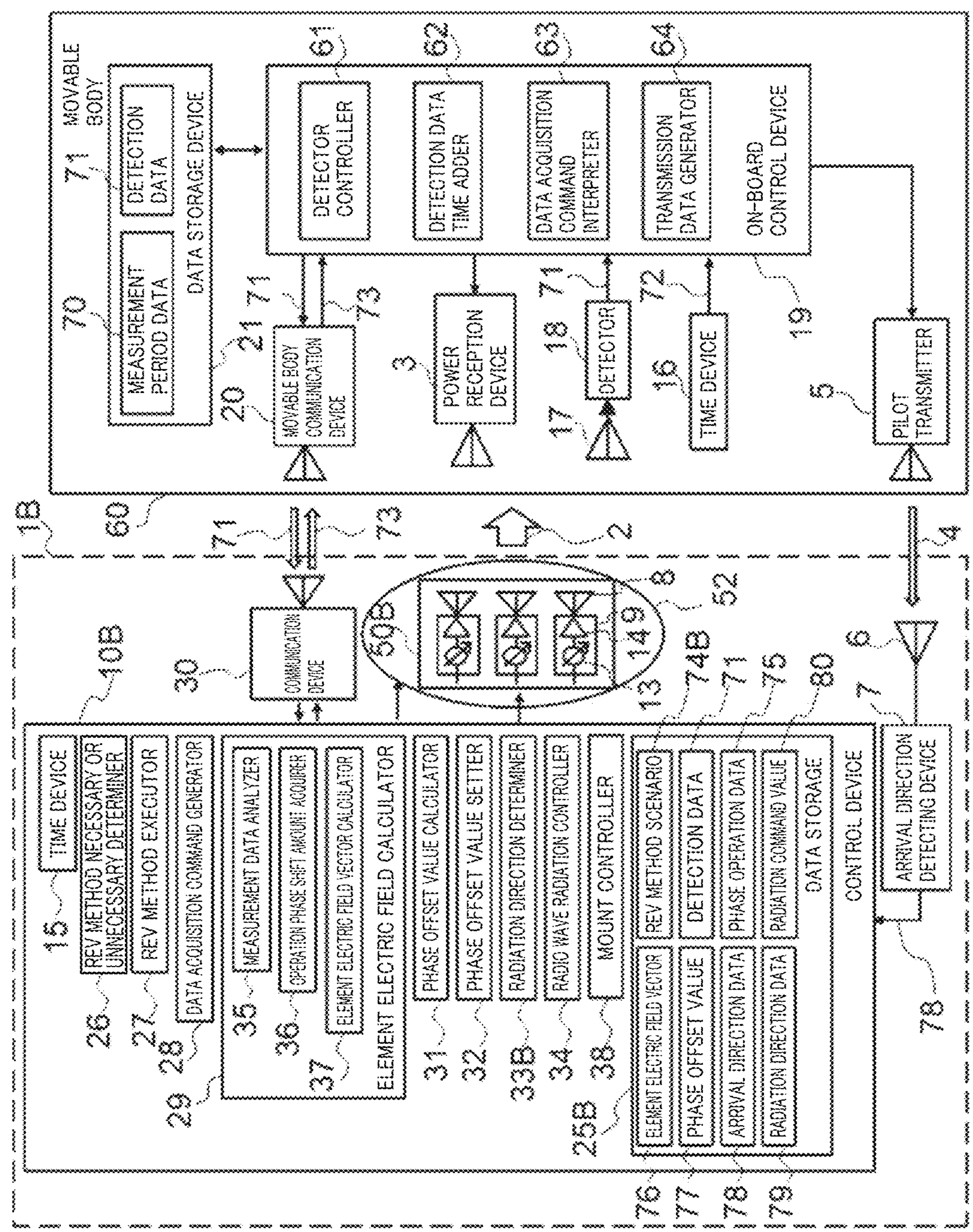
FIG. 28 is a block diagram illustrating a functional configuration of the wireless power transmission device and the movable body according to the third embodiment.

FIG. 28 is a block diagram illustrating a functional configuration of the wireless power transmission device and the movable body according to the third embodiment. In FIG. 28, points different from FIG. 5 in the first embodiment are described. Control device 10B also includes a mount controller 38 to control azimuth rotating mount 52. A radiation direction determiner 33B is modified.

The following variables are defined for explaining the operation of radiation direction determiner 33B and mount controller 38.

$\psi_{AZM}$: the azimuth angle in which azimuth rotating mount 52 is directed.

$\psi_{AZE}$: the azimuth angle component of the power transmission direction relative to the front direction of power transmission antenna 50B.

$$\psi_{AZE}=\psi_{AZ}-\psi_{AZM} \quad (41)$$

$\psi_{ELM}$: the inclination angle of azimuth rotating mount 52. The angle between the horizontal plane and the opening area of power transmission antenna 50B. Here, $\psi_{ELM}$=30 degrees.

$\psi_{ELE}$: the altitude angle of the power transmission direction relative to the front direction of power transmission antenna 50B. The altitude angle is the angle between the power transmission direction and the direction toward the zenith.

$$\psi_{ELE}=\psi_{EL}-\psi_{ELM} \quad (42)$$

$\psi_{AZmax}$: the upper limit value for $|\psi_{AZE}|$. For example, 45 degrees.

$\psi_{ELmax}$: the upper limit value for the altitude angle $\psi_{ELE}$. For example, 45 degrees.

$\psi_{ELmin}$: the lower limit value for the altitude angle $\gamma_{ELE}$. For example, −45 degrees.

In wireless power transmission device 1B, pilot antenna 6 and arrival direction detecting device 7 detect the arrival direction with respect to the direction of the opening area of power transmission antenna SOB. Arrival direction detecting device 7 detects the arrival direction ($\psi_{AZE}$, $\psi_{ELE}$). Thus, the direction toward the arrival direction ($\psi_{AZE}$, $\psi_{ELE}$) is set as the radiation direction ($\psi_{AZE}$, $\psi_{ELE}$) of power transmission radio wave 2. When the presence direction ($\psi_{AZ}$, $\psi_{EL}$) of the movable body is detected without using a pilot signal, the presence direction ($\psi_{AZ}$, $\psi_{EL}$) is converted into the direction ($\psi_{AZE}$, $\psi_{ELE}$) by equation (41) and equation (42). The direction toward the direction ($\psi_{AZE}$, $\psi_{ELE}$) is set as the radiation direction of power transmission radio wave 2.

Mount controller 38 controls the direction $\psi_{AZM}$ in which azimuth rotating mount 52 is directed such that $\psi_{AZE}$ and WELL satisfy all of the following equation (43) and equation (44). The range of the power transmission direction ($\psi_{AZE}$, $\psi_{ELE}$) that satisfies all of equation (43) and equation (44) is called proper angle range.

$$|\psi_{AZE}|\leq\psi_{AZmax} \quad (43)$$

$$\psi_{ELmin}\leq\varphi_{ELE}\leq\psi_{ELmax} \quad (44)$$

Equation (41) is substituted into equation (43) as follows.

$$|\psi_{AZ}-\varphi_{AZM}|\leq\psi_{AZmax} \quad (45)$$

Equation (42) is substituted into equation (44) as follows.

$$\psi_{ELmin}+\psi_{ELM}\leq\psi_{EL}\leq\psi_{ELmax}+\psi_{ELM} \quad (46)$$

The power transmission direction ($\psi_{AZ}$, $\psi_{EL}$) may be monitored to determine whether equation (45) and equation (46) are satisfied, instead of monitoring the power transmission direction ($\psi_{AZE}$, $\psi_{ELE}$).

There are some possible methods for mount controller 38 to control azimuth rotating mount 52. Here, the azimuth angle of azimuth rotating mount 52 is changed only when the power transmission direction ($\psi_{AZE}$, $\psi_{ELE}$) gets out of the proper angle range. The radiation direction can be changed faster by changing the power transmission direction ($\psi_{AZE}$, $\psi_{ELE}$) electrically than by rotating azimuth rotating mount 52. Azimuth rotating mount 52 may be rotated slowly such that $\psi_{AZE}$ approaches zero after $\psi_{AZE}$ significantly varies.

Mount controller 38 monitors $\psi_{AZE}$ and $\psi_{ELE}$ and checks whether equation (43) and equation (44) are satisfied. When equation (43) is not satisfied, azimuth rotating mount 52 is rotated so that equation (43) is satisfied. When $\psi_{AZE}<-\psi_{AZmax}$ is satisfied, azimuth rotating mount 52 is rotated counterclockwise. When war $\psi_{AZE}>\psi_{AZmax}$ is satisfied, azimuth rotating mount 52 is rotated clockwise. Azimuth rotating mount 52 is rotated until $\psi_{AZE}$=0 degrees. During rotation of azimuth rotating mount 52, $\psi_{AZE}$ and $\psi_{ELE}$ are controlled such that the power transmission direction is directed to the presence direction of movable body 60.

When $\psi_{ELE}>\psi_{ELmax}$ is satisfied, that is, equation (44) is not satisfied, it means that movable body 60 is at a low elevation angle (the altitude angle $\psi_{EL}$ is large). The only way to satisfy equation (44) is that movable body 60 moves to a position at a higher elevation angle. When satisfying $\psi_{ELE}>\psi_{ELmax}$ is detected, power transmission to movable body 60 is stopped. When satisfying $\psi_{ELE}\leq\psi_{ELmax}$ is detected, power transmission to movable body 60 is resumed.

When $\psi_{ELE}<\psi_{ELmin}$ is satisfied, that is, equation (44) is not satisfied, azimuth rotating mount 52 is rotated. When azimuth rotating mount 52 rotates 180 degrees, $\psi_{EL}<0$ is changed to $-\psi_{EL}>0$ and $\psi_{ELE}=-\psi_{EL}-\psi_{ELM}>\psi_{ELM}>\psi_{ELmin}$ are satisfied, then equation (44) is satisfied.

When mount controller 38 detects $\psi_{ELE}<\psi_{ELmin}$ is satisfied, azimuth rotating mount 52 is rotated so that $\psi_{AZE}=0$, $\psi_{ELE}\geq\psi_{ELmin}$ are satisfied. The rotation direction of azimuth rotating mount 52 is determined such that the rotation angle of azimuth rotating mount 52 to satisfy $\psi_{AZE}=0$, $\psi_{ELF}\geq\psi_{ELmin}$ is small. When $\psi_{AZE}\geq0$ is satisfied, azimuth rotating mount 52 is rotated counterclockwise. When $\psi_{AZE}<0$ is satisfied, azimuth rotating mount 52 is rotated clockwise. There is a period in which $|\psi_{AZE}|>\psi_{AZmax}$ is satisfied before $\psi_{AZE}=0$, $\psi_{ELE}\geq\psi_{ELmin}$ are satisfied. In a period in which $|\psi_{AZE}|>\psi_{AZmax}$ is satisfied, radiation of power transmission radio wave 2 is stopped and azimuth rotating mount 52 is rotated at highest speed. Rotating azimuth rotating mount 52 at highest speed can minimize the period in which radiation of power transmission radio wave 2 is stopped. While $|\psi_{AZE}|\leq\psi_{AZmax}$ is satisfied, $\psi_{AZE}$ and $\psi_{ELE}$ are controlled such that the power transmission direction is directed to the presence direction of movable body 60.

Figure 29:
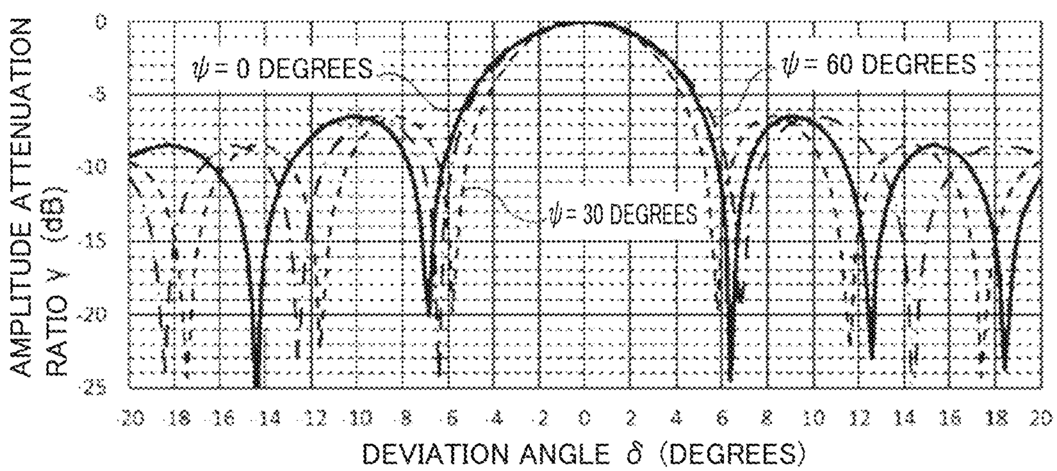
FIG. 29 is a graph illustrating change of an amplitude attenuation ratio $\gamma$ to change of a deviation angle $\delta$ in the phased array antenna included in the wireless power transmission device according to the third embodiment.

Power transmission antenna 50B can form a power transmission beam with a smaller half-width smaller than power transmission antenna 50 at a low elevation angle. FIG. 29 is a graph illustrating change of an amplitude attenuation ratio γ to change of deviation angle δ in the phased array antenna included in the wireless power transmission device according to the third embodiment. FIG. 29 illustrates graphs representing change of amplitude attenuation ratio γ to change of deviation angle δ when $\psi_{AZE}=0$ degrees is satisfied and either $\psi_{EL}=0$ degrees, 30 degrees, or 60 degrees is satisfied. The graph satisfying $\psi_{EL}=0$ degrees is depicted by a solid line, the graph satisfying $\psi_{EL}=30$ degrees is depicted by a broken line, and the graph satisfying $\psi=60$ degrees is depicted by a long and short dashed line. When $\psi_{EL}=0$ degrees is satisfied, the half-width is approximately 8.0 degrees. When $\psi_{EL}=30$ degrees is satisfied, the half-width is approximately 6.8 degrees. When $\psi_{EL}=60$ degrees is satisfied, the half-width is approximately 8.0 degrees. Compared with FIG. 6, the half-width when $\psi_{EL}=60$ degrees is smaller.

Figure 30:
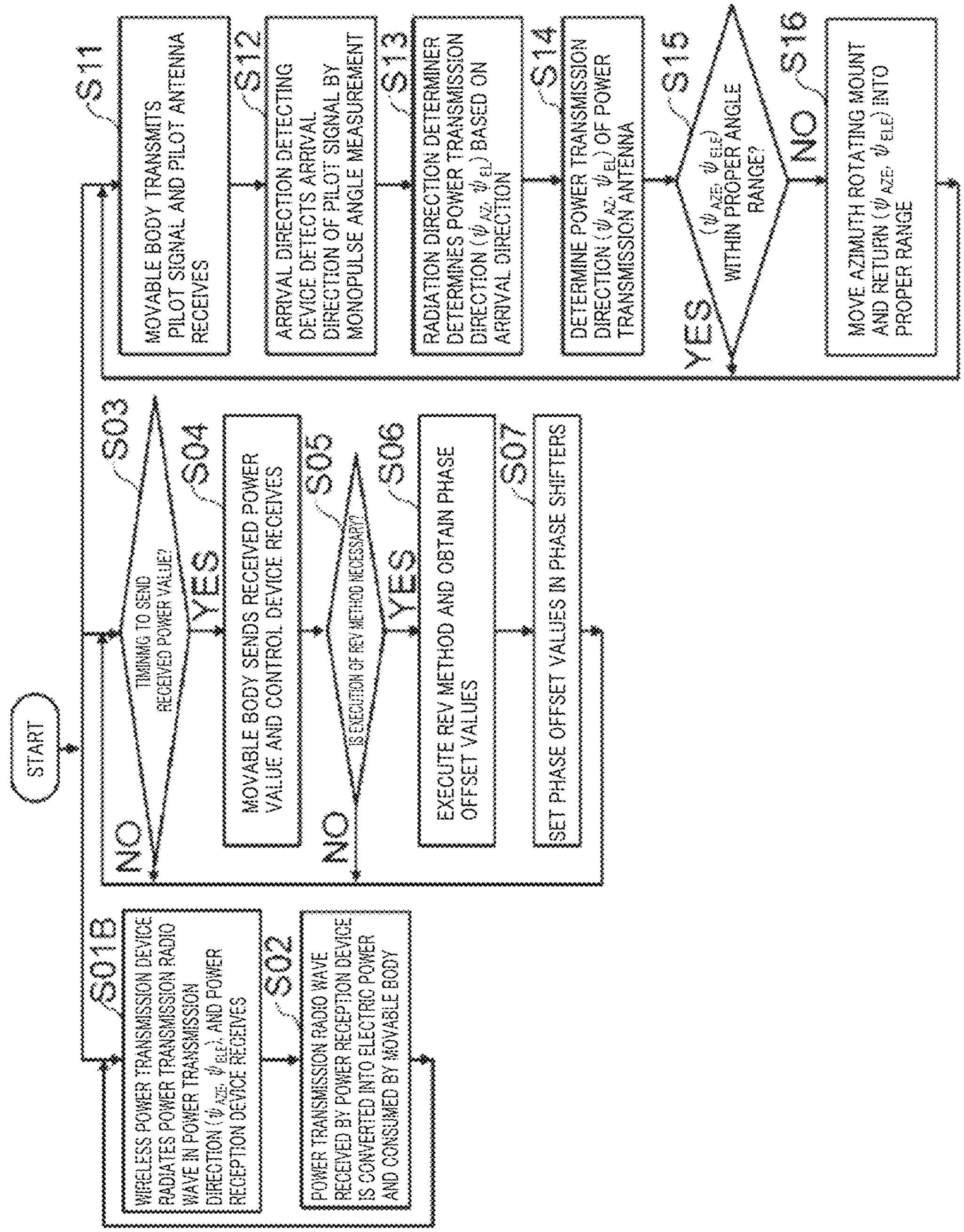
FIG. 30 is a flowchart illustrating a power transmission procedure to a movable body by the wireless power transmission device according to the third embodiment.

The operation is described. FIG. 30 is a flowchart illustrating a power transmission procedure to a movable body by the wireless power transmission device according to the third embodiment. In FIG. 30, points different from FIG. 8 in the first embodiment are described. Steps S14 to S16 are added after S13 in which the power transmission direction ($\psi_{AZ}$, $\psi_{EL}$) is determined. At S14, the power transmission direction ($\psi_{AZE}$, $\psi_{ELE}$) of power transmission antenna 50B is determined from power transmission direction ($\psi_{AZ}$, $\psi_{EL}$). The power transmission direction ($\psi_{AZ}$, $\psi_{EL}$) and the power transmission direction ($\psi_{AZE}$, $\psi_{ELE}$) have the relation of equation (41) and equation (42).

At step S15, it is checked whether the power transmission direction ($\psi_{AZE}$, $\psi_{ELE}$) of power transmission antenna 50B is within the proper angle range. When it is within the proper angle range (YES at S15), the process returns to S11. When it is not within the proper angle range (NO at S15), at step S16, azimuth rotating mount 52 is rotated such that the power transmission direction ($\psi_{AZE}$, $\psi_{ELE}$) becomes within the proper angle range. After S16 is performed, the process returns to S11.

Figure 31:
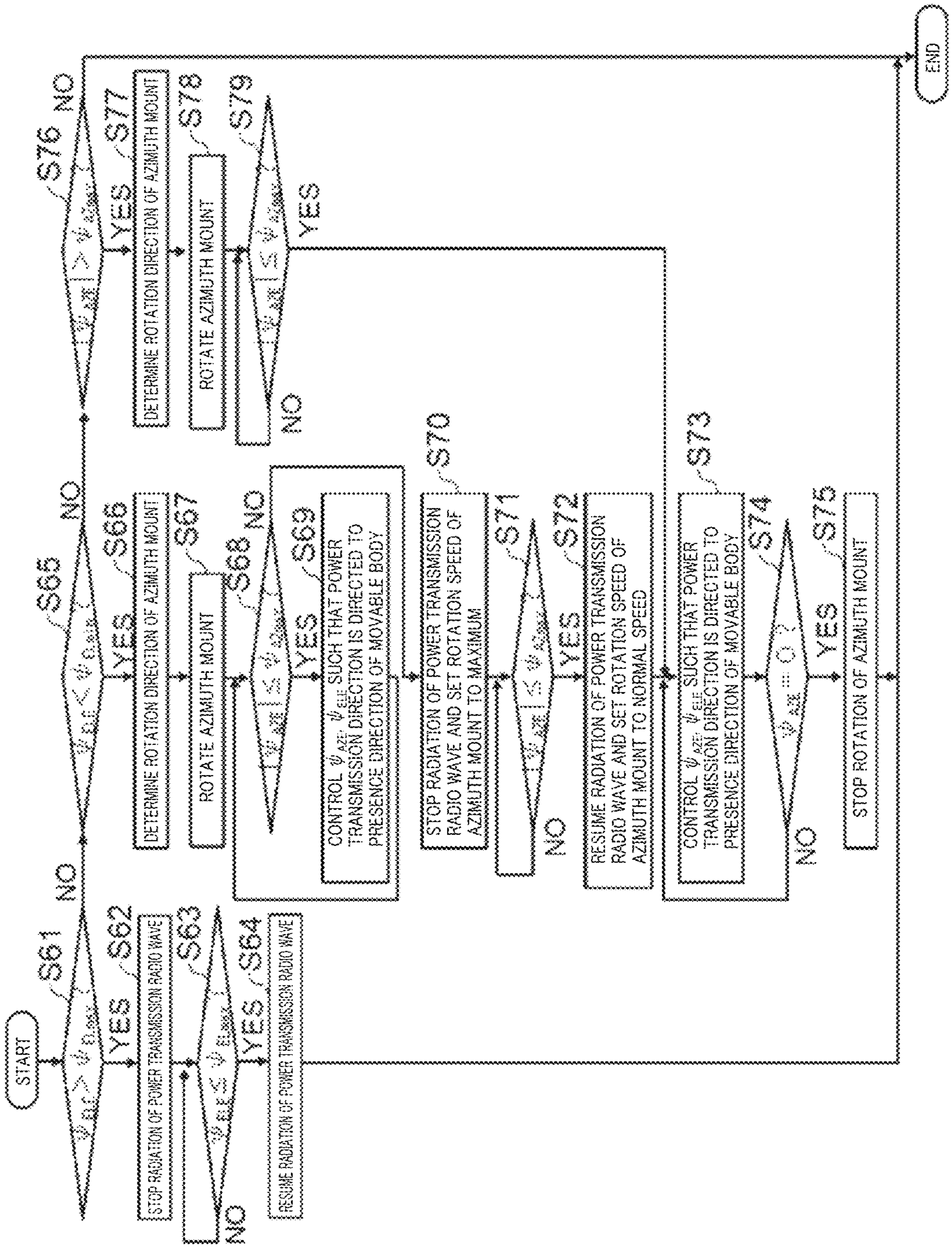
FIG. 31 is a flowchart illustrating a procedure for restoring a power transmission direction to a proper angle range in the power transmission procedure to a movable body by the wireless power transmission device according to the third embodiment.

The procedure of restoring the power transmission direction ($\psi_{AZE}$, $\psi_{ELE}$) out of the proper angle range to the proper angle range at S16 is described referring to FIG. 31. At step S61, it is checked whether $\psi_{ELE}>\psi_{ELmax}$ is satisfied or not. When $\psi_{ELE}>\psi_{ELmax}$ is satisfied (YES at S61), at step S62, radiation of power transmission radio wave 2 is stopped. At step S63, it is checked whether $\psi_{ELE}<\psi_{ELmax}$ is satisfied or not. When $\psi_{ELE}\leq\psi_{ELmax}$ is satisfied (YES at S63), at step S64, radiation of power transmission radio wave 2 is resumed. After S64 is performed, the process ends. When not $\psi_{ELE}\leq\psi_{ELmax}$ is satisfied (NO at S63), S63 is performed repeatedly in predetermined cycles.

When $\psi_{ELE}>\psi_{ELmax}$ is not satisfied (NO at S61), at step S65, it is checked whether $\psi_{ELE}<\psi_{ELmin}$ is satisfied or not. When $\psi_{ELE}<\psi_{ELmin}$ (YES at S65) is satisfied, at step S66, the rotation direction of azimuth rotating mount 62 is determined. when $\psi_{AZE}\geq0$ is satisfied, the rotation direction is determined to be counterclockwise, and when $\psi_{AZE}<0$ is satisfied, it is determined to be clockwise. At step S67, azimuth rotating mount 62 is rotated. At step S68, it is checked whether $|\psi_{AZE}|\leq\psi_{AZmax}$ is satisfied or not. When $|\psi_{AZE}|\leq\psi_{AZmax}$ is satisfied (YES at S68), at step S69, $\psi_{AZE}$ and $\psi_{ELE}$ are controlled such that the power transmission direction is directed to the presence direction of movable body 60. After S69 is performed, the process returns to S68.

When $|\psi_{AZE}|\leq\psi_{AZmax}$ is not satisfied (NO at S68), at step S70, radiation of power transmission radio wave 2 is stopped and the rotation speed of azimuth rotating mount 62 is set to the maximum. At step S71, it is checked whether $|\psi_{AZE}|\leq\psi_{AZmax}$. When $|\psi_{AZE}|\leq\psi_{AZmax}$ is satisfied (YES at S71), at step S72, radiation of power transmission radio wave 2 is resumed and the rotation speed of azimuth rotating mount 62 is set to a normal speed. At step S73, $\psi_{AZE}$ and $\psi_{ELE}$ are controlled such that the power transmission direction is directed to the presence direction of movable body 60. At step S74, it is checked whether $\psi_{AZE}=0$ degrees. When $\psi_{AZE}=0$ degrees is not satisfied (YES at S74), S74 is performed repeatedly in predetermined cycles. When $\psi_{AZE}=0$ degrees is satisfied (YES at S74), at step S75, the rotation of azimuth rotating mount 62 is stopped. After S75 is performed, the process ends.

When $\psi_{ELE}<\psi_{ELmin}$ (NO at S65) is not satisfied, at step S76, it is checked whether $|\psi_{AZE}|>\psi_{AZmax}$ is satisfied or not. When $|\psi_{AZE}|>\psi_{AZmax}$ is not satisfied (NO at S76), the process ends. When $|\psi_{AZE}>\psi_{AZmax}$ is satisfied (YES at S76), at step S77, the rotation direction of azimuth rotating mount 62 is determined. When $\psi_{AZE}\geq0$ is satisfied, the rotation direction is determined to be counterclockwise, and when $\psi_{AZE}<0$ is satisfied, it is determined to be clockwise. At step S78, azimuth rotating mount 62 is rotated. At step S79, it is checked whether $|\psi_{AZE}|\leq\psi_{AZmax}$. When $|\psi_{AZE}|\leq\psi_{AZmax}$ is not satisfied (NO at S79), S79 is performed repeatedly in predetermined cycles. When $|\psi_{AZE}|\leq\psi_{AZmax}$ is satisfied (YES at S79), the process proceeds to S73.

In wireless power transmission device 1B, the azimuth angle of power transmission antenna 50B can be changed by azimuth rotating mount 52 and power transmission antenna 50B is installed such that it is inclined relative to the horizontal plane. Thus, wireless power transmission device 1B can transmit power to movable body 60 in a wider range of azimuth angle and elevation angle than wireless power transmission device 1. Wireless power transmission device 1B can form a power transmission beam with a narrower half-width than wireless power transmission device 1 at a low elevation angle.

The elevation angle of the direction in which the opening area of the power transmission antenna is directed may be changeable mechanically. The power transmission antenna can change the radiation direction by mechanically and electrically changing the radiation direction in combination.

Fourth Embodiment

In the first embodiment, mono-pulse tracking of a pilot signal transmitted by the receiving side on the power transmitting side is used as means for tracking a movable body. In a fourth embodiment, the pilot signal is tracked by step track method. In step track method, the orientation direction of the pilot antenna receiving a pilot signal is searched for while being changed by trial and error, and the power transmission direction of the power transmission radio wave is changed to the direction in which the reception strength of the pilot signal is increased. Although the orientation direction of the pilot antenna is also changed to the direction in which the reception strength is decreased, the power transmission direction of the power transmission radio wave tracks only the direction in which the reception strength is increased.

Figure 32:
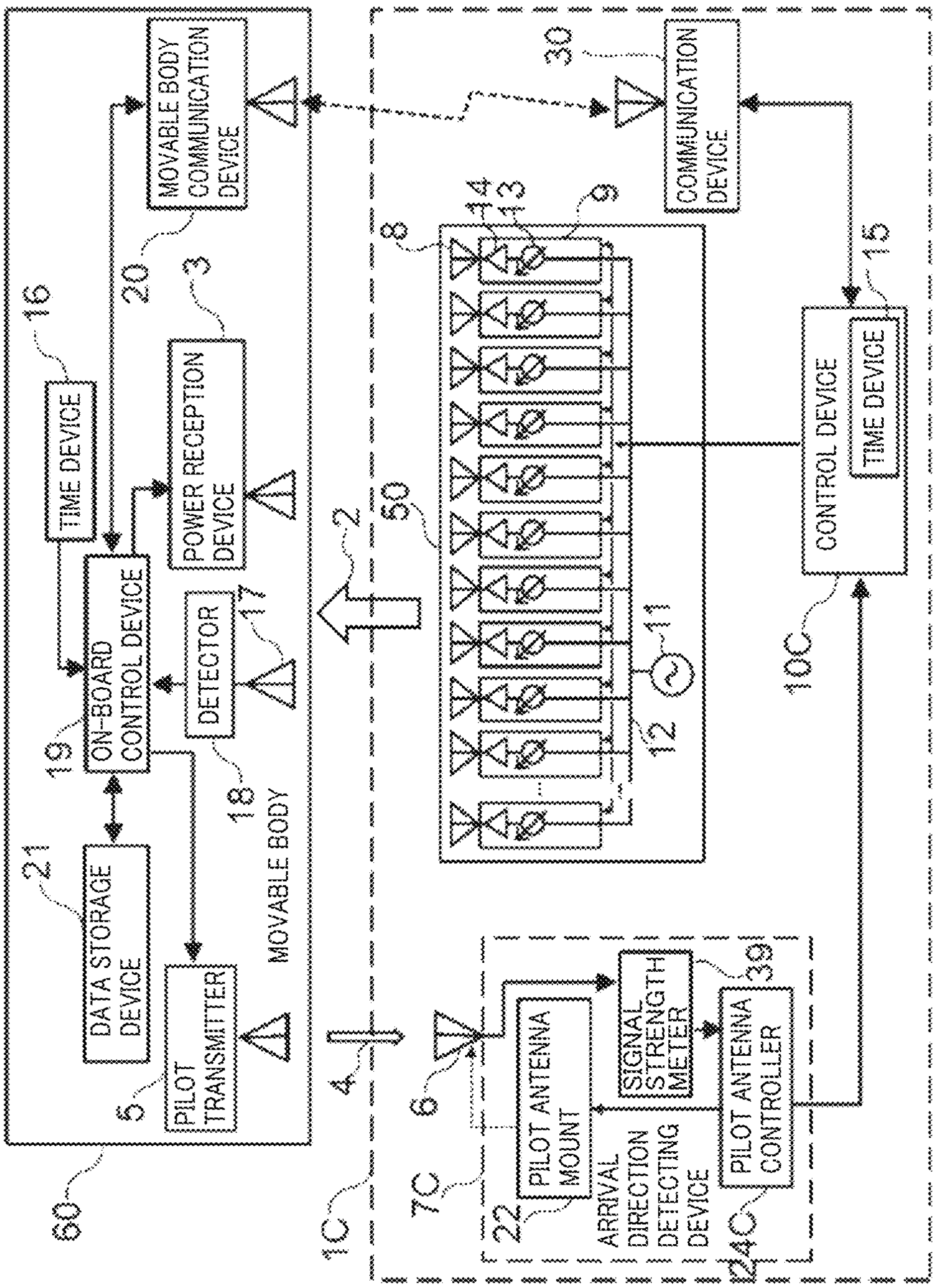
FIG. 32 is a diagram illustrating an overall configuration of a wireless power transmission system for a movable body using a wireless power transmission device according to a fourth embodiment.
Figure 33:
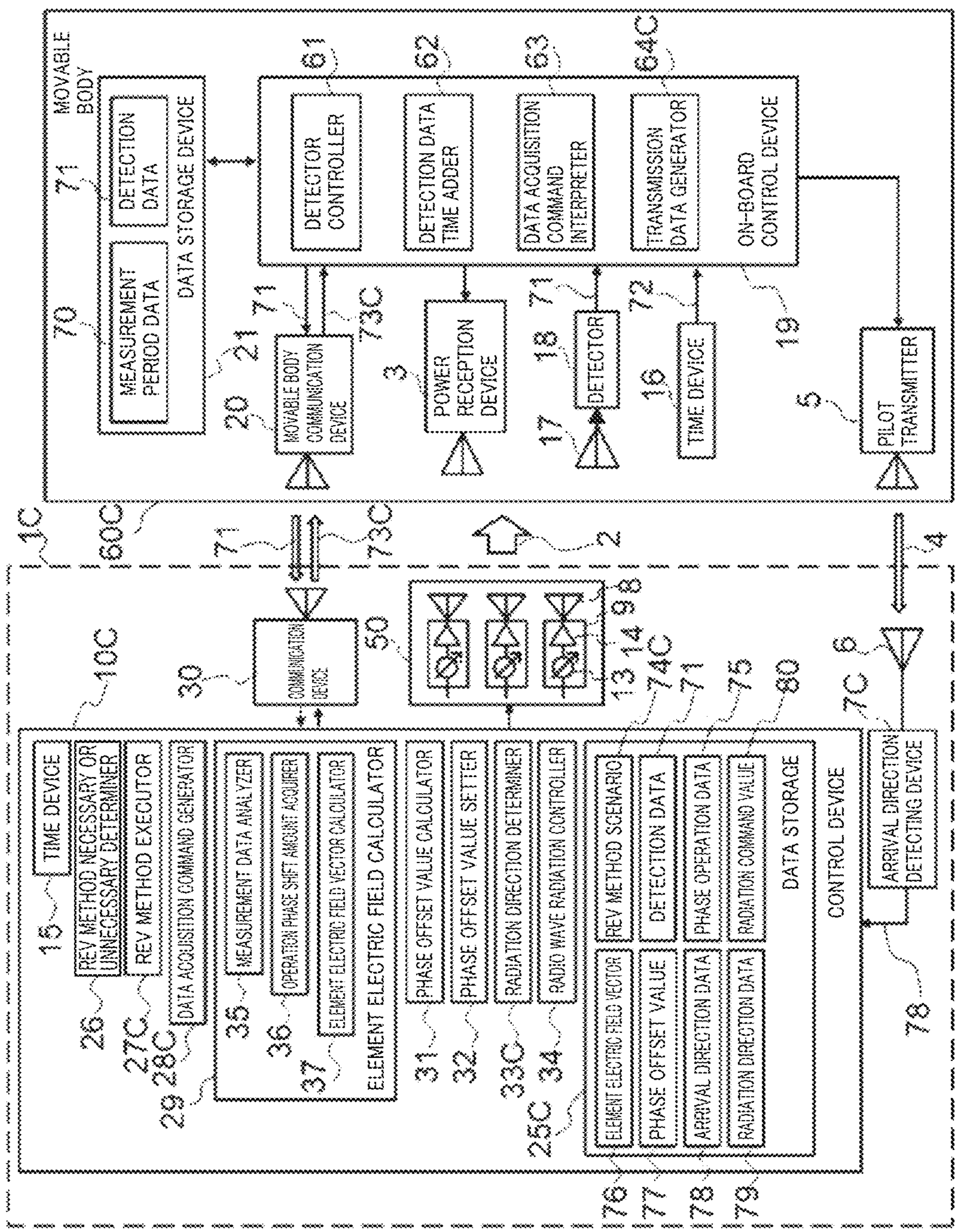
FIG. 33 is a block diagram illustrating a functional configuration of the wireless power transmission device and the movable body according to the fourth embodiment.

Referring to FIG. 32 and FIG. 33, the structure of a wireless power transmission device 1C and movable body 60 is described. FIG. 32 is a diagram illustrating an overall configuration of a wireless power transmission system for a movable body using a wireless power transmission device according to a fourth embodiment. In FIG. 32, points different from FIG. 2 in the first embodiment are described. An arrival direction detecting device 7C and a control device 10C are modified. Arrival direction detecting device 7C includes a signal strength meter 39 instead of pilot receiver 24. Signal strength meter 39 measures the signal strength of a pilot reception signal. A pilot antenna controller 23C is modified. Pilot antenna controller 23C controls pilot antenna mount 22 by step track method FIG. 33 is a block diagram illustrating a functional configuration of the wireless power transmission device and the movable body according to the fourth embodiment. In FIG. 33, points different from FIG. 5 in the first embodiment are described. Control device 10C sends a data acquisition command 73C for each one period in which phase shifter 13 specified by REV method scenario 74C takes the specified phase shift amount, and acquires one piece of detection data 71C. Data storage 25C stores REV method scenario 74C.

The signal strength of the pilot reception signal measured by signal strength meter 39 is called pilot signal strength. Pilot antenna controller 23C changes the orientation direction of pilot antenna 6 by a predetermined angle temporarily in a plurality of directions, using the orientation direction of pilot antenna 6 in the previous cycle as a reference direction. Signal strength meter 39 measures the pilot signal strength in a state in which the orientation direction of pilot antenna 6 is directed in the direction changed from the reference direction. Pilot antenna controller 23C sets the direction in which the pilot signal strength is largest among the directions changed temporarily, as a new reference direction of the orientation direction of pilot antenna 6. Pilot antenna controller 23C repeats such a process to change the reference direction of the orientation direction of pilot antenna 6. Pilot antenna controller 23C notifies control device 10C of the reference direction of the orientation direction of pilot antenna 6 as the arrival direction. In arrival direction detecting device 7C, the cycle of detecting the arrival direction is longer than in arrival direction detecting device 7.

In control device 10C, a data acquisition command generator 28C and a radiation direction determiner 33C are modified. Radiation direction determiner 33C updates radiation direction data 81C in a cycle shorter than the cycle in which arrival direction data 79 is updated. Radiation direction determiner 33C interpolates the points of time without arrival direction data 79 to generate radiation direction data 81C. Specifically, radiation direction determiner 33C estimates the rate of change of arrival direction data 79 and estimates arrival direction data 79 based on the estimated rate to update radiation direction data 81C.

Data acquisition command 73C is generated for each one measurement period $Tp^r$, r=1, . . . nd in which phase shifter 13$p$ specified by REV method scenario 74C takes the specified operation phase shift amount (r*θd).

One piece of measurement period data 70C is data indicating the start time and the end time of measurement period $Tp^r$, r=1, . . . , nd. Every time data acquisition command 73C is received, one piece of measurement period data 70C is set. Data command generator 28C of control device 10C generates data acquisition command 73C every measurement period $Tp^r$. On-board control device 19C generates detection data 71 by calculating the average of electric field strength in the measurement period specified by data acquisition command 73C. On-board control device 19C sends detection data 71 in each measurement period $Tp^r$ to control device 10C. Measurement period $Tp^r$ is a period in which phase shifter 13$p$ that is the operating phase shifter takes one operation phase shift amount.

Figure 34:
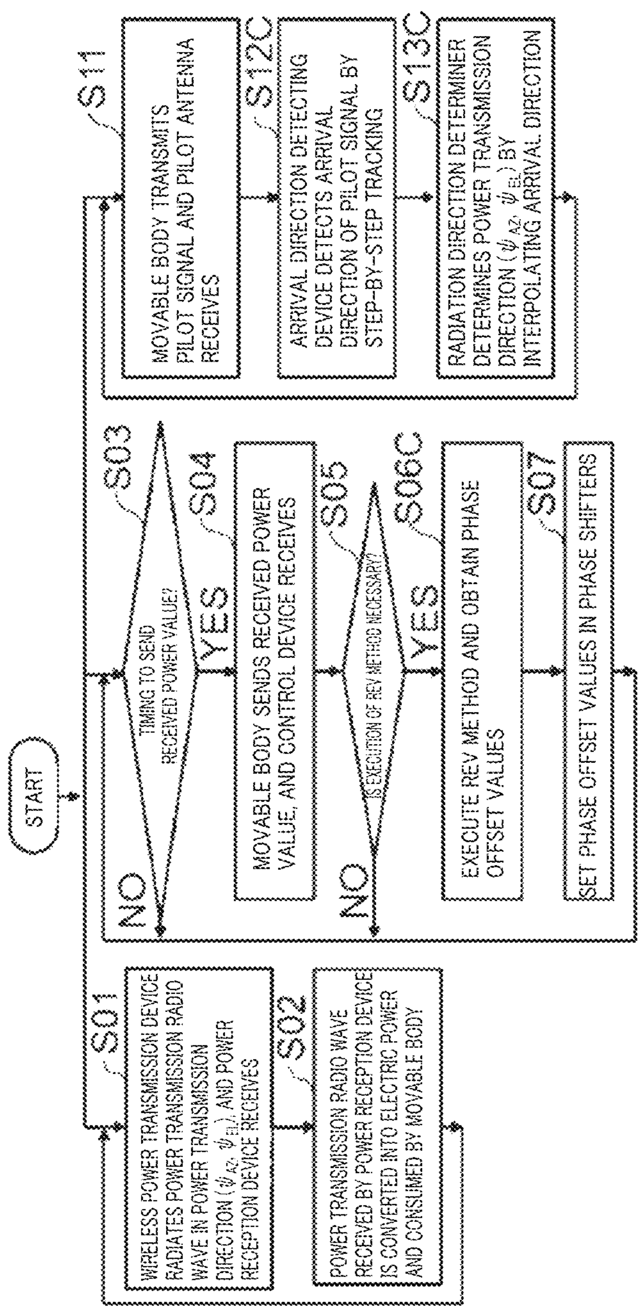
FIG. 34 is a flowchart illustrating a power transmission procedure to a movable body by the wireless power transmission device according to the fourth embodiment.

The operation is described. FIG. 34 is a flowchart illustrating a power transmission procedure to a movable body by the wireless power transmission device according to the fourth embodiment. In FIG. 34, points different from FIG. 8 in the first embodiment are described. Steps S06C, S12C, and S13C are modified.

At S06C, data acquisition command 73C and detection data 71 are sent and received for each one measurement period $Tp^r$, r=1, . . . , nd, and the REV method is executed. At S12C, arrival direction detecting device 7C tracks pilot signal 4 by step track method to determine the arrival direction of pilot signal 4. At S13C, the rate of change of arrival direction data 79 of pilot signal 4 is estimated, and radiation direction data 81C is estimated and updated in a cycle shorter than the updating cycle of arrival direction data 79.

Figure 35:
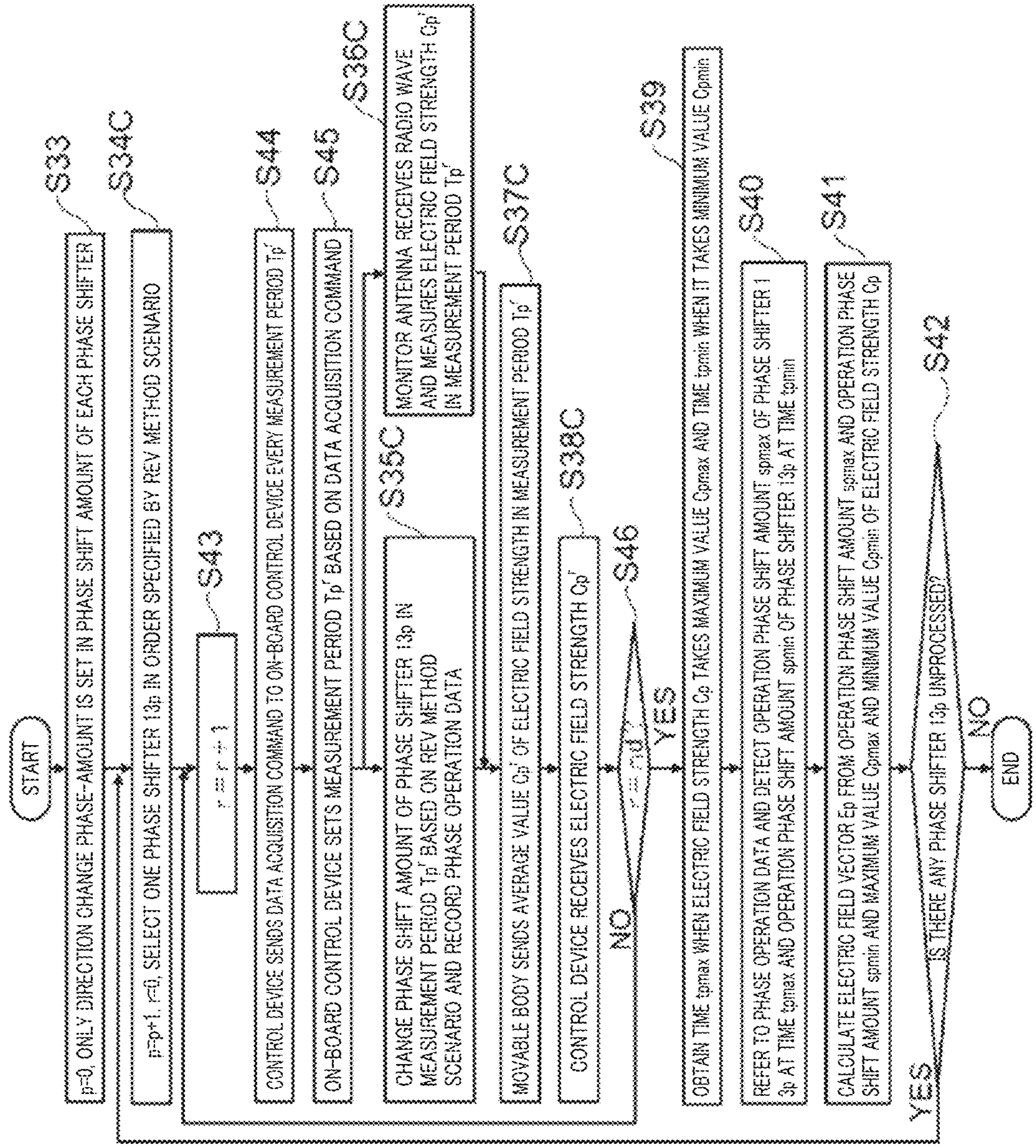
FIG. 35 is a flowchart illustrating the procedure of calculating an element electric field vector of a radio wave radiated by each element antenna by the REV method in the wireless power transmission device according to the fourth embodiment.

The procedure of executing the REV method in the fourth embodiment is described referring to FIG. 35. In FIG. 35, points different from FIG. 9 in the first embodiment are described. S31 and S32 are removed, and at step S33, p=0 is set, and REV method executor 27 sets the phase shift amount of each phase shifter 13 only to the direction change phase shift amount. At S34C, p=p+1, r=0, and one phase shifter 13$p$ is selected in the order specified by the REV method scenario. Subsequently to S34C, at step S43, r=r+1 is set. At step S44, control device 10C sends data acquisition command 73C to on-board control device 19C every measurement period $Tp^r$. At step S45, data acquisition command interpreter 63C interprets data acquisition command 73C and stores one piece of measurement period data 70C specifying the time to start and end the measurement of the reception electric field strength into data storage device 21C in association with $Tp^r$.

Subsequently to S45, at step S35C, REV method executor 27C causes phase shifter 13$p$ to take operation phase shift amount $sp^r$ in measurement period $Tp^r$ based on REV method scenario 74C and records phase operation data 75. Concurrently with S35C, at step S36C, monitor antenna 17 receives a radio wave and measures electric field strength $Cp^r$ that is detection data 71 in measurement period $Tp^r$. The average value of electric field strength $Cp^r$ in measurement period $Tp^r$ is calculated.

At step S37C, movable body communication device 20 sends the average value of electric field strength $Cp^r$ in measurement period $Tp^r$ from movable body 60 to control device 10C. Electric field strength $Cp^r$ in measurement period $Tp^r$ is electric field change data that represents change of electric field in measurement period $Tp^r$. At step S38C, communication device 30 receives electric field strength $Cp^r$.

Subsequently to S38C, at step S46, whether r=nd is satisfied or not is checked. When r=nd is satisfied, it means that all of operation phase shift amounts $sp^r$ are taken by one phase shifter 13. When r=nd is satisfied (YES at S46), the process proceeds to S39. When r=nd is not satisfied (NO at S46), the process returns to S43.

Wireless power transmission device 1C operates similarly to wireless power transmission device 1 and a similar effect can be obtained. Since the power transmission beam tracks movable body 60 during execution of the REV method, the accuracy of the REV method can be increased. Since signal strength meter 39 that outputs the reception signal strength is used, the configuration of the arrival direction detecting device is simplified. This leads to size reduction of the arrival direction detecting device.

Fifth Embodiment

In a fifth embodiment, the movable body tracking method is changed from that of the fourth embodiment. In the fourth embodiment, a pilot signal transmitted by the receiving side is tracked by step track method on the power transmitting side, as means for tracking a movable body. In the fifth embodiment, the orientation direction of the pilot antenna is changed in the neighborhood of the arrival direction of the pilot signal and the received power strength is measured. An error in the arrival direction is estimated from the orientation direction changed intentionally and the change in received power strength, and the most probable arrival direction is estimated from the estimated error. The tracking method in the fifth embodiment is called neighborhood search tracking. Control device 10C is notified of the most probable arrival direction. Control device 10C is similar to that in the fourth embodiment.

Figure 36:
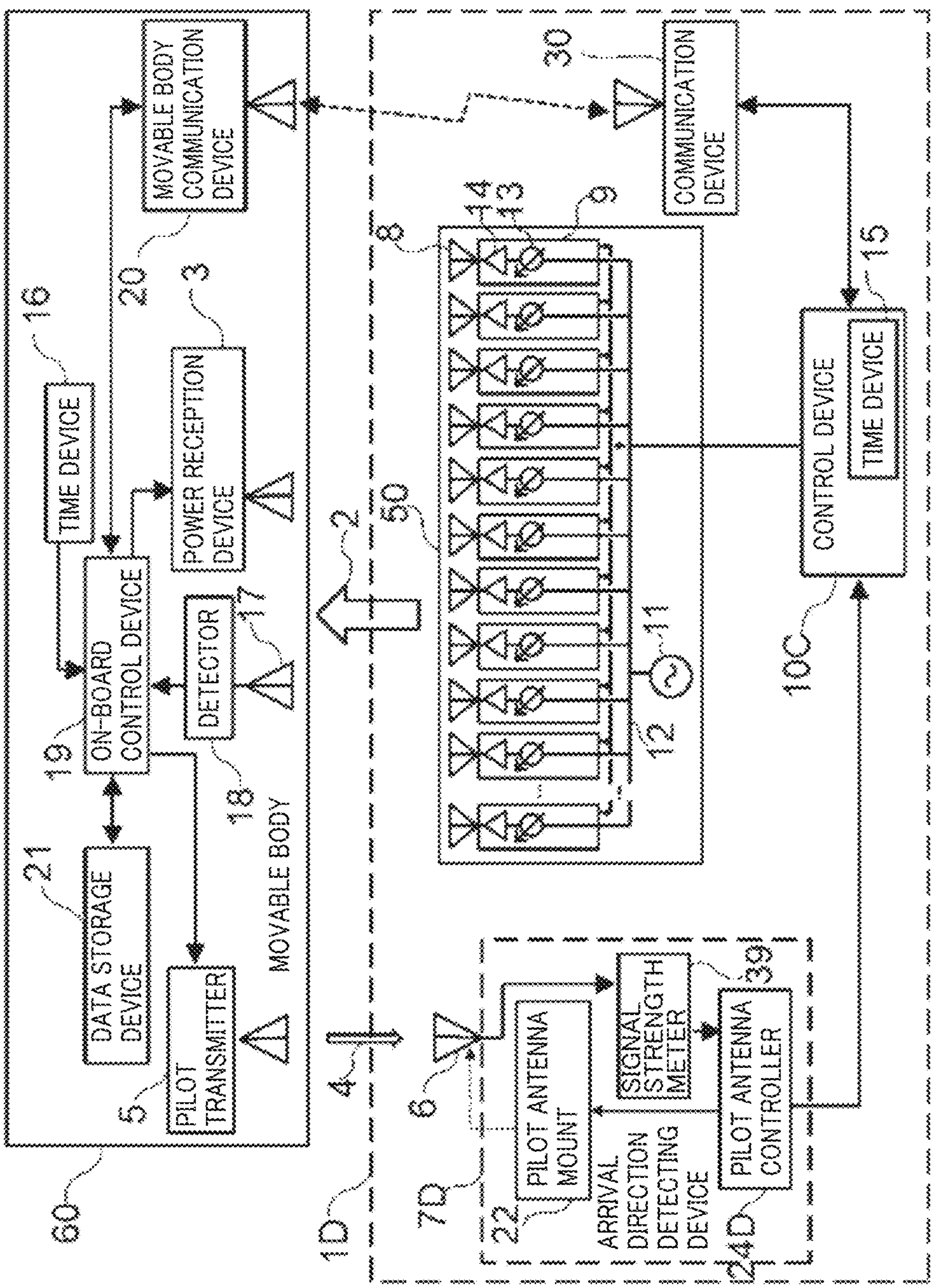
FIG. 36 is a diagram illustrating an overall configuration of a wireless power transmission system for a movable body using a wireless power transmission device according to a fifth embodiment.

FIG. 36 is a diagram illustrating an overall configuration of a wireless power transmission system for a movable body using a wireless power transmission device according to the fifth embodiment. In FIG. 36, points different from FIG. 32 in the fourth embodiment are described. In an arrival direction detecting device 7D, a pilot antenna controller 23D is modified. Pilot antenna controller 23D changes the orientation direction of pilot antenna 26 such that neighborhood search tracking is performed.

Figure 37:
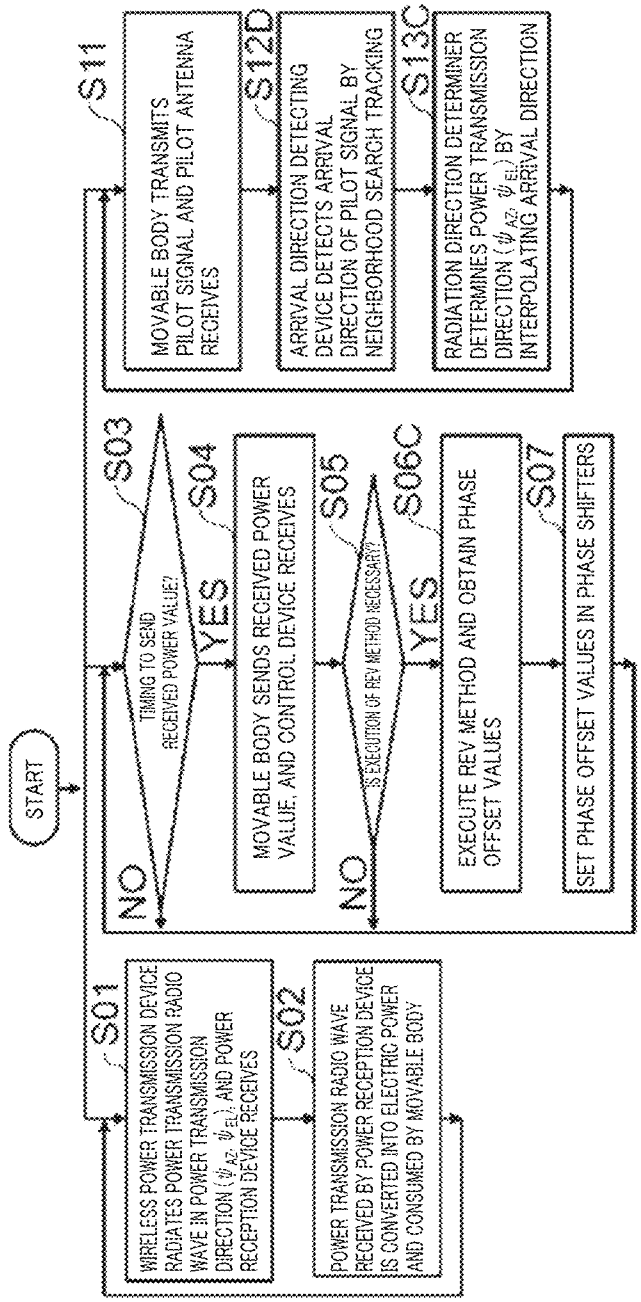
FIG. 37 is a flowchart illustrating a power transmission procedure to a movable body by the wireless power transmission device according to the fifth embodiment.

The operation is described. FIG. 37 is a flowchart illustrating a power transmission procedure to a movable body by the wireless power transmission device according to the fifth embodiment. In FIG. 37, points different from FIG. 34 in the fourth embodiment are described. At step S12D, arrival direction detecting device 7D detects the arrival direction of pilot signal 4 by neighborhood search tracking.

Wireless power transmission device 1D operates similarly to wireless power transmission device 1 and a similar effect can be obtained. Since the power transmission beam tracks movable body 60 during execution of the REV method, the accuracy of the REV method can be increased. Also in the fifth embodiment, the configuration of the arrival direction detecting device can be simplified, leading to size reduction of the arrival direction detecting device.

Sixth Embodiment

In a sixth embodiment, the movable body measures its position and attitude and notifies the wireless power transmission device, and the wireless power transmission device determines the power transmission direction based on the position and the attitude of the movable body. The sixth embodiment is a modification to the first embodiment. The modification may be made based on the second to fifth and other embodiments.

Figure 38:
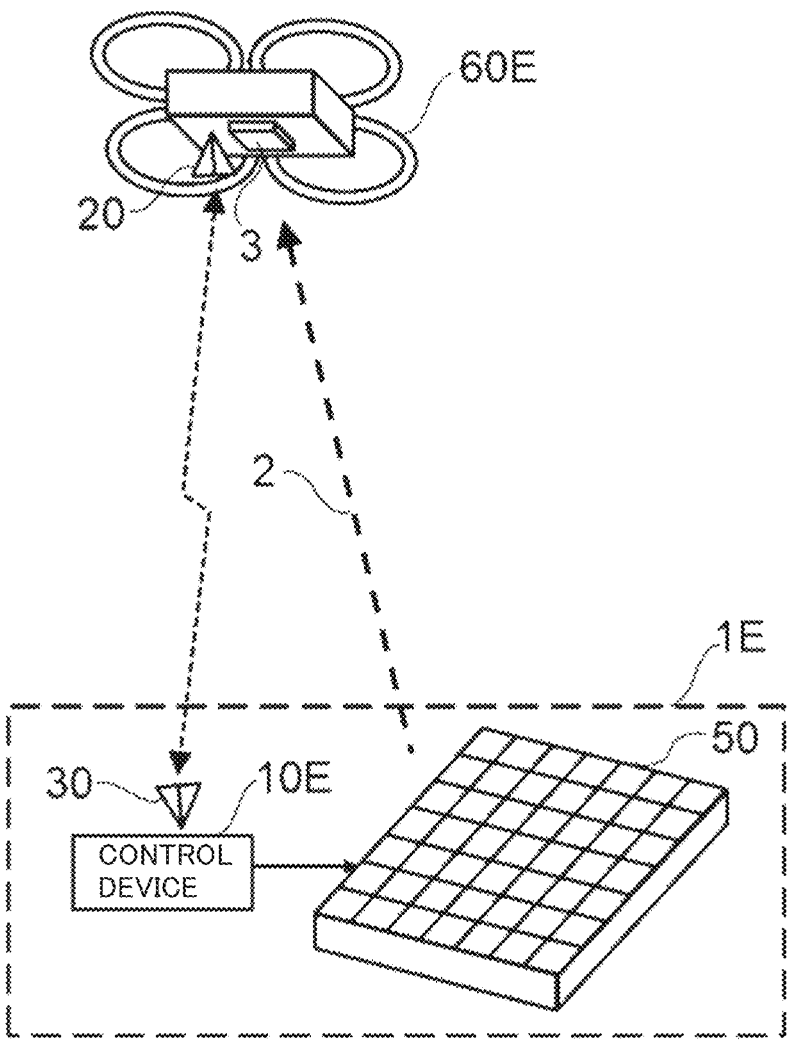
FIG. 38 is a schematic diagram illustrating a configuration of a wireless power transmission system for a movable body using a wireless power transmission device according to a sixth embodiment.
Figure 39:
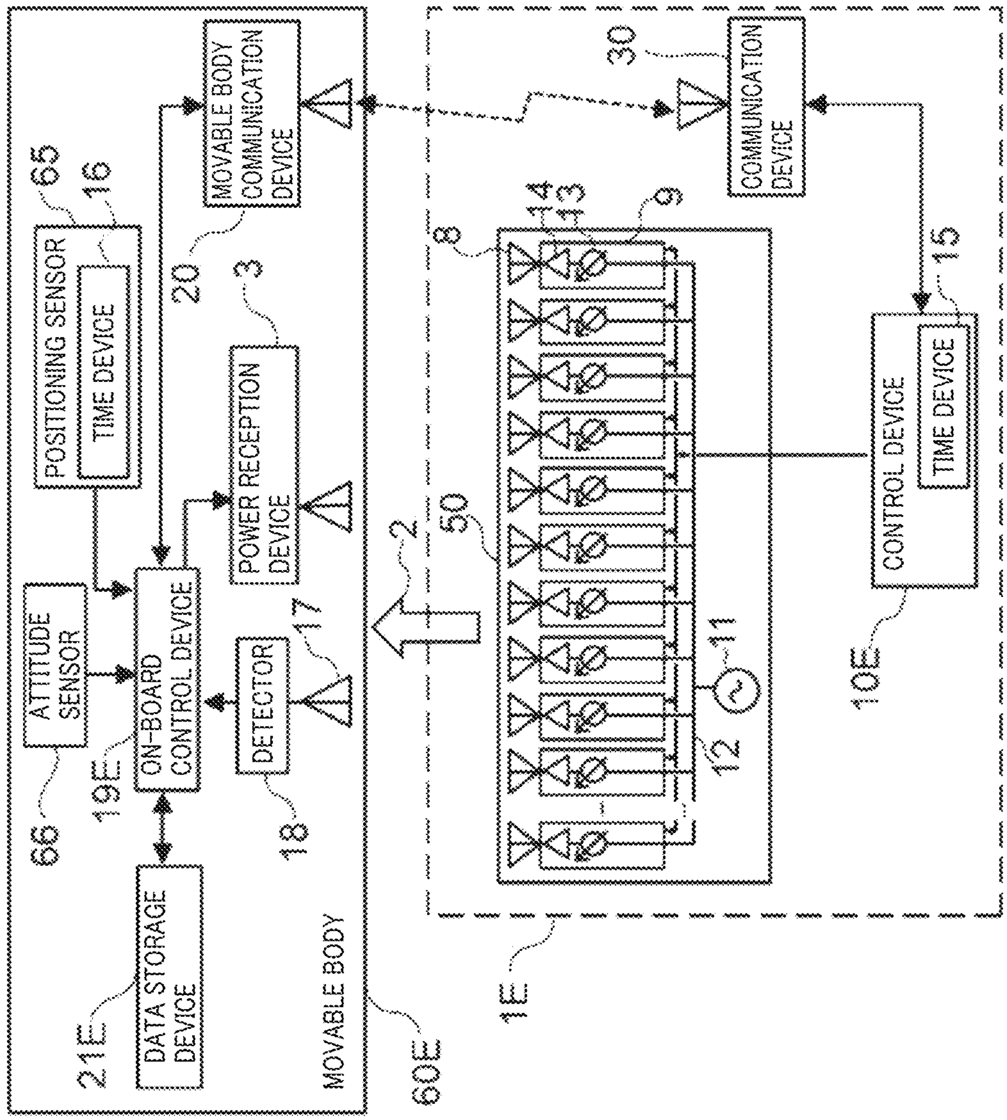
FIG. 39 is a diagram illustrating an overall configuration of the wireless power transmission system for a movable body using a wireless power transmission device according to the sixth embodiment.
Figure 40:
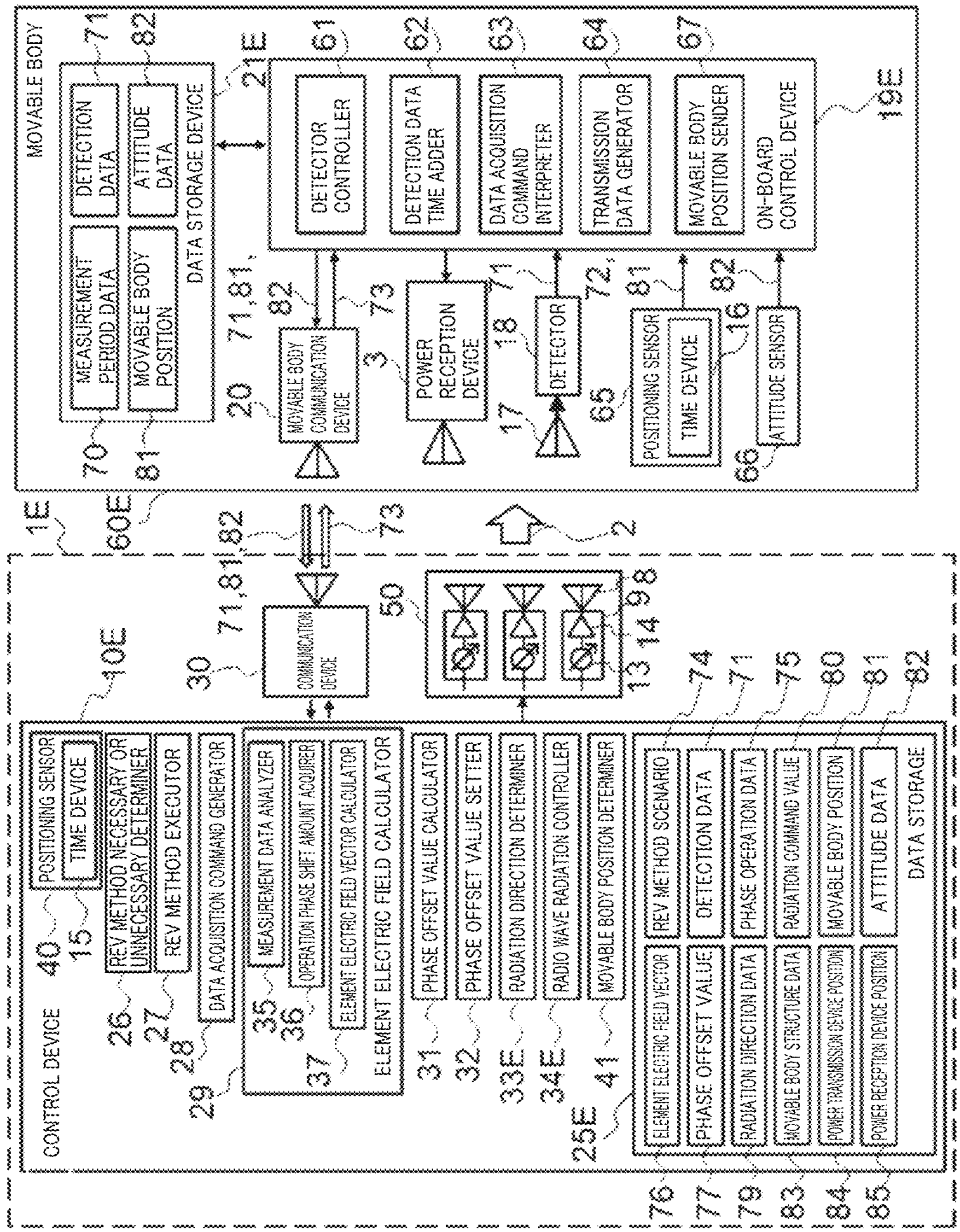
FIG. 40 is a block diagram illustrating a functional configuration of the wireless power transmission device and the movable body according to the sixth embodiment.

Referring to FIG. 38 to FIG. 40, the structure of a wireless power transmission device 1E and a movable body 60E is described. FIG. 38 is a schematic diagram illustrating a configuration of a wireless power transmission system for a movable body using a wireless power transmission device according to the sixth embodiment. FIG. 39 is a diagram illustrating an overall configuration of a wireless power transmission system for a movable body using a wireless power transmission device according to the sixth embodiment. FIG. 40 is a block diagram illustrating a functional configuration of the wireless power transmission device and the movable body according to the sixth embodiment. In the sixth embodiment, pilot transmitter 5 and the arrival direction detecting device are unnecessary. A movable body 60E does not include pilot transmitter 5. Movable body 60E includes a positioning sensor 65, an attitude sensor 66, and a movable body position sender 67. Positioning sensor 65 measures the position of movable body 60E. Positioning sensor 65 is also used as a time device 16. Positioning sensor 65 is, for example, a GPS receiver. Instead of a GPS receiver, any device that can measure the position in three-dimensional space of movable body 60E can be used as positioning sensor 65. Attitude sensor 66 measures the attitude of movable body 60E. Movable body position sender 67 performs a process of sending periodically movable body position 81 measured by positioning sensor 65 and attitude data 82 measured by attitude sensor 66 to control device 10E. When the movable body position measured by positioning sensor 65 is not close to the position of power reception device 3, control device 10E corrects the movable body position using the attitude measured by attitude sensor 66 and structure data representing the structure of movable body 60E and determines the position of power reception device 3. When movable body 60E is small and the position in three-dimensional space of movable body 60E is considered as the position of power reception device 3, attitude sensor 66 is not necessarily provided.

In movable body 60E, a data storage device 21E is modified. Data storage device 21E also stores movable body position 81 and attitude data 82. Movable body position 81 is a three-dimensional position of movable body 60E measured by positioning sensor 65. Attitude data 82 is data representing the attitude of movable body 60E measured by attitude sensor 66.

Control device 10E includes a positioning sensor 40 and a movable body position determiner 41. Positioning sensor 40 measures the position of wireless power transmission device 1E. Positioning sensor 40 is also used as a time device 15. Movable body position determiner 41 determines the position of movable body 60E from the movable body position and the attitude data of movable body 60E sent from movable body 60E. Once the position of movable body 60E is determined, the presence direction that is the direction in which movable body 60E is present viewed from the position of power transmission antenna 50 is also determined. Movable body position determiner 41 is a presence direction determiner that determines the presence direction. Positioning sensor 40 is, for example, a GPS receiver. Instead of a GPS receiver, any device that can measure the position in three-dimensional space of wireless power transmission device 1E can be used as positioning sensor 40. When wireless power transmission device 1E is not moved, positioning sensor 40 may not be equipped.

In control device 10E, a data storage 25E, a radiation direction determiner 33E, and a radio wave radiation controller 34E are modified. Data storage 25E includes movable body structure data 83, power transmission device position 84, movable body position 81, attitude data 82, and power reception device position 85. In movable body position 81, the position data of movable body 60E measured by positioning sensor 65 and sent from movable body 60E is recorded. In attitude data 82, the attitude data of movable body 60E measured by attitude sensor 66 and sent from movable body 60E is recorded. Attitude data 82 is, for example, the direction in which movable body 60E is directed (nose direction). In power reception device position 85, the position of power reception device 3 determined by movable body position determiner 41 is recorded. In movable body structure data 83, data representing the structure of movable body 60E is recorded, which is used when power reception device position 85 is obtained from movable body position 81 and attitude data 82. Movable body structure data 83 is, for example, data representing that the position of power reception device 3 is 10 m to the back of the position of positioning sensor 65 in the nose direction. Data storage 25E is a movable body data storage that stores the movable body structure data.

Movable body position determiner 41 is a power reception device position determiner that determines power reception device position 85 using movable body structure data 83, movable body position 81, and attitude data 82. When attitude data 82 is, for example, the nose direction of movable body 60E, the position in the positional relation specified by movable body structure data 83 in the direction indicated by attitude data 82 with respect to movable body position 81 is power reception device position 85. Power transmission device position 84 is the position of wireless power transmission device 1E (strictly speaking, power transmission antenna 50) measured by positioning sensor 40. The movable body position determiner may determine the movable body position measured by positioning sensor 65. Power transmission device position 84 is a power transmission antenna position that is the position of power transmission antenna 50.

Radiation direction determiner 33E determines the radiation direction of power transmission radio wave 2 toward power reception device 3 (power transmission direction), based on power reception device position 85 and power transmission device position 84. Radio wave radiation controller 34E determines the phase and amplitude of element radio wave 2$E_p$ radiated by each element antenna 8$_p$, also using the distance (power transmission distance) between wireless power transmission device 1E and power reception device 3, and controls each element module 9 such that the determined phase and amplitude is obtained. In the case of a far field, the power transmission distance is not necessary. When the power transmission distance is not considered as a far field, it is necessary to determine the phase and amplitude of element radio wave 2$E_p$ radiated by each element antenna 8$_p$ also in consideration of the power transmission distance.

Figure 41:
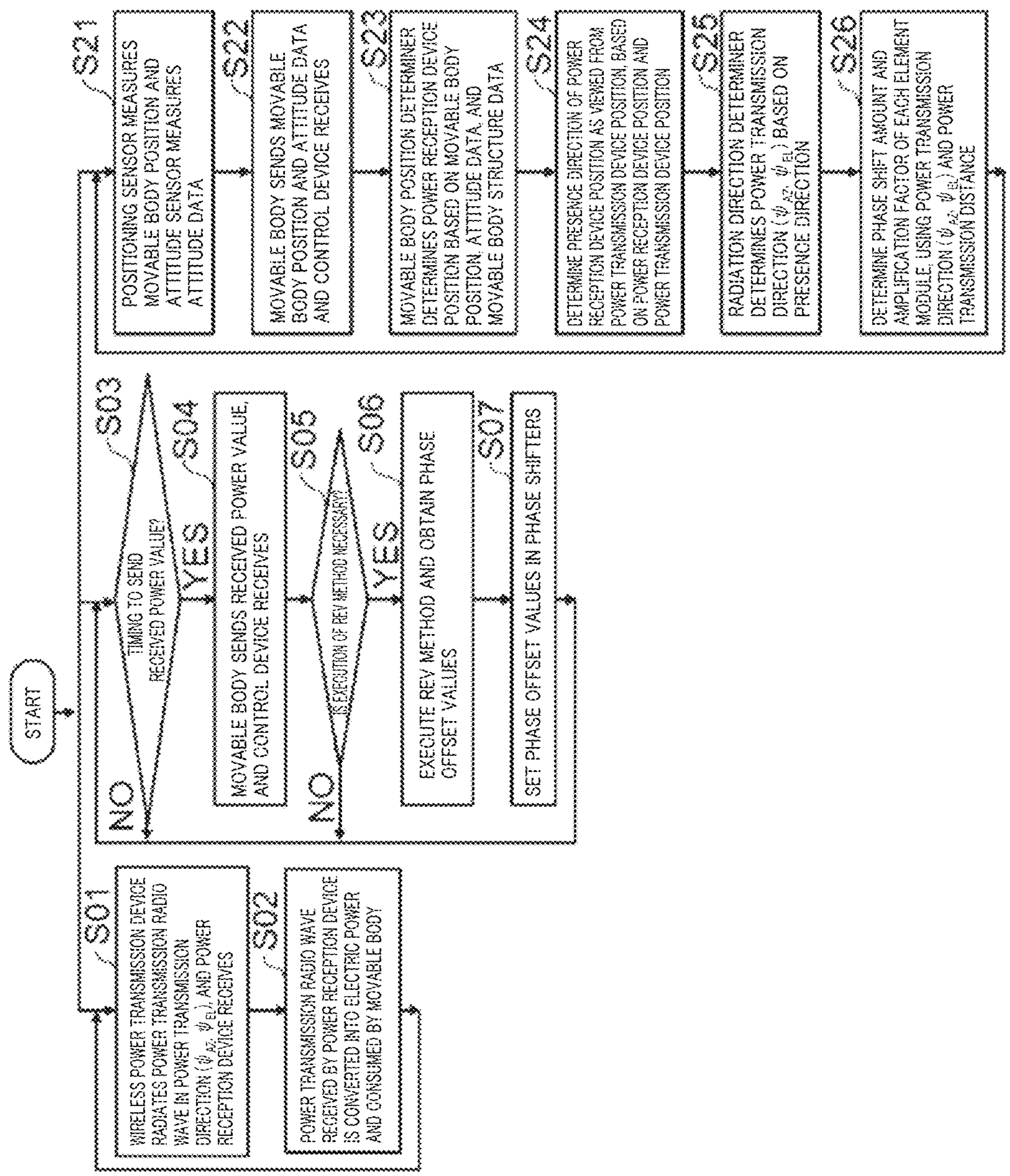
FIG. 41 is a flowchart illustrating a power transmission procedure to a movable body by the wireless power transmission device according to the sixth embodiment.

The operation is described. FIG. 41 is a flowchart illustrating a power transmission procedure to a movable body by the wireless power transmission device according to the sixth embodiment. In FIG. 41, points different from FIG. 8 in the first embodiment are described. The process includes steps S21 to S26 instead of S11 to S13. At step S21, positioning sensor 65 included in movable body 60E measures movable body position 81 that is the position of movable body 60E, and attitude sensor 66 measures attitude data 82. At step S22, movable body 60E sends movable body position 81 and attitude data 82, which are received by control device 10E. At step S23, movable body position determiner 41 determines power reception device position 85, using movable body structure data 83, movable body position 81, and attitude data 82. At step S24, the presence direction that is the direction in which power reception device position 85 is present viewed from power transmission device position 84 is determined based on power reception device position 85 and power transmission device position 84. At step S25, radiation direction determiner 33E determines the power transmission direction ($\psi_{AZ}$, $\psi_{EL}$) toward power reception device 3. At step S26, radio wave radiation controller 34E determines the phase and amplitude of element radio wave 2$E_p$ radiated by each element antenna 8$_p$, using the power transmission direction ($\psi_{AZ}$, $\psi_{EL}$) and the power transmission distance, and determines the phase shift amount and the amplification factor of each element module 9 such that the determined phase and amplitude is obtained. Wireless power transmission device 1E radiates power transmission radio wave 2 in the power transmission direction at S01, with the phase shift amount and amplification factor determined at S26. After S26 is performed, the process returns to S21. Control device 10E performs the process at S21 to S26 repeatedly in predetermined cycles.

Wireless power transmission device 1E operates similarly to wireless power transmission device 1 and a similar effect can be obtained. Since the power transmission beam tracks movable body 60 during execution of the REV method, the accuracy of the REV method can be increased.

Since the position of movable body 60E is measured, the pilot transmitter, the pilot antenna, and the arrival direction detecting device are unnecessary. When movable body 60 is large, the position of power reception device 3 is determined also in consideration of the attitude of movable body 60E measured by attitude sensor 65, and therefore power can be transmitted to power reception device 3 accurately and efficiently. When movable body 60 is small, the direction toward the movable body position measured by positioning sensor 66 is set as the presence direction.

The use of the distance between movable body 60E and wireless power transmission device 1E can improve the accuracy of the REV method and enables more accurate power transmission to the position of power reception device 3 during power transmission.

Seventh Embodiment

In a seventh embodiment, the first embodiment is modified such that the position of the movable body is measured on the ground. The movable body and the wireless power transmission device are modified.

Figure 42:
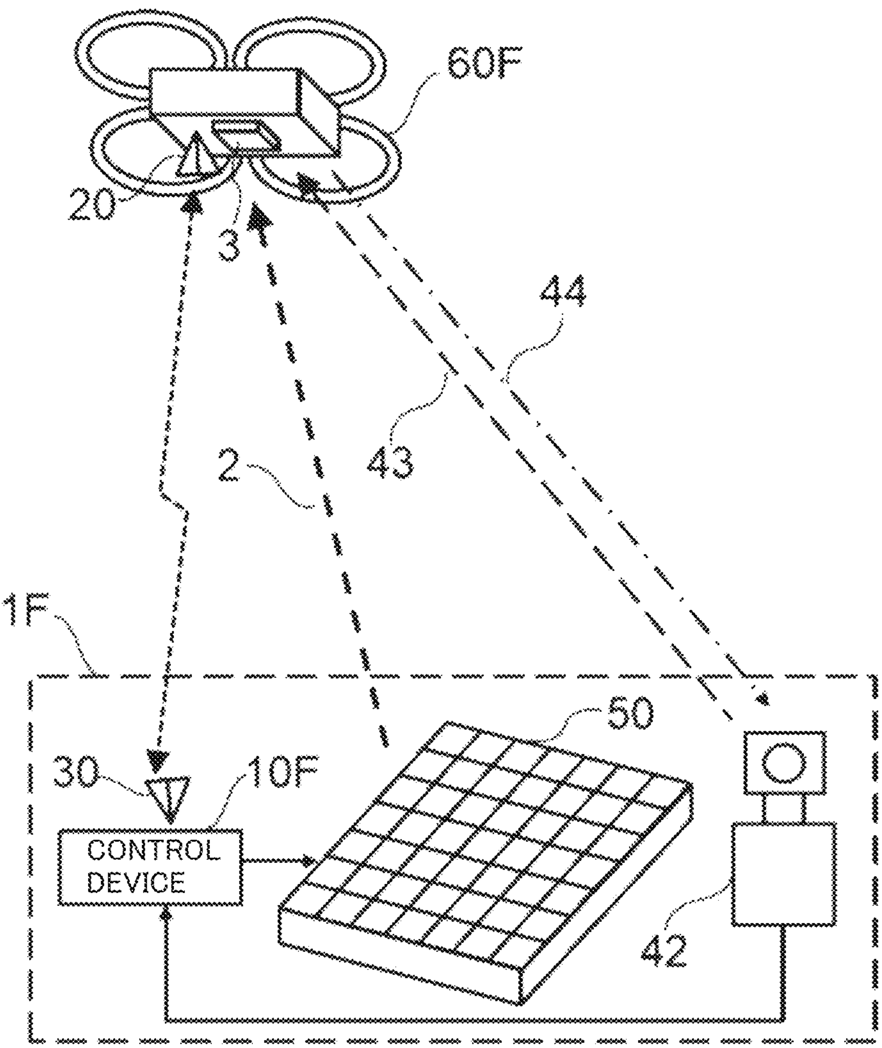
FIG. 42 is a schematic diagram illustrating a configuration of a wireless power transmission system for a movable body using a wireless power transmission device according to a seventh embodiment.
Figure 43:
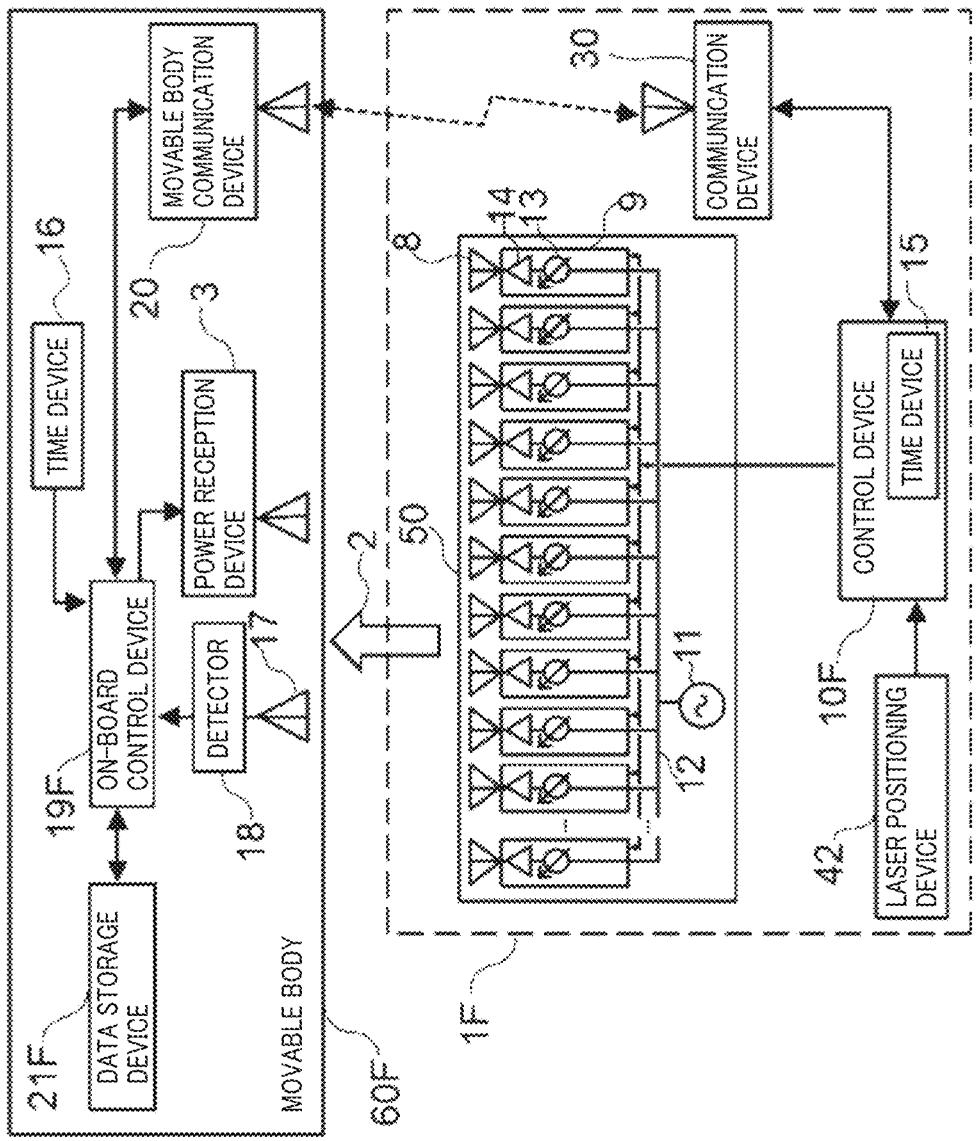
FIG. 43 is a diagram illustrating an overall configuration of the wireless power transmission system for a movable body using a wireless power transmission device according to the seventh embodiment.
Figure 44:
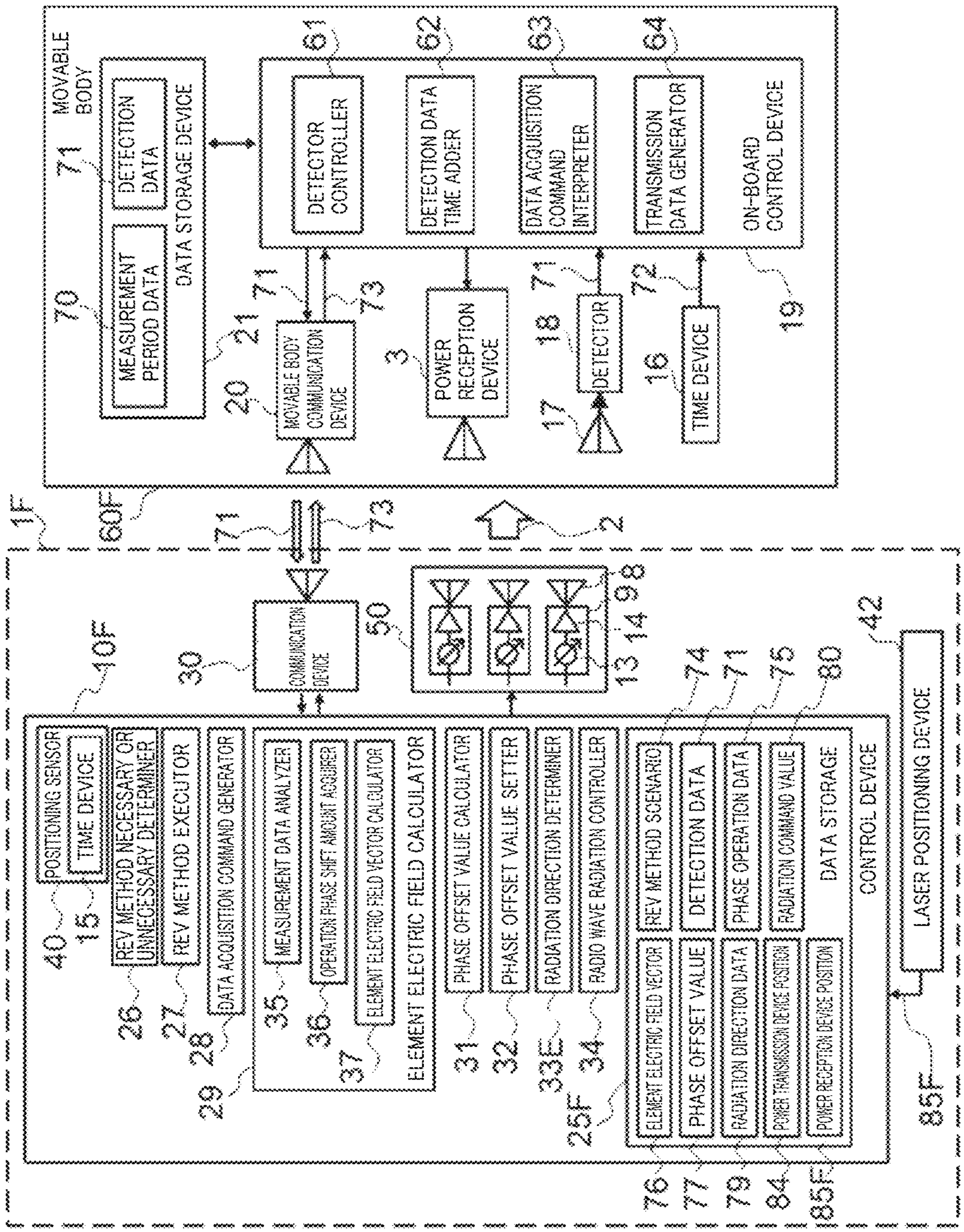
FIG. 44 is a block diagram illustrating a functional configuration of the wireless power transmission device and the movable body according to the seventh embodiment.

Referring to FIG. 42 to FIG. 44, the structure of a wireless power transmission device 1F and a movable body 60F is described. FIG. 42 is a schematic diagram illustrating a configuration of a wireless power transmission system for a movable body using a wireless power transmission device according to the seventh embodiment. FIG. 43 is a diagram illustrating an overall configuration of a wireless power transmission system for a movable body using a wireless power transmission device according to the seventh embodiment. FIG. 44 is a block diagram illustrating a functional configuration of the wireless power transmission device and the movable body according to the seventh embodiment. Movable body 60F does not include pilot transmitter 5. Movable body 60F does not include the positioning sensor and the like. A laser positioning device 42 is installed in the neighborhood of wireless power transmission device 1F. Laser positioning device 42 measures the position of power reception device 3 included in movable body 60F. Power reception device position 85F representing the position of power reception device 3 measured by laser positioning device 42 is inputted to a control device 10F in predetermined cycles during power transmission to movable body 60F. Laser positioning device 42 is a movable body position measuring device that measures the movable body position.

Laser positioning device 42 transmits a laser beam 43 in each direction and receives reflected laser beam 44 reflected by movable body 60F that is a positioning target. The direction in which movable body 60F is present is determined from the direction of reflected laser beam 44, and the distance to movable body 60F is determined from the time until reflected laser beam 44 is received since laser beam 43 is emitted. When movable body 60F is large and measurement is performed with a wide range of reflected laser beam 44, power reception device position 85F that is the position of power reception device 3 is also determined. Laser positioning device 42 has data representing a pattern of reflection from movable body 60F. The reflection pattern also includes data indicating the power reception device position in the reflection pattern. Laser positioning device 42 matches the obtained reflected laser beam 43 actually with a pattern to determine power reception device position 85F. Reflection patterns of movable body 60F in which movable body 60F is viewed from several directions are prepared. The positioning device that measures the position of power reception device 3 may use radio waves or acoustic waves instead of laser beams.

In control device 10F, a data storage 25F and a radiation direction determiner 33E are modified. Data storage 25F includes power reception device position 85F instead of arrival direction data 78. Power reception device position 85F of power reception device 3 inputted from laser positioning device 42 is set in power reception device position 85F.

Radiation direction determiner 33E has a configuration similar to that included in control device 10E and operates similarly.

Figure 45:
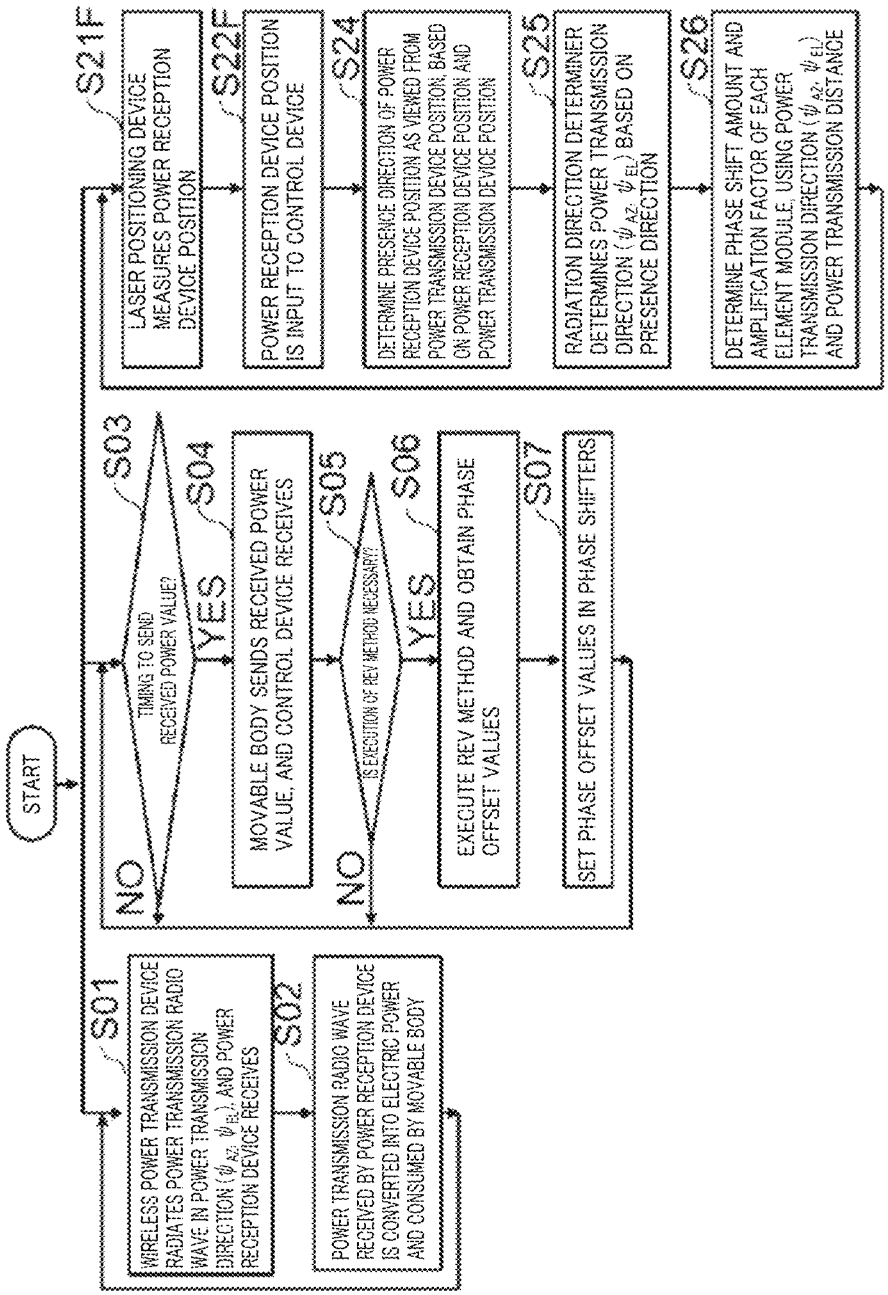
FIG. 45 is a flowchart illustrating a power transmission procedure to a movable body by the wireless power transmission device according to the seventh embodiment.

The operation is described. FIG. 45 is a flowchart illustrating a power transmission procedure to a movable body by the wireless power transmission device according to the seventh embodiment. In FIG. 45, points different from FIG. 37 in the sixth embodiment are described. S21F and S22F are modified, and S23 is deleted. At step S21F, laser positioning device 42 measures power reception device position 85F. At step S22F, power reception device position 85F detected by laser positioning device 42 is inputted to control device 10F. S24 to S26 are similar to those in FIG. 37 in the sixth embodiment. After S26 is performed, the process returns to S21F. Control device 10F performs the process at S21F to S26 repeatedly in predetermined cycles.

Wireless power transmission device 1F operates similarly to wireless power transmission device 1 and a similar effect can be obtained. Since the power transmission beam tracks movable body 60 during execution of the REV method, the accuracy of the REV method can be increased.

The movable body is required to have neither the positioning sensor nor the pilot transmitter. Even when the movable body is small and has a limitation in a device to be installed, wireless power transmission device 1F can transmit power to the movable body accurately and efficiently.

The movable body position measuring device that measures the movable body position may radiate distance-measurement waves such as laser light, non-laser light, radio waves, ultrasonic waves, or the like and receive distance-measurement reflected waves reflected by the movable body. The distance to the movable body may be measured based on the elapsed time from transmission of a distance-measurement wave to reception of a distance-measurement reflected wave, and the movable body position may be measured from the measured distance and the direction in which the distance-measurement reflected wave arrives.

Eighth Embodiment

Figure 46:
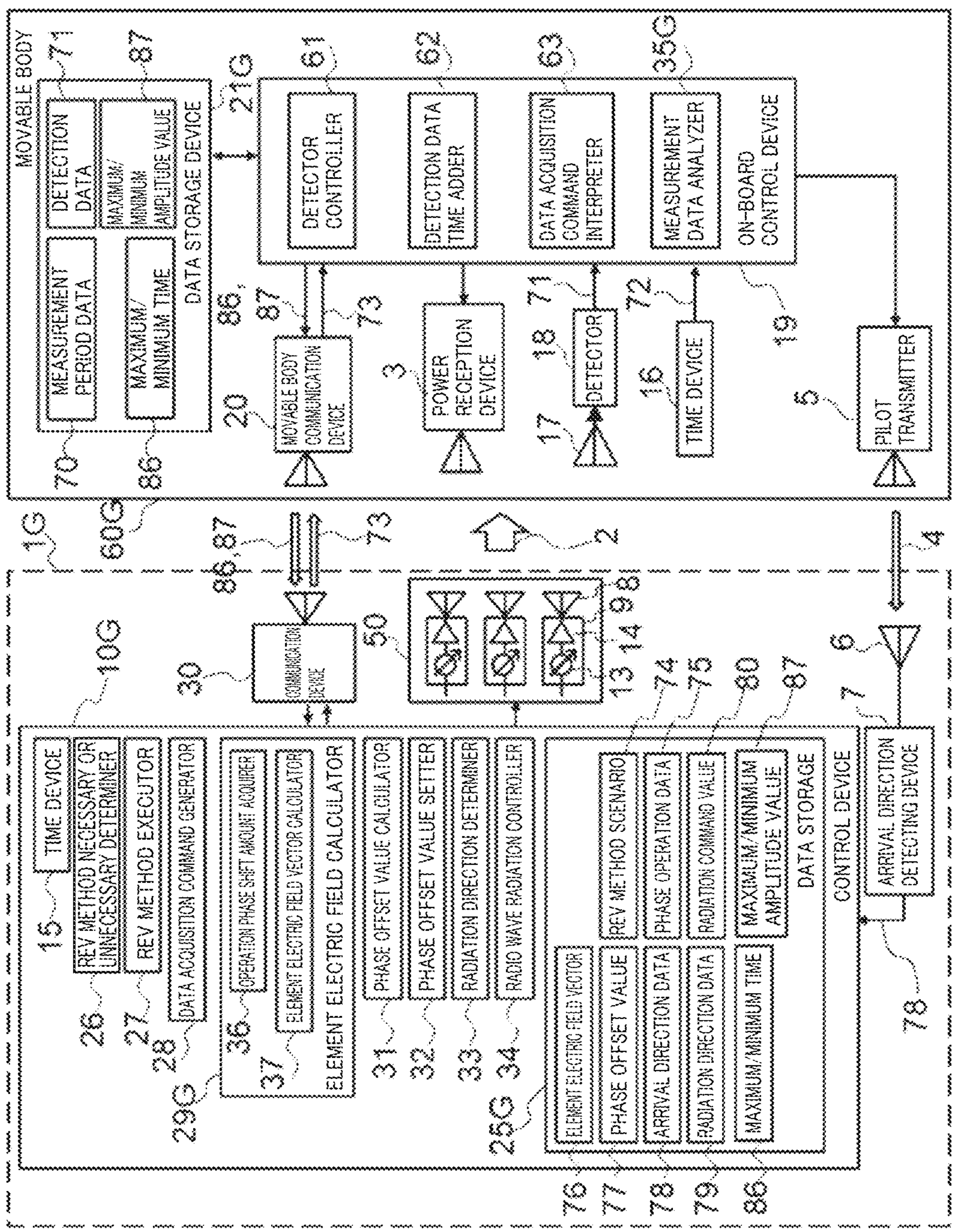
FIG. 46 is a block diagram illustrating a functional configuration of a wireless power transmission device and a movable body according to an eighth embodiment.

In an eighth embodiment, the first embodiment is modified such that a part of the process of calculating the element electric field vector by the REV method is executed in a movable body so that the volume of data transmitted from the movable body to the control device is reduced. In the eighth embodiment, compared with the first embodiment, a control device 10G, an on-board control device 19G, and a data storage device 21G are modified. A configuration of the power transmission system for the movable body by the wireless power transmission device according to the eighth embodiment is described referring to FIG. 46. FIG. 46 is a block diagram illustrating a functional configuration of the wireless power transmission device and the movable body according to the eighth embodiment. In FIG. 46, points different from FIG. 5 in the first embodiment are described.

Measurement periods Tp are a plurality of periods given by the data acquisition command. Each measurement period corresponds to a period in which the operating phase shifter changes the phase shift amount. Data storage device 21G mounted on movable body 60G also stores maximum/minimum time 86 and maximum/minimum amplitude value 87. Maximum/minimum time 86 is time Tpmax when electric field strength Cp(t) detected actually in measurement period Tp is largest and time Tpmin when electric field strength Cp(t) is smallest. Maximum/minimum amplitude value 87 is maximum value Cpmax and minimum value Cpmin of electric field strength Cp(t) in measurement period Tp. Maximum/minimum time 86 and maximum/minimum amplitude value 87 are sent from on-board control device 19G to control device 10G as a reply to data acquisition command 73G. Maximum/minimum time 86 and maximum/minimum amplitude value 87 are electric field change data that represents change in electric field in measurement period Tp. Only maximum/minimum time 86 may be sent as electric field change data.

On-board control device 19G does not include transmission data generator 64 and includes a measurement data analyzer 35G. Measurement data analyzer 35G detects time Tpmax and time Tpmin from electric field strength Cp(t) measured actually in measurement period Tp. Maximum value Cpmax and minimum value Cpmin of electric field strength Cp(t) also are detected. Measurement period Tp is an analysis period in which electric field strength Cp(t)

measured in this period is analyzed. Time Tpmax and time Tpmin stored as maximum/minimum time 86 in data storage device 21G are the phase shift amount detection time obtained by analyzing electric field strength Cp(t) measured in each analysis period. Measurement data analyzer 35G detects the phase shift amount detection time for each analysis period.

Movable body communication device 20 sends maximum/minimum time 86 and maximum/minimum amplitude value 87 to control device 10G. Movable body communication device 20 does not send electric field strength Cp measured in measurement period Tp, that is, detection data 71 to control device 10G.

Data storage 25G included in control device 10G stores maximum/minimum time 86 and maximum/minimum amplitude value 87 sent from movable body 60G. Since detection data 71 is not sent from movable body 60G, detection data 71 is not stored in data storage 25G.

Element electric field calculator 29G does not include measurement data analyzer 35. Operation phase shift amount acquirer 36 obtains the operation phase shift amount of phase shifter 13*p* recorded in phase operation data 75 at time Tpmax and time Tpmin that are maximum/minimum time 86. Element electric field vector calculator 37 calculates the phase of element electric field vector 76 (element electric field phase) generated by element antenna 8 corresponding to phase shifter 13*p* to change the phase, and the amplitude of element electric field vector 76. Element antenna 8 corresponding to phase shifter 13*p* is element antenna 8 receiving an element transmission signal outputted by phase shifter 13*p*. Element electric field vector calculator 37 calculates the phase and amplitude of element electric field vector 76 from the operation phase shift amount of phase shifter 13*p* that is recorded in phase operation data 75 at time Tpmax and time Tpmin, and maximum value Cpmax and minimum value Cpmin of electric field strength Cp(t). Phase offset value calculator 31 calculates phase offset value 77 for each phase shifter 13 from the phase of element electric field vector 76 of each phase shifter 13. Phase offset value setter 32 sets phase offset value 77 in each phase shifter 13.

Figure 47:
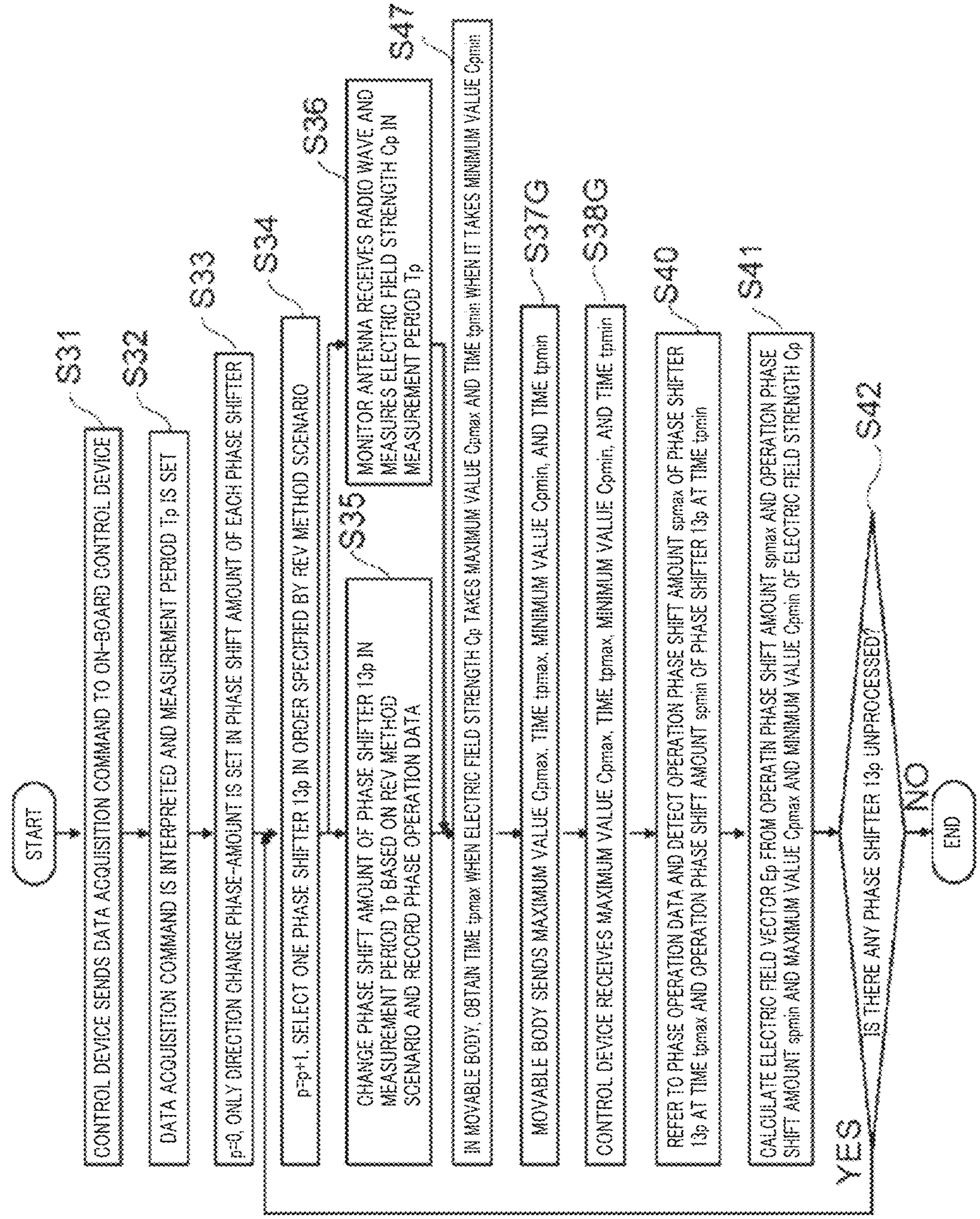
FIG. 47 is a flowchart illustrating a procedure of calculating an element electric field vector of a radio wave radiated by each element antenna by the REV method in the wireless power transmission device according to the eighth embodiment.

The operation is described. FIG. 47 is a flowchart illustrating the procedure of calculating the element electric field vector of a radio wave radiated by each element antenna by the REV method in the wireless power transmission device according to the eighth embodiment.

In FIG. 47, points different from FIG. 9 in the first embodiment are described. S37 is changed to S37G, and S38 is changed to S38G. Step S47 is added before step S37G. At S47, measurement data analyzer 35G included in movable body 60G detects maximum value Cpmax of electric field strength Cp in measurement period Tp and time Tpmax that is the time when maximum value Cpmax is taken. Further, minimum value Cpmin of electric field strength Cp in measurement period Tp and time Tpmin that is the time when minimum value Cpmin is taken are detected.

The process at S47 corresponds to the process at S39 in FIG. 40. In FIG. 47, therefore, S39 does not exist.

At step S37G, movable body communication device 20 included in movable body 60G sends time Tpmax and time Tpmin as maximum/minimum time 86 together with maximum value Cpmax and minimum value Cpmin as maximum/minimum amplitude value 87 to communication device 30 included in control device 10G.

At step S38G, communication device 30 receives time Tpmax and time Tpmin together with maximum value Cpmax and minimum value Cpmin.

Subsequently to S38G, S40 is performed. The subsequent process is similar to that in FIG. 40.

In the power transmission system for the movable body in the eighth embodiment, in addition to the effect obtained by the first embodiment, the volume of data sent from movable body 60G to execute the REV method can be reduced.

Ninth Embodiment

In a ninth embodiment, the first embodiment is modified such that the process of calculating the element electric field vector by the REV method is executed in the movable body so that the volume of data sent from the movable body to the control device is reduced. In the REV method scenario, the operation phase shift amount of each phase shifter is discrete and the time to be constant taking each of operation phase shift amounts is set to an appropriate length of time. By doing so, an error can be reduced when the operation phase shift amount is obtained from the time using the REV method scenario instead of the record of actual change in operation phase shift amount of the phase shifter.

Figure 48:
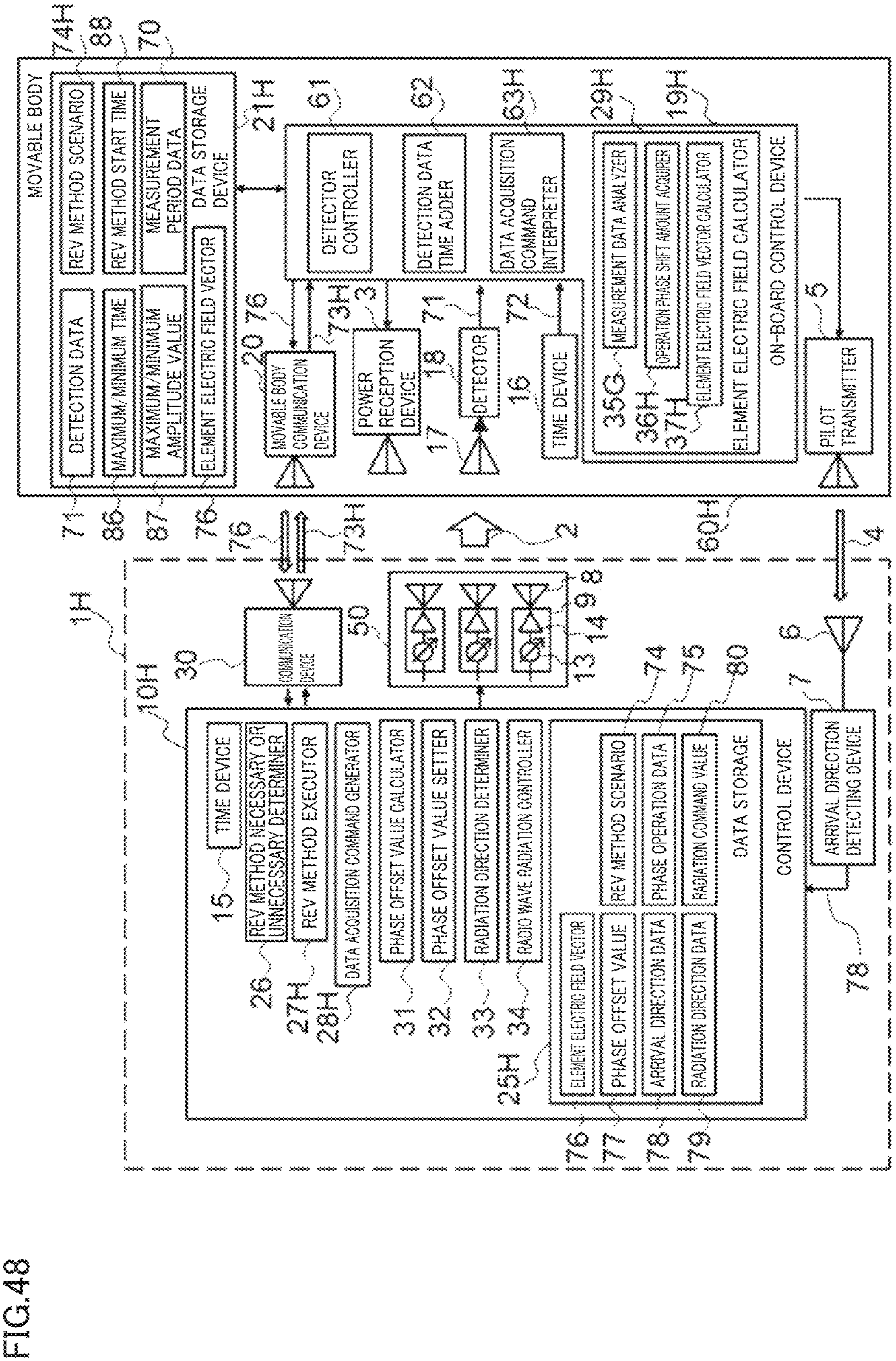
FIG. 48 is a block diagram illustrating a functional configuration of a wireless power transmission device and a movable body according to a ninth embodiment.

In a wireless power transmission device 1H, compared with wireless power transmission device 1, a control device 10H, an on-board control device 19H, and a data storage device 21H are modified. A configuration of the power transmission system to the movable body by the wireless power transmission device according to the ninth embodiment is described referring to FIG. 48. FIG. 48 is a block diagram illustrating a functional configuration of the wireless power transmission device and the movable body according to the ninth embodiment. In FIG. 48, points different from FIG. 46 in the eighth embodiment are described.

Data acquisition command 73H is a command to instruct on-board control device 19H to calculate an element electric field vector. Data acquisition command 73H is sent from control device 10H to on-board control device 19H. On-board control device 19H generates detection data 71. On-board control device 19H calculates element electric field vector 76 of each element module based on detection data 71 and REV method scenario 74. On-board control device 19H sends element electric field vector 76 to control device 10H.

Control device 10H does not include element electric field calculator 29. A data acquisition command generator 28H is modified. Data storage 25H does not store maximum/minimum time 86 and maximum/minimum amplitude value 87. Data storage 25H stores REV method scenario 74H. REV method scenario 74H is modified from REV method scenario 74 so that element electric field vector 76 is calculated easily also in on-board control device 19H. REV method scenario 74H is described later.

In control device 10H, data acquisition command generator 28H is modified to generate data acquisition command 73H. Data acquisition command 73H is passed by movable body communication device 20 to on-board control device 19H. Data acquisition command 73H includes the REV method start time. REV method start time 88 is the time when REV method executor 27H included in control device 10H starts execution of REV method scenario 74H. In REV method scenario 74H, the execution start is a reference event, and other events are non-reference events in which the time is expressed by a relative time from the execution start.

For example, when the REV method scenario is defined to have a plurality of reference events, data acquisition command 73H may be sent multiple times, or a command to indicate the time of a reference event may be sent one or more times and data acquisition command 73H may be sent once.

On-board control device 19H includes a data acquisition command interpreter 63H and an element electric field calculator 29H. Data storage device 21H stores REV method scenario 74H, REV method start time 88, measurement period data 70, detection data 71, maximum/minimum time 86, maximum/minimum amplitude value 87, and element electric field vector 76. REV method scenario 74H is stored into data storage device 21H before movable body 60H takes off.

REV method scenario 74H stored in data storage device 21H may be identical to that included in control device 10H or may include only data necessary for element electric field calculator 29H. Maximum/minimum time 86 and maximum/minimum amplitude value 87 are data to be used for element electric field calculator 29H to obtain element electric field vector 76 and therefore they may be internal data of element electric field calculator 29H and is not necessarily stored in data storage device 21H.

Upon receiving data acquisition command 73H, data acquisition command interpreter 63H extracts REV method start time 88 from data acquisition command 73H and stores the extracted REV method start time 88 into data storage device 21H. REV method scenario 74H is referred to set measurement period data 70 that is measurement period Tp for each operating phase shifter. In measurement period data 70, the relative time is replaced by the time, using REV method start time 88. Setting a plurality of measurement periods Tp based on REV method start time 88 and REV method scenario 74H may be given to the eighth embodiment and the like in which time Tpmax and time Tpmin that are the phase shift amount detection time are obtained in the movable body.

Detector controller 61 generates detection data 71 in a measurement period specified by measurement period data 70. Detection data time adder 62 adds time data 72 representing the time of measurement to detection data 71. Detection data 71 is stored into data storage device 21H.

Element electric field calculator 29H calculates element electric field vector 76, based on detection data 71 measured in the period specified by measurement period data 70, and REV method scenario 74H. Phase operation data 75 is not sent from control device 10H to on-board control device 19H. Element electric field calculator 29H therefore refers to REV method scenario 74H instead of phase operation data 75.

Element electric field calculator 29H includes measurement data analyzer 35G, an operation phase shift amount acquirer 36H, and an element electric field vector calculator 37H. Measurement data analyzer 35G detects time Tpmax and time Tpmin when electric field strength Cp(t) measured actually in measurement period Tp is largest or smallest, in the same way as in the eighth embodiment. Instead of obtaining the time of maximum or minimum strictly, the time in the vicinity of the center of a period in which electric field strength Cp(t) takes a value close to the maximum or the minimum, excluding fluctuations due to noise, is detected as time Tpmax and time Tpmin. Maximum value Cpmax and minimum value Cpmin of electric field strength Cp(t) also are detected. Time Tpmax and time Tpmin are stored as maximum/minimum time 86 into data storage device 21H. Maximum value Cpmax and minimum value Cpmin are stored as maximum/minimum amplitude value 87 into data storage device 21H.

Operation phase shift amount acquirer 36H converts time Tpmax and time Tpmin into relative times by subtracting REV method start time 88. The operation phase shift amount spmax at time Tpmax and the operation phase shift amount sprain at time Tpmin are obtained by referring to REV method scenario 74H by time Tpmax and time Tpmin converted into relative times. The relative time in REV method scenario 74H may be converted into the time by adding REV method start time 88, and REV method scenario 74H may be referred to by time Tpmax and time Tpmin.

Element electric field vector calculator 37H calculates the element electric field vector of each element module from operation phase shift amount spmax and operation phase shift amount spmin, and maximum value Cpmax and minimum value Cpmin.

REV method scenario 74H is modified so that the operation phase shift amount is acquired reliably even when element electric field calculator 29H does not refer to phase operation data 75. In REV method scenario 74H, the operation phase shift amount of each phase shifter 13 is changed discretely. The period in which phase shifter 13 keeps constant with the specified operation phase shift amount is set to be equal to or longer than a predetermined length. That is, in REV method scenario 74H, the phase operating pattern is defined such that the time in which the operating phase shifter (phase shifter 13 for which the phase shift amount is operated) takes each of different operation phase shift amounts is equal to or longer than a predetermined duration time.

When REV method executor 27H controls phase shifter 13 in accordance with REV method scenario 74H, an error may be generated in the timing for changing the operation phase shift amount actually. Even when an error is generated, since the period in which the operation phase shift amount is constant is equal to or longer than a predetermined length, REV method scenario 74H can be referred to acquire operation phase shift amount spmax and operation phase shift amount spmin at time Tpmax and time Tpmin with a reduced error. The length of period in which the operation phase shift amount is constant is determined as appropriate in consideration of the magnitude of error of fluctuating execution time.

Figure 49:
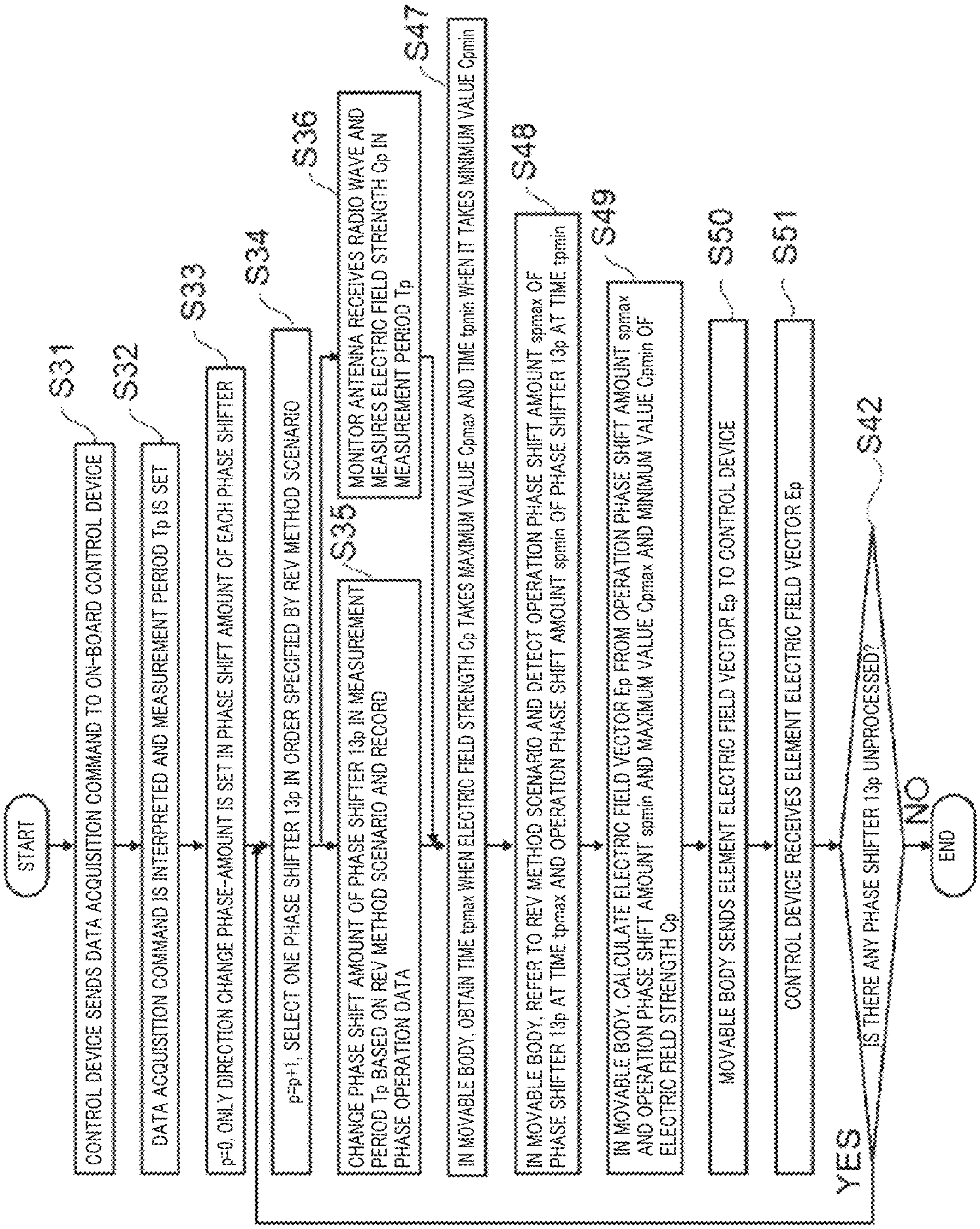
FIG. 49 is a flowchart illustrating a procedure of calculating an element electric field vector of a radio wave radiated by each element antenna by the REV method in the wireless power transmission device according to the ninth embodiment.

The operation is described. FIG. 49 is a flowchart illustrating the procedure of calculating an element electric field vector of a radio wave radiated by each element antenna by the REV method in the wireless power transmission device according to the ninth embodiment.

In FIG. 49, points different from FIG. 47 in the eighth embodiment are described. S37G and S38G are removed and steps S48 to S51 are added. S47 to S50 are the process performed in movable body 60H. At S47, measurement data analyzer 35G detects time Tpmax and time Tpmin in the same way as in the eighth embodiment. Subsequently to step S47, at step S48, operation phase shift amount acquirer 36H refers to REV method scenario 74H to detect the operation phase shift amount spmax of phase shifter 13*p* at time Tpmax. The operation phase shift amount spmin of phase shifter 13*p* at time Tpmin is also detected.

At step S49, element electric field vector calculator 37H calculates the phase and amplitude of element electric field vector Ep from operation phase shift amount spmax, operation phase shift amount spmin, and maximum value Cpmax and minimum value Cpmin of electric field strength Cp. The phase of element electric field vector Ep is calculated based on the average of the phase calculated from operation phase shift amount spmax and the phase calculated from operation phase shift amount spmin and the electric field strength change ratio (|Cpmax|/|Cpmin|).

At step S50, movable body communication device 20 mounted on movable body 60H sends element electric field vector Ep to communication device 30 included in control device 10G. At step S51, communication device 30 receives element electric field vector Ep.

Subsequently to S51, at S42, it is checked whether there is any phase shifter 13 not yet processed.

In the ninth embodiment, in addition to the effect obtained by the first embodiment, the volume of data sent from movable body 60G can be reduced because the REV method is executed in the movable body. Furthermore, it is not necessary for control device 10H to calculate element electric field vector Ep by the REV method.

The on-board control device may carry out up to the process of obtaining operation phase shift amount spmax and operation phase shift amount spmin of the operating phase shifter, and the process of calculating element electric field vector Ep from operation phase shift amount spmax and operation phase shift amount spmin may be executed in the control device. In this case, operation phase shift amount spmax and operation phase shift amount spmin are sent from the on-board control device to the control device.

Tenth Embodiment

Figure 50:
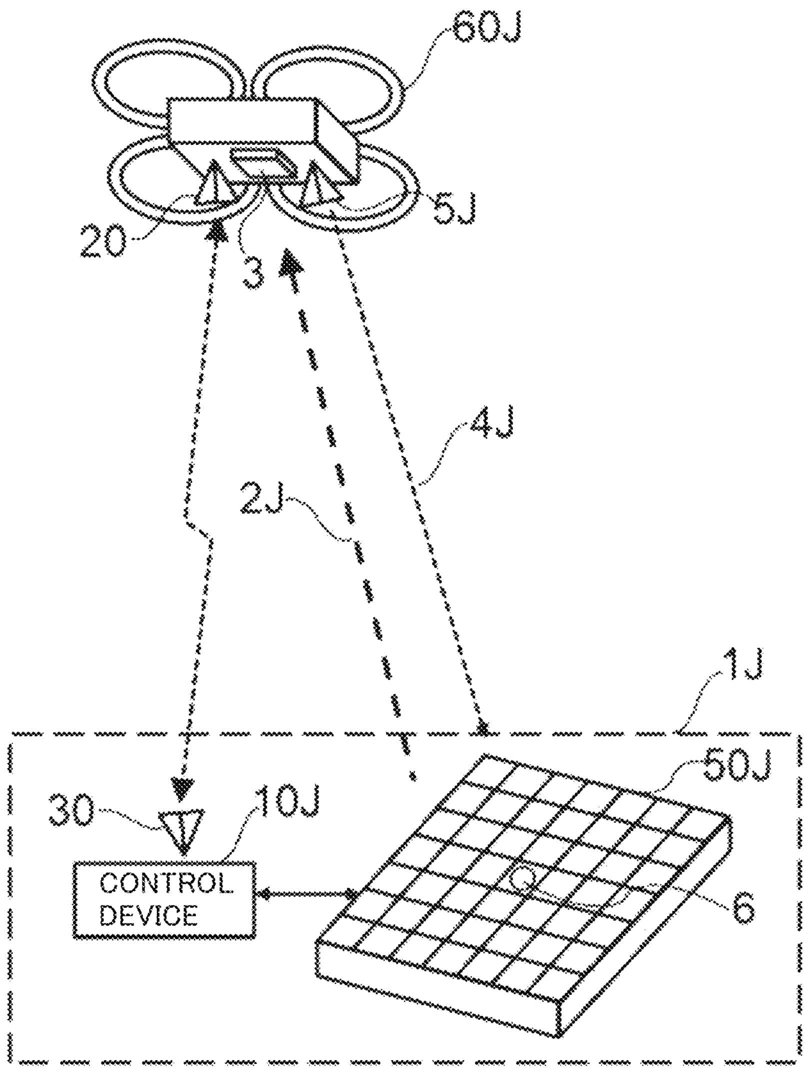
FIG. 50 is a schematic diagram illustrating a configuration of a wireless power transmission system for a movable body using a wireless power transmission device according to a tenth embodiment.

In a tenth embodiment, not only the presence direction of the movable body but also a three-dimensional position of the movable body (called movable body position) is measured, and the wireless power transmission device radiates a power transmission radio wave (power transmission beam) so that the maximum electric power can be received at the movable body position. The tenth embodiment is an embodiment that can handle a case where a power transmission antenna is increased in scale or power is transmitted to a movable body in a near field and therefore the distance to a movable body is not a far field. In the tenth embodiment, the movable body position is measured during execution of the REV method and a power transmission beam tracks the changing movable body position. Referring to FIG. 50, a configuration of a wireless power transmission system for a movable body according to the tenth embodiment is described. A wireless power transmission device 1J and a movable body 60J are modified.

Wireless power transmission device 1J can send a pulse-modulated power transmission radio wave 2J. Movable body 60J can send a pulse-modulated pilot signal 4J. In wireless power transmission device 1J, a distance G between power transmission antenna 50J and movable body 60J is measured based on the time until the pulse-modulated pilot signal 4J is received since the pulse-modulated power transmission radio wave 2J is transmitted.

Wireless power transmission device 1J differs from wireless power transmission device 1 in that power transmission antenna 50J and a control device 10J are modified. Power transmission antenna 50J transmits pulse-modulated power transmission radio wave 2J. Movable body 60J returns pulse-modulated pilot signal 4J for power transmission radio wave 2J. Control device 10J controls power transmission antenna 50J such that pulse-modulated power transmission radio wave 2J can be transmitted. Control device 10J measures distance G.

Figure 51:
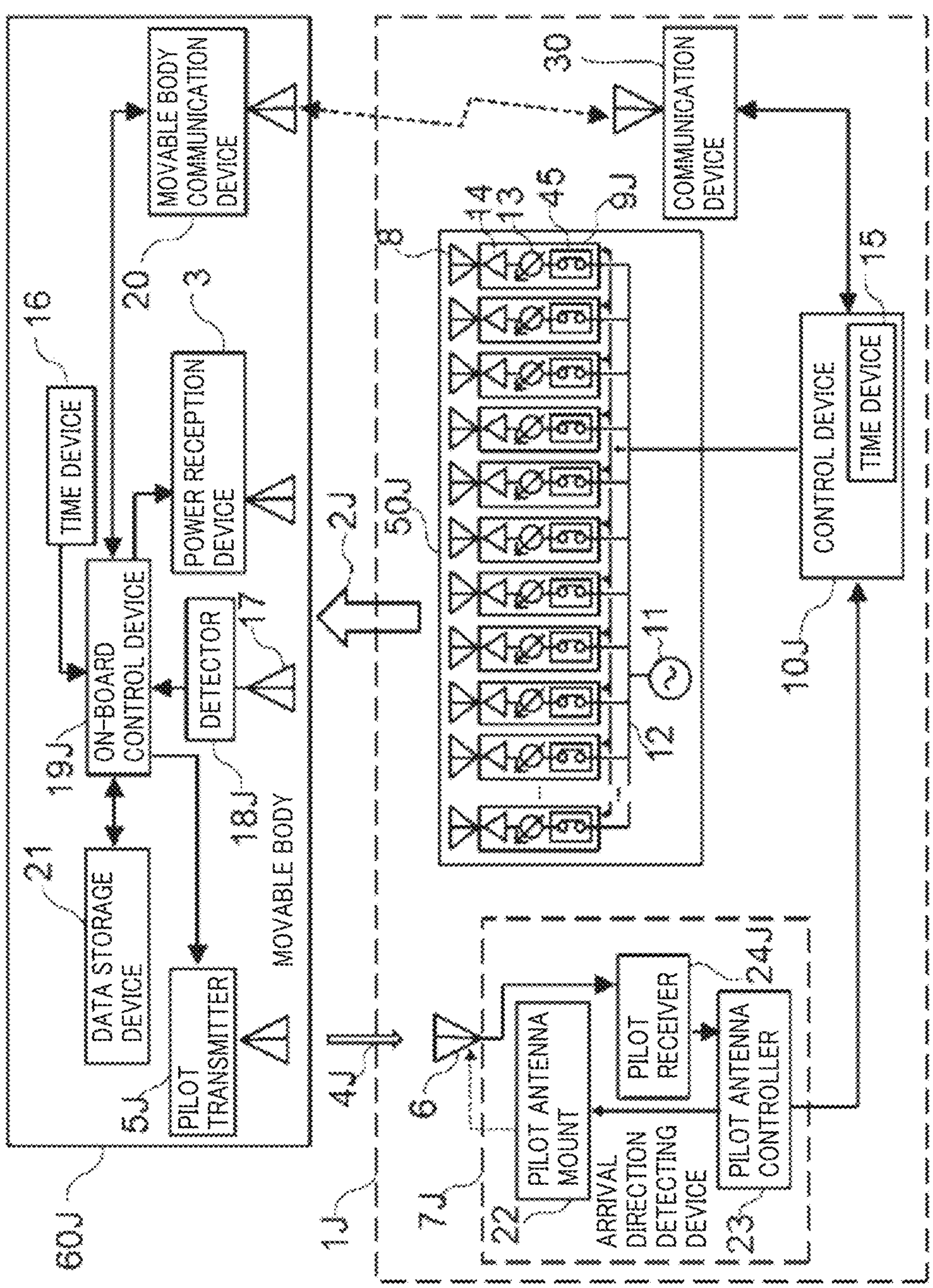
FIG. 51 is a diagram illustrating an overall configuration of the wireless power transmission system for a movable body using a wireless power transmission device according to the tenth embodiment.

Referring to FIG. 51, a configuration of wireless power transmission device 1J and movable body 60J is described. FIG. 51 is a diagram illustrating an overall configuration of a wireless power transmission system for a movable body using a wireless power transmission device according to the tenth embodiment. In FIG. 51, points different from FIG. 2 in the first embodiment are described.

In wireless power transmission device 1J, power transmission antenna 50J, arrival direction detecting device 7J, and control device 10J are modified. In power transmission antenna 50J, an element module 9J is modified. Element module 9J includes a pulse modulation switch 45 for pulse-modulating power transmission radio wave 2J. Pulse modulation switch 45 is controlled by control device 10J to switch between radiation and non-radiation of power transmission radio wave 2J. Pulse modulation switch 45 is turned on and off in predetermined cycles so that power transmission radio wave 2J can be pulse-modulated. When pulse modulation switch 45 is kept on, power transmission radio wave 2J not pulse-modulated is radiated. Control device 10J controls on and off of pulse modulation switch 45 in a predetermined length of time TO so that pulse-modulated power transmission radio wave 2J is radiated from power transmission antenna 50J. Pulse modulation switch 45 is usually kept on state and does not pulse-modulate power transmission radio wave 2J.

In arrival direction detecting device 7J, a pilot receiver 24J is modified. Pilot receiver 24J receives pulse-modulated pilot signal 4J and detects the starting part and the end part of pulse modulation to notify control device 10J. The signal given is called a pulse modulation detection signal 89 (illustrated in FIG. 52). Control device 10J receiving pulse modulation detection signal 89 records the reception time of pilot signal 4J. The modification made in control device 10J is described referring to FIG. 52.

In movable body 60J, a pilot transmitter 5J, a detector 181, and an on-board control device 19J are modified. Pilot transmitter 5J transmits pulse-modulated pilot signal 4J. Although not illustrated in the drawings, pilot transmitter 5J contains a switch to switch between transmission and non-transmission of pilot signal 41. The switch is controlled by on-board control device 19J. In a period in which the switch is turned on and off in predetermined cycles, pilot transmitter 5J transmits pulse-modulated pilot signal 4J. In a period in which the switch is kept on, pilot transmitter 5J transmits pilot signal 4J not pulse-modulated.

Detector 18J receives pulse-modulated power transmission radio wave 2J and detects the starting part and the end part of pulse modulation to notify on-board control device 19J. On-board control device 19J receiving the notification records the reception time of power transmission radio wave 2J and performs control such that pilot communication device 5J starts and ends pulse modulation. Pilot communication device 51 starts transmission of pulse-modulated pilot signal 4J after elapse of a predetermined time T1 since pulse-modulated power transmission radio wave 2J is received by detector 18J. The modification made in on-board control device 19J is described referring to FIG. 52.

Figure 52:
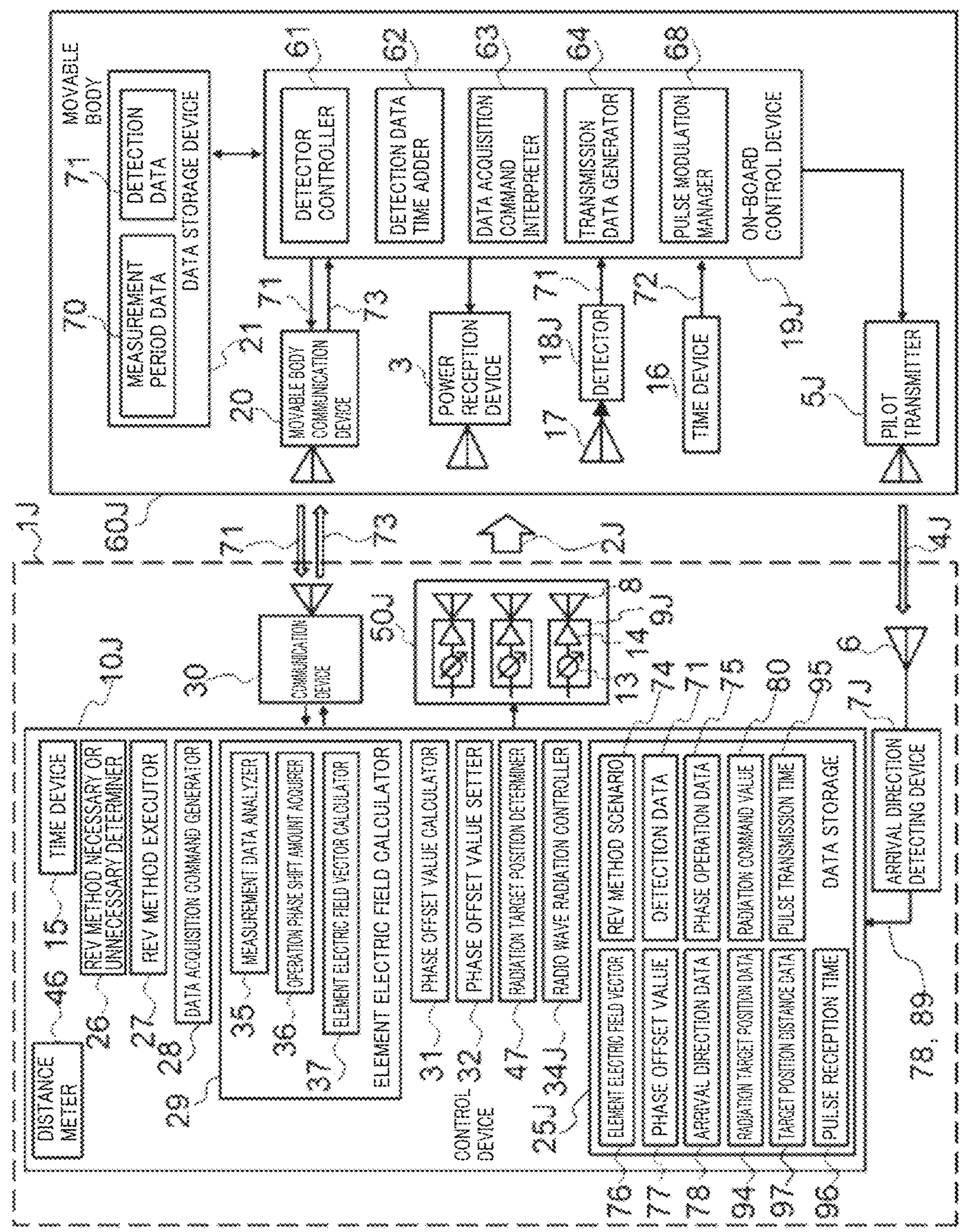
FIG. 52 is a block diagram illustrating a functional configuration of the wireless power transmission device and the movable body according to the tenth embodiment.

Referring to FIG. 52, a functional configuration of wireless power transmission device 1J and movable body 60J is described. FIG. 52 is a block diagram illustrating a functional configuration of the wireless power transmission device and the movable body according to the tenth embodiment. In FIG. 52, points different from FIG. 5 in the first embodiment are described.

On-board control device 19J includes a pulse modulation manager 68 additionally. Pulse modulation manager 68 receives a detection signal indicating the starting part and the end part of pulse modulation of power transmission radio wave 2J sent from detector 18J and controls whether to make pilot transmitter 5J to perform pulse modulation or not.

Upon receiving a notification that pulse modulation of power transmission radio wave 2J is started, pulse modulation manager 68 acquires the reception time of notification (start notification time). Pilot transmitter 5J is controlled to start pulse modulation of pilot signal 4J at the time when time T1 has elapsed since the start notification time. Upon receiving a notification that pulse modulation of power transmission radio wave 2J is ended, pulse modulation manager 68 acquires the reception time of notification (end notification time). Pilot transmitter 5J is controlled end pulse modulation of pilot signal 4J at the time when a predetermined time T1 has elapsed since the end notification time.

Control device 10J does not include radiation direction determiner 33 and includes a distance meter 46 and a radiation target position determiner 47. In control device 10J, a data storage 25J and a radio wave radiation controller 34J are modified. Radiation target position determiner 47 determines a radiation target position determined by the radiation direction and the distance from power transmission antenna 50J. The radiation target position is a range of position in three-dimensional space set to be a target to radiate a radio wave by power transmission antenna 50J. Power transmission antenna 50J can change the radiation target position and radiate a radio wave to the changed radiation target position.

Distance meter 46 measures the distance from power transmission antenna 50J to movable body 60J (strictly speaking, power reception device 3). The distance from power transmission antenna 50J to movable body 60J is called movable body distance. Distance meter 46 obtains a movable body distance from the time until pilot signal 4J is received since power transmission radio wave 2J is transmitted. Distance meter 46 is a movable body distance measurer that measures the movable body distance based on the elapsed time from transmission of a power transmission radio wave to the movable body to reception of a pilot signal transmitted in response to the power transmission radio wave by the wireless power transmission device.

Movable body 60J is present at a position at the movable body distance in the presence direction when viewed from power transmission antenna 50J. The position in three-dimensional space in which movable body 60J is present is the movable body position. Arrival direction detecting device 7 and distance meter 46 constitute a movable body position determiner that determines the movable body position from the presence direction and the movable body distance. The movable body position determiner that determines the movable body position that is the position where the movable body is present may determine the movable body position by any other method.

Distance meter 46 records the measured movable body distance as target position distance data 97 in data storage 25J so that power transmission radio wave 2J can be radiated using the movable body position as the radiation target position. Radio wave radiation controller 34J controls element modules 9 such that power transmission antennas 50J radiate power transmission radio waves 2J with the phases matched at the radiation target position.

In wireless power transmission device 1J, the radiation target position is set to a single point in three-dimensional space. Setting the radiation target position to a single point is an example of the radiation target position that is a range of position in three-dimensional space. The radiation target position may be a range of position instead of the position of a single point. The size of the range of the radiation target position may be determined based on the measurement accuracy of the arrival direction and the movable body distance. The size of the range of the radiation target position may be determined depending on the characteristics of the power transmission beam radiated by the wireless power transmission device. The size of the range of the radiation target position may be fixed or may be changed according to the situation.

The target position distance is the distance to a point included in the radiation target position. For example, the distance to a position that is the center of the radiation target position may be set as the target position distance. Alternatively, for example, the distance to a point at a predetermined position on the boundary of the radiation target position may be set. In wireless power transmission device 1J, the radiation target position is determined to include the movable body position so that power can be transmitted to the movable body.

Data storage 25J has radiation target position data 94 instead of radiation direction data 79. Data storage 25J also has pulse transmission time 95, pulse reception time 96, and target position distance data 97. Radiation target position data 94 is data representing a radiation target position that is the position at a predetermined distance (target position distance) in a predetermined direction (radiation direction) from power transmission antenna 50J. The radiation direction is a direction determined based on arrival direction data 78. Target position distance data 97 is data representing a target position distance. Pulse transmission time 95 is data representing the time related to the time when power transmission radio wave 2J is sent. Pulse reception time 96 is data representing the time related to the time when pilot signal 4J is received. Distance meter 46 sets pulse transmission time 95 and pulse reception time 96, measures the movable body distance based on pulse transmission time 95 and pulse reception time 96, and sets the measured movable body distance as target position distance data 97 in data storage 25J.

Distance meter 46 controls on and off of pulse modulation switch 45 to pulse-modulate power transmission radio wave 2J. Distance meter 46 records the time when pulse modulation of power transmission radio wave 2J is started and ended as pulse transmission time 95. Distance meter 46 sets the time when pulse modulation detection signal 89 for the start and the end of pulse modulation of pilot signal 4J is received, as pulse reception time 96. Distance meter 46 obtains the average T2 of the time difference between pulse reception time 96 and pulse transmission time 95 for the start and the time difference between pulse reception time 96 and pulse transmission time 95 for the end. Furthermore, time $T3=T2-T1$ is obtained by subtracting T1 from T2. T3 is the time required for power transmission radio wave 2J and pilot signal 4J going to movable body 60J and returning. Distance meter 46 obtains the target position distance based on T3. The target position distance is a distance obtained by correcting the distance calculated from T3 in consideration of the positional relation between pilot transmitter 5J and power reception device 3 and the like. Distance meter 46 sets the obtained target position distance as target position distance data 97.

Radiation target position determiner 47 determines the radiation target position based on arrival direction data 78 and target position distance data 97 and sets the determined radiation target position as radiation target position data 94. Radiation target position determiner 47 sets the direction opposite to the direction represented by arrival direction data 78 as the radiation direction and determines the position of the distance represented by target position distance data 97 in the radiation direction from power transmission antenna 50J as the radiation target position.

The moving speed of movable body 60J may be estimated based on the temporal transition of arrival direction data 78 and target position distance data 97, and the radiation target position may be determined so as to include the estimated position where movable body 60J is present after a predetermined time in consideration of the moving speed. The position determined by arrival direction data 78 and target position distance data 97 at each point of time may be stored as the movable body position, the position of the movable body after a predetermined time may be predicted based on the temporal transition of the stored movable body position, and the radiation target position may be determined so as to include the predicted position of the movable body.

Radiation target position determiner 47 determines the radiation target position as a relative position to the power transmission antenna so as to include the movable body position by controlling the phase shift amount that is the amount by which phase shifter 13 changes the phase of a transmission signal.

Radio wave radiation controller 34J generates radiation command values 80 such that power transmission antennas 50J radiate power transmission radio waves 2J with the phases matched at the radiation target position stored in radiation target position data 95. Radiation command value 80 is sent as a power transmission control signal to wireless power transmission device 1. Each element module 9J is controlled such that the corresponding element antenna 8 radiates element radio wave $2E_p$ having the phase and amplitude specified by radiation command value 80. Radio wave radiation controller 34J is a radiation target position changer that radiates power transmission radio wave 2J to the radiation target position by controlling the phase shift amount of phase shifter 13 included in each element module 9J. The phase shift amount changed by radio wave radiation controller 34J is called radiation target position change phase shift amount. Since the radiation target position is determined by the radiation direction and the distance, radio wave radiation controller 34J can also be recognized as a radiation direction changer.

Power transmission radio waves 2J having the phases matched at the radiation target position mean that the maximum value of the phase difference at the radiation target position of the phase of element radio wave $2E_p$ radiated by each element antenna $8_p$ is equal to or less than a predetermined upper limit value. When the radiation target position is a single point, it is preferable to perform control such that the phase difference between element radio waves $2E_p$ at the radiation target position is zero. When the radiation target position has a range, the phase difference between element radio waves $2E_p$ is controlled to be equal to or less than the upper limit value at each point in the range. The phase difference between element radio waves $2E_p$ may be controlled to be zero at a point in the range of radiation target position. The sum of phase differences between element radio waves $2E_p$ at the points in the range of radiation target position can be controlled to be minimized. Alternatively, the following method may be possible. Among the points included in the ranged defined by the radiation target position, a point at which the distance to the position of each element antenna $8_p$ is largest (maximum distance point), a point at which the distance is smallest (minimum distance point), and a midpoint of the line connecting the maximum distance point and the minimum distance point (median distance point) are obtained. The phases of element radio waves $2E_p$ radiated by element antennas $8_p$ are controlled to be the same at the median distance point of element antennas $_p$.

In the tenth embodiment, power transmission radio wave 2J, power transmission antenna 50J, element module 9J, movable body 60J, and the like are modified in order to obtain distance G between wireless power transmission device 1J and movable body 60J. These modifications have nothing to do with wireless power transmission by wireless power transmission device 1J. In a description as to how radio wave radiation controller 34J determines radiation command value 80, power transmission radio wave 2, power transmission antenna 50, element module 9, movable body 60, and the like are used.

How to determine a command value of the phase to each element module 9 such that the phase of element radio wave $2E_p$ radiated by each element antenna 8 is matched at the radiation target position is described. For this, the following is assumed.

(A) Power transmission antenna 50 has element antennas 8 arranged linearly in one dimension.

(B2) The distance of movable body 60 from power transmission antenna 50 is shorter than the distance at which a far field is established.

(C) Change in power transmission direction in a plane having the direction in which element antennas 8 are arranged and the front direction of power transmission antenna 50 is studied. When the power transmission direction is matched with the front direction of power transmission antenna 50, the angle of the power transmission direction is zero degrees.

(D2) Change in distance between wireless power transmission device 1J and power reception device 3 is also taken into consideration.

The following variables are defined for explanation. Variables whose meaning is changed are also described.

$P^S$: the position of wireless power transmission device 1. The position at the center of power transmission antenna 50 (the position Nm). Called power transmission device position or power transmission antenna position.

$P^T$: the radiation target position. The relative position of power reception device 3 to power transmission device position $P^S$.

ψ: the power transmission direction. The angle between the direction from power transmission device position $P^S$ toward radiation target position $P^T$ and the front direction of power transmission antenna 50.

G: the radiation target position distance. The distance from power transmission device position $P^S$ to radiation target position $P^T$.

Gp: the distance from element antenna 8*p* to radiation target position $P^T$.

Δp: the difference between Gp and G. Δp=Gp−G.

$\theta^G_p$: the target position change phase shift amount that is the amount by which element antenna 8 numbered p is changed the phase when power is transmitted to radiation target position $P^T$ having power transmission direction ψ and at distance G. The phase difference between element radio wave $2E_p$ radiated by element antenna 8*p* and element radio wave 2E radiated from power transmission device position $P^S$.

$k^G_p$: the phase shift amount for phase shifter 13 numbered p for target position change phase shift amount $\theta^G_p$.

$P^E$: deviation position. The position different from radiation target position $P^T$.

δ: deviation angle. The angle difference between the direction toward deviation position $P^E$ and power transmission direction ψ toward radiation target position $P^T$. The direction toward deviation position $P^E$ is (ψ+δ).

D: the deviation position distance. The distance between deviation position $P^E$ and power transmission device position $P^S$.

Dp: the deviation position distance. The distance from element antenna 8$p$ to deviation position $P^E$.

$\varepsilon^G_p$: the phase difference between element radio wave 2$E_p$ radiated by element antenna 8$p$ that is detected at deviation position $P^E$ and element radio wave 2E radiated from power transmission device position $P^S$, in a state of radiation toward radiation target position $P^T$.

$\gamma^G$: the ratio of the amplitude of the electric field vector detected at deviation position $P^E$ to the amplitude of the electric field vector detected at radiation target position $P^T$. Called amplitude attenuation ratio.

Distance difference Δp from distance Gp in power transmission direction ψ can be calculated by the following equations.

$$GP = \sqrt{((G+(p-Nm)*L*\sin(\psi))^2+(p-Nm)*L*\cos(\psi)^2)} \quad (47)$$
$$= \sqrt{(G^2+2*G*\sin(\psi)*(p-Nm)*L+((p-Nm)*L)^2)}$$

$$\Delta p = \sqrt{(G^2+2*G*\sin(\psi)*(p-Nm)*L+((p-Nm)*L)^2)} - G \quad (48)$$
$$= \sqrt{(p-Nm)*L*(2*G*\sin(\psi)+(p-Nm)*L)/(Gp+G)}$$

According to equation (47), when G is larger to such an extent that (p−Nm)*L can be ignored (G>>(p−Nm)*L), then Gp/G=1 is satisfied, and equation (48) is changed to equation (1).

Phase difference $\theta^G_p$ can be calculated by the following equation.

$$\theta^G_p = (2*\pi)*(\Delta p/\lambda) \quad (49)$$
$$= (2*\pi)*(L/\lambda)*(p-Nm)$$
$$*(2*G*\sin(\psi)+(p-Nm)*L)/(Gp+G) \quad p=1, \ldots, N$$

Since the phase is changed every θd in phase shifter 13, $k^G_p$ is determined as follows such that $|\theta^G_p - k^G_p*\theta d| \le (\theta d/2)$ is satisfied.

$$k^G_p = \mathrm{int}((\theta^G_p/\theta d)+0.5) \quad (50)$$

Figure 53:
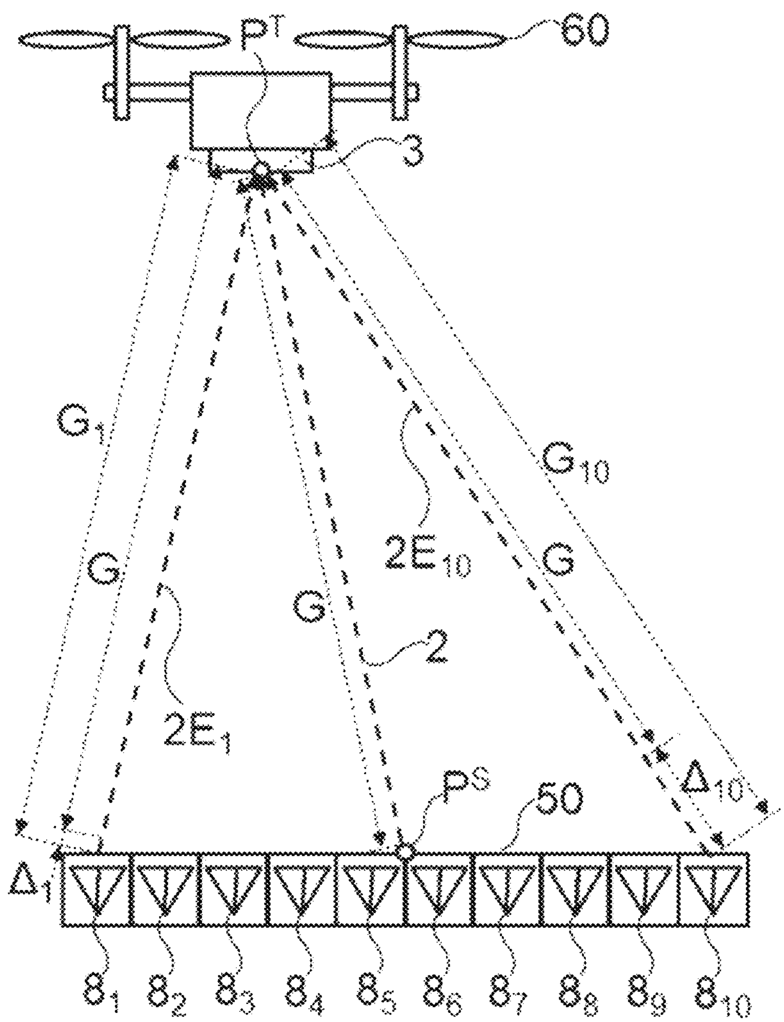
FIG. 53 is a diagram illustrating an example of the state in which there is a difference between distance Gp from element antenna 8*p* to radiation target position $P^T$ and distance G from power transmission device position $P^S$ to radiation target position $P^T$ in the wireless power transmission device and the movable body according to the tenth embodiment.

FIG. 53 illustrates an example of the state in which there is a difference between distance Gp from element antenna 8$p$ to radiation target position $P^T$ and distance G from power transmission device position $P^S$ to radiation target position $P^T$. Here, N is set to satisfy N=10, and distances $G_1$, $G_{10}$ from element antennas $\mathbf{8}_1$, $\mathbf{8}_{10}$ to radiation target position $P^T$ and distance differences $\Delta_1$, $\Delta_{10}$ are illustrated. Power transmission antenna 50 radiates power transmission radio wave 2 from power transmission device position $P^S$ to radiation target position $P^T$. When element antenna 8 is present at power transmission device position $P^S$, element radio wave 2$E_{Nm}$ is radiated similarly to power transmission radio wave 2. Element radio wave 2$E_p$ radiated by element antenna 8$p$ is radiated with the phase adjusted so as to have a phase difference $k^G_p*\theta d$ corresponding to distance difference $\Delta_n$ in comparison to power transmission radio wave 2. By doing so, the phase difference between element radio waves 2$E_p$ radiated by element antennas 8$p$ at radiation target position $P^T$ is equal to or less than (θd/2).

The phase difference $\varepsilon^G_p$ between element radio wave 2$E_p$ radiated by element antenna 8$p$ and element radio wave 2E radiated from power transmission device position $P^S$ as detected at deviation position $P^E$ is determined as follows.

$$\varepsilon^G_p = (2*\pi)*((Dp-D)/\lambda) - k^G p*\theta d \quad (51)$$
$$= (2*\pi)*(L/\lambda)*(p-Nm)$$
$$*(2*D*\sin(\psi+\delta)+(p-Nm)*L)/(Dp+D) - k^G p*\theta d$$
$$Dp = \sqrt{(D^2+2*D*\sin(\psi+\delta)*(p-Nm)*L+((p-Nm)*L)^2)} \quad (52)$$

Assuming that δ is minute, equations (51) and (52) are approximated by sin(δ)≈δ and cos(δ)≈1 as follows.

$$\varepsilon^G_p = (2*\pi)*(L/\lambda)*(p-Nm) \quad (53)$$
$$*(2*D*\delta*\cos(\psi)+(p-Nm)*L)/(Dp+D)$$
$$-k^G p*\theta d$$
$$Dp = (D^2+2*D*\delta*\cos(\psi)*(p-Nm)*L+((p-Nm)*L)^2) \quad (54)$$

The amplitude attenuation ratio $\gamma^G$, which is a value obtained by diving the amplitude of the electric field vector detected at deviation position $P^E$ by the amplitude of the electric field vector detected at radiation target position $P^T$ can be calculated as follows. The deterioration of power transmission efficiency caused by changing the phase every θd in phase shifter 13 is ignored at radiation target position $P^T$.

$$\gamma^G = (1/N)*\Sigma\exp(j*\varepsilon^G_p) \quad (55)$$

In equation (55) and the like, Σ means summation with p=1, . . . , N. Based on equation (55), the absolute value $|\gamma^G|$ of $\gamma^G$ can be calculated as follows.

$$|\gamma^G| = (1/N)*\sqrt{(\Sigma\cos(\varepsilon^G_p))^2+(\Sigma\sin(\varepsilon^G_p))^2)} \quad (56)$$

Figure 54:
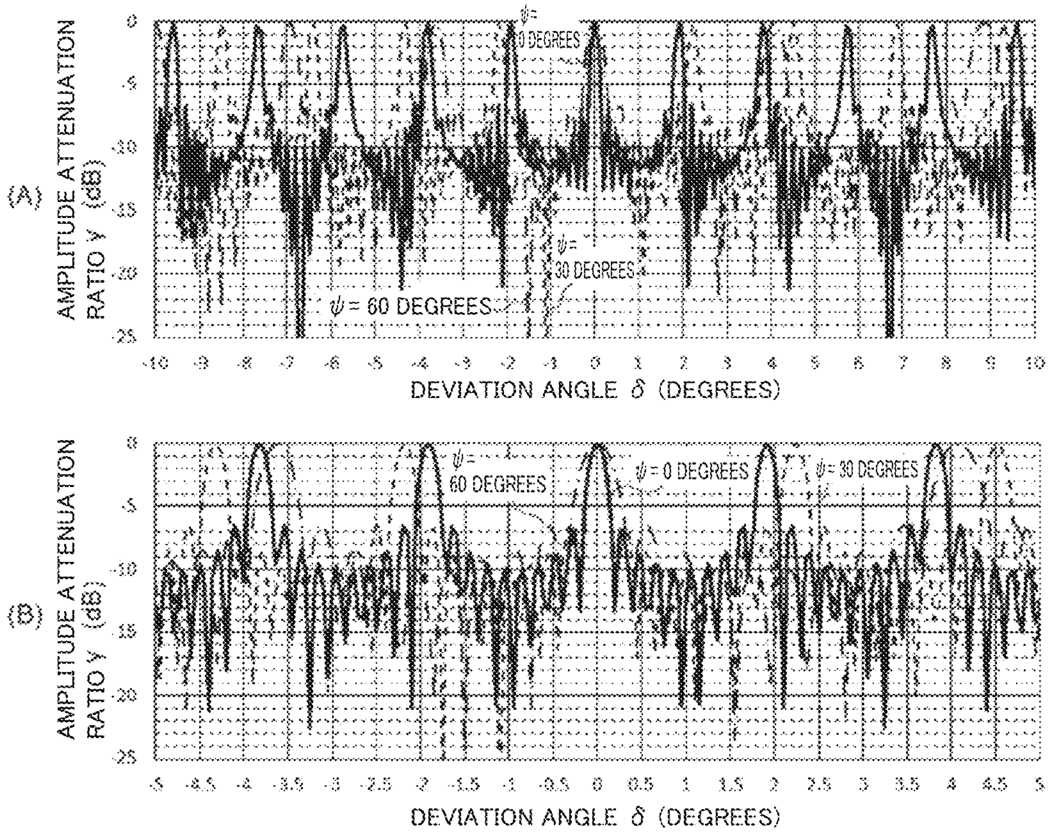
FIG. 54 is a graph illustrating change of an amplitude attenuation ratio γ to change of a deviation angle δ in the phased array antenna (L=1800 mm) of the wireless power transmission device according to the tenth embodiment.
Figure 55:
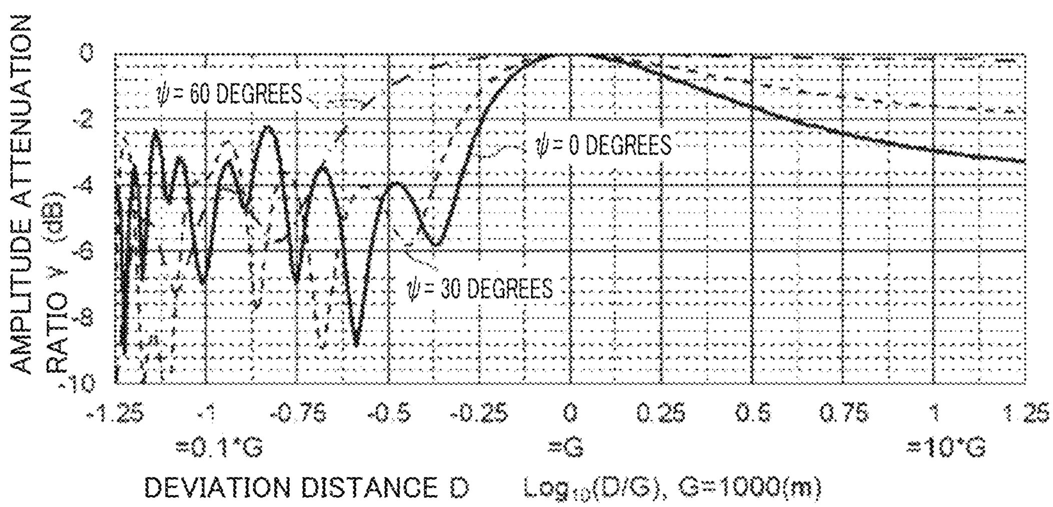
FIG. 55 is a graph illustrating change of an amplitude attenuation ratio γ to change of a deviation distance G in the phased array antenna (L=1800 mm) of the wireless power transmission device according to the tenth embodiment.

A case where power transmission antenna 50 is a phased array antenna where N=10, f=5 GHz, λ=60 mm, L=1800 mm=1.8 m, nd=128, and θd=2.8125 degrees are satisfied is studied. FIG. 54 illustrates graphs representing change of amplitude attenuation ratio γ to change of deviation angle δ while satisfying G=1000 m, in a case where the positions in power transmission directions ψ=0 degrees, 30 degrees, and 60 degrees are the radiation target position satisfying G=1000 m. FIG. 54(A) illustrates δ in the range from 10 degrees to −10 degrees, and FIG. 54(B) illustrates a magnification of δ in the range from 5 degrees to −5 degrees. FIG. 55 illustrates graphs representing change of amplitude attenuation ratio γ when distance G is changed while ψ=0 degrees, 30 degrees, or 60 degrees is satisfied. In FIG. 55, the horizontal axis is indicated by $\log_{10}$(D/G). When D=G is satisfied, $\log_{10}$(D/G) is zero. In FIG. 54 and FIG. 55, the graph for ψ=0 degrees is satisfied is depicted by a solid line, the graph satisfying ψ=30 degrees is depicted by a broken line, and the graph satisfying ψ=60 degrees is depicted by a long and short dashed line.

When ψ=0 degrees is satisfied in FIG. 54, the half-width (full width at half maximum) at which the amplitude of the electric field vector attenuates to half is approximately 0.24 degrees. In the case of FIG. 6 in which a far field is established, the half-width is approximately 6.8 degrees. When a power transmission radio wave is radiated when ψ=0 degrees is satisfied, the half-width of the power transmission beam is reduced to approximately 1/28 in FIG. 54, compared with FIG. 6. The half-width of the power transmission beam becomes narrower substantially in proportion to the size of power transmission antenna 50J approximately 30 times larger. The half-width when ψ=30 degrees is satisfied is substantially the same as when ψ=0 degrees is satisfied. When ψ=60 degrees is satisfied, the half-width is approximately 0.47 degrees. When ψ=0 degrees is satisfied, the amplitude of the electric field vector takes peaks at intervals of about 1.9 degrees, and when ψ=30 degrees is satisfied, peaks are taken at intervals of approximately 2.2 degrees. When ψ=60 degrees is satisfied, peaks are taken approximately at 3.6 degrees in the amplitude of the electric vector on the side where deviation angle δ<0 is satisfied and at approximately 4.0 degrees on the side where deviation angle δ>0 is satisfied.

When the phase of a power transmission beam is controlled also in consideration of the radiation target position, the variation of amplitude attenuation ratio γ is large relative to the variation of deviation distance D. When ψ=0 degrees is satisfied in FIG. 55, amplitude attenuation ratio γ is decreased 3 dB at $\log_{10}(D/G)\approx 0.28$, that is, D≈0.53*G. On the increasing side of deviation distance D, γ is decreased 3 dB at $\log_{10}(D/G)\approx 1.03$, that is, D≈10.7*G. When ψ=30 degrees is satisfied, γ is decreased 3 dB at $\log_{10}(D/G)\approx -0.34$, that is, D≈0.45*G. When ψ=60 degrees is satisfied, γ is decreased 3 dB at $\log_{10}(D/G)\approx -0.67$, that is, D≈0.21*G. On the increasing side of deviation distance D, when ψ=30 degrees is satisfied, γ is decreased approximately 1.8 dB at $\log_{10}(D/G)\approx$, that is, D≈10*G. When ψ=60 degrees is satisfied, γ is decreased approximately 0.2 dB at $\log_{10}(D/G)=$, that is, D=10*G. When the beam width is large, the degree of decrease of γ to variation of the distance is small.

Figure 56:
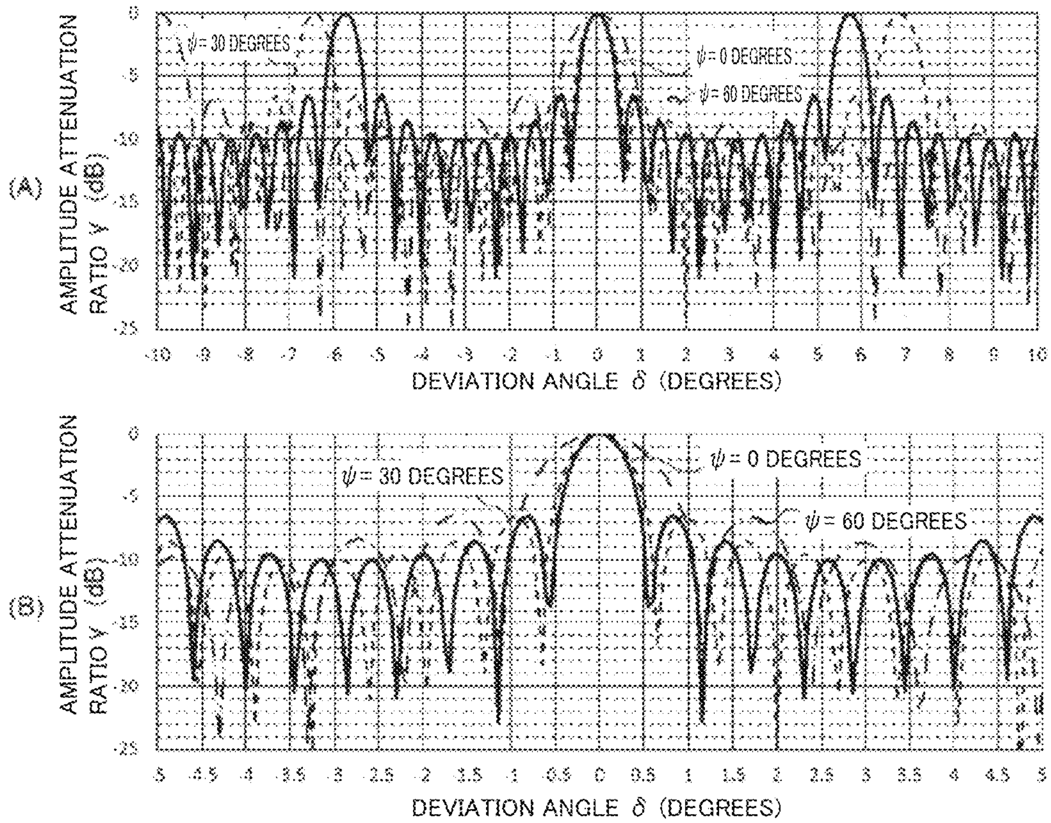
FIG. 56 is a graph illustrating change of an amplitude attenuation ratio γ to change of a deviation angle δ in the phased array antenna (L=600 mm) of the wireless power transmission device according to the tenth embodiment.
Figure 57:
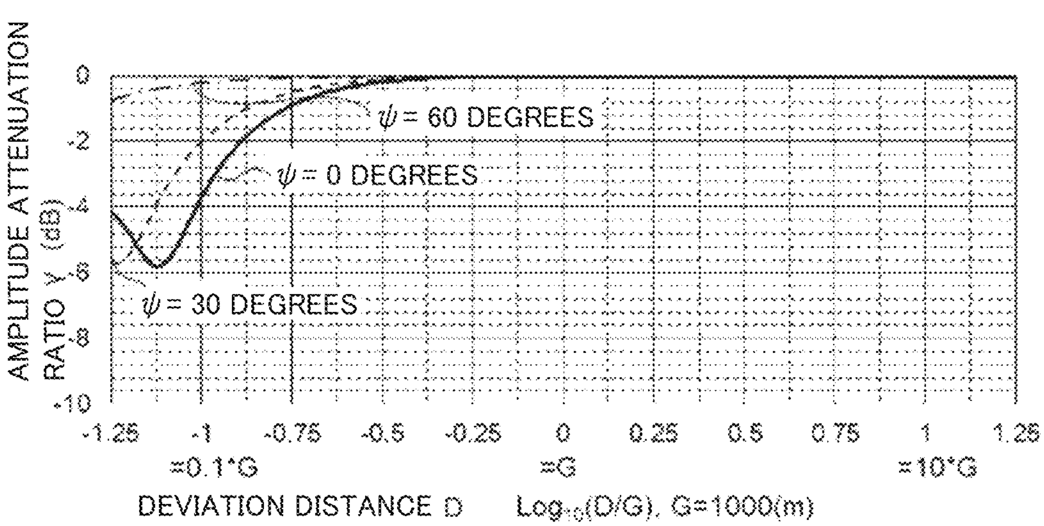
FIG. 57 is a graph illustrating change of an amplitude attenuation ratio γ to change of a deviation distance G in the phased array antenna (L=600 mm) of the wireless power transmission device according to the tenth embodiment.

FIG. 56 and FIG. 57 illustrate graphs of amplitude attenuation ratio γ when only L is changed to L=600 mm as a comparative example. FIG. 56 illustrates graphs representing change of amplitude attenuation ratio γ to change of deviation angle δ for a transmission antenna satisfying L=600 mm. FIG. 57 illustrates graphs representing change of amplitude attenuation ratio γ to change of deviation distance D for a transmission antenna satisfying L=600 mm. In FIG. 56, the half-width satisfying ψ=0 degrees is approximately 0.71 degrees. When ψ=30 degrees is satisfied, the half-width is approximately 0.82 degrees, and when ψ=30 degrees is satisfied, the half-width is approximately 1.4 degrees. Since the size of power transmission antenna 50 is 1/3 times smaller, the half-width is approximately three times larger. The interval between peaks is larger for each angle of ψ. When ψ=0 degrees is satisfied, peaks are taken at an interval of approximately 5.7 degrees, and when ψ=30 degrees is satisfied, peaks are taken at an interval of approximately 6.4 degrees. When ψ=60 degrees is satisfied, peaks are taken at approximately 10 degrees on the side where deviation angle δ<0 is satisfied, and the interval of peaks is greater than 10 degrees on the side where δ>0 is satisfied.

In the change of amplitude attenuation ratio γ to change of deviation distance D illustrated in FIG. 57, decrease of γ is less than 0.4 dB with any angle ψ in the range of $\log_{10}(D/G)>-0.5$, that is, D>0.32*G. It can be thought that for power transmission antenna 50 satisfying L=600 min, power transmission distance G=1000 m is the distance at which a far field is established. When ψ=0 degrees is satisfied, γ is decreased 3 dB at $\log_{10}(D/G)\approx -0.96$, that is, D≈0.11*G. When ψ=30 degrees is satisfied, $\log_{10}(D/G)=-1.07$, that is, D≈0.085*G. When ψ=60 degrees is satisfied, at $\log_{10}(D/G)=-1.25$, that is, D≈0.056*G, the decrease of γ is approximately 0.8 dB.

FIG. 57 can be considered as the graphs illustrating how much the power transmission efficiency is decreased at a closer distance in wireless power transmission device 1 controlling such that the phase of each element radio wave 2E is matched at a distance of a far field. From FIG. 57, it can be understood that the power transmission efficiency is decreased in wireless power transmission device 1 when movable body 60 is present at a nearer position. In wireless power transmission device 1J, the phase of each element radio wave 2$E_p$ is controlled such that the amplitude of power transmission radio wave 2 is maximized at the radiation target position also in consideration of distance G to the movable body, whereby the amplitude of the power transmission radio wave can be maintained at the maximum for any value of distance G. Even when the movable body such as a drone equipped with the power reception device moves in the depth direction viewed from the wireless power transmission device, the phase of a radio wave radiated by each element antenna included in the phased array antenna can be set to the optimum value, thereby improving the power transmission efficiency.

The effect of the power transmission beam tracking movable body 60 using the position of movable body 60 as radiation target position $P^T$ during execution of the REV method is studied. For distance G to movable body 60 and power transmission direction ψ, the values calculated by equation (9) and equation (10) is measured. The variables used for explaining the process of the REV method are defined as follows. The variables already defined are also used.

$P^T_t$: the position of movable body 60 at elapsed time t since the start of the REV method.

$\theta^G_{rp}$: the phase command value for phase shifter 13 numbered q during execution of the REV method.

$E^G_p$: the element electric field vector at radiation target position $P^T$ generated by element radio wave 2$E_p$ radiated by element antenna 8$_p$ numbered p.

$E^G$sum: the electric field vector at radiation target position $P^T$ generated by element radio waves 2E radiated by all element antennas 8.

$\theta^G$sum: the phase of electric field vector $E^G$sum.

In the REV method, the phase is changed by r*θd every time Td in the order of r=1, . . . nd in element antenna 8 numbered q in the order of q=1, . . . , N. Further, the phase of element radio wave 2$E_p$ radiated by each element antenna 8$_p$ is controlled so that element radio wave 2E can be radiated toward radiation target position $P^T$. Phase command value $\theta^G_{rp}$ for each phase shifter 13 at time t=m*Td is determined as follows. $k^G_p$*θd in equation (57-1) and equation (57-2) is the target position change phase shift amount, and r*θd is the operation phase shift amount. $k^G_p$ can be calculated from equation (50) and equation (49).

$$\text{For } p \text{ satisfying } p\neq q,\ \theta^G_{rp}=k^G_p*\theta d \tag{57-1}$$

$$\text{For } p \text{ satisfying } p=q,\ \theta^G_{rp}=(k^G_p+r)*\theta d \tag{57-2}$$

Here, the relation of q and r with m is written by equations (12) and (13).

The phase of element radio wave 2$E_p$ radiated by element antenna 8$_p$ numbered p has the following three kinds of differences with respect to target position change phase shift amount $\theta^G_p$.

(A) the phase error φp of element radio wave 2$E_p$ radiated by element antenna 8$_p$ numbered p.

(B) the error of approximating $\theta^G$p by an integer multiple of θd.

(C) the operation phase shift amount $r*\theta d$ in executing the REV method.

The element electric field vectors $E^G_p$ and $E^G$sum therefore can be calculated as follows.

$$E^G_p = E_0 * \exp\left(j(\varphi p + \theta^G_{rp} - \theta^G_p)\right) \quad (58)$$

$$E^G \text{sum} = \Sigma E^G_p = E_0 * \Sigma \exp\left(j(\varphi p + \theta^G_{rp} - \theta^G_p\right) \quad (59)$$

$$\left|E^G \text{sum}\right| = \sqrt{\left(\left(\Sigma \cos\left(\varphi p + \theta^G_{rp} - \theta^G_p\right)\right)^2 + \left(\Sigma \sin\left(\varphi p + \theta^G_{rp} - \theta^G_p\right)\right)^2\right)} \quad (60)$$

$$\theta^G \text{sum} = \sin^{-1}\left(\Sigma \sin\left(\varphi p + \theta^G_{rp} - \theta^G_p\right) / \left|E^G \text{sum}\right|\right) \quad (61)$$

A comparative example in which movable body 60 is not tracked during execution of the REV method is studied. The following variables are defined.

$P^T_0$: the position of movable body 60 at the start of the REV method (t=0).

$\psi_0$: the radiation direction at the start of the REV method. The angle between the direction from power transmission device position $P^S$ toward radiation target position $P^T_0$ and the front direction of power transmission antenna 50.

$G_0$: the radiation target position distance at the start of the REV method. The distance from power transmission device position $P^S$ to radiation target position $P^T_0$.

$G_{0p}$: the distance from element antenna 8*p* to radiation target position $P^T_0$ at the start of the REV method.

$\Delta_{0p}$: the difference between $G_{0p}$ and $G_0$. $\Delta_{0p}=G_{0p}-G_0$.

$\theta^G_{0p}$: the target position change phase shift amount for element antenna 8 numbered p when element radio wave 2$E_p$ is radiated toward radiation target position $P^T_0$ at the start of the REV method.

$k^G_{0p}$: the phase shift amount for phase shifter 13 numbered p for target position change phase shift amount $\theta^G_{0p}$.

$\varepsilon 2^G_p$: the phase difference between element radio wave 2$E_p$ radiated by element antenna 8*p* detected at $P^T$ (corresponding to the deviation position) of movable body 60 and element radio wave 2E radiated from power transmission device position $P^S$, in a state of radiation toward radiation target position $P^T_0$ during execution of the REV method.

$E2^G_p$: the element electric field vector generated by element radio wave 2$E_p$ radiated by element antenna 8$_p$ numbered p at position $P^T$ of movable body 60, in a state of radiation toward radiation target position $P^T_0$ during execution of the REV method.

$E2^G$sum: the electric field vector generated by element radio waves 2E radiated by all element antennas 8 at position $P^T$ of movable body 60, in a state of radiation toward radiation target position $P^T_0$ during execution of the REV method.

$\theta 2^G$sum: the phase of electric field vector $E2^G$sum.

$\theta^G_{0p}$, $k^G_{0p}$, and $\varepsilon 2^G_p$ can be calculated as follows.

$$\theta^G_{0p}=(2*\pi)*(L/\lambda)*(p-Nm)*(2*G_0*\sin(\psi_0)+(p-Nm)*L)/(G_{0p}+G_0) \quad (62)$$

$$k^G_{0p}=\text{int}((\theta^G_{0p}/\theta d)+0.5) \quad (63)$$

$$\varepsilon 2^G_p=(2*\pi)*((Gp-G)/\lambda)-k^G_0p*\theta d=(2*\pi)*(L/\lambda)*(p-Nm)*(2*G*\sin(\psi)+(p-Nm)*L)/(Gp+G)-k^6_0p*\theta d \quad (64)$$

Equation (7) is substituted into equation (64) as follows.

$$\varepsilon 2^G_p=(2*\pi)*(L/\lambda)*(p-Nm)/(Gp+G)*(2*(G_0*\sin(\psi_0)+V_0*m*Td*\sin(\xi_0))+(p-Nm)*L)-k^G_0p*\theta d \quad (65)$$

When movable body 60 is not tracked during execution of the REV method, the phase command value $\theta^G_{rp}$ for each phase shifter 13 at time t=m*Td is determined as follows.

$$\text{For } p \text{ satisfying } p\neq q, \theta^G_{rp}=k^G_{0p}*\theta d \quad (66\text{-}1)$$

$$\text{For } p \text{ satisfying } p=q, \theta^G_{rp}=(k^G_{0p}+r)*\theta d \quad (66\text{-}2)$$

$E2^G_p$ and $E2^G$sum can be calculated by the following equations.

$$E2^G_p = E_0 * \exp\left(j(\varphi p + \theta^G_{rp} - \theta^G_{0p} + \varepsilon 2^G_p\right) \quad (67)$$

$$E2 \text{ sum} = \Sigma E2_p = E_0 * \Sigma \exp\left(j(\varphi p + \theta^G_{rp} - \theta^G_{0p} + \varepsilon 2^G_p\right) \quad (68)$$

$$|E2 \text{ sum}| = \sqrt{\left(\left(\Sigma \cos\left(\varphi p + \theta^G_{rp} - \theta^G_{0p} + \varepsilon 2^G_p\right)\right)^2 + \left(\Sigma \sin\left(\varphi p + \theta^G_{rp} - \theta^G_{0p} + \varepsilon 2^G_p\right)\right)^2\right)} \quad (69)$$

$$\theta 2 \text{ sum} = \sin^{-1}\left(\Sigma \sin\left(\varphi p + \theta^G_{rp} - \theta^G_{0p} + \varepsilon 2^G_p\right) / |E2 \text{ sum}|\right) \quad (70)$$

As another comparative example, a case where phase $\theta p$ of each phase shifter 13*p* is controlled such that only the radiation direction of radio wave 2 is changed as in wireless power transmission device 1 and the power transmission beam tracks movable body 60 during execution of the REV method is studied. Direction change phase shift amount $\theta_p$ can be calculated by the above equation (1). $k_p$ that discretizes $\theta_p$ can be calculated by equation (2). Phase command value $\theta_{rp}$ for each phase shifter 13 during execution of the REV method can be calculated by the above equation (11-1) and equation (11-2).

In phase shifter 13*p*, although phase difference $\theta^G_p$ calculated by equation (49) should be generated, direction change phase shift amount $\theta_p$ calculated in equation (1) is set. Therefore, element electric field vector $E_p$ is determined as follows. $\theta_p$ is used for calculating $\theta_{rp}$.

$$E_p=E_0*\exp(j(\varphi p+\theta_{rp}-\theta^G_p)) \quad (71)$$

Esum and $\theta_{sum}$ can be calculated as follows.

$$E\text{sum}=\Sigma E_p=E_0*\Sigma\exp(j(\varphi p+\theta_{rp}-\theta^G_p) \quad (72)$$

$$|E\text{sum}|=\sqrt{((\Sigma \cos(\varphi p+\theta_{rp}-\theta^G_p))^2+(\Sigma \sin(\varphi p+\theta_{rp}-\theta^G_p))^2)} \quad (73)$$

$$\theta\text{sum}=\sin^{-1}(\Sigma \sin(\varphi p+\theta_{rp}-\theta^G_p)/|E\text{sum}|) \quad (74)$$

Equation (31) to equation (32) for distance G and the orientation direction ($\psi_{AZ}$, $\psi_{EL}$) for the power transmission antenna having element antennas 8 arranged in two dimensions to track movable body 60 are satisfied similarly in the tenth embodiment.

The following variables are defined to represent the target position change phase shift amount in the power transmission antenna having element antennas 8 arranged in dimensions.

$\theta^G_{xp,yp}$: the target position change phase shift amount for element antenna 8 numbered (xp, yp) when power transmission radio wave 2 is radiated toward the radiation target position at distance G and in the power transmission direction ($\psi_{AZ}$, $\psi_{EL}$).

$k^G_{xp,yp}$: the phase shift amount for phase shifter 13 numbered (xp, yp) for target position change phase shift amount $\theta^G_{xp,yp}$.

$\theta^{G}_{xp,yp}$ and $k^{G}_{xp,yp}$ can be calculated by the following equations.

$$\theta^{G}_{xp,yp} = (2*\pi)*(L/\lambda) *((xp-Nm)*\sin(\psi_{AZ})+(yp-Nm)*\cos(\psi_{AZ})) *(2*G*\sin(\psi_{EL}) +((xp-Nm)*\sin(\psi_{AZ})+(yp-Nm)*\cos(\psi_{AZ}))*L) /(Gp+G) \quad p=1, \ldots, N \tag{75}$$

$$k^{G}_{xp,yp} = \mathrm{int}((\theta_{xp,xy}/\theta d)+0.5) \tag{76}$$

Figure 58:
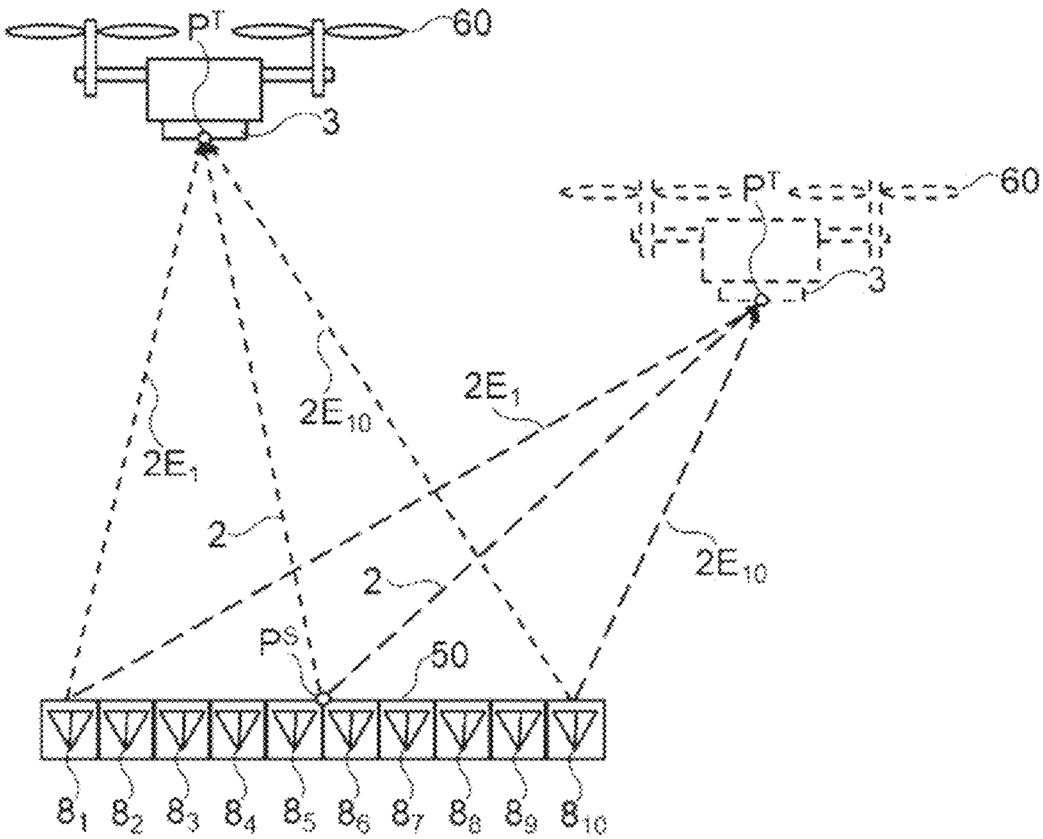
FIG. 58 is a diagram illustrating an example in which the wireless power transmission device in the tenth embodiment sets a radiation target position in accordance with the position of the moving movable body.
Figure 59:
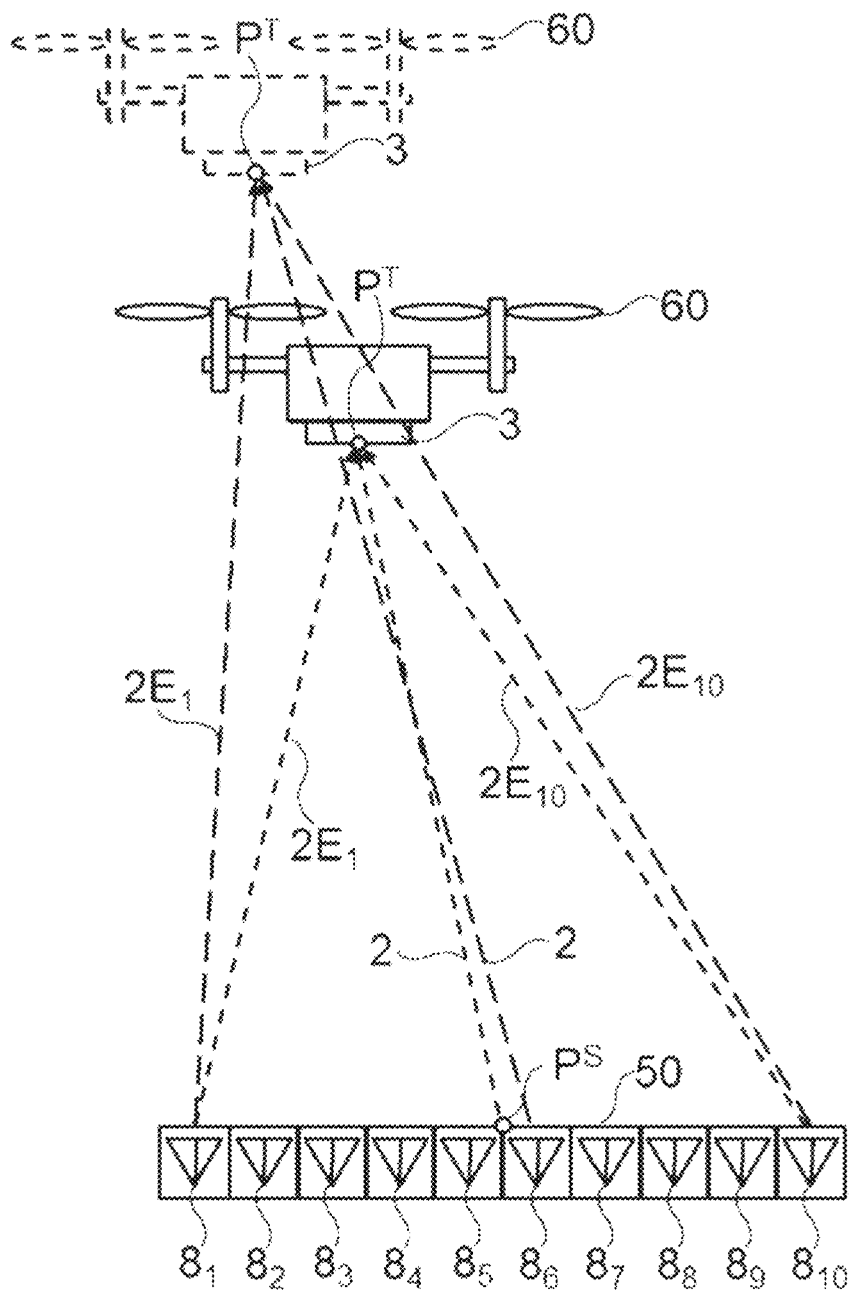
FIG. 59 is a diagram illustrating another example in which the wireless power transmission device in the tenth embodiment sets a radiation target position in accordance with the position of the moving movable body.

FIG. 58 and FIG. 59 illustrate an example in which wireless power transmission device 1J sets radiation target position $P^T$ in accordance with the position of moving movable body 60. In FIG. 58, movable body 60 moves such that the arrival direction is changed mainly. In FIG. 59, movable body 60 moves such that the distance from wireless power transmission device 1J is changed mainly. No matter how movable body 60 moves, wireless power transmission device 1J obtains the position of movable body 60 and sets radiation target position $P^T$ such that the obtained position is included. Wireless power transmission device 1J controls each element module 9 to radiate power transmission radio wave 2 such that the maximum power at radiation target position $P^T$ can be transmitted.

Figure 60:
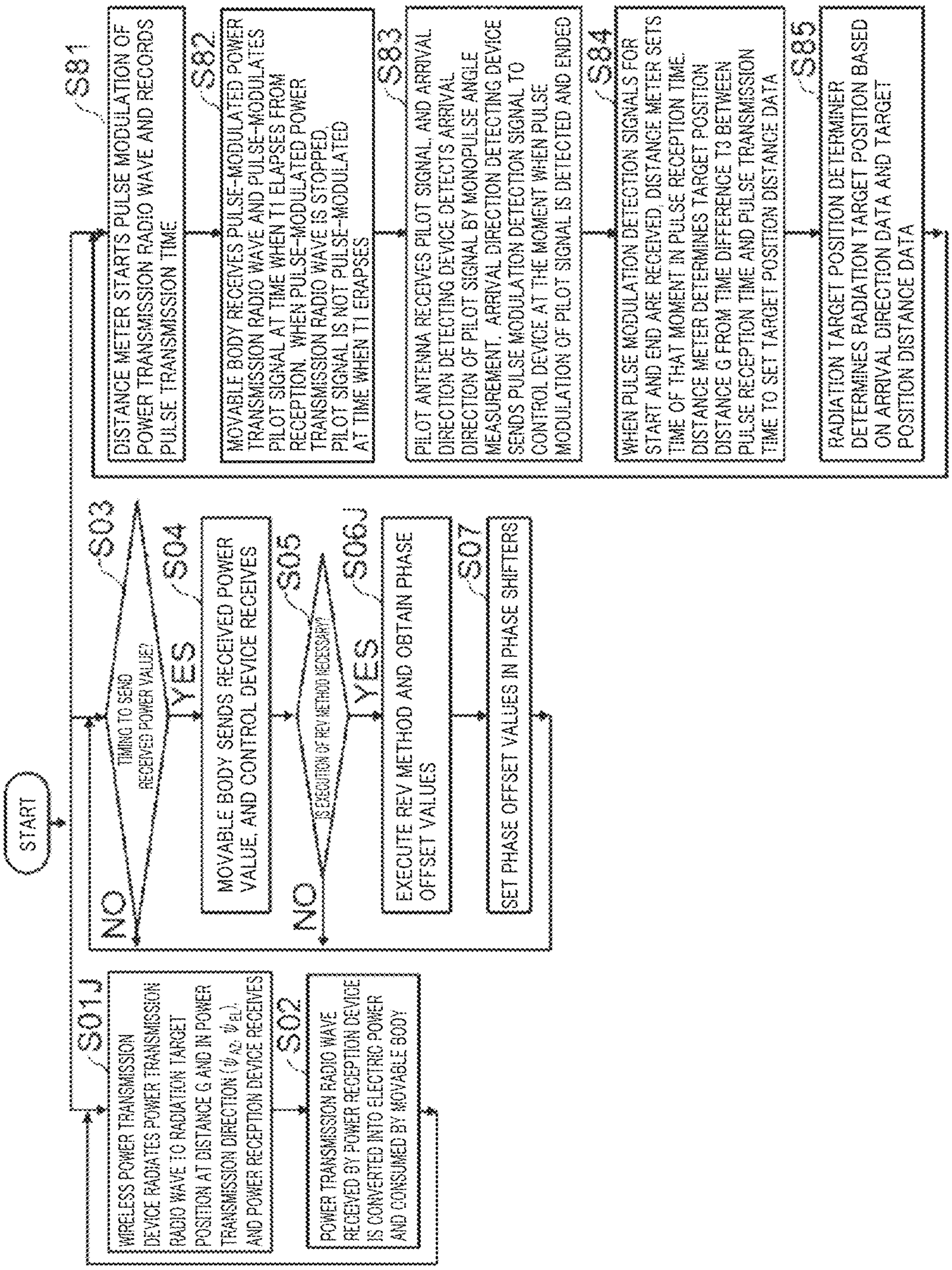
FIG. 60 is a flowchart illustrating a power transmission procedure to a movable body by the wireless power transmission device according to the tenth embodiment.

The operation is described. FIG. 60 is a flowchart illustrating a power transmission procedure to a movable body by the wireless power transmission device according to the tenth embodiment. In FIG. 60, points different from FIG. 8 in the first embodiment are described.

At step S01J, wireless power transmission device 1J radiates power transmission radio wave 2J, using the position at distance G and in the power transmission direction ($\psi_{AZ}$, $\psi_{EL}$) where movable body 60J is present as the radiation target position. Power reception device 3 included in movable body 60J receives power transmission radio wave 2J. The process of executing the REV method at S06J is also changed slightly.

The process of determining a power transmission direction at S11 to S13 is changed to the process of determining a radiation target position at steps S81 to S85. At step S81, distance meter 46 starts pulse modulation of power transmission radio wave 2J and records pulse transmission time 95. The length of period TO of pulse modulation is predetermined, and distance meter 46 records the start time and the end time of the period of pulse modulation as pulse transmission time 95. At step S82, movable body 60J receives pulse-modulated power transmission radio wave 2J and pulse-modulates pilot signal 4J at a time when T1 elapses from the reception of pulse-modulated power transmission radio wave 2J. When reception of pulse-modulated power transmission radio wave 2J is stopped, pilot signal 4J is not pulse-modulated at a time when T1 elapses.

At step S83, pilot antenna 6 receives pilot signal 4J, and arrival direction detecting device 7J detects the arrival direction of pilot signal 4J by mono-pulse angle measurement. Arrival direction detecting device 7J checks whether pilot signal 4J is pulse-modulated and sends pulse modulation detection signal 89 to control device 10J at the moment when pulse modulation is detected and at the moment when the end of pulse modulation is detected.

At step S84, when control device 10J receives pulse modulation detection signal 89 for the start, distance meter 46 sets the time of that moment in pulse reception time 96. When pulse modulation detection signal 89 for the end is received, distance meter 46 also sets the time of that moment in pulse reception time 96. Distance meter 46 determines target position distance G from time difference T3 between pulse reception time 96 and pulse transmission time 95 to set target position distance data 97. The arrival direction detected by arrival direction detecting device 7J is set in arrival direction data 78.

At step S85, radiation target position determiner 47 determines the radiation target position based on arrival direction data 78 and target position distance data 97 and sets the determined radiation target position in radiation target position data 94. At S01J, wireless power transmission device 1J radiates power transmission radio wave 2J toward the position specified by radiation target position data 95 set at S85.

After S85 is performed, the process returns to S81. The process at S81 to S85 is performed periodically in predetermined cycles. The length of one cycle is determined such that the difference between the radiation target position calculated last time and the current radiation target position is within an acceptable range even when movable body 60J moves at the possible maximum moving speed.

Figure 61:
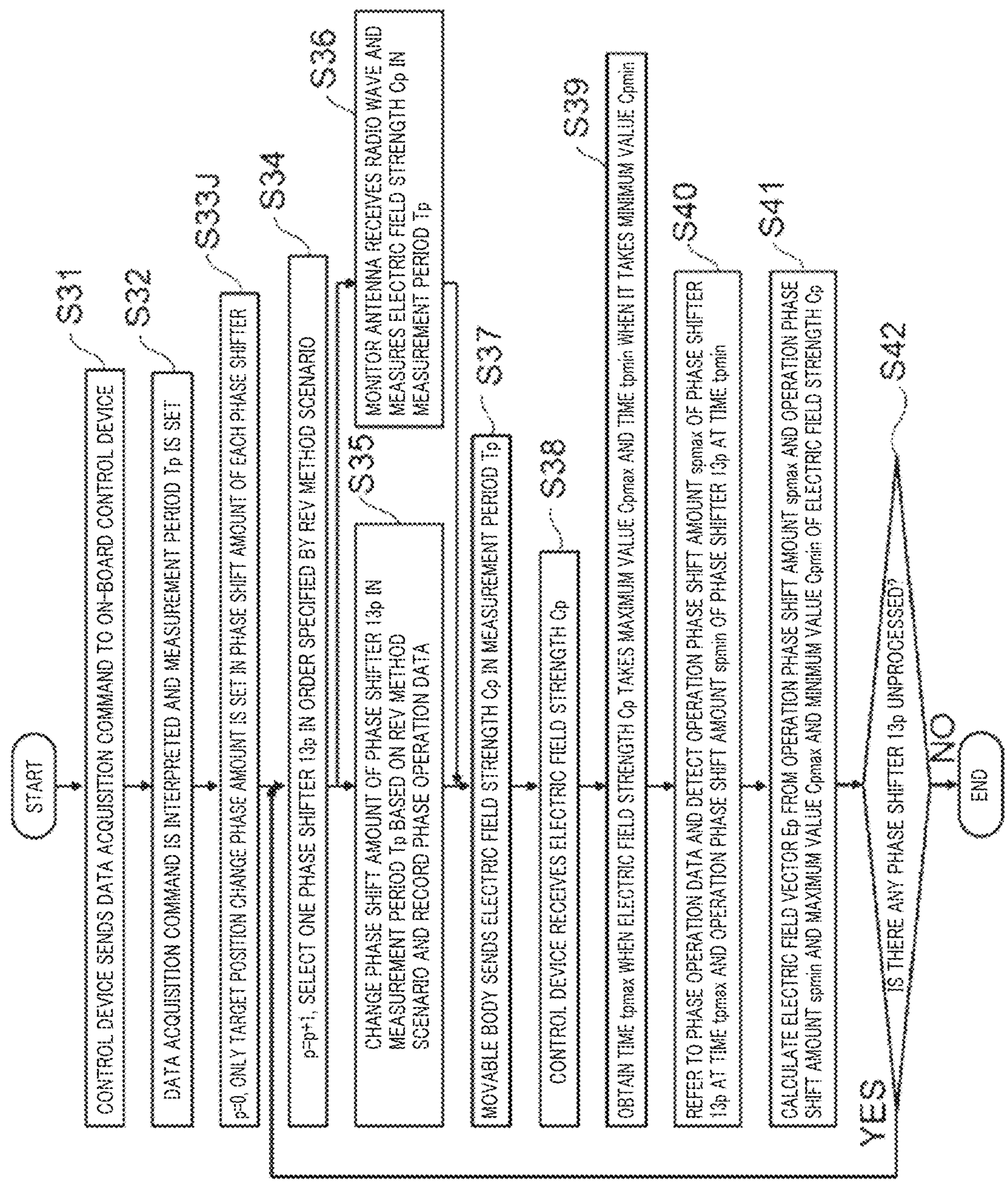
FIG. 61 is a flowchart illustrating the procedure of calculating an element electric field vector of a radio wave radiated by each element antenna by the REV method in the wireless power transmission device according to the tenth embodiment.

Referring to FIG. 61, the procedure of executing the REV method at S06J is described. FIG. 61 is a flowchart illustrating the procedure of calculating an element electric field vector of a radio wave radiated by each element antenna by the REV method in the wireless power transmission device according to the tenth embodiment. In FIG. 61, points different from FIG. 9 in the first embodiment are described.

At S33J, only the target position change phase shift amount is set as the phase shift amount of phase shifter 13, instead of the direction change phase shift amount.

The effect of a power transmission beam tracking movable body 60J during execution of the REV method by wireless power transmission device 1J is explained with an operation example. A case where the parameters of the power transmission antenna and the REV method are N=10, f=5 GHz, λ=60 mm. L=1800 mm=1.8 m, nd=128, θd=2.8125 degrees is studied. The parameters for movable body 60J are $G_0$=1000 m, $\psi_0$=30 degrees, $V_0$=−30 m/sec, and $\xi_0$=90 degrees. Compared with the first embodiment, L=1800 mm and $\psi_0$=30 degrees are changed.

Figure 62:
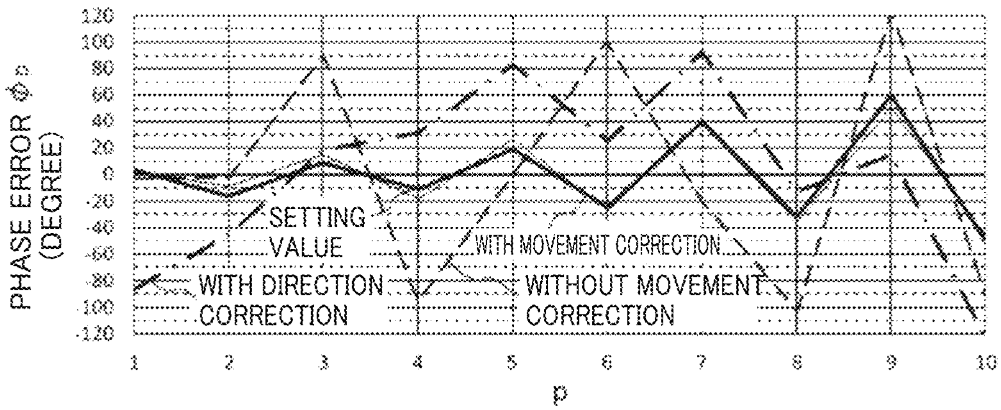
FIG. 62 is a diagram illustrating a phase offset value and a phase error remaining after correction obtained in the wireless power transmission device according to the tenth embodiment and comparative examples, in an operation example in which L=1800 mm is satisfied.
Figure 62:
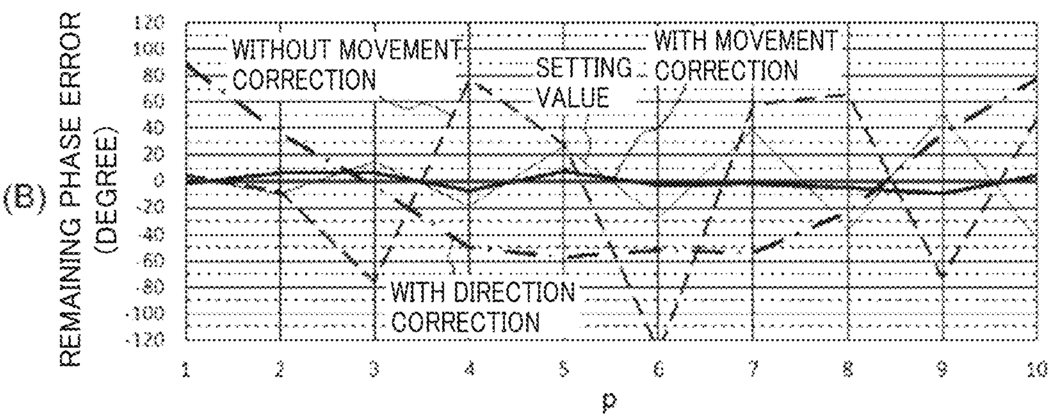

FIG. 62 is a diagram illustrating phase offset values and phase errors remaining after correction obtained in the wireless power transmission device according to the tenth embodiment and comparative examples, in the operation example in which L=1800 mm is satisfied. The comparative examples include a case where the power transmission beam does not track the movable body (without movement correction) during execution of the REV method and a case where the movable body is tracked (with direction correction) during execution of the REV method in wireless power transmission device 1 radiating a power transmission radio wave toward the power transmission direction. FIG. 62(A) illustrates the set phase error and the phase offset value obtained by executing the REV method, and FIG. 62(B) illustrates the remaining phase error. The setting value of the phase error is depicted by a thin solid line, the phase offset value obtained when the radiation target position tracks the movable body (with movement correction) during execution of the REV method is depicted by a thick solid line, the phase offset value obtained when the radiation target position does not track the movable body (without movement correction) is depicted by a thick broken line, and the phase offset value obtained when the power transmission direction tracks the movable body (with direction correction) is depicted by a thin broken line. FIG. 62(B) illustrates the remaining phase error obtained by subtracting the phase offset value from the set phase error. In FIG. 62, the average value of the phase offset value for each phase shifter 13*p* and the average value of the remaining phase error are zero.

The phase offset value with movement correction is calculated such that the absolute value of the difference from the set phase error φp is approximately 9 degrees at maximum and approximately 5 degrees on average. The absolute value of the difference of phase offset value without movement correction from φp is approximately 128 degrees at maximum and approximately 56 degrees on average. The difference of the phase offset value with direction correction from φp is larger at p=1 and p=10 at both ends of power transmission antenna 50. The absolute value of the difference from φp is approximately 89 degrees at maximum and approximately 48 degrees on average.

Figure 63:
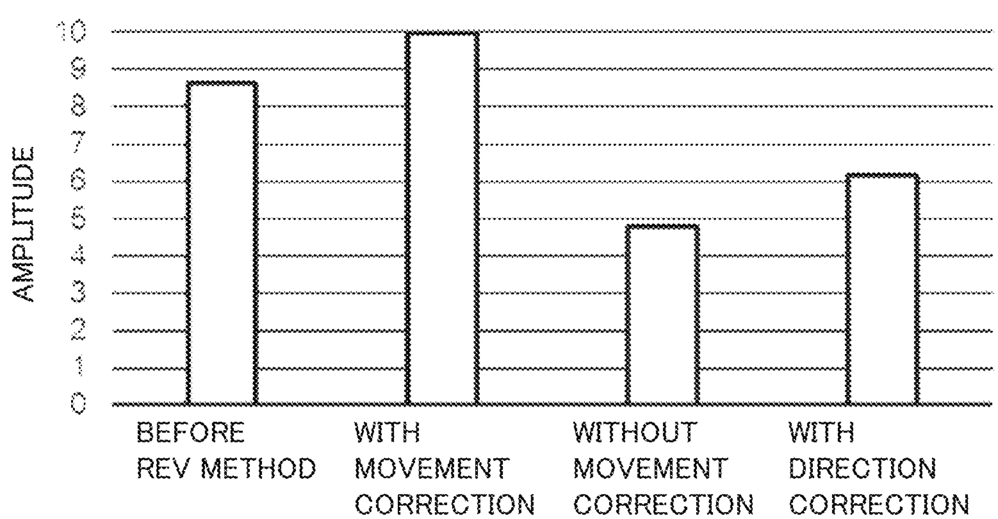
FIG. 63 is a diagram comparing the absolute values of the amplitude of the electric field vector after correction in the wireless power transmission device according to the tenth embodiment and the comparative example, in the operation example in which L=1800 mm is satisfied.

FIG. 63 is a diagram comparing the absolute values of the amplitude of the composite electric field vector after correction in the wireless power transmission device according to the first embodiment and the comparative example in an operation example in which L=1800 mm is satisfied. When the phase of element radio wave 2$E_p$ radiated by each element antenna $\mathbf{8}_p$ is matched, $|E^6sum|=10$ is obtained. $|E^G sum|$ is decreased to $|E^G sum|=8.6$ before execution of the REV method. In the REV method with movement correction, $|E^G sum|=9.95$ is obtained after correction. In the REV method without movement correction, $|E2^G sum|=4.8$ is obtained after correction. In the REV method with direction correction, $|Esum|=6.2$ is obtained after correction. Without movement correction and with direction correction, the amplitude of the composite electric field vector after correction is smaller than before execution of the REV method.

It can be understood that the power transmission direction tracks the movable body during execution of the REV method whereby the phase error can be eliminated accurately by the REV method. When the radiation target position does not track the movable body during execution of the REV method, the REV method fails to correct the phase error. It can be thought that in a case in which L=1800 mm and G=1000 m are satisfied, the radio wave radiated by power transmission antenna 50 is unable to be calculated by the formula for a far field. With the distance at which the electric field is unable to be calculated by the formula for a far field, the REV method fails to correct the phase error when only the power transmission direction to the movable body is changed.

Figure 64:
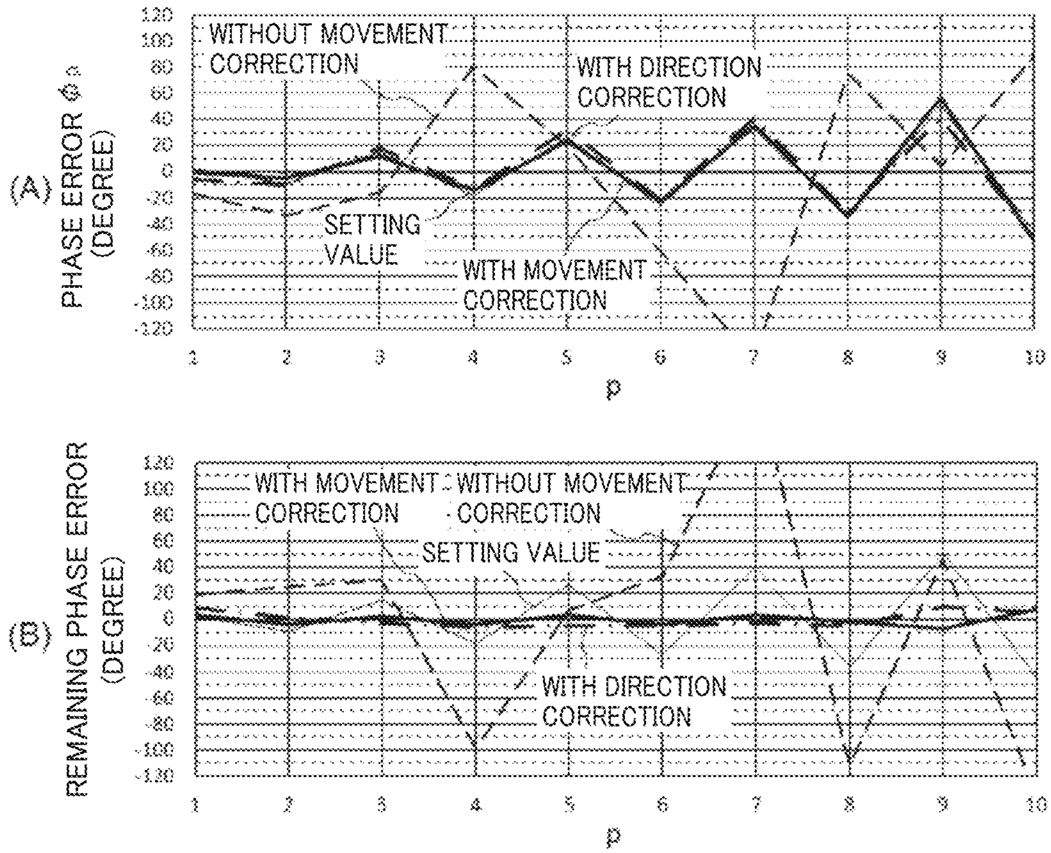
FIG. 64 is a diagram illustrating a phase offset value and a phase error remaining after correction obtained in the wireless power transmission device according to the tenth embodiment and comparative examples, in an operation example in which L=600 mm is satisfied.
Figure 65:
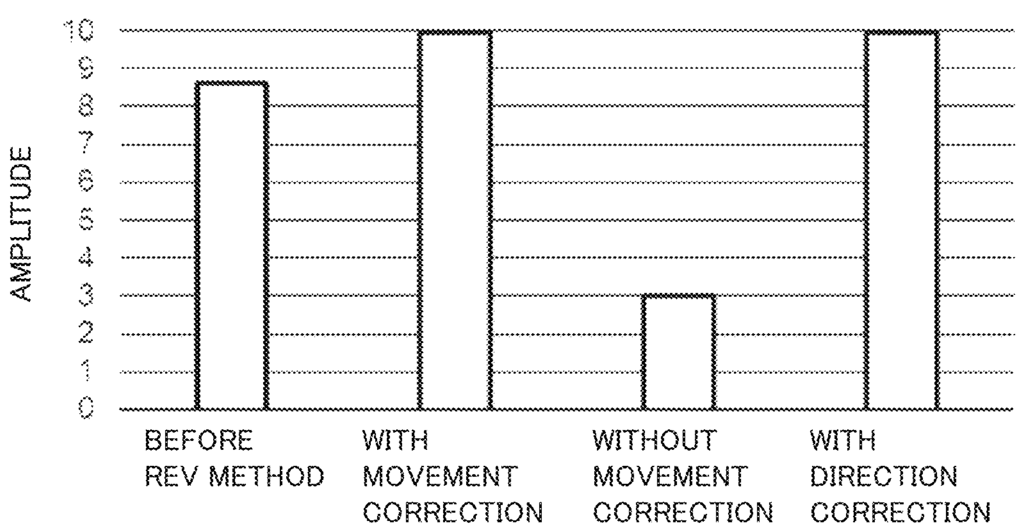
FIG. 65 is a diagram comparing the absolute values of the amplitude of the electric field vector after correction in the wireless power transmission device according to the tenth embodiment and the comparative example in the operation example in which L=600 mm is satisfied.

FIG. 64 and FIG. 65 illustrate the result obtained when the REV method is executed in another example in which L=600 m is satisfied. The phase offset value with movement correction is calculated such that the absolute value of the difference from the set phase error φp is approximately 7.4 degrees at maximum and approximately 4.1 degrees on average. The absolute value of the difference of the phase offset value with direction correction from φp is approximately 9.8 degrees at maximum and approximately 5.2 degrees on average. As illustrated in FIG. 65, in a case satisfying L=600 mm, the amplitude of the composite electric field vector $|Esum|$ is 9.97 with direction correction. When L=600 mm at which G=1000 m is thought to be a far field, the REV method can correct the phase error even when the REV method to correct only the direction is executed.

Wireless power transmission device 1J operates similarly to wireless power transmission device 1 and a similar effect can be obtained. Since the power transmission beam tracks movable body 60 during execution of the REV method, the accuracy of the REV method can be increased. Since the phase of element radio wave 2$E_p$ radiated by each element antenna $\mathbf{8}_p$ is controlled also in consideration of the distance to movable body 60, the power transmission efficiency can be higher than when the phase is controlled such that only the radiation direction tracks the movable body when power transmission antenna 50 is large or the distance to movable body 60 is small.

FIG. 62 to FIG. 65 illustrate an example of phase error φp. Although not illustrated in the drawings, wireless power transmission device 1J can execute REV method accurately even when phase error φp has any other pattern, similarly to wireless power transmission device 1.

Figure 66:
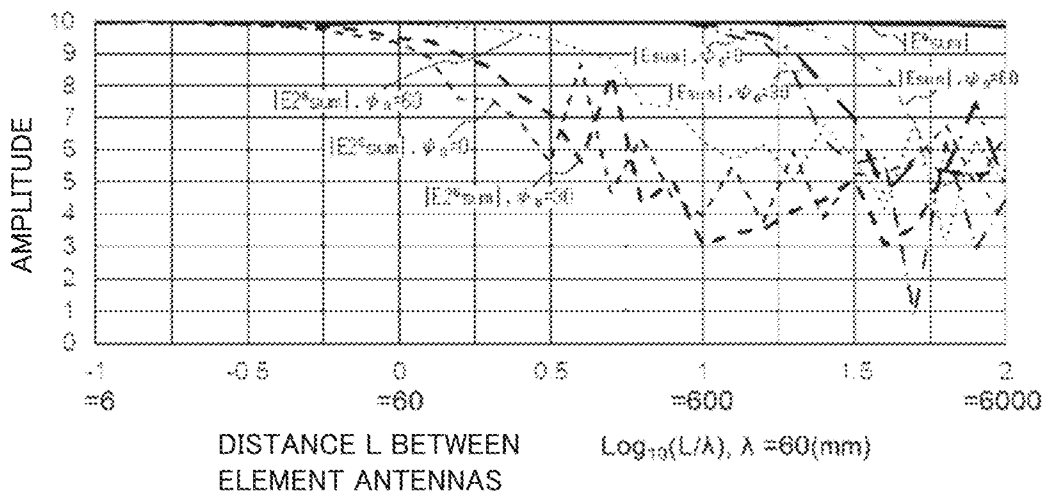
FIG. 66 is a diagram illustrating the absolute values of the amplitude of the electric field vector after correction to change in element antenna distance L in the wireless power transmission device according to the tenth embodiment and the comparative example in the operation example, for several power transmission directions $\psi_0$.

Referring to FIG. 66, the amplitude of the composite electric field vector obtained by executing the REV method is studied, where distance L between element antennas 8 which is an indicator of the size of power transmission antenna 50 is changed satisfying G=1000 m, with several power transmission directions $\psi_0$. FIG. 66 illustrates graphs indicating the amplitude of the composite electric field vector $|E^G sum|$ obtained by executing the REV method obtained by executing the REV method with changing L when the power transmission direction $\psi_0$ is one of 30 degrees, 0 degrees, and 90 degrees at the start of the REV method. Here, the basic pattern of parameters for movement of movable body 60J are $G_0$=1000 m, $\psi_0$=30 degrees, $V_0$=−30 m/sec, and $\xi_0$=90 degrees. The parameters that are not changed in the drawings take the values of the basic pattern. The horizontal axis in the graph in FIG. 66 and the like shows a value ($\log_{10}(L/\lambda)$) represented by the common logarithm of the rate of L to wavelength λ.

The amplitude of the composite electric field vector $|E^G{}_{sum}|$ obtained by performing the REV method with the radiation target position tracking movable body 60 is depicted by a thick solid line. The amplitude of the composite electric field vector $|E2^G{}_{sum}|$ obtained by executing the REV method with a power transmission beam fixed at the position of movable body 60 at the start of the REV method as the radiation target position is depicted by a broken line. The amplitude of the composite electric field vector $|E_{sum}|$ obtained by performing the REV method with only the radiation direction of a power transmission beam tracking the movable body is depicted by a long and short dashed line. These depictions are similar in other graphs.

$|E2^G{}_{sum}|$ obtained when $\psi_0$=30 degrees is satisfied is depicted by a thick broken line, $|E2^G{}_{sum}|$ obtained when $\psi_0$=0 degrees is satisfied is depicted by a broken line with an intermediate thickness, and $|E2^G{}_{sum}|$ obtained when $\psi_0$=60 degrees is satisfied is depicted by a thin broken line. $|E_{sum}|$ obtained when $\psi_0$=30 degrees is satisfied is depicted by a thick long and short dashed line, $|E_{sum}|$ obtained when $\psi_0$=0 degrees is satisfied is depicted by a long and short dashed line with an intermediate thickness, and $|E_{sum}|$ obtained when $\psi_0$=60 degrees is satisfied is depicted by a thin long and short dashed line.

As for $|E^G{}_{sum}|$ obtained when the REV method is performed by tracking movable body 60, $|E^G{}_{sum}| \geq 9.995$ is satisfied for any L when either $\psi_0$=30 degrees, $\psi_0$=0 degrees, or $\psi_0$=60 degrees is satisfied. It can be thought that whatever value power transmission direction $\psi_0$ takes and whatever value L takes, $|E^G{}_{sum}| \geq 9.995$ is satisfied.

When $\psi_0$=30 degrees is satisfied, $|E2^G{}_{sum}|$ obtained when the power transmission beam is fixed to the position of movable body 60 at the start of the REV method starts decreasing at the vicinity of $\log_{10}(L/\lambda)=-0.25$, that is, L=0.56*λ=33 mm and is decreased to $|E2^G sum|=9$ at $\log_{10}(L/\lambda)=0.2$, that is, L=1.59*λ=96 mm. When $\psi_0$=0 degrees is satisfied, L at which the decrease starts is smaller than when $\psi_0$=30 degrees is satisfied. When $\psi_0$=0 degrees is satisfied, the decrease starts from the vicinity of $\log_{10}(L/\lambda)$=−0.4, that is, L=0.4*λ=24 mm and $|E2^G_{sum}|$ is decreased to 9 at $\log_{10}(L/\lambda)$=0.08, that is, L=1.19*λ=72 mm. When $\psi_0$=60 degrees is satisfied, L at which the decrease starts is larger than when $\psi_0$=30 degrees. When $\psi_0$=60 degrees is satisfied, the decrease starts from the vicinity of $\log_{10}(L/\lambda)$=0.15, that is, L=1.4*λ=84 mm and $|E2^G_{sum}|$ is decreased to 9 at $\log_{10}(L/\lambda)$=0.65, that is, L=1.19*λ=72 mm. When $|E2^G_{sum}|$ is decreased to about less than 6, $|E2^G_{sum}|$ becomes higher or lower at random with respect to increase of L. The pattern of $|E2^G_{sum}|$ becoming higher or lower with respect to increase of L can be thought to vary depending on phase error φp.

When L is small relative to λ (for example, L<λ), change of the phase of power transmission radio wave 4 due to movement of the radiation target position is small, and the REV method can be executed accurately even when the power transmission beam is fixed to the position at the start of the REV method. This is satisfied for any power transmission direction $\psi_0$ to the position of movable body 60 at the start of the REV method.

The reasons why $|E2^G_{sum}|\geq 9$ can be maintained up to a larger L for larger $\psi_0$ are the following two reasons.

(A) When $\psi_0$ is larger, the beam width of the power transmission beam is larger.

(B) Since $\xi_0$=90 degrees is satisfied, as wo is larger, the amount of change of the presence direction caused by movement of movable body 60 is smaller.

When $\psi_0$=30 degrees is satisfied, the amplitude of composite electric field vector $|E_{sum}|$ obtained by performing the REV method with only the radiation direction of the power transmission beam tracking the movable body starts decreasing at the vicinity of $\log_{10}(L/\lambda)$=1.05, that is, L=11.2*λ=672 mm and is decreased to $|E_{sum}|$=9 at $\log_{10}(L/\lambda)$=1.31, that is, L=23.2*λ=1392 mm. When $\psi_0$=0 degrees is satisfied, L at which the decrease starts is smaller than when $\psi_0$=30 degrees is satisfied. When $\psi_0$=0 degrees is satisfied, the decrease starts at the vicinity of $\log_{10}(L/\lambda)$=1.0 that is, L=10.0*λ=600 mm and $|E_{sum}|$ is decreased to 9 at $\log_{10}(L/\lambda)$=1.25, that is, L=17.8*λ=1068 mm. When $\psi_0$=60 degrees is satisfied, L at which the decrease starts is larger than when $\psi_0$=30 degrees is satisfied. When $\psi_0$=60 degrees is satisfied, the decrease starts at the vicinity of $\log_{10}(L/\lambda)$=1.33, that is, L=21.4*λ=1284 mm and $|E_{sum}|$ is decreased to 9 at $\log_{10}(L/\lambda)$=1.51, that is, L=32.4*λ=1944 mm. When $|E_{sum}|$ is decreased to less than approximately 6, $|E2^G_{sum}|$ thereafter becomes higher or lower with respect to increase of L.

In the operation example described here, in any radiation direction $\psi_0$, when L≤600 mm is satisfied, at the distance of G=1000 m, power transmission radio wave 2 can be calculated by the formula for a far field. The reasons why $|E_{sum}|\geq 9$ can be maintained up to a larger L when $\psi_0$ is large are (A) and (B) explained above.

Figure 67:
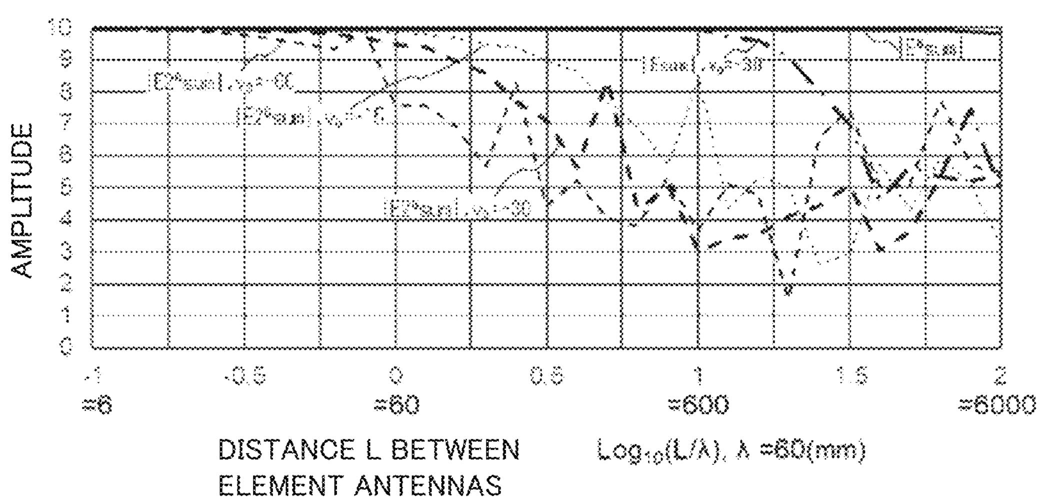
FIG. 67 is a diagram illustrating the absolute values of the amplitude of the electric field vector after correction to change in element antenna distance L in the wireless power transmission device according to the tenth embodiment and the comparative example in the operation example, for several moving speeds $v_0$ of the movable body.
Figure 68:
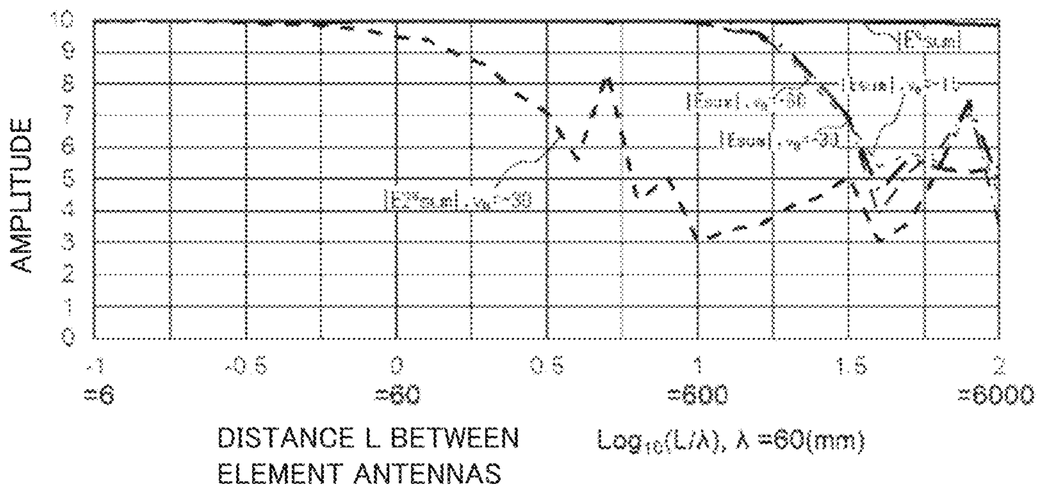
FIG. 68 is a diagram illustrating the absolute values of the amplitude of the electric field vector after correction to change in element antenna distance L in the wireless power transmission device according to the tenth embodiment and the comparative example in the operation example, for several moving speeds $v_0$ of the movable body.

Referring to FIG. 67 and FIG. 68, the amplitude of the composite electric field vector obtained by executing the REV method is studied, where distance L between element antennas 8 is changed satisfying G=1000 m, with several moving speeds $v_0$ of movable body 60. For visibility of illustration, in FIG. 67, the graphs representing $|E2^G_{sum}|$ when moving speed $v_0$ is either $v_0$=−30 (m/sec), $v_0$=−60 (m/sec), or $v_0$=−15 (m/sec) is satisfied are depicted, and the graph representing $|E_{sum}|$ only when $v_0$=−30 (m/sec) is satisfied is depicted. In FIG. 68, the graph representing $|E2^G_{sum}|$only when moving speed $v_0$ is $v_0$=−30 (m/sec) is depicted, and the graphs representing $|E_{sum}|$ when $v_0$ is either $v_0$=−30 (m/sec), $v_0$=−60 (m/sec), or $v_0$=−15 (m/sec) are depicted. In FIG. 67 and FIG. 68, the graph representing $|E2^6_{sum}|$ obtained when $v_0$=−30 (m/sec) is satisfied is depicted by a thick broken line, the graph representing $|E2^G_{sum}|$ obtained when $v_0$=−60 (m/sec) is satisfied is depicted by a broken line with an intermediate thickness, and the graph representing $|E2^G_{sum}|$ obtained when is satisfied $v_0$=−15 (m/sec) is depicted by a thin broken line. The graph representing $|E_{sum}|$ obtained when $v_0$=−30 (m/sec) is satisfied is depicted by a thick long and short dashed line, the graph representing $|E_{sum}|$ obtained when $v_0$=−60 (m/sec) is satisfied is depicted by a long and short dashed line with an intermediate thickness, and the graph representing $|E_{sum}|$ obtained when $v_0$=−15 (m/sec) is satisfied is depicted by a thin long and short dashed line.

As for $|E^G_{sum}|$ obtained when the REV method is performed by tracking movable body 60, $|E^G_{sum}|\geq 9.995$ is satisfied for any L when $v_0$ is either $v_0$=−30 (m/sec), $v_0$=−60 (in/sec), or $v_0$=−15 (m/sec) is satisfied. It can be thought that whatever value moving speed $v_0$ takes and whatever value L takes, $|E^G_{sum}|\geq 9.995$ is satisfied.

In FIG. 67 and FIG. 68, the graph of $|E2^G_{sum}|$ obtained when $v_0$=−30 (m/sec) is satisfied with the power transmission beam fixed to the position of movable body 60 at the start of the REV method is the same as the graph of $|E2^G_{sum}|$ obtained when $\psi_0$=30 degrees is satisfied in FIG. 66. As illustrated in FIG. 67, $|E2^G_{sum}|$ obtained when $v_0$=−60 (m/sec) is satisfied starts decreasing at L smaller than that obtained when $v_0$=−30 (m/sec) is satisfied. When $v_0$=−60 (m/sec) is satisfied, the decrease starts at the vicinity of $\log_{10}(L/\lambda)$=−0.7, that is, L=0.2*λ=12 mm, and $|E2^G_{sum}|$ is decreased to 9 at $\log_{10}(L/\lambda)$=−0.06, that is, L=0.88*λ=53 mm. When $v_0$=−15 (m/sec) is satisfied, L at which the decrease starts is larger than when $v_0$=−30 (m/sec) is satisfied. When $v_0$=−15 (m/sec) is satisfied, the decrease starts at the vicinity of $\log_{10}(L/\lambda)$=0.15, that is, L=1.4*λ=84 mm, and $|E2^G_{sum}|$ is decreased to 9 at $\log_{10}(L/\lambda)$=0.49, that is, L=3.09*λ=185 mm. When $|E_2{}^G_{sum}|$ is decreased to about less than 6, $|E2^G_{sum}|$ thereafter becomes higher or lower at random with respect to increase of L.

When L is small relative to λ (for example, L<λ), change of the phase of power transmission radio wave 4 due to movement of the radiation target position is small, and the REV method can be executed accurately even when the power transmission beam is fixed to the position at the start of the REV method. This is satisfied for any moving speed $v_0$ of movable body 60.

$|E2^G_{sum}|\geq 9$ can be maintained up to a larger L when moving speed $v_0$ is small for the following reason.

(C) When moving speed $v_0$ is small, the amount of change of the moving distance and the presence direction of movable body 60 during a period in which the REV method is executed is small.

In FIG. 67 and FIG. 68, the graph of the amplitude of composite electric field vector $|E_{sum}|$ obtained when $v_0$=−30 (m/sec) is satisfied and the REV method is performed with only the radiation direction of the power transmission beam tracking the movable body is the same as the graph of $|E_{sum}|$ obtained when $\psi_0$=30 degrees is satisfied in FIG. 66. As illustrated in FIG. 68, the graphs of $|E_{sum}|$ obtained when $v_0$=−60 (m/sec) is satisfied or when $v_0$=−15 (m/sec) is satisfied are substantially the same as the graph when $v_0$=−30 (in/sec) is satisfied. L at which $|E_{sum}|$ is decreased to 9 in the range of $v_0$=−15 to −60 (m/sec) is in the range of $\log_{10}(L/\lambda)$=1.27 to 1.32, that is, L=18.8*λ to 20.7*λ=1130 to 1240 mm.

In the operation example described here, when L≤600 mm is satisfied and moving speed $v_0$ takes any value, at the distance of G=1000 m, power transmission radio wave 2 can be calculated by the formula for a far field.

Figure 69:
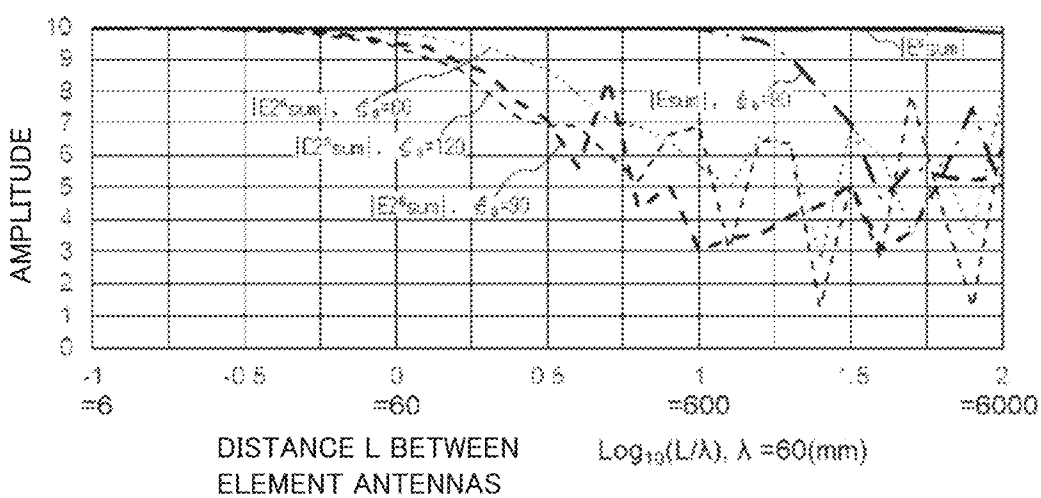
FIG. 69 is a diagram illustrating the absolute values of the amplitude of the electric field vector after correction to change in element antenna distance L in the wireless power transmission device according to the tenth embodiment and the comparative example in the operation example, for several moving directions $\xi_0$ of the movable body.
Figure 70:
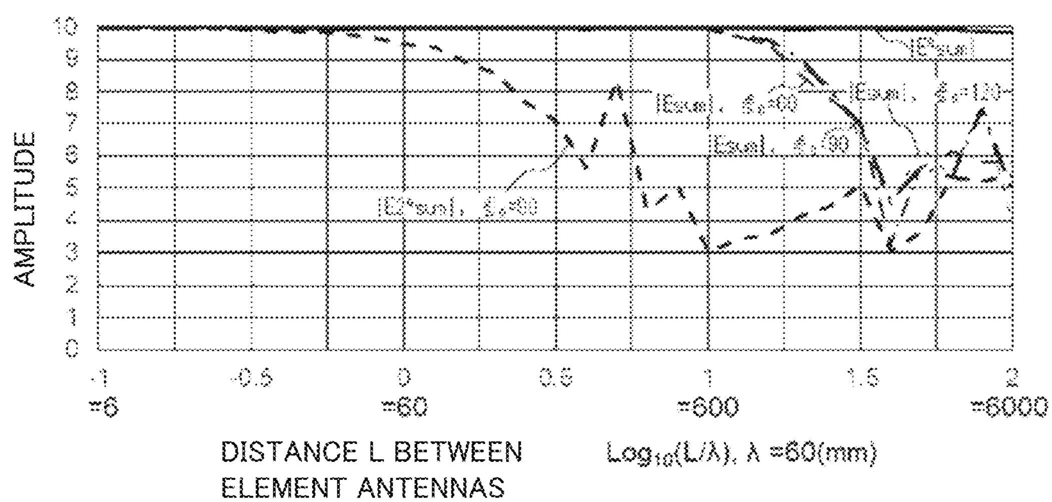
FIG. 70 is a diagram illustrating the absolute values of the amplitude of the electric field vector after correction to change in element antenna distance L in the wireless power transmission device according to the tenth embodiment and the comparative example in the operation example, for several moving directions $\xi_0$ of the movable body.

Referring to FIG. 69 and FIG. 70, the amplitude of the composite electric field vector obtained by executing the REV method is studied, where distance L between element antennas 8 is changed satisfying G=1000 m, with several moving directions $\xi_0$ of movable body 60. For visibility of illustration, in FIG. 69, the graphs representing $|E2^G_{sum}|$ obtained when moving direction $\xi_0$ is either $\xi_0$=90 degrees, $\xi_0$=120 degrees, or $\xi_0$=60 degrees is satisfied are depicted, and the graph representing $|E_{sum}|$ only obtained when $\xi_0$=90 degrees is satisfied is depicted. In FIG. 70, the graph representing $|E2^G_{sum}|$ only when moving direction $\xi_0$ is $\xi_0$=90 degrees is satisfied is depicted, and the graphs representing $|E_{sum}|$ obtained when either $\xi_0$=90 degrees, $\xi_0$=120 degrees, or $\xi_0$=60 degrees is satisfied are depicted. In FIG. 69 and FIG. 70, the graph representing $|E2^G_{sum}|$ obtained when $\xi_0$=90 degrees is satisfied is depicted by a thick broken line, the graph representing $|E2^G_{sum}|$ obtained when $\xi_0$=120 degrees is satisfied is depicted by a broken line with an intermediate thickness, and the graph representing $|E2^G_{sum}|$ obtained when $\xi_0$=60 degrees is satisfied is depicted by a thin broken line. The graph representing $|E_{sum}|$ obtained when $\xi_0$=90 degrees is satisfied is depicted by a thick long and short dashed line, the graph representing $|E_{sum}|$ obtained when $\xi_0$=120 degrees is satisfied is depicted by a long and short dashed line with an intermediate thickness, and the graph representing $|E_{sum}|$ obtained when $\xi_0$=60 degrees is satisfied is depicted by a thin long and short dashed line.

As for $|E^G_{sum}|$ obtained when the REV method is performed by tracking movable body 60, $|E^G\text{sum}|≥9.995$ is satisfied for any L when either $\xi_0$=90 degrees, $\xi_0$=120 degrees, or $\xi_0$=60 degrees is satisfied. It can be thought that whatever value moving direction $\xi_0$ takes and whatever value L takes, $|E^G\text{sum}|≥9.995$ is satisfied.

In FIG. 69 and FIG. 70, the graph of $|E2^G_{sum}|$ obtained when $\xi_0$=90 degrees is satisfied with the power transmission beam fixed to the position of movable body 60 at the start of the REV method is the same as the graph of $|E2^G_{sum}|$ obtained when $\psi_0$=30 degrees is satisfied in FIG. 66. As illustrated in FIG. 69, $|E2^G_{sum}|$ obtained when $\xi_0$=120 degrees is satisfied starts decreasing at L smaller than when $\xi_0$=90 degrees is satisfied. When $\xi_0$=120 degrees is satisfied, the decrease starts from the vicinity of $\log_{10}(L/\lambda)=-0.35$, that is, L=0.45*λ=27 mm and $|E2^G_{sum}|$ is decreased to 9 at $\log_{10}(L/\lambda)=0.13$, that is, L=1.36*λ=81 mm. When $\xi_0$=60 degrees is satisfied, L at which the decrease starts is larger than when $\xi_0$=90 degrees is satisfied. When $\xi_0$=60 degrees is satisfied, the decrease starts from the vicinity of $\log_{10}(L/\lambda)=-0.1$, that is, L=0.79*λ=47 mm and $|E2^G_{sum}|$ is decreased to 9 at $\log_{10}(L/\lambda)=0.41$, that is, L=2.58*λ=155 mm. When $|E2^G_{sum}|$ is decreased to about less than 6, $|E2^G_{sum}|$ thereafter becomes higher or lower at random with respect to increase of L.

When L is small relative to λ (for example, L<λ), change of the phase of power transmission radio wave 4 due to movement of the radiation target position is small, and the REV method can be executed accurately even when the power transmission beam is fixed to the position at the start of the REV method. This is satisfied for any moving direction $\xi_0$ of movable body 60.

The reason why $|E2^G_{sum}|≥9$ can be maintained up to a larger L for smaller moving direction $\xi_0$ is the following reason.

(D) Since power transmission direction $\psi_0$=30 degrees is satisfied, as $\xi_0$ is smaller, the amount of change of the presence direction caused by movement of movable body 60 is smaller.

In FIG. 69 and FIG. 70, the graph of the amplitude of composite electric field vector $|E_{sum}|$ obtained when $\xi_0$=90 degrees is satisfied and the REV method is performed with only the radiation direction of the power transmission beam tracking the movable body is the same as the graph of $|E_{sum}|$ obtained when $\psi_0$=30 degrees is satisfied in FIG. 66. As illustrated in FIG. 68, the graphs of $|E_{sum}|$ obtained when $\xi_0$=120 degrees is satisfied or when $\xi_0$=60 degrees is satisfied are substantially the same as the graph when $\xi_0$=90 degrees is satisfied. L at which $|E_{sum}|$ is decreased to 9 in the range of $\xi_0$=60 to 120 degrees is in the range of $\log_{10}(L/\lambda)$ =1.26 to 1.32, that is, L=18.1*λ to 20.7*λ=1090 to 1240 mm.

In the operation example described here, when L≤600 mm is satisfied and moving direction $\xi_0$ takes any value, at the distance of G=1000 m, power transmission radio wave 2 can be calculated by the formula for a far field.

In the wireless power transmission device in which the position of movable body 60 is recognized by direction and distance and the phases of power transmission radio waves are controlled to be matched at the position where movable body 60 is present, the REV method is executed by tracking the movable body during execution of the REV method, whereby the REV method can be executed accurately not depending on distance L between element antennas 8 that determines the size of the power transmission antenna, power transmission direction ψ, distance G to the movable body, and moving speed $v_0$ and moving direction $\xi_0$ of the movable body. Further, after execution of the REV method, wireless power transmission to the radiation target position determined by power transmission direction ψ and distance G can be performed efficiently, not depending on distance L between antennas 8, power transmission direction ψ, distance G, moving speed $v_0$, and moving direction $\xi_0$.

In the wireless power transmission device in which the direction in which the movable body is present is set as the radiation direction of a power transmission radio wave, and the phases of power transmission radio waves are controlled to be matched at a distance of a far field at which element radio wave 2$E_p$ for each element antenna 8$_p$ travels parallel, REV method is executed by tracking the movable body during execution of the REV method in a state in which the movable body is present at a position at which wavelength λ of the power transmission radio wave, distance L between antennas 8, and distance G to the movable body are a far field, whereby the REV method can be executed accurately not depending on transmission direction ψ, distance G to the movable body, moving speed $v_0$ and moving direction of the movable body. Further, after execution of the REV method, in a state in which the movable body is present at distance G that is a far field determined by wavelength λ and distance L between antennas 8, wireless power transmission in power transmission direction ψ can be performed accurately, not depending on power transmission direction ψ, distance G, moving speed $v_0$, and moving direction $\xi_0$.

A modulated wave in which not only whether the power transmission radio wave is to be pulse-modulated but also timing information is included as a digital signal in a power transmission radio wave radiated by the power transmitter may be sent. The movable body may demodulate the power transmission radio wave and send the demodulated information by a pilot signal. When some process is performed in the movable body, the time required to perform the process in the movable body is set constant, so that the time to go back and forth between the wireless power transmission device and the movable body can be measured by subtracting the constant time.

The movable body distance may be measured based on the propagation time that is the time taken for a communication radio wave used for communication between the wireless power transmission device and the movable body to propagate both ways or one way between communication device 30 and movable body communication device 20.

The distance measuring instrument that measures the distance from the position of the power transmission antenna to the position of the movable body may radiate distance-measurement waves such as laser light, non-laser light, radio waves, ultrasonic waves, or the like and receive distance-measurement reflected waves reflected by the movable body. The distance to the movable body may be measured based on the elapsed time from transmission of a distance-measurement wave to reception of a distance-measurement reflected wave. The distance is measured based on the measured elapsed time and the speed of the radiated distance-measurement wave. Instead of only being reflected by the movable body, the received signal may be amplified by the movable body and the amplified signal may be radiated in the direction of the wireless power transmission device.

The arrival time to the movable body may be measured in the movable body and the distance may be measured in the movable body, instead of measuring the time difference between both ways to the movable body. The movable body may radiate a radio wave and the like, and the wireless power transmission device may measure the time taken for the radio wave to reach the wireless power transmission device and measure the distance to the movable body. The movable body may radiate a radio wave and the like, and the movable body may measure the distance based on the time required for going to the wireless power transmission device and returning. The distance measured by the movable body may be sent by the movable body communication device or may be sent by modulating the pilot signal.

A radio wave or the like may be processed with spread spectrum by pseudo random number codes and the like, and the propagation time of the radio wave may be measured based on the code position subjected to reverse spread.

Not only the presence direction of the movable body but also the movable body position that is the position where the movable body is present may be measured, and the movable body position may be set as the radiation target position.

These are applicable to the other embodiments.

Eleventh Embodiment

Figure 71:
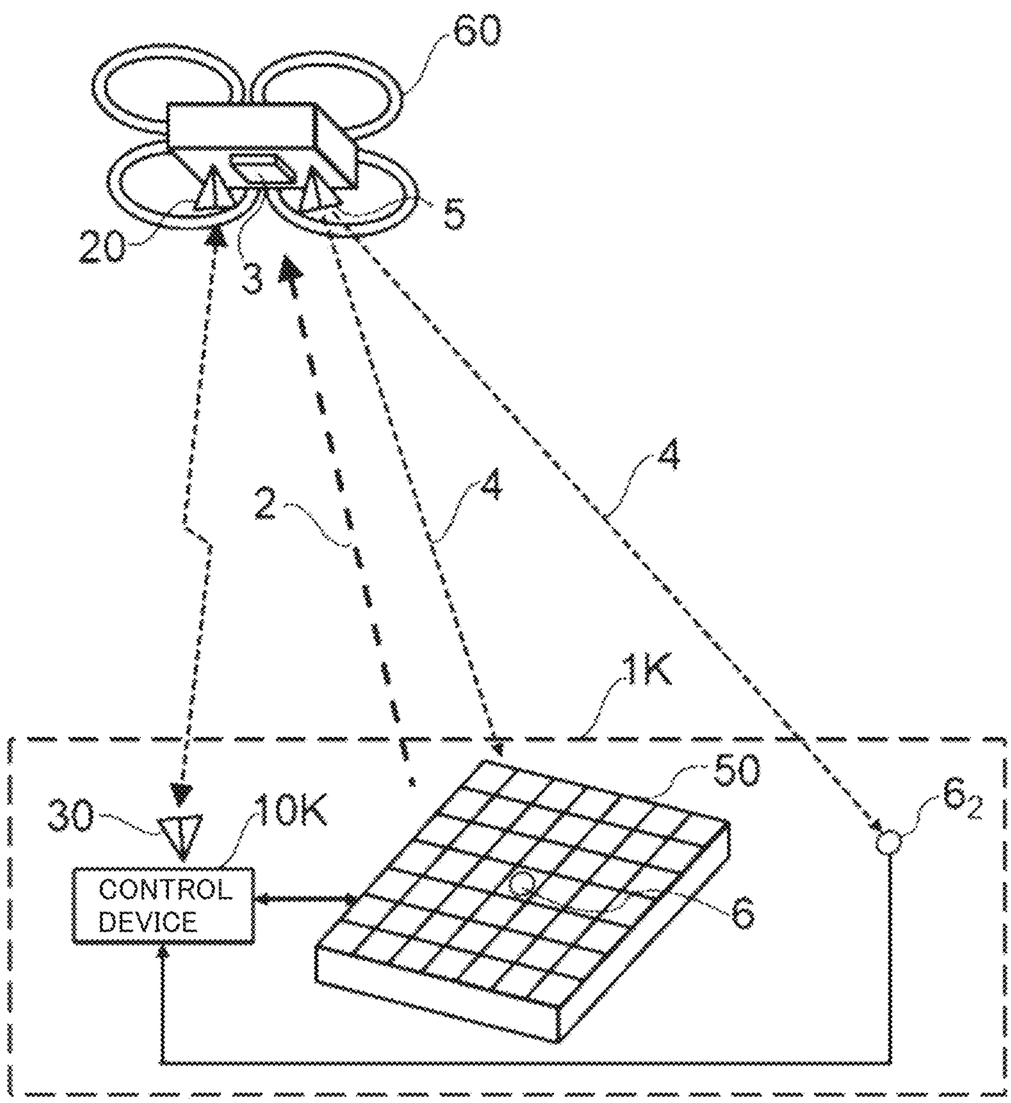
FIG. 71 is a schematic diagram illustrating a configuration of a wireless power transmission system for a movable body using a wireless power transmission device according to an eleventh embodiment.
Figure 72:
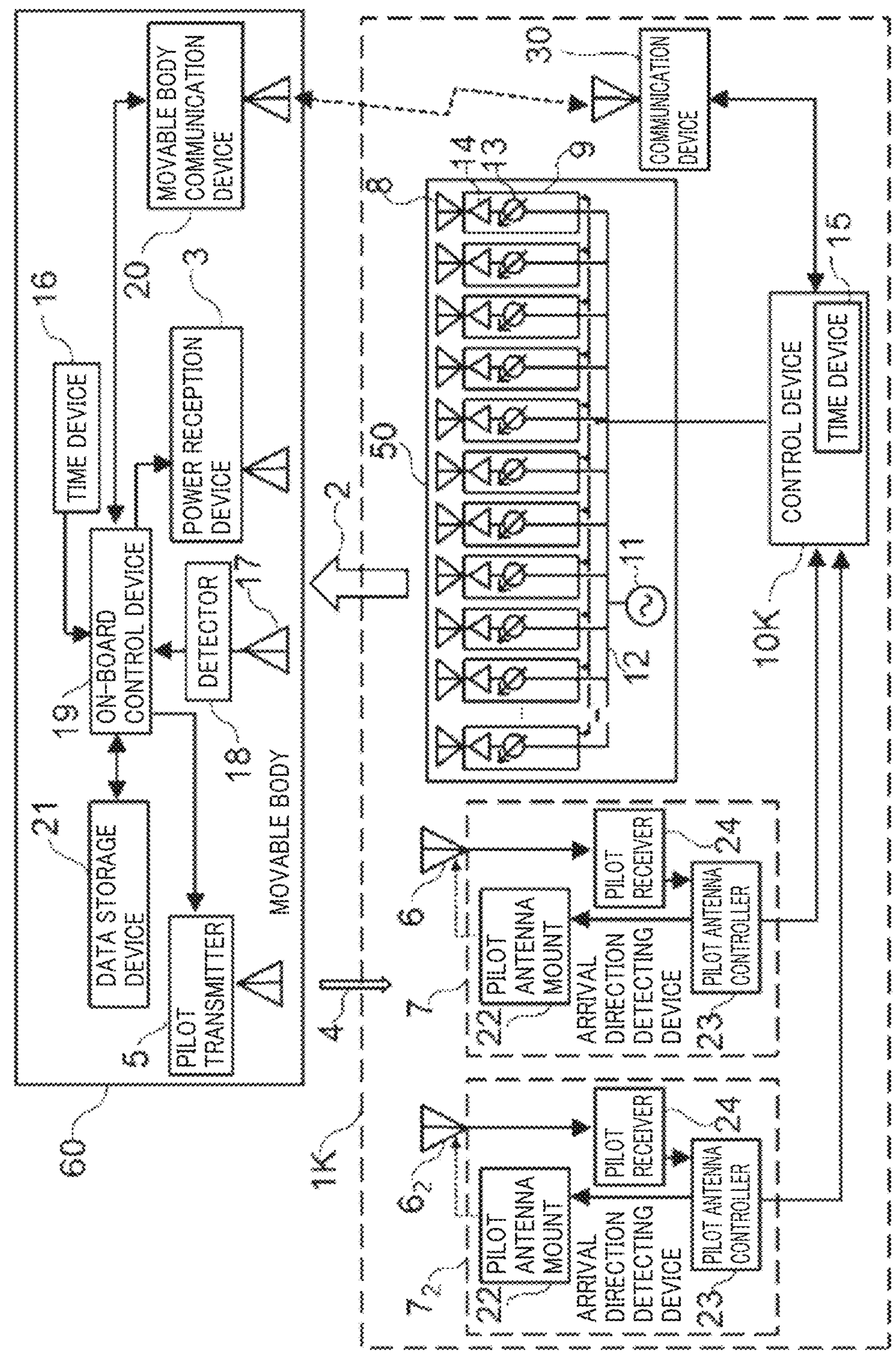
FIG. 72 is a diagram illustrating an overall configuration of the wireless power transmission system for a movable body using a wireless power transmission device according to the eleventh embodiment.
Figure 73:
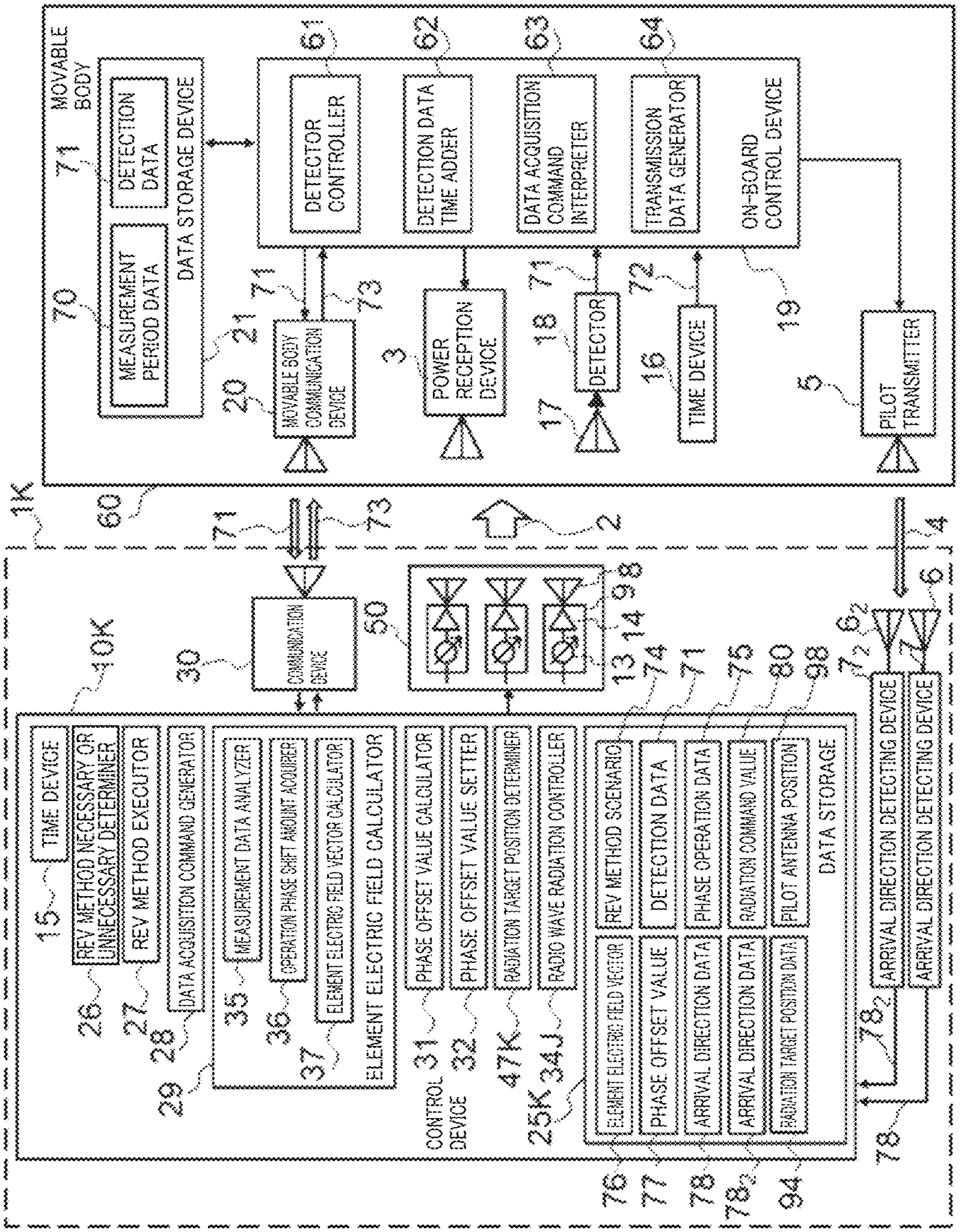
FIG. 73 is a block diagram illustrating a functional configuration of the wireless power transmission device and the movable body according to the eleventh embodiment.

In an eleventh embodiment, the tenth embodiment is modified such that the movable body position is measured using at least two pilot antennas for mono-pulse angle measurement. Referring to FIG. 71 to FIG. 73, a configuration of the wireless power transmission system for a movable body according to the eleventh embodiment is described. In the eleventh embodiment, the movable body is not modified. Only the wireless power transmission device is modified.

In FIG. 71, points different from FIG. 1 in the first embodiment are described. In FIG. 72, points different from FIG. 2 in the first embodiment are described. In a wireless power transmission device 1K, a control device 10K is modified. Wireless power transmission device 1K includes, in addition to pilot antenna 6 arranged at the center of power transmission antenna 50, a pilot antenna 6, and another arrival direction detecting device 7$_2$ (illustrated in FIG. 72) at a distance from power transmission antenna 50. Pilot antennas 6 and 6$_2$ are installed at different locations. Pilot antenna 6, is similar to pilot antenna 6. Pilot antenna 6$_2$ receives pilot signal 4 and generates a pilot reception signal. Arrival direction detecting device 7$_2$ has the same configuration as arrival direction detecting device 7. Arrival direction detecting device 7$_2$ performs mono-pulse angle measurement on the pilot reception signal from pilot antenna 6$_2$ to determine arrival direction data 78$_2$ and outputs the same to control device 10K.

In FIG. 73, points different from FIG. 5 in the first embodiment are described. Control device 10K does not include radiation direction determiner 33 and includes a radiation target position determiner 47K. Radiation target position determiner 47K determines a radiation target position determined by the radiation direction and the distance from power transmission antenna 50. In control device 10K, a data storage 25K and a radio wave radiation controller 34J are modified. Radio wave radiation controller 34J is similar to that included in control device 10J.

Data storage 25K has radiation target position data 94 instead of radiation direction data 79. Radiation target position data 94 is data representing the radiation target position set to be a target to radiate a radio wave by power transmission antenna 50. Radiation target position data 94 is identical to that stored in data storage 25J. Data storage 25K also has arrival direction data 78$_2$ and pilot antenna position 98. Arrival direction data 78$_2$ is the arrival direction of pilot signal 4 at the position of pilot antenna 6$_2$ that is detected by arrival direction detecting device 7$_2$. Pilot antenna position 98 is data representing the positions of pilot antennas 6 and 6$_2$ with respect to power transmission antenna 50.

Pilot antenna position 98 is pilot antenna installation location data that is data representing pilot antenna installation locations that are the locations where pilot antennas 6 and 6$_2$ are installed. Data storage 25K is an installation location data storage that stores the pilot antenna installation location data.

Radiation target position determiner 47K determines the position of movable body 60 (movable body position) by triangulation using arrival direction data 78 and 78$_2$ and pilot antenna position 98. Radiation target position determiner 47K determines the movable body position with respect to pilot antenna 6 as the radiation target position. Radiation target position determiner 47K sets the determined radiation target position as radiation target position data 94 in data storage 25K. Here, assuming that pilot transmitter 5 and power reception device 3 are near to each other in movable body 60, the position of pilot transmitter 5 is set as the radiation target position.

The method by which radiation target position determiner 47K determines the position of pilot transmitter 5 from arrival direction data 78 and 78$_2$ and pilot antenna position 98 is described.

The following variables are defined.

Point $PA_1$: the position of pilot antenna 6 set in pilot antenna position 98.

Point $PA_2$: the position of pilot antenna 6$_2$ set in pilot antenna position 98.

$VA_1$: the directional vector represented by arrival direction data 78.

$VA_2$: the directional vector represented by arrival direction data 78.

Point $P_0$: the assumed position of pilot transmitter 5.

$VB_1$: the directional vector from point $PA_1$ toward point $P_0$.

$VB_2$: the directional vector from point $PA_2$ toward point $P_0$.

$EV(P_0)$: the evaluation function of an error in the directional vector determined from point $P_0$.

Here, it is assumed that the magnitudes of all directional vectors $VA_1$, $VA_2$, $VB_1$, and $VB_2$ are the same. That is, the following equation is satisfied.

$$|VA_1|=|VA_2|=|VB_1|=|VB_2| \quad (77)$$

$EV(P_0)$ is defined as follows.

$$EV(P_0)=|VA_1-VB_1|^2+|VA_2-VB_2|^2 \quad (78)$$

Position $P_0$ of pilot transmitter 5 is determined such that $EV(P_0)$ calculated by equation (78) is minimized.

When there are three or more Na pilot antennas 6, $EV(P_0)$ is changed as follows.

$$EV(P_0)=\Sigma|VA_k-VB_k|^2 \quad (79)$$

In equation (79), Σ means summation for k=1, 2, . . . , Na. Such position $P_0$ that minimizes equation (79) is set as the position of pilot communication device 5.

Radiation target position determiner 47K is a movable body position determiner that determines the movable body position based on at least two arrival directions and the pilot antenna installation location data. Radiation target position determiner 47K is a presence direction determiner that determines the presence direction based on the power transmission antenna position and the movable body position. Radiation target position determiner 47K is a movable body distance measurer that measures the movable body distance based on the power transmission antenna position and the movable body position.

Figure 74:
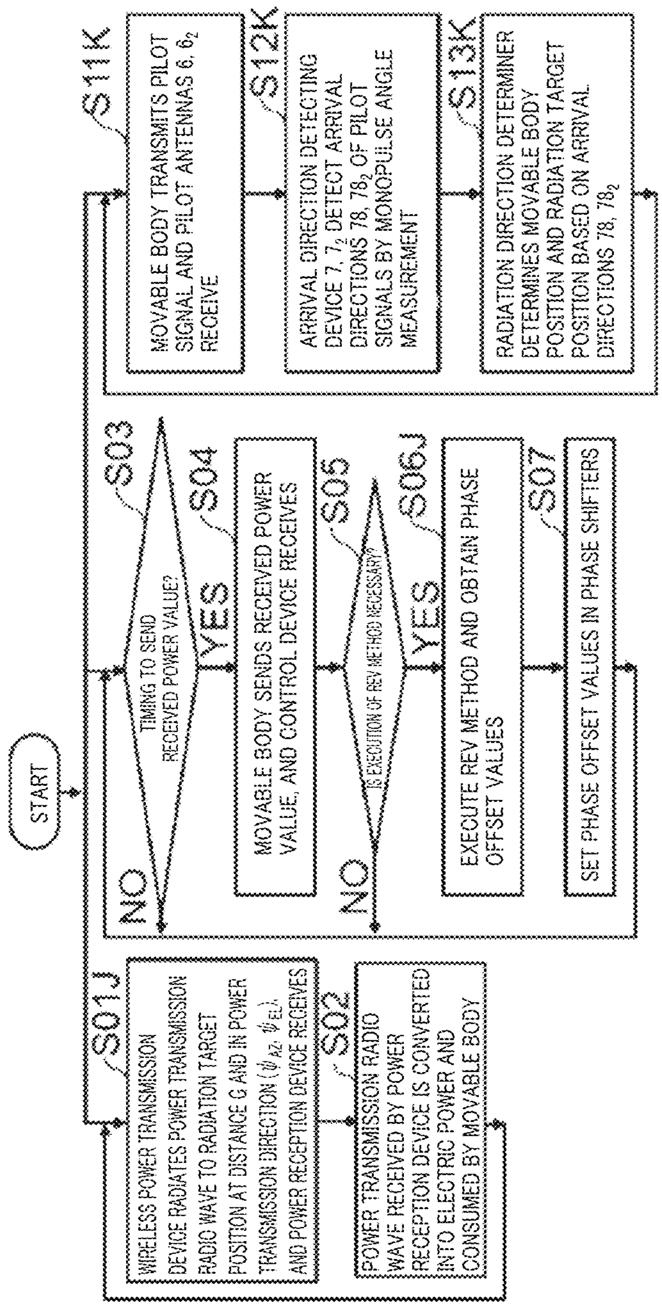
FIG. 74 is a flowchart illustrating a power transmission procedure to a movable body by the wireless power transmission device according to the eleventh embodiment.

The operation is described. FIG. 74 is a flowchart illustrating a power transmission procedure to a movable body by the wireless power transmission device according to the eleventh embodiment. In FIG. 74, points different from FIG. 8 in the first embodiment are described.

In wireless power transmission device 1K, SW and S06J are modified as in wireless power transmission device 1J. At step S01J, wireless power transmission device 1K radiates power transmission radio wave 2, using the position at distance G and in the power transmission direction ($\psi_{AZ}$, $\psi_{EL}$) where movable body 60 is present as the radiation target position. Power reception device 3 included in movable body 60 receives power transmission radio wave 2. The process of executing the REV method at S06J is illustrated in FIG. 61, as in wireless power transmission device 1J.

Steps S11K to S13K are modified. At S11K, pilot transmitter 5 included in movable body 60 transmits pilot signal 4. Pilot antennas 6 and 6$_2$ included in wireless power transmission device 1 receive pilot signal 4 and generate a pilot reception signal. At step S12K, arrival direction detecting devices 7 and 7$_2$ each detect the arrival direction of pilot signal 4 by mono-pulse angle measurement for the pilot reception signal. At step S13K, radiation target position determiner 47K determines the movable body position based on arrival direction data 78 and 78$_2$. Further, the movable body position is converted into a relative position with respect to pilot antenna 2 and radiation target position 84 is determined. The radiation target position is a single point in which the power transmission direction ($\psi_{AZ}$, $\psi_{EL}$) and distance G are determined. The power transmission direction is the direction from pilot antenna 6 toward the radiation target position. The pilot antenna 6 is installed at the center of the opening area of power transmission antenna 50. The position of movable body 60 after the elapse of a predetermined time may be predicted based on the radiation target position and the moving speed of movable body 60, and the predicted position may be set as the radiation target position. Power transmission antenna 50 radiates power transmission radio wave 2 at S01J to the radiation target position determined at S13K.

After S13K is performed, the process returns to S11K. The process at S11K to S13K is performed periodically in predetermined cycles. The length of one cycle is determined such that the difference between the radiation target position calculated last time and the current radiation target position is within an acceptable range even when movable body 60 moves at the possible maximum moving speed.

Wireless power transmission device 1K operates similarly to wireless power transmission device 1J and a similar effect can be obtained. Since the power transmission beam tracks movable body 60 during execution of the REV method, the accuracy of the REV method can be increased.

Twelfth Embodiment

Figure 75:
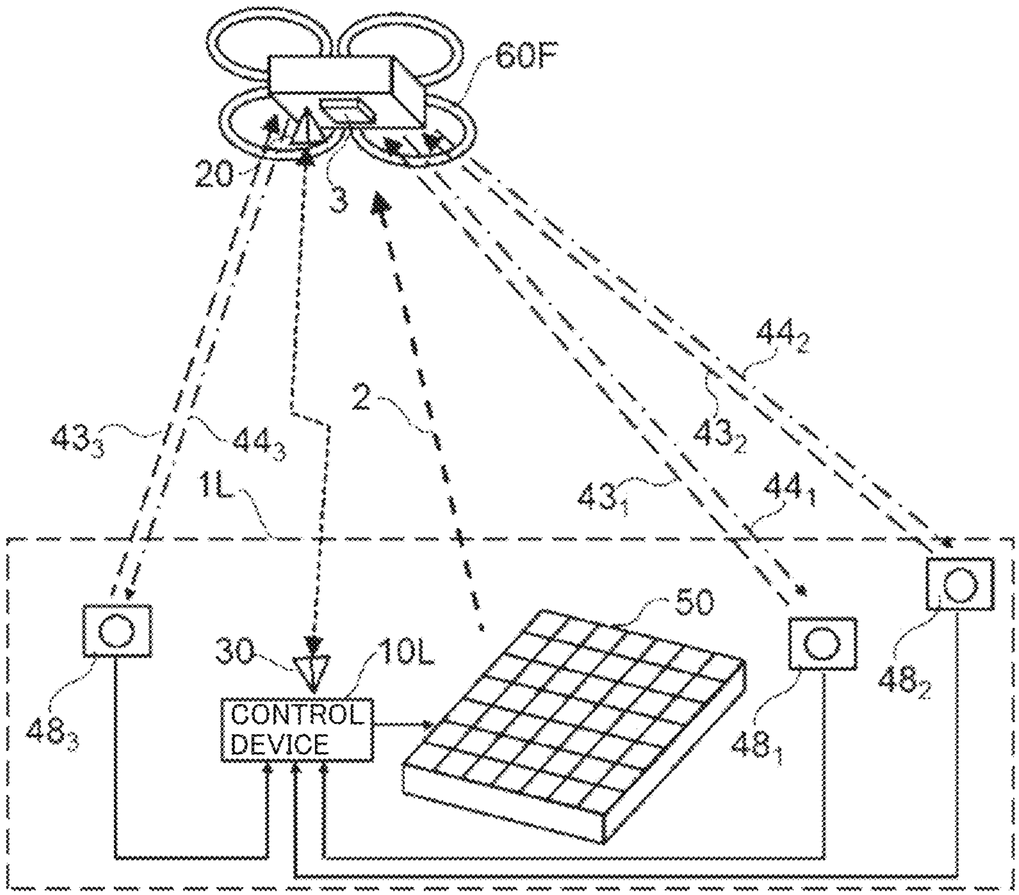
FIG. 75 is a schematic diagram illustrating a configuration of a wireless power transmission system for a movable body using a wireless power transmission device according to a twelfth embodiment.
Figure 76:
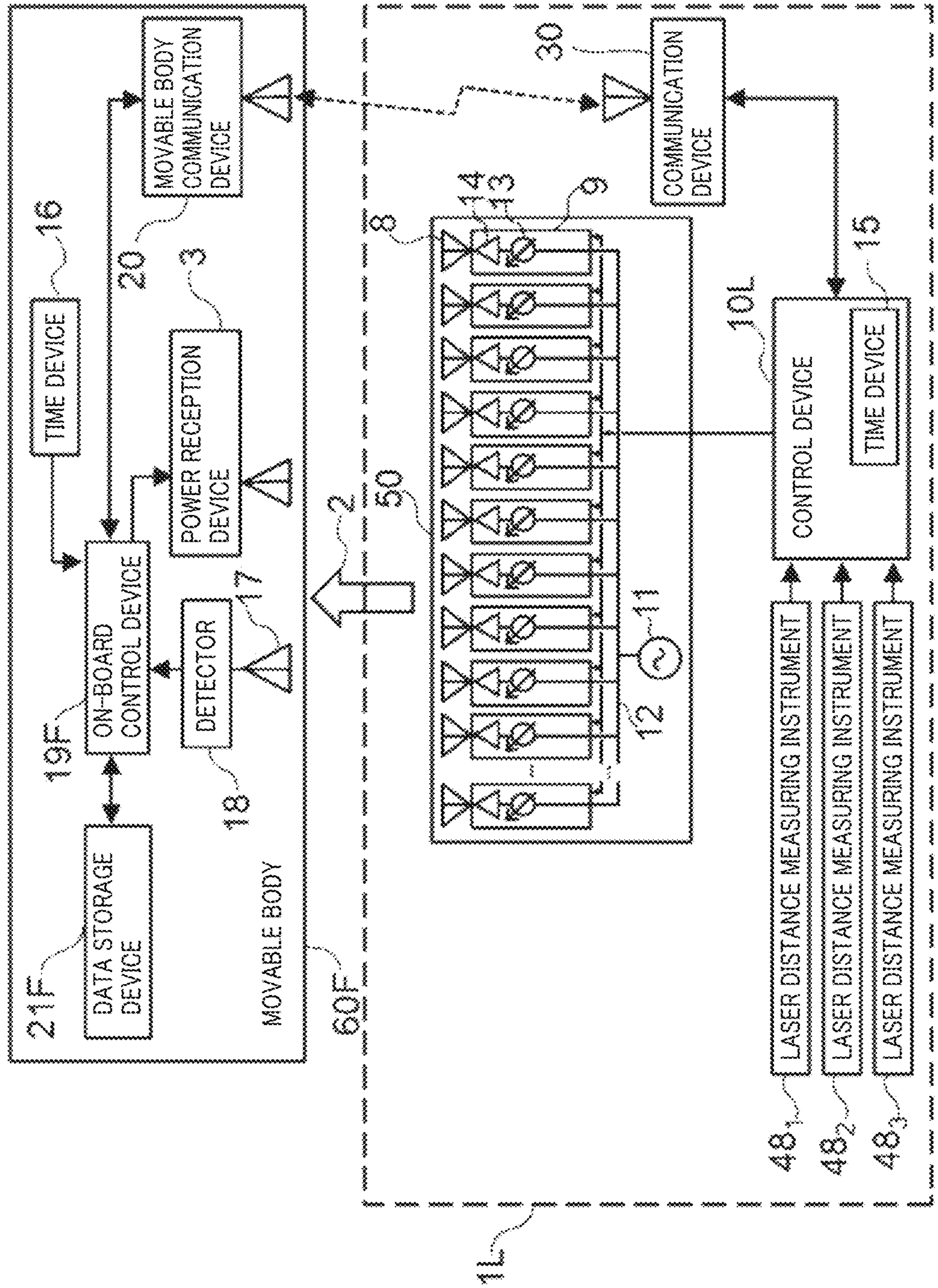
FIG. 76 is a diagram illustrating an overall configuration of the wireless power transmission system for a movable body using a wireless power transmission device according to the twelfth embodiment.
Figure 77:
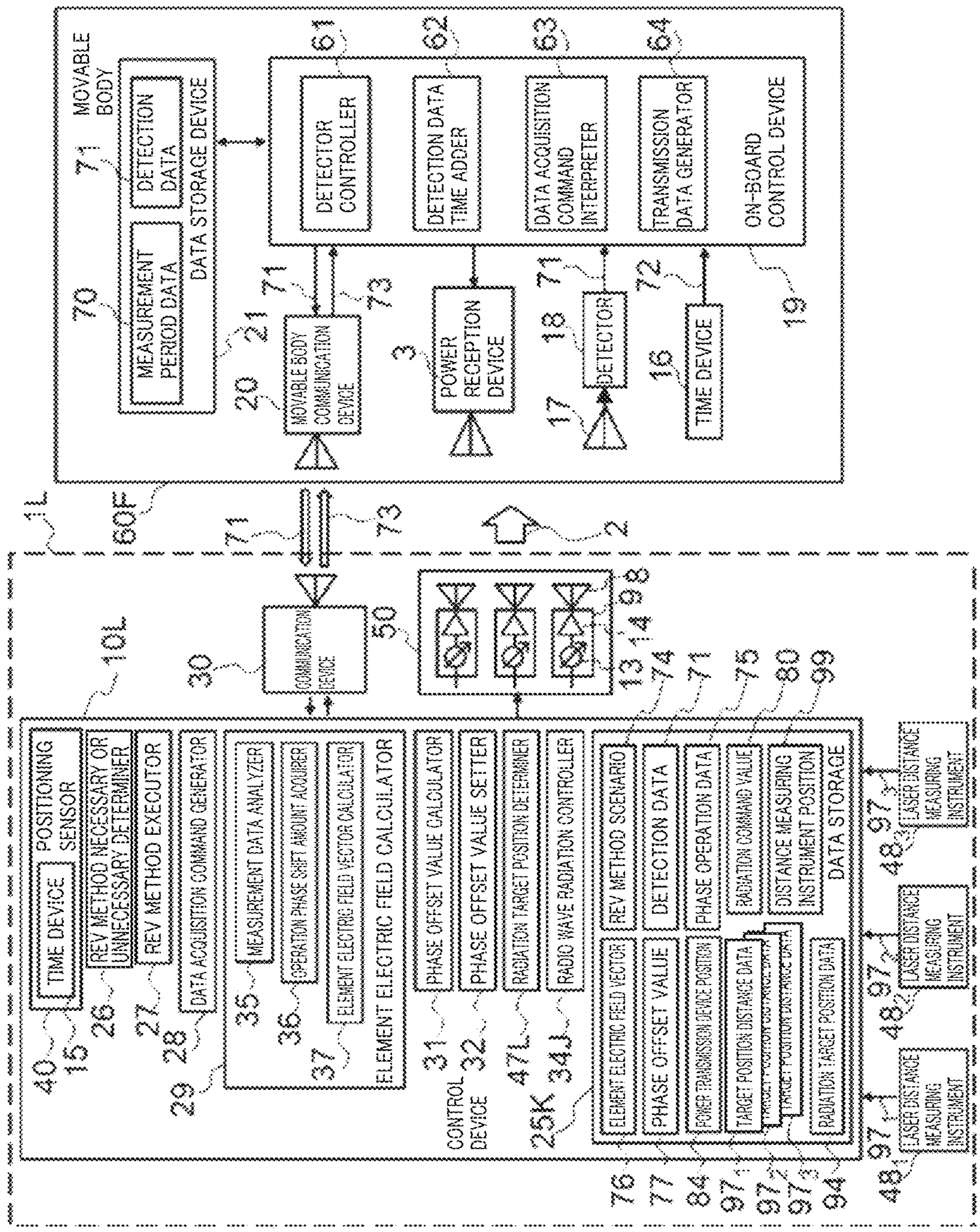
FIG. 77 is a block diagram illustrating a functional configuration of the wireless power transmission device and the movable body according to the twelfth embodiment.

In a twelfth embodiment, the tenth embodiment is modified such that the movable body position is measured using three or more optical distance measuring instruments installed at different positions. In the twelfth embodiment, a movable body that does not include a pilot transmitter is used as in the seventh embodiment. The wireless power transmission device is modified. Referring to FIG. 75 to FIG. 77, a configuration of a wireless power transmission system for a movable body, and the structure of a wireless power transmission device and a movable body according to the twelfth embodiment is described.

In FIG. 75, points different from FIG. 1 in the first embodiment are described. In FIG. 76, points different from FIG. 2 in the first embodiment are described. A movable body 60F does not include pilot transmitter 5 and does not transmit pilot signal 4. Movable body 60F is not equipped with a position sensor and the like. A wireless power transmission device 1L does not include pilot antenna 6.

Wireless power transmission device 1L includes three laser distance measuring instruments 48$_1$, 48$_2$, and 48$_3$. Laser distance measuring instruments 48$_1$, 48$_2$, and 48$_3$ each are a distance measuring instrument that measures the distance from its position to movable body 60F. Laser distance measuring instruments 48$_1$, 48$_2$, and 48$_3$ radiate laser beams 43$_1$, 43$_2$, and 43$_3$, respectively. Laser beams 43$_1$, 43$_2$, and 43$_3$ are reflected by movable body 60F into reflected laser beams 44$_1$, 44$_2$, and 44$_3$, respectively. Laser distance measuring instruments 48$_1$, 48$_2$, and 48$_3$ measure the time from emission of laser beams 43$_1$, 43$_2$, and 43$_3$ to reception of reflected laser beams 44$_1$, 44$_2$, and 44$_3$, respectively. Laser distance measuring instruments 48$_1$, 48$_2$, and 48$_3$ obtain distances $GA_1$, $GA_2$, and $GA_3$ from their positions to movable body 60F based on the measured time. Laser distance measuring instruments 48$_1$, 48$_2$, and 48$_3$ send the measured distances $GA_1$, $GA_2$, and $GA_3$ to control device 10L.

Control device 10L determines the position of movable body 60 from distances $GA_1$, $GA_2$, and $GA_3$ and data of the installation locations of laser distance measuring instruments 48$_1$, 48$_2$, and 48$_3$. Here, the point at distances $GA_1$, $GA_2$, and $GA_3$ from the installation locations of laser distance measuring instruments 48$_1$, 48$_2$, and 48$_3$ is determined uniquely, and this point is the position of movable body 60. In order to obtain the position of movable body 60 accurately, it is preferable that the installation locations of laser distance measuring instruments 48$_1$, 48$_2$, and 48$_3$ are sufficiently distant from each other.

In FIG. 77, points different from FIG. 5 in the first embodiment are described. Control device 10L does not include radiation direction determiner 33 and includes a radiation target position determiner 47L. Control device 10L includes positioning sensor 40. Radiation target position determiner 47L determines the movable body position that is the position of movable body 60 using the distance to movable body 60F measured by laser distance measuring instruments $48_1$, $48_2$, and $48_3$. Laser distance measuring instruments $48_1$, $48_2$, and $48_3$ and radiation target position determiner 47L constitute a movable body position measurer that measures the movable body position. Radiation target position determiner 47L converts the movable body position into a radiation target position that is a relative position to the position of the power transmission antenna. The radiation target position is represented by the radiation direction and the distance to the radiation target position.

In control device 10L, a data storage 25L and radio wave radiation controller 34J are modified. Radio wave radiation controller 34J is similar to that included in control device 10J.

Data storage 25L has radiation target position data 94 instead of radiation direction data 79. Data storage 25L also has power transmission device position 84, target position distance data $97_1$, $97_2$, and $97_2$, and distance measuring instrument position 99. Power transmission device position 84 is the position of power transmission antenna 50J measured by positioning sensor 40. Target position distance data $97_1$, $97_2$, and $97_2$ are distances $GA_1$, $GA_2$, and $GA_3$ measured by laser distance measuring instruments $48_1$, $48_2$, and $48_3$. Distance measuring instrument position 99 is data representing the installation locations of laser distance measuring instruments $48_1$, $48_2$, and $48_3$.

Distance measuring instrument position 99 is distance measuring instrument installation location data that is data representing the installation locations of laser distance measuring instruments $48_1$, $48_2$, and $48_3$. Data storage 25L is an installation location data storage that stores the distance measuring instrument installation location data.

Radiation target position determiner 47L determines the position of movable body 60F (movable body position) by trilateration using target position distance data $97_1$, $97_2$, and $97_2$ and distance measuring instrument position 99. The position in three-dimensional space is determined uniquely when the distances from three points at known positions are determined. Since the positions of laser distance measuring instruments $48_1$, $48_2$, and $48_3$ are known and distances $GA_1$, $GA_2$, and $GA_3$ from laser distance measuring instruments $48_1$, $48_2$, and $48_3$ are determined, the position of movable body 60F is determined. Radiation target position determiner 47L subtracts power transmission device position 84 from the movable body position. The position obtained by subtraction is stored as radiation target position data 94 in data storage 25K.

When there are four or more laser distance measuring instruments $48_k$, the position of movable body 60F is assumed, the distance from each laser distance measuring instrument $48_k$ is calculated, and the position where, for example, the square sum of the difference from the measured distance actually is smallest is set as the position of movable body 60F.

Radiation target position determiner 47L is a movable body position determiner that determines the movable body position based on the distance measured by at least three distance measuring instruments and the distance measuring instrument installation location data. Radiation target position determiner 47L is a presence direction determiner that determines the presence direction based on the power transmission antenna position and the movable body position. Radiation target position determiner 47L is a movable body distance measurer that measures the movable body distance based on the power transmission antenna position and the movable body position.

Figure 78:
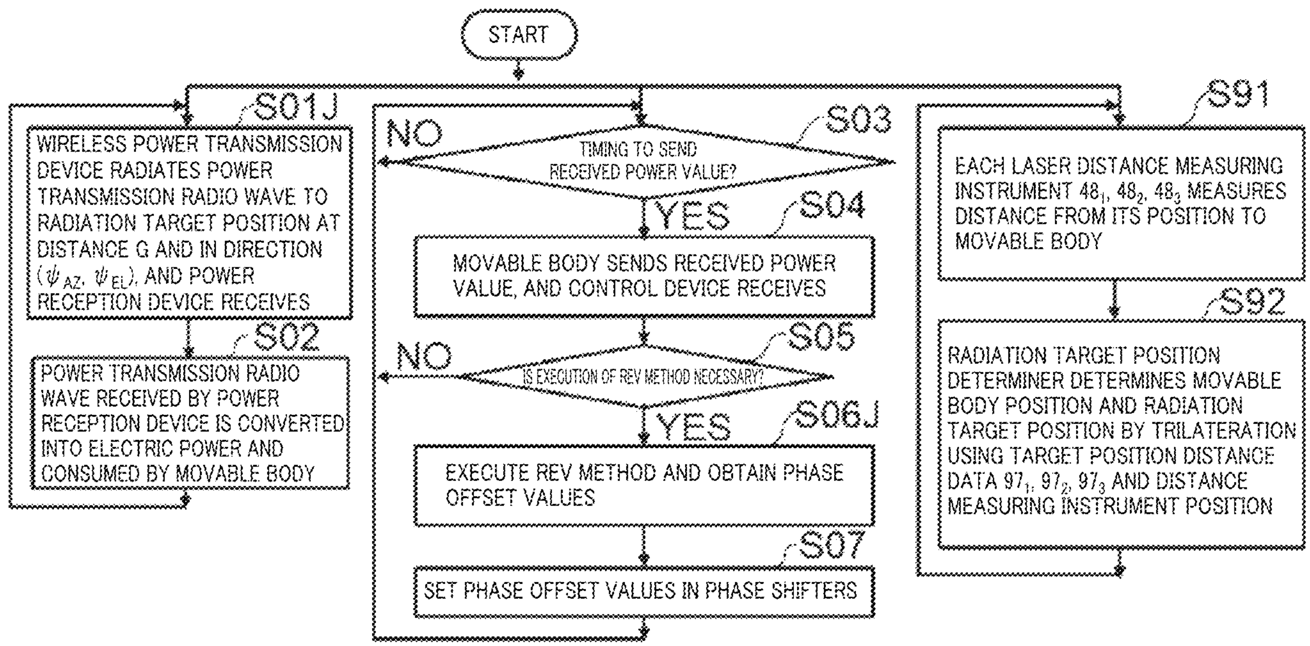
FIG. 78 is a flowchart illustrating a power transmission procedure to a movable body by the wireless power transmission device according to the twelfth embodiment.

The operation is described. FIG. 78 is a flowchart illustrating a power transmission procedure to a movable body by the wireless power transmission device according to the thirteenth embodiment. In FIG. 78, points different from FIG. 74 in the eleventh embodiment are described.

Steps S91 to S92 are performed instead of S11K to S13K. At S91, laser distance measuring instruments $48_1$, $48_2$, and $48_3$ each measure the distance from its position to movable body 60F. At S92, radiation target position determiner 47L determines the movable body position and the radiation target position by trilateration using target position distance data $97_1$, $97_2$, and $97_2$ and distance measuring instrument position 99.

Wireless power transmission device 1L operates similarly to wireless power transmission device 1J and a similar effect can be obtained. Since the power transmission beam tracks movable body 60 during execution of the REV method, the accuracy of the REV method can be increased.

The distance measuring instruments may be those that radiate non-laser light, radio waves, ultrasonic waves, or the like.

Thirteenth Embodiment

Figure 79:
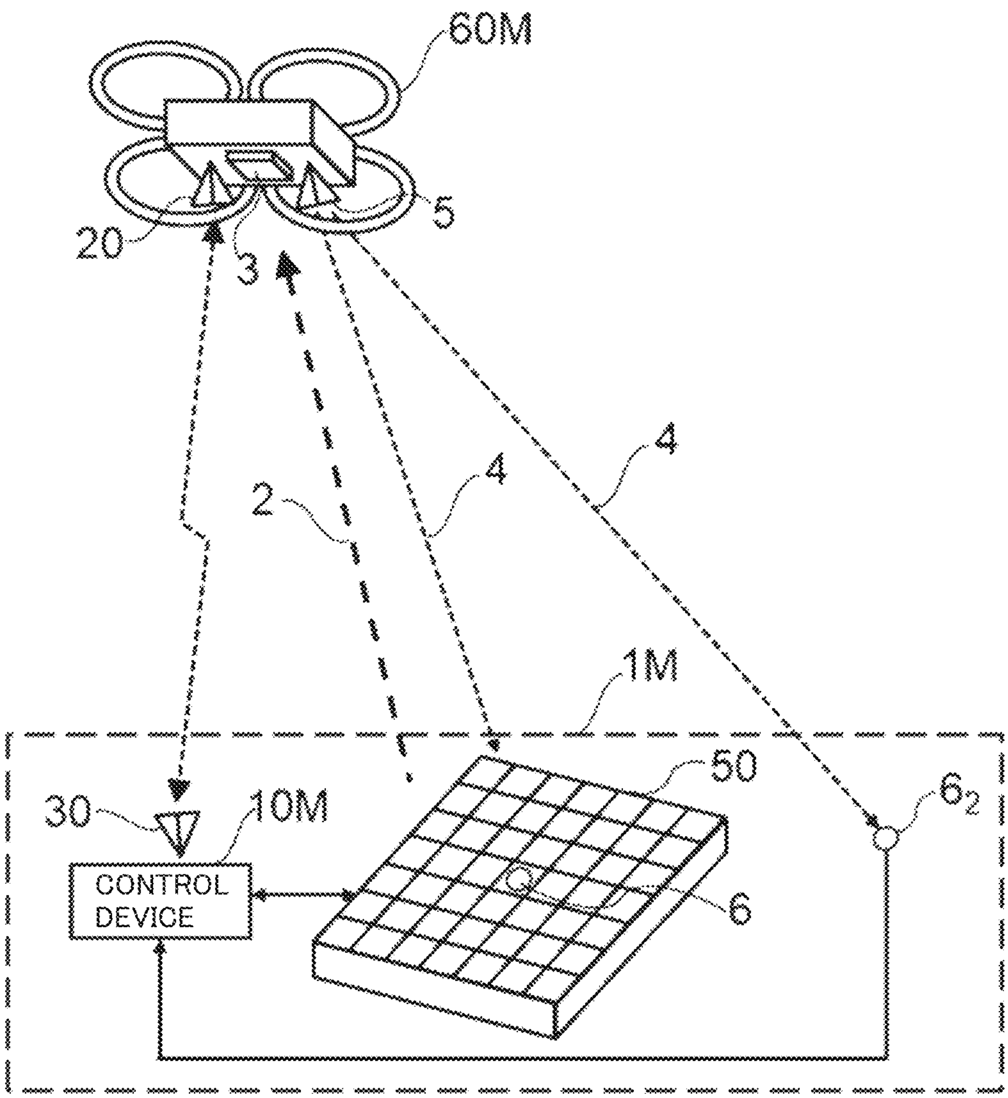
FIG. 79 is a schematic diagram illustrating a configuration of a wireless power transmission system for a movable body using a wireless power transmission device according to a thirteenth embodiment.
Figure 80:
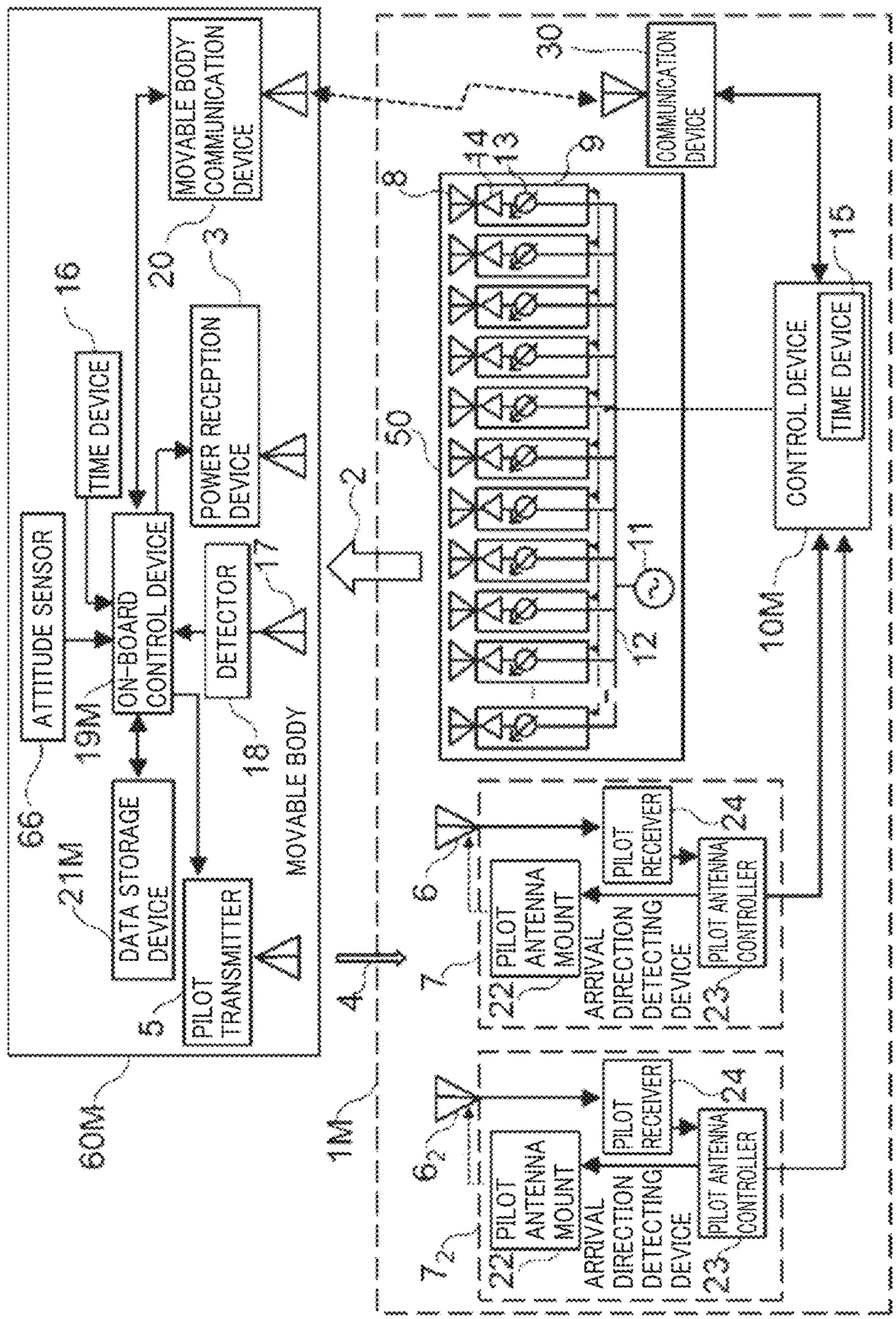
FIG. 80 is a diagram illustrating an overall configuration of the wireless power transmission system for a movable body using a wireless power transmission device according to the thirteenth embodiment.
Figure 81:
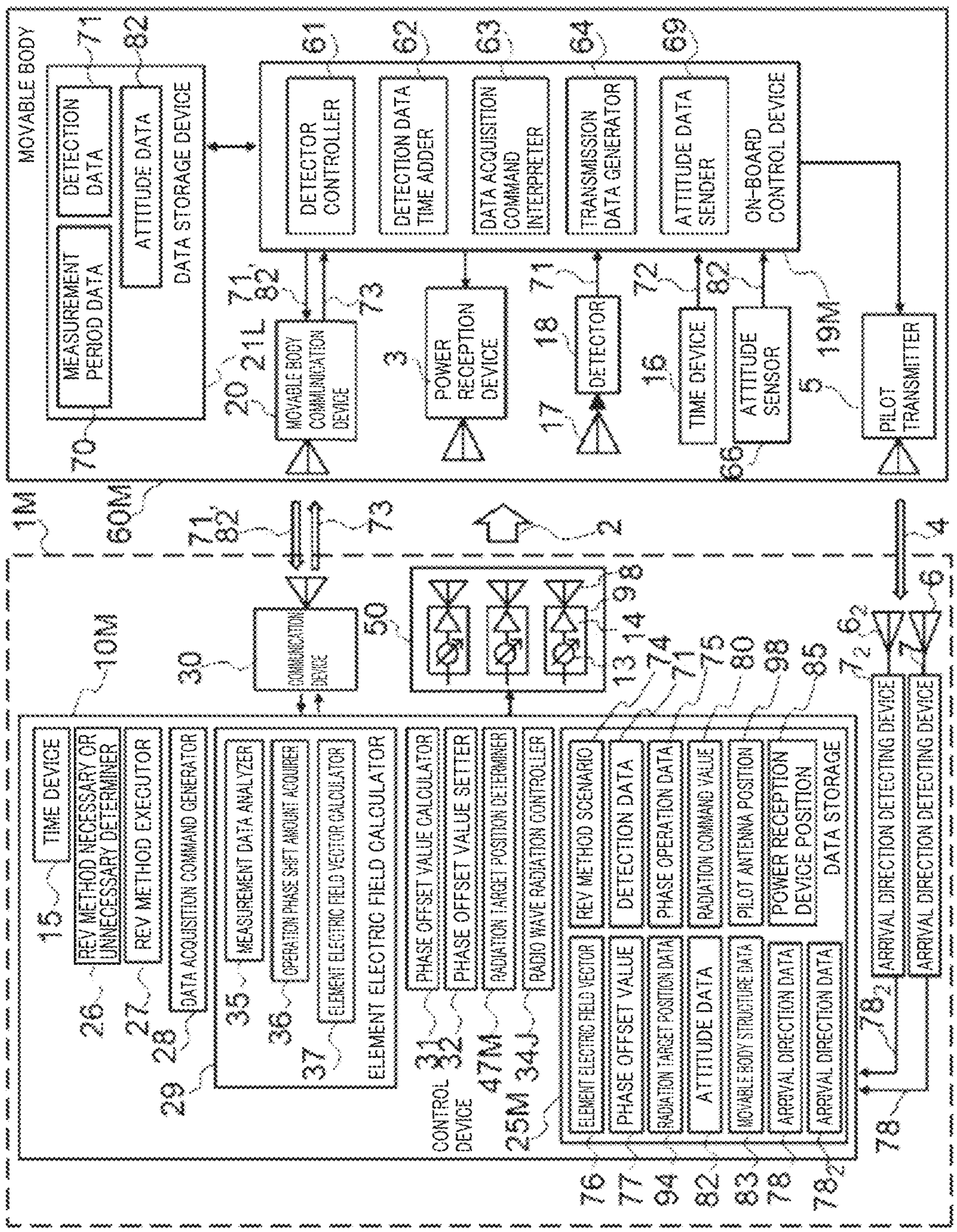
FIG. 81 is a block diagram illustrating a functional configuration of the wireless power transmission device and the movable body according to the thirteenth embodiment.
Figure 82:
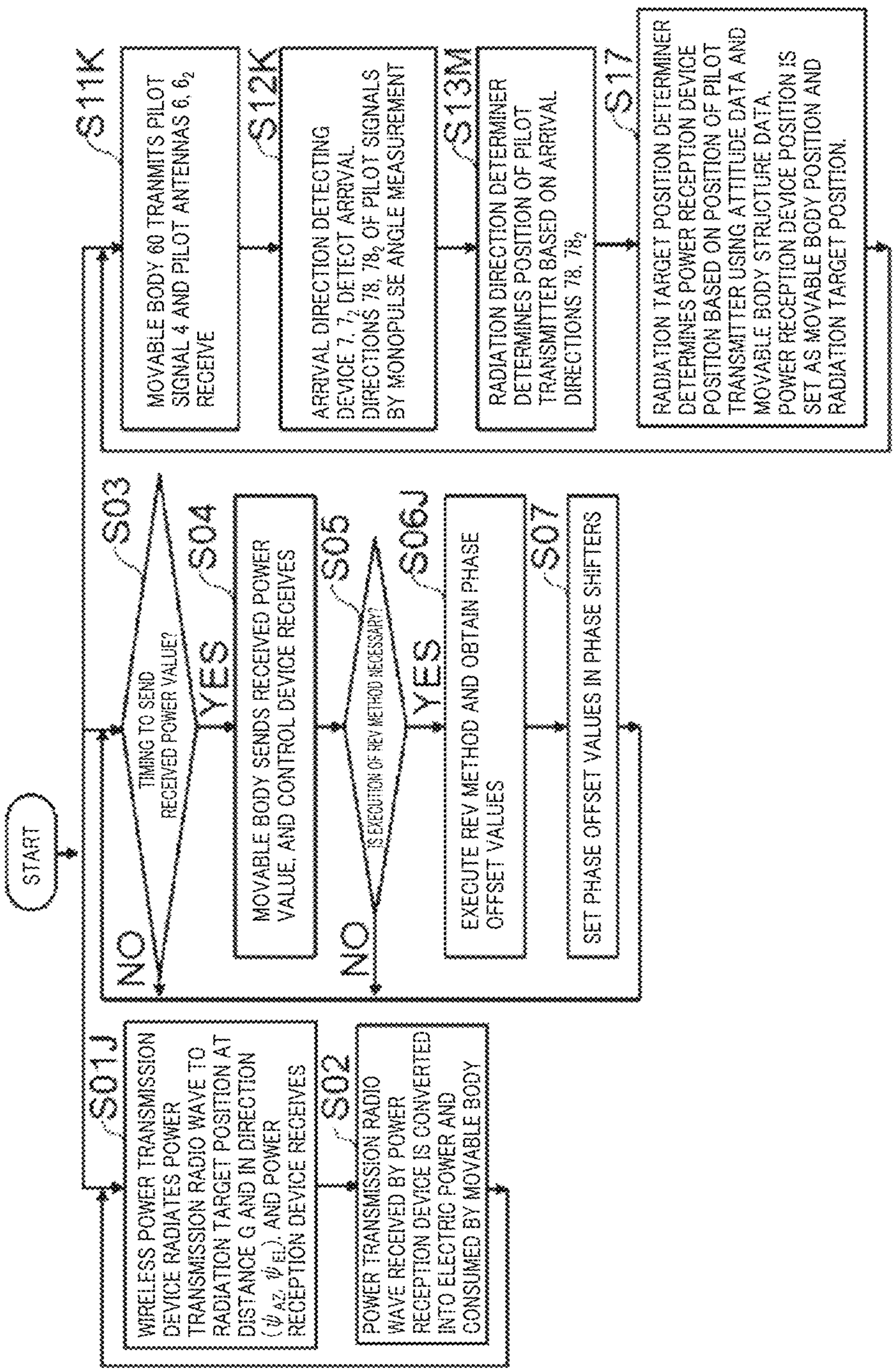
FIG. 82 is a flowchart illustrating a power transmission procedure to a movable body by the wireless power transmission device according to the thirteenth embodiment.

In a thirteenth embodiment, the eleventh embodiment is modified such that the movable body includes an attitude sensor and the position of power reception device 3 is obtained from the position of the pilot transmitter based on attitude data of the movable body. The thirteenth embodiment is an embodiment suitable for a case where the movable body is large and the pilot transmitter and the power reception device are not close to each other. Referring to FIG. 79 to FIG. 81, a configuration of a wireless power transmission system for a movable body, and the structure of a wireless power transmission device and a movable body according to the thirteenth embodiment is described.

In FIG. 79, points different from FIG. 71 in the eleventh embodiment are described. FIG. 80, points different from FIG. 72 in the eleventh embodiment are described. In FIG. 81, points different from FIG. 73 in the eleventh embodiment are described. A wireless power transmission device 1M and a movable body 60M are modified. Movable body 60M includes attitude sensor 66 and an attitude data sender 69. Attitude sensor 66 measures the attitude of movable body 60M. Attitude data sender 69 performs the process of sending attitude data 82 measured by attitude sensor 66 to control device 10M periodically. When the movable body position measured by positioning sensor 65 is not close to the position of power reception device 3, control device 10M corrects the movable body position using the attitude measured by attitude sensor 66 and structure data representing the structure of movable body 60M and determines the position of power reception device 3.

In movable body 60M, a data storage device 21M is modified. Data storage device 21M also stores attitude data 82. Attitude data 82 is data representing the attitude of movable body 60E measured by attitude sensor 66. Attitude data 82 is, for example, data representing that the nose direction is horizontal and the north-east direction.

In wireless power transmission device 1M, control device 10M is modified. In control device 10M, a radiation target position determiner 47M and a data storage 25M are modified. Data storage 25M also stores power reception device position 85, movable body structure data 83, and attitude data 82. Power reception device position 85 is the position of power reception device 3. Movable body structure data 83 is data representing the position of power reception device 3 with respect to pilot transmitter 5 in movable body 60M. Movable body structure data 83 is, for example, data representing that the position of power reception device 3 is 10 m to the front of pilot transmitter 5 in the nose direction. Attitude data 82 is data sent from movable body 60M. Data storage 25M is a movable body data storage that stores the movable body structure data.

Radiation target position determiner 47M determines the position of pilot transmitter 5 from arrival direction data 78 and $\mathbf{78}_2$ and pilot antenna position 98, similarly to radiation target position determiner 47K. Radiation target position determiner 47M further refers to movable body structure data 83 and attitude data 82 to determine power reception device position 85 with respect to the position of pilot transmitter 5. Radiation target position determiner 47M sets power reception device position 85 as the movable body position. Radiation target position determiner 47M sets the movable body position with respect to pilot antenna 6 as the radiation target position. Radiation target position determiner 47M sets the radiation target position as radiation target position data 94 in data storage 25M.

Radiation target position determiner 47M is a movable body position determiner that determines the movable body position based on at least two arrival directions and the pilot antenna installation location data. Radiation target position determiner 47M is a presence direction determiner that determines the presence direction based on the power transmission antenna position and the movable body position. Radiation target position determiner 47M is a movable body distance measurer that measures the movable body distance based on the power transmission antenna position and the movable body position. Radiation target position determiner 47M is a power reception device position determiner that determines power reception device position 85 using movable body structure data 83 and attitude data 82.

The operation is described. FIG. 81 is a flowchart illustrating a power transmission procedure to a movable body by the wireless power transmission device according to the thirteenth embodiment. In FIG. 81, points different from FIG. 74 in the first embodiment are described.

In wireless power transmission device 1M, step S13M is modified and step S17 is added after S13M. At S13M, radiation target position determiner 47M determines the position of pilot transmitter 5 as the movable body position from arrival directions 78 and $\mathbf{78}_2$. At S17, radiation target position determiner 47M determines power reception device position 85 based on the position of pilot transmitter 5, using attitude data 82 and movable body structure data 83. Power reception device position 85 is set as the movable body position and the radiation target position. The movable body position with respect to pilot antenna 6 is the radiation target position. Radiation target position determiner 47M sets the determined radiation target position as radiation target position data 94 in data storage 25M.

Using attitude data 82 and movable body structure data 83, power reception device position 85 can be determined as the radiation target position. Wireless power transmission device 1M can perform wireless power transmission efficiently using power reception device position 85 as a radiation target when movable body 60 is large and pilot transmitter 5 and power reception device 3 are not close to each other.

Wireless power transmission device 1M operates similarly to wireless power transmission device 1J and a similar effect can be obtained. Since the power transmission beam tracks movable body 60 during execution of the REV method, the accuracy of the REV method can be increased.

Fourteenth Embodiment

Figure 83:
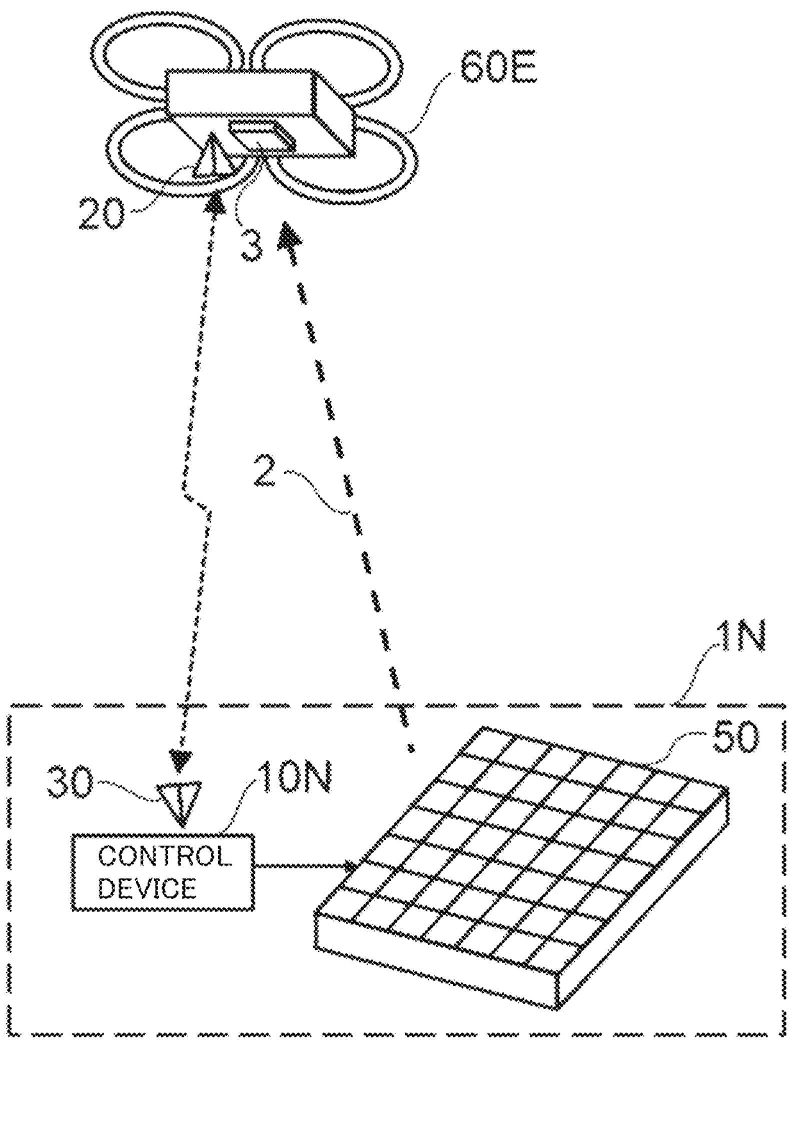
FIG. 83 is a schematic diagram illustrating a configuration of a wireless power transmission system for a movable body using a wireless power transmission device according to a fourteenth embodiment.
Figure 84:
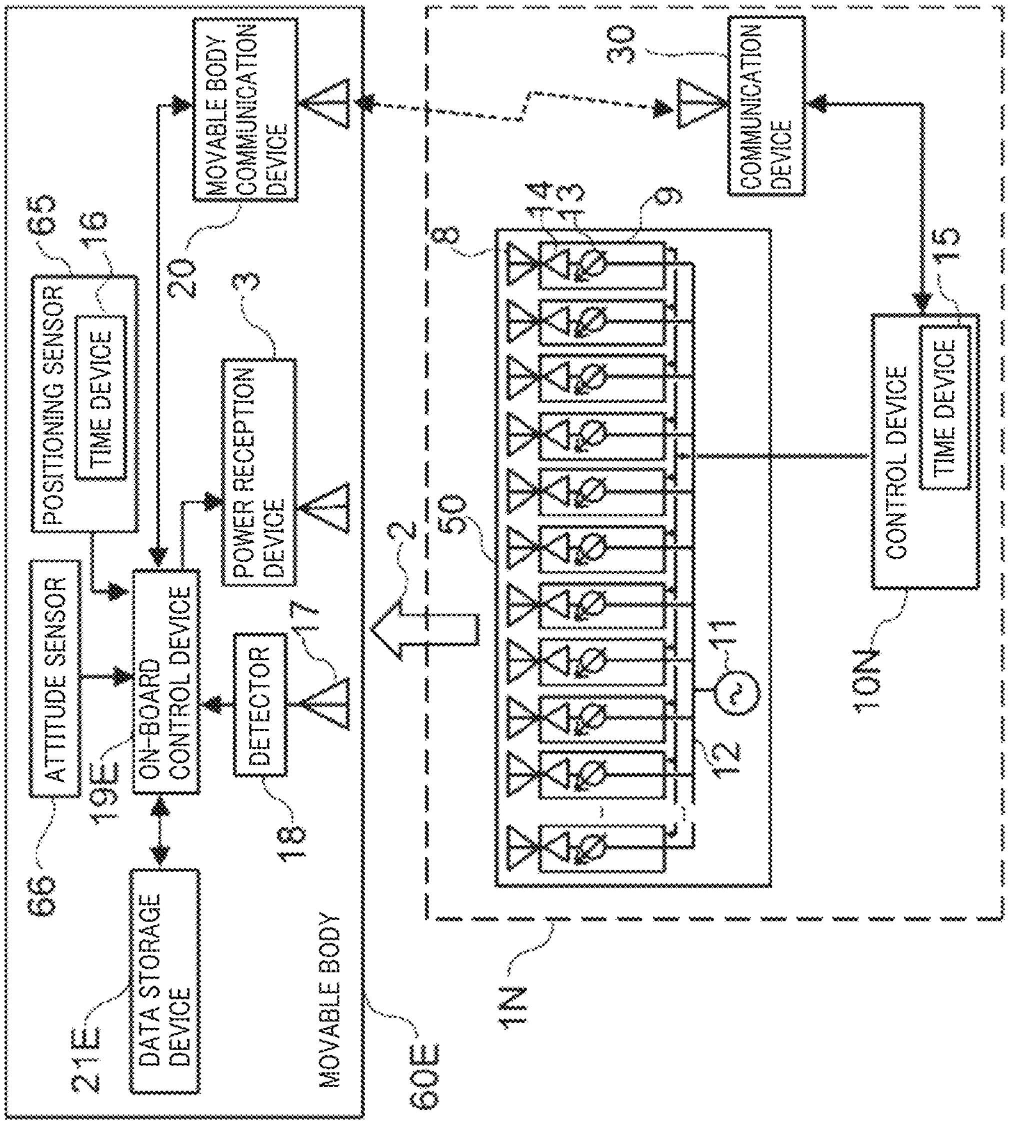
FIG. 84 is a diagram illustrating an overall configuration of a wireless power transmission system for a movable body using a wireless power transmission device according to the fourteenth embodiment.
Figure 85:
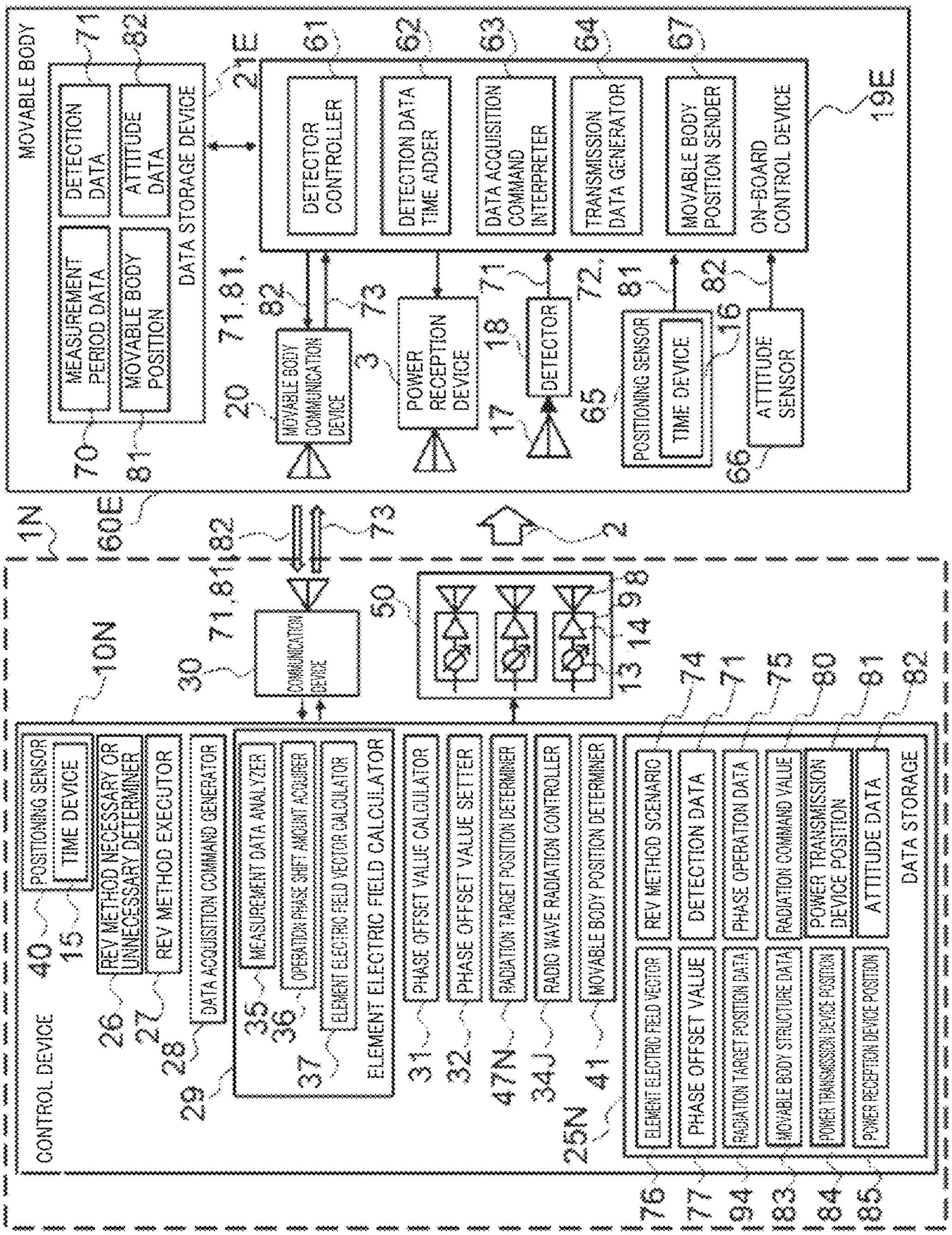
FIG. 85 is a block diagram illustrating a functional configuration of the wireless power transmission device and the movable body according to the fourteenth embodiment.

In a fourteenth embodiment, the sixth embodiment is modified such that the wireless power transmission device radiates a power transmission radio wave (power transmission beam) so that the maximum electric power can be received at the movable body position. Referring to FIG. 83 to FIG. 85, a configuration of a wireless power transmission system for a movable body, and the structure of a wireless power transmission device and a movable body according to the fourteenth embodiment is described. In the sixth embodiment, the movable body is equipped with a positioning sensor to measure its position. The wireless power transmission device determines the presence direction that is the direction in which the movable body is present, based on the movable body position sent from the movable body. In this fourteenth embodiment, the radiation target position is determined based on the movable body position sent from the movable body, and the phase of each element radio wave $\mathbf{2}E_p$ is controlled such that the phase of each element radio wave $\mathbf{2}E_p$ is matched at the radiation target position.

In FIG. 83, points different from FIG. 38 in the sixth embodiment are described. In FIG. 84, points different from FIG. 39 in the sixth embodiment are described. In FIG. 85, points different from FIG. 40 in the sixth embodiment are described. A wireless power transmission device 1N is modified. Movable body 60E is not modified. Movable body 60E includes positioning sensor 65 and attitude sensor 66.

In wireless power transmission device 1N, a control device 10N is modified. In control device 10N, a data storage 25N and radiation controller 34J are modified. Radio wave radiation controller 34J is similar to that included in control device 10J. Control device 10N does not include radiation direction determiner 33E and includes a radiation target position determiner 47N. Data storage 25N does not have radiation direction data 79 and has radiation target position data 94. Radiation target position determiner 47N sets radiation target position data 94 obtained by converting power reception device position 85 into a relative position to power transmission device position 84, based on movable body position 81 and power transmission device position 84. Radio wave radiation controller 34J generates radiation command values 80 such that power transmission antennas 50 radiate power transmission radio waves 2 with the phases matched at the radiation target position stored in radiation target position data 95.

Figure 86:
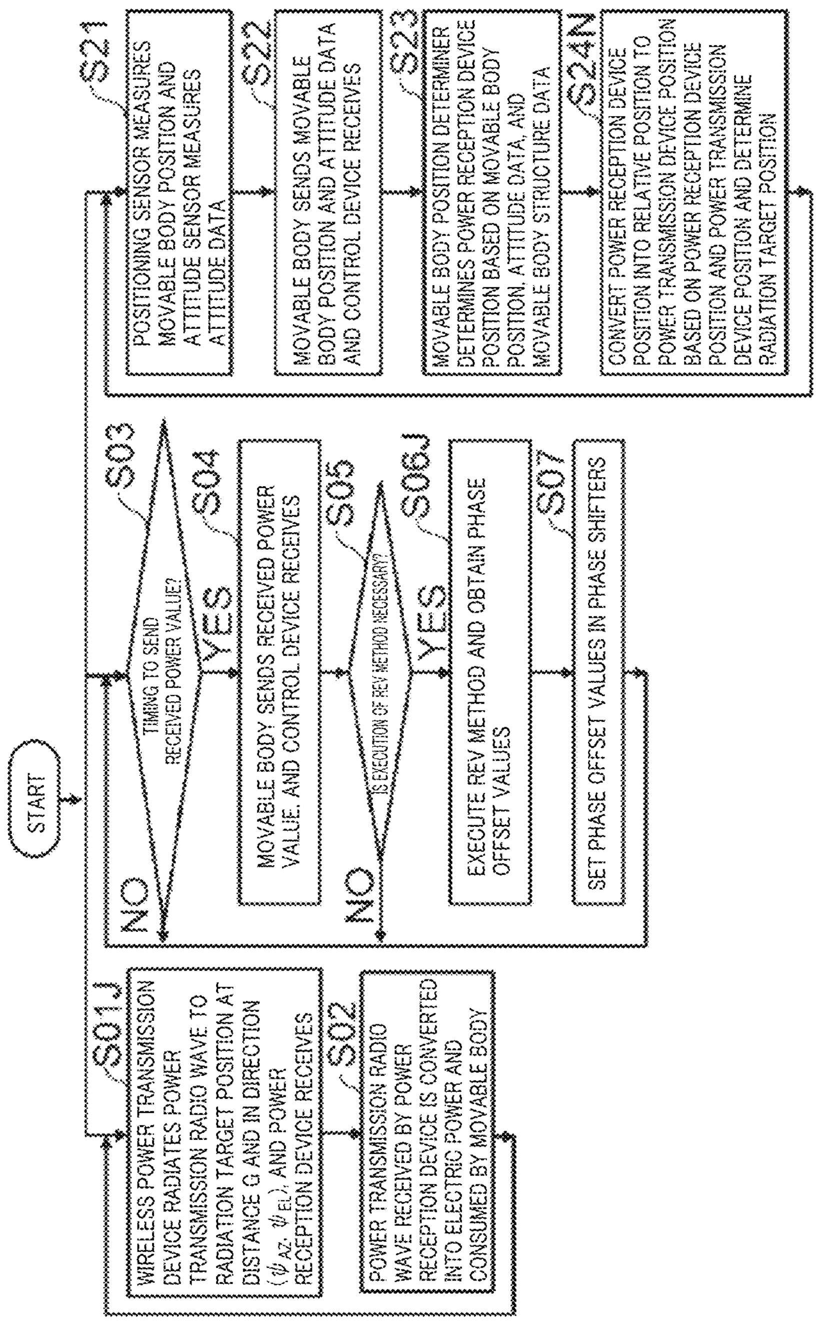
FIG. 86 is a flowchart illustrating a power transmission procedure to a movable body by the wireless power transmission device according to the fourteenth embodiment.

The operation is described. FIG. 86 is a flowchart illustrating a power transmission procedure to a movable body by the wireless power transmission device according to the fourteenth embodiment. In FIG. 86, points different from FIG. 41 in the sixth embodiment are described.

In wireless power transmission device 1N, step S01J and step S24N are modified. S01J is similar to that in the tenth embodiment. At step S01J, wireless power transmission device 1N radiates power transmission radio wave 2, using the position at distance G and in the power transmission direction ($\psi_{AZ}$, $\psi_{EL}$) where movable body 60E is present as the radiation target position. Power reception device 3 included in movable body 60E receives power transmission radio wave 2. S01J includes a process similar to the process at S26 in FIG. 41.

At step S24N, radiation target position determiner 47N determines radiation target position data 94 by converting power reception device position 85 into a relative position to power transmission device position 84, based on movable body position 81 and power transmission device position 84.

Wireless power transmission device 1N operates similarly to wireless power transmission device 1J and a similar effect can be obtained. Since the power transmission beam tracks movable body 60 during execution of the REV method, the accuracy of the REV method can be increased.

Fifteenth Embodiment

Figure 87:
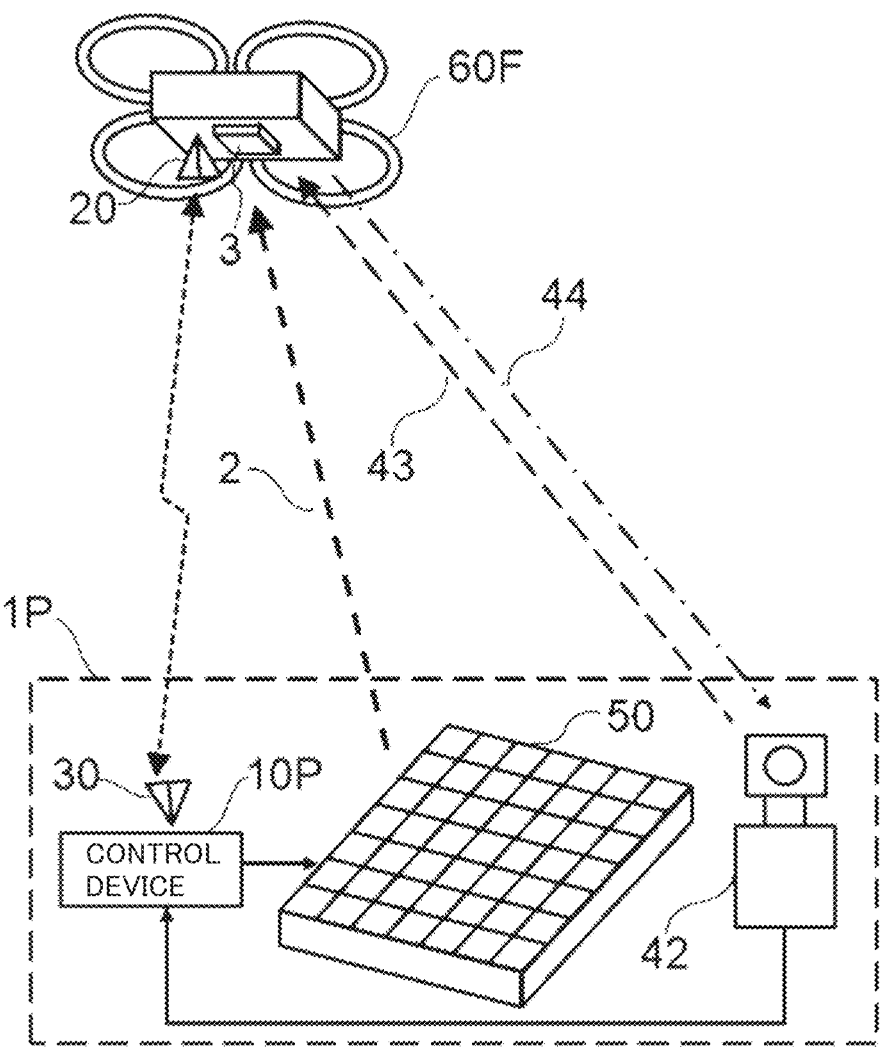
FIG. 87 is a schematic diagram illustrating a configuration of a wireless power transmission system for a movable body using a wireless power transmission device according to a fifteenth embodiment.
Figure 88:
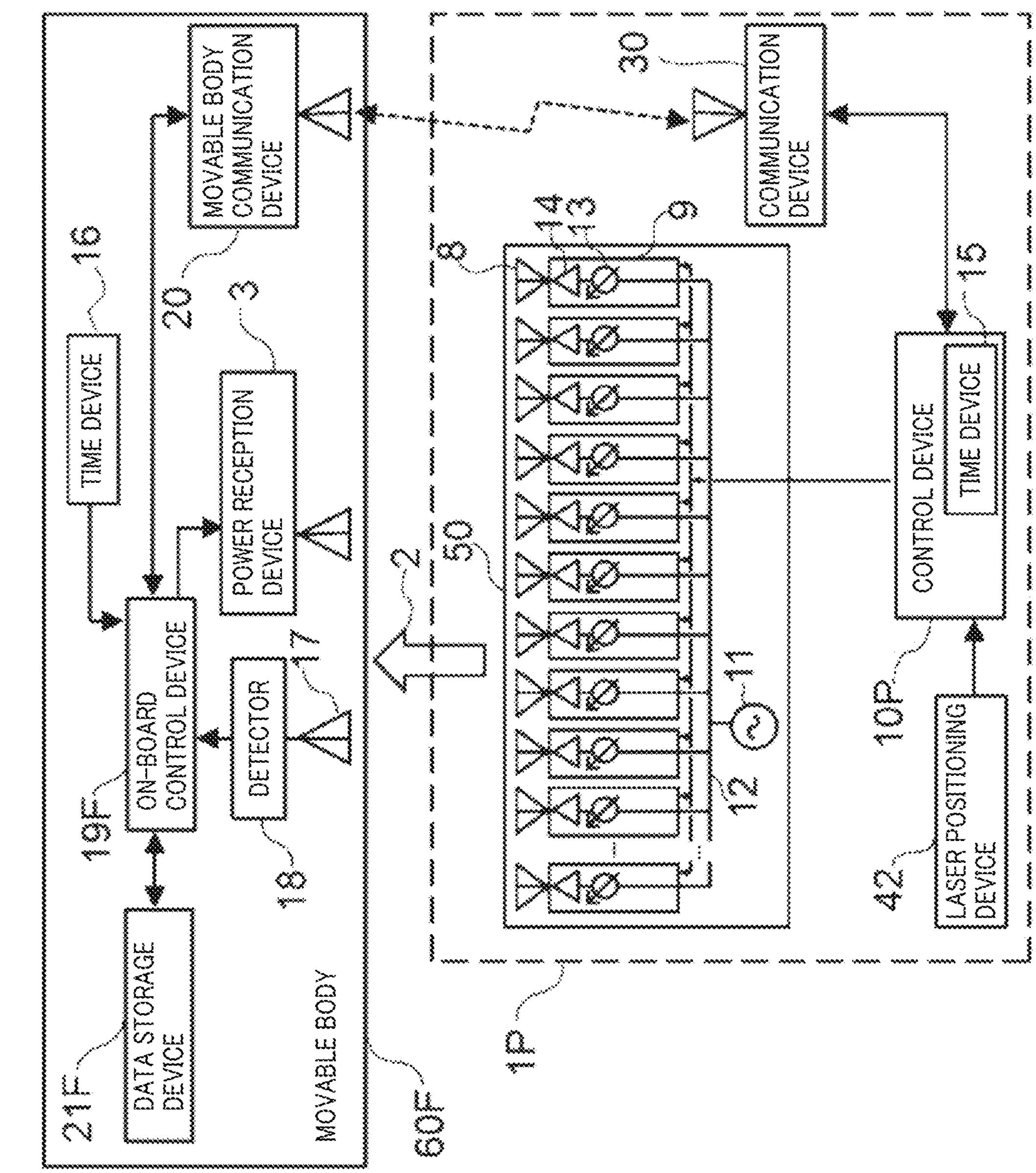
FIG. 88 is a diagram illustrating an overall configuration of the wireless power transmission system for a movable body using a wireless power transmission device according to the fifteenth embodiment.
Figure 89:
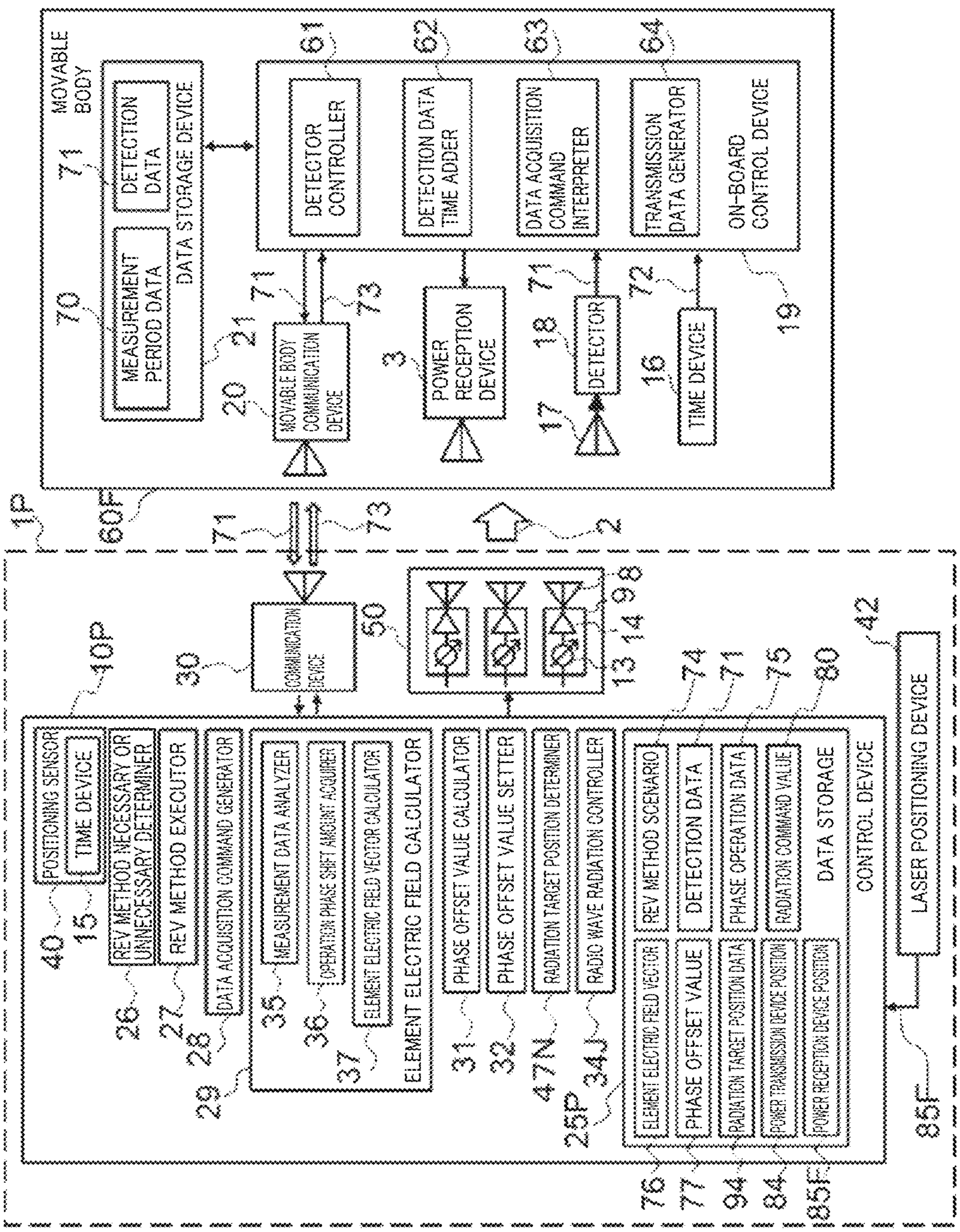
FIG. 89 is a block diagram illustrating a functional configuration of the wireless power transmission device and the movable body according to the fifteenth embodiment.

In a fifteenth embodiment, the seventh embodiment is modified such that the wireless power transmission device radiates a power transmission radio wave (power transmission beam) so that the maximum electric power can be received at the movable body position. Referring to FIG. 87 to FIG. 89, a configuration of a wireless power transmission system for a movable body, and the structure of a wireless power transmission device and a movable body according to the fifteenth embodiment is described. In the seventh embodiment, the wireless power transmission device includes a movable body position measuring device that measures the position of the movable body.

In FIG. 87, points different from FIG. 42 in the seventh embodiment are described. In FIG. 88, points different from FIG. 43 in the seventh embodiment are described. In FIG. 89, points different from FIG. 44 in the seventh embodiment are described. A wireless power transmission device 1N is modified. Movable body 60F is not modified. The modification in the fifteenth embodiment from the seventh embodiment is similar to the modification in the fourteenth embodiment from the sixth embodiment.

In a wireless power transmission device 1P, a control device 10P is modified. In control device 10P, a data storage 25P and radiation controller 34J are modified. Radio wave radiation controller 34J is similar to that included in control device 10J. Control device 10P does not include radiation direction determiner 33 and includes radiation target position determiner 47N. Data storage 25N does not have radiation direction data 79 and has radiation target position data 94.

FIG. 89 differs from FIG. 85 in the fourteenth embodiment in that wireless power transmission device 1P includes laser positioning device 42 and control device 10P is modified. Movable body 60E is changed to movable body 60F that does not include positioning sensor 65 and attitude sensor 66. Control device 10P differs from control device 10N in that it does not include movable body position determiner 41 and data storage 25P has power reception device position 85F instead of power reception device position 85. Power reception device position 85F is data measured by laser positioning device 42.

Figure 90:
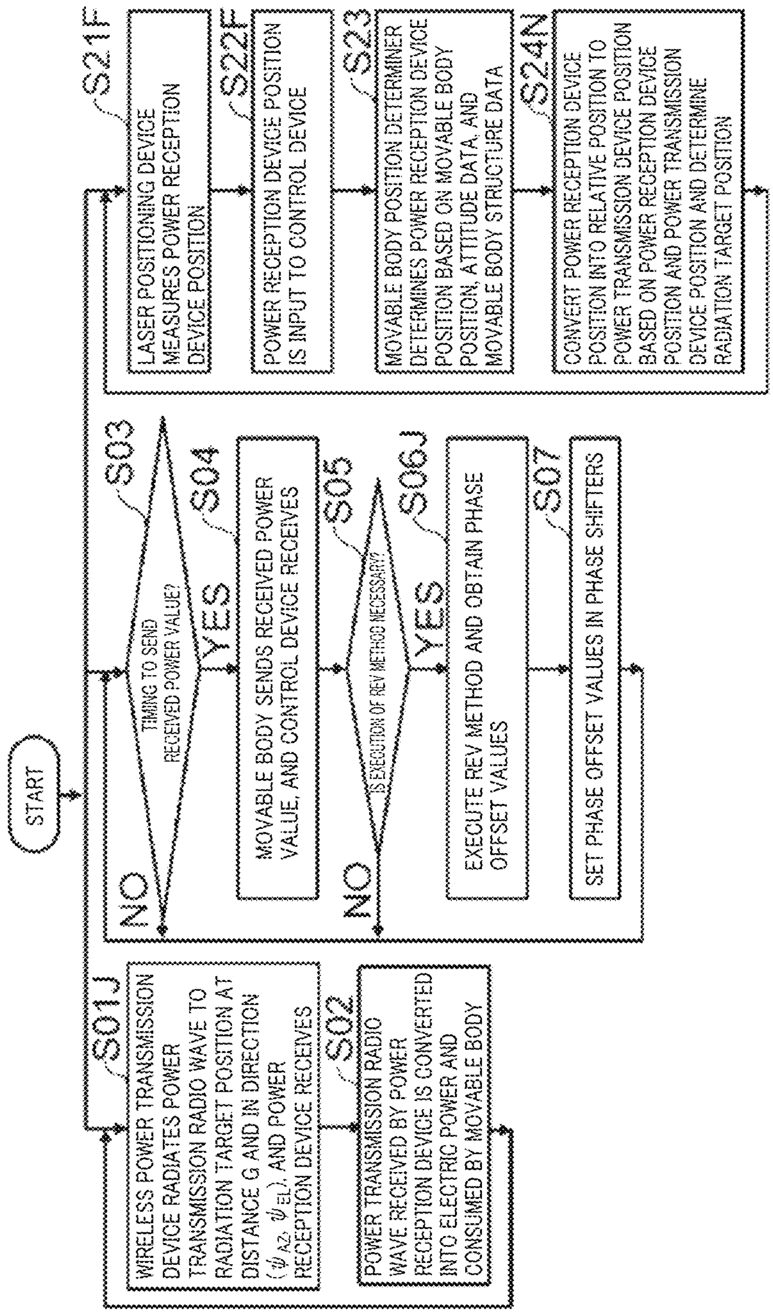
FIG. 90 is a flowchart illustrating a power transmission procedure to a movable body by the wireless power transmission device according to the fifteenth embodiment.

The operation is described. FIG. 90 is a flowchart illustrating a power transmission procedure to a movable body by the wireless power transmission device according to the fifteenth embodiment. In wireless power transmission device 1P, compared with FIG. 45 in the seventh embodiment, step S01J and step S24N are modified similarly to wireless power transmission device 1N. FIG. 90 differs from FIG. 86 in the fourteenth embodiment in S21F and S22F. S21F and S22F are the process in which the laser positioning device measures the power reception device position and inputs the measured power reception device position to the control device. At S24N, radiation target position determiner 47N determines radiation target position data 94 by converting power reception device position 85 into a relative position to power transmission device position 84, based on movable body position 81 and power transmission device position 84.

Wireless power transmission device 1P operates similarly to wireless power transmission device 1J and a similar effect can be obtained. Since the power transmission beam tracks movable body 60 during execution of the REV method, the accuracy of the REV method can be increased.

Sixteenth Embodiment

Figure 91:
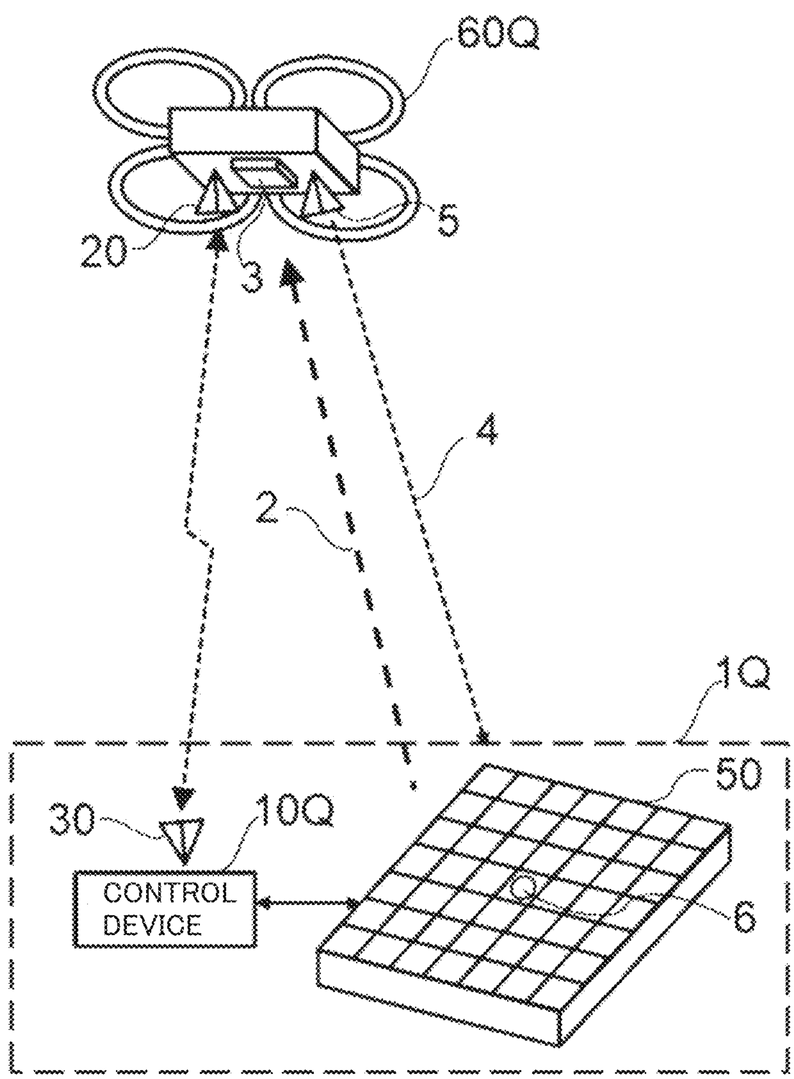
FIG. 91 is a schematic diagram illustrating a configuration of a wireless power transmission system for a movable body using a wireless power transmission device according to a sixteenth embodiment.
Figure 92:
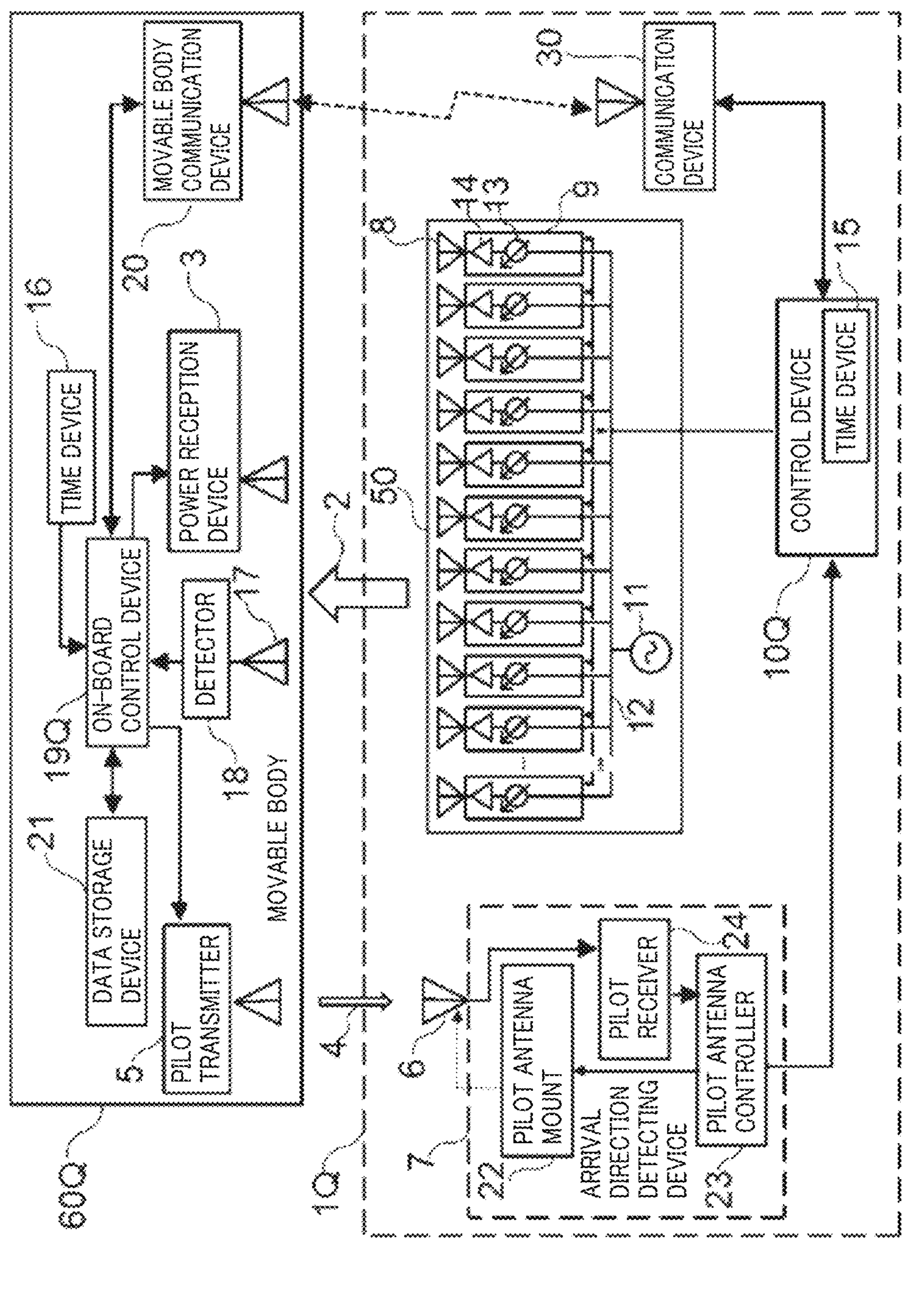
FIG. 92 is a diagram illustrating an overall configuration of the wireless power transmission system for a movable body using a wireless power transmission device according to the sixteenth embodiment.
Figure 93:
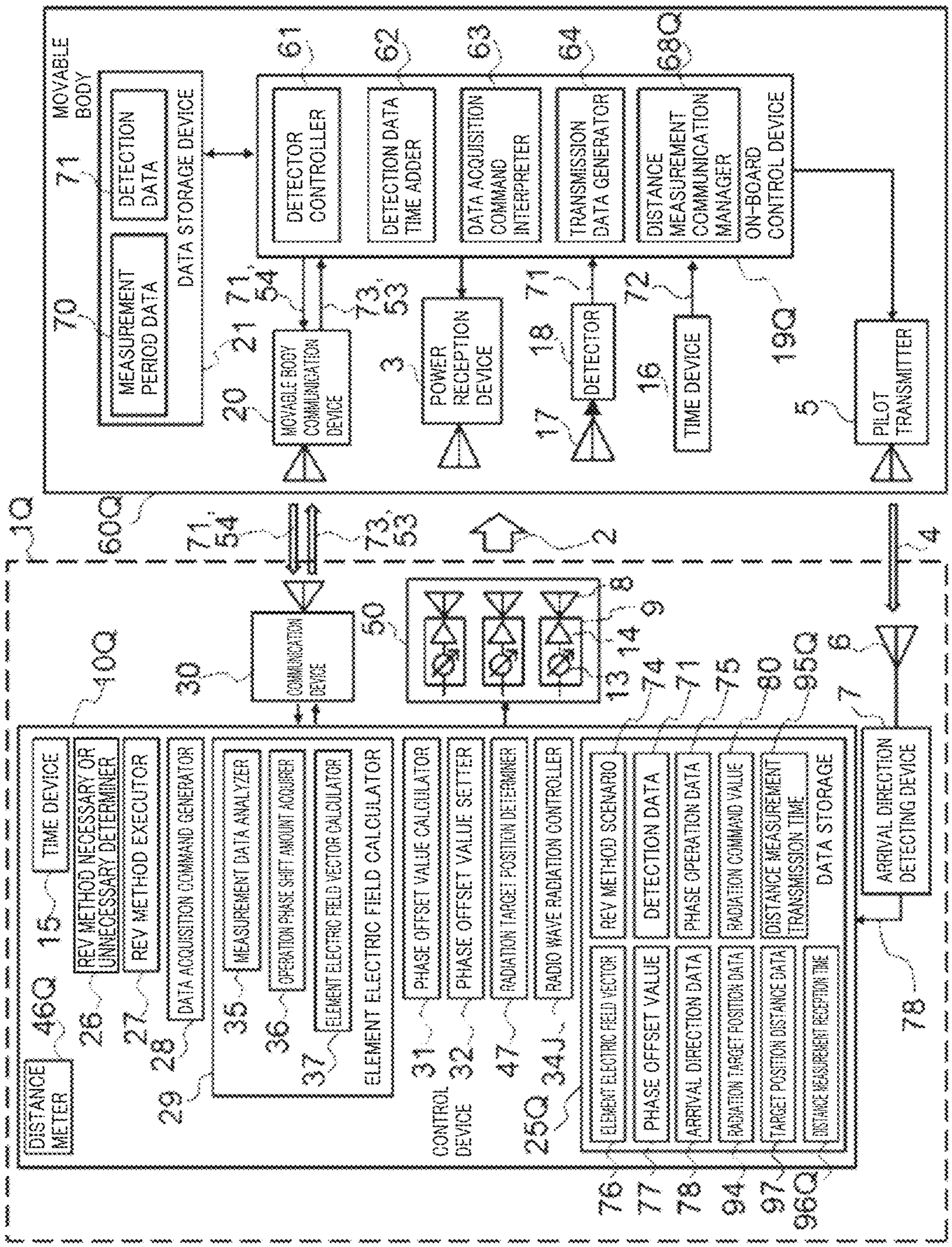
FIG. 93 is a block diagram illustrating a functional configuration of the wireless power transmission device and the movable body according to the sixteenth embodiment.

In a sixteenth embodiment, the tenth embodiment is modified such that the distance to the movable body is measured by a communication radio wave used for communication. Referring to FIG. 91 to FIG. 93, a configuration of a wireless power transmission system for a movable body, and the structure of a wireless power transmission device and a movable body according to the sixteenth embodiment is described.

In FIG. 91, points different from FIG. 50 in the tenth embodiment are described. In FIG. 92, points different from FIG. 51 in the tenth embodiment are described. In FIG. 93, points different from FIG. 52 in the tenth embodiment are described. A wireless power transmission device 1Q and a movable body 60Q are modified.

Communication for measuring the distance is performed between wireless power transmission device 1Q and movable body 60Q, and the distance between power transmission antenna 50 and movable body 60Q is measured based on the time required for communication. Wireless power transmission device 1Q includes power transmission antenna 50 similar to that included in wireless power transmission device 1. Power transmission radio wave 2 and pilot signal 4 are not pulse-modulated.

In wireless power transmission device 1Q, arrival direction detecting device 7 and a control device 10Q are modified. Unlike arrival direction detecting device 7J, arrival direction detecting device 7 has only the function of detecting the arrival direction of pilot signal 4. In control device 10Q, a data storage 25Q and a distance meter 46Q are modified. Data storage 25Q does not have pulse transmission time 95 and pulse reception time 96 and has distance measurement transmission time 95Q and distance measurement reception time 96Q instead of them.

Movable body 60Q includes pilot transmitter 5 and detector 18 similar to those of movable body 60. In movable body 60Q, an on-board control device 19Q is modified. On-board control device 19Q does not include pulse modulation manager 68 and includes a distance measurement communicator 68Q, instead. When receiving a distance measurement signal 53 sent by wireless power transmission device 1Q, distance measurement communicator 68Q sends a distance measurement response signal 54 to wireless power transmission device 1Q when a predetermined time T1Q has elapsed since the time when distance measurement signal 53 is received.

Distance meter 46Q sends distance measurement signal 53 to movable body 60Q and receives distance measurement response signal 54 sent by movable body 60Q. Distance meter 46Q stores the time when distance measurement signal 53 is sent as distance measurement transmission time 95Q into data storage 25Q. Distance meter 46Q stores the time when distance measurement response signal 54 is received as distance measurement reception time 96Q into data storage 25Q. Distance meter 46Q measures time T2Q from transmission of distance measurement signal 53 to reception of distance measurement response signal 54. Distance meter 46Q calculates time T3Q=T2Q−T1Q by subtracting T1Q from T2Q. Distance meter 46Q measures the distance between power transmission antenna 50 and movable body 60Q based on T3Q. Distance meter 46Q stores the measured distance as target position distance data 97 into data storage 25Q.

When the distance between communication device 30 and power transmission antenna 50 cannot be ignored, target position distance data 97 is determined by correcting the distance calculated from T2Q based on data representing the positional relation between communication device 30 and power transmission antenna 50.

When the distance between movable body communication device 20 and power reception device 3 cannot be ignored, attitude data 82 is sent from movable body 60, and the power reception device position is obtained based on attitude data 82 and movable body structure data 83. Arrival direction data 78 and target position distance data 97 may be corrected based on the power reception device position.

Figure 94:
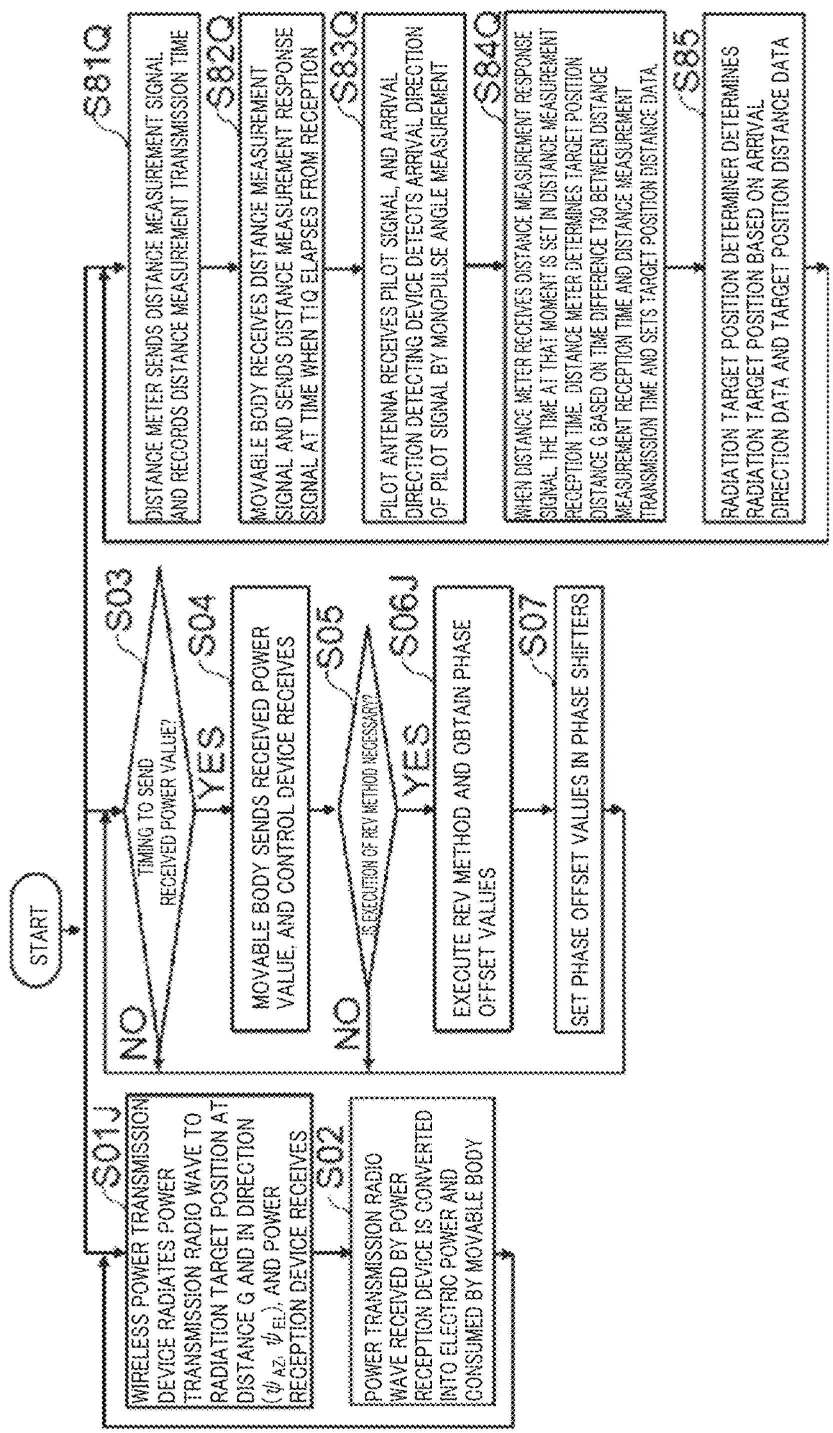
FIG. 94 is a flowchart illustrating a power transmission procedure to a movable body by the wireless power transmission device according to the sixteenth embodiment.

The operation is described. FIG. 94 is a flowchart illustrating a power transmission procedure to a movable body by the wireless power transmission device according to the sixteenth embodiment. In FIG. 94, points different from FIG. 52 in the tenth embodiment are described.

Steps S81Q to S84Q are modified. At S81Q, distance meter 46Q sends distance measurement signal 53 and records distance measurement transmission time 95Q. At S82Q, movable body 60Q receives distance measurement signal 53 and sends distance measurement response signal 54 at a time when T1Q elapses from the reception. At S83Q, pilot antenna 6 receives pilot signal 4, and arrival direction detecting device 7 detects the arrival direction of pilot signal 4J by mono-pulse angle measurement. At S84Q, when distance meter 46Q receives distance measurement response signal 54, the time at that moment is set in distance measurement reception time 96Q. Distance meter 46Q determines target position distance G based on time difference T3Q between distance measurement reception time 96Q and distance measurement transmission time 95Q and sets target position distance data 97.

Wireless power transmission device 1Q operates similarly to wireless power transmission device 1J and a similar effect can be obtained. Since the power transmission beam tracks movable body 60 during execution of the REV method, the accuracy of the REV method can be increased.

Seventeenth Embodiment

Figure 95:
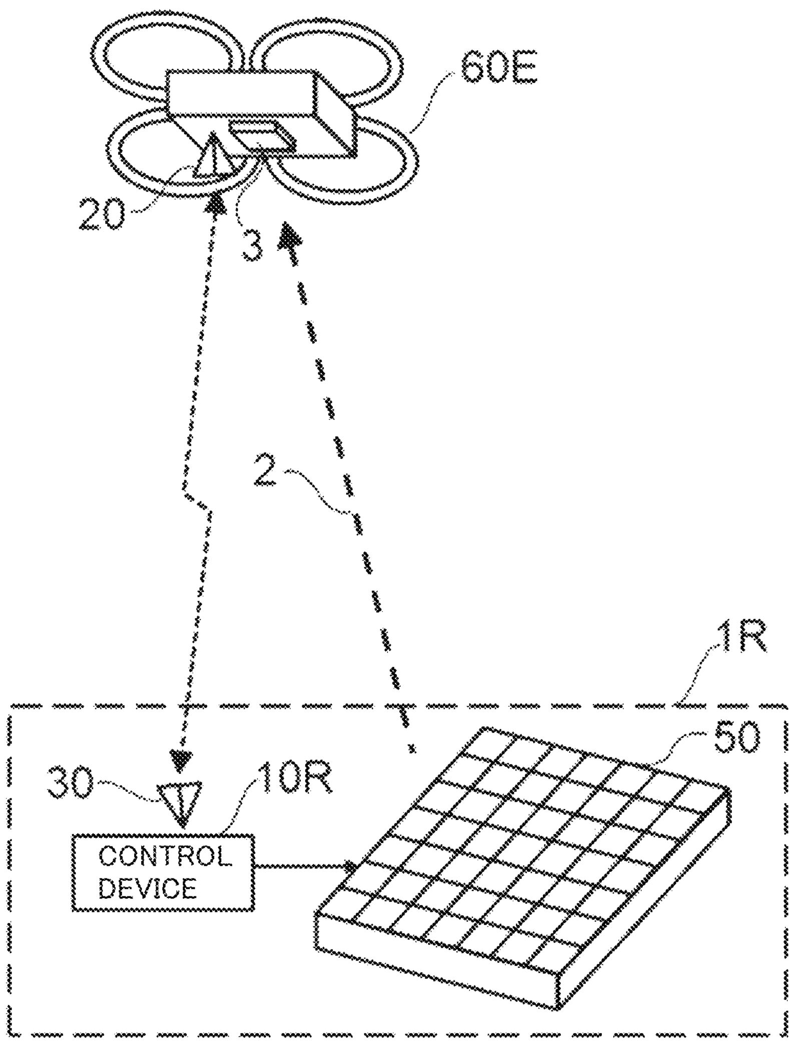
FIG. 95 is a schematic diagram illustrating a configuration of a wireless power transmission system for a movable body using a wireless power transmission device according to a seventeenth embodiment.
Figure 96:
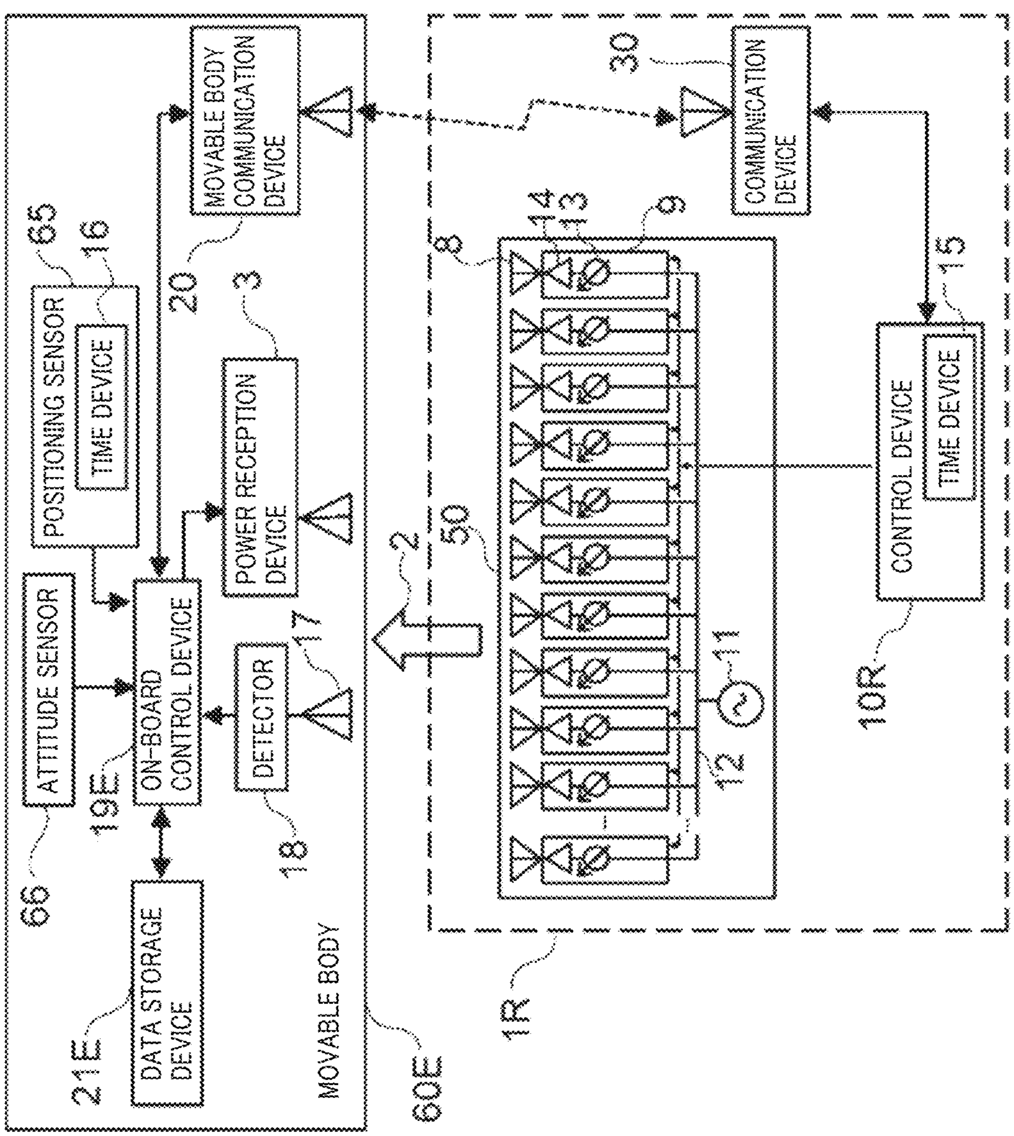
FIG. 96 is a diagram illustrating an overall configuration of the wireless power transmission system for a movable body using a wireless power transmission device according to the seventeenth embodiment.
Figure 97:
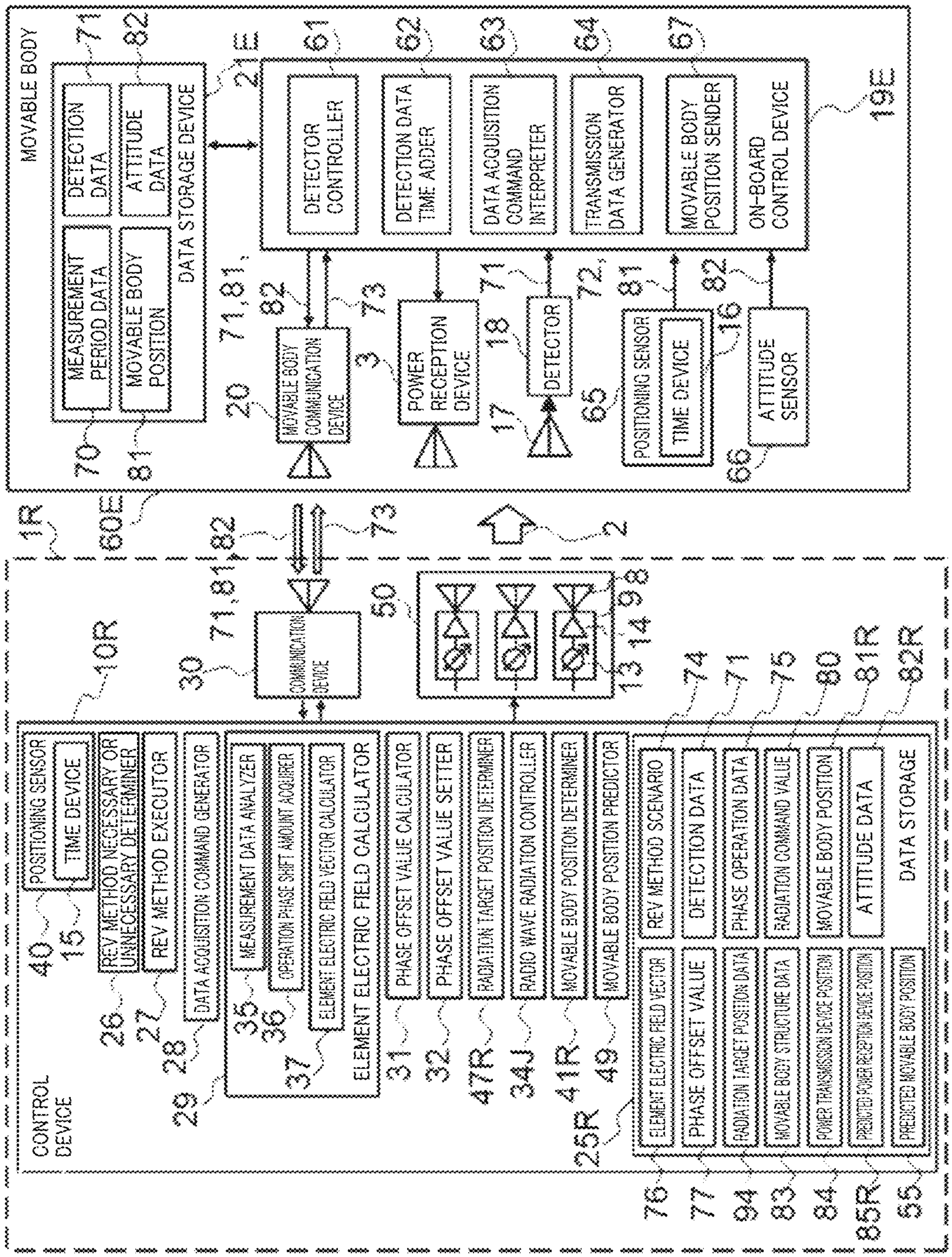
FIG. 97 is a block diagram illustrating a functional configuration of the wireless power transmission device and the movable body according to the seventeenth embodiment.

In a seventeenth embodiment, the fourteenth embodiment is modified such that the position of the movable body is predicted and the radiation target position is determined such that the radiation target position includes the predicted position of the movable body. Another embodiment may be modified. Referring to FIG. 95 to FIG. 97, a configuration of a wireless power transmission system for a movable body, and the structure of a wireless power transmission device and a movable body according to the seventeenth embodiment is described. In the fourteenth embodiment, the movable body includes a positioning sensor and an attitude sensor and the radiation target position is determined such that the radiation target position includes the power reception device position.

In FIG. 95, points different from FIG. 86 in the fourteenth embodiment are described. In FIG. 96, points different from FIG. 84 in the fourteenth embodiment are described. In FIG. 97, points different from FIG. 85 in the fourteenth embodiment are described. A wireless power transmission device 1R is modified. Movable body 60E is not modified.

In wireless power transmission device 1R, only a control device 10R is modified. Control device 10R includes a movable body position predictor 49 to predict the position of movable body 60E. In control device 10R, a data storage 25R, a movable body position determiner 41R, and a radiation target position determiner 47R are modified.

In data storage 25R, movable body position 81R and attitude data 82R are modified and data storage 25R includes predicted movable body position 55. Data storage 25R has predicted power reception device position 85R instead of power reception device position 85. Movable body position 81R is data representing the movable body position measured in an immediate period having a predetermined length TR (for example, a few seconds). Attitude data 82R is attitude data measured in an immediate period having length TR. Predicted movable body position 55 is data representing the movable body position and the attitude data predicted by movable body position predictor 49. Predicted power reception device position 85R is data representing the power reception device position determined by movable body position determiner 41R based on predicted movable body position 55.

Movable body position predictor 49 predicts the movable body position and the attitude data after a prediction time TS. Prediction time TS is determined as appropriate in accordance with the processing time in wireless power transmission device 1J and the distance to movable body 60. Predicting the movable body position enables efficient power transmission to movable body 60 even the process of detecting the position of movable body 60 or the computation for obtaining a phase correction value takes time. Movable body position predictor 49 predicts the movable body position after prediction time TS by approximating the movable body position in a period having length TR stored as movable body position 81R by a linear or quadratic equation with respect to time. The predicted movable body position is stored as predicted movable body position 55. Movable body position predictor 49 predicts the attitude data after prediction time TS by approximating the attitude data in a period having length TR stored as attitude data 82R by a linear or quadratic equation with respect to time. When the attitude data is represented by, for example, yaw angle, pitch angle, and roll angle, the attitude data is predicted for each of yaw angle, pitch angle, and roll angle. The predicted attitude data is stored as predicted movable body position 55. In order to reduce noise effects, the moving averages of the movable body position and the attitude data may be obtained, and linear or quadratic approximate equations of the moving average value with respect to time may be obtained.

Movable body position determiner 41R predicts a power reception device position based on predicted movable body position 55 (including the predicted attitude data) and movable body structure data 83. The predicted power reception device position is stored as predicted power reception device position 85R in data storage 25R.

Radiation target position determiner 47R determines radiation target position data 94 such that radiation target position data 94 includes predicted power reception device position 85R. When the movable body is small, the power reception device position is not necessarily predicted and radiation target position data 94 may be determined such that radiation target position data 94 includes the predicted movable body position.

Data storage 25R is a movable body position history storage that stores movable body position 81R that is data representing the movable body position measured in an immediate period having length TR. Data storage 25R is also an attitude data history storage that stores attitude data 82R that is data representing the attitude data measured in an immediate period having length TR. An immediate period having length TR is a predetermined range of time. The range of time may be determined such that, for example, the time when the latest arrival direction is measured is not included.

Movable body position predictor 49 is a movable body position predictor that predicts a movable body position. Movable body position predictor 49 predicts a movable body position based on movable body position 81R stored in data storage 25R. Predicted movable body position 55 is a movable body position predicted by movable body position predictor 49.

Movable body position predictor 49 is also a power reception device position predictor that predicts a power reception device position. Movable body position predictor 49 predicts a power reception device position based on movable body position 81R and attitude data 82R stored in data storage 25R. Predicted power reception device position 85R is a power reception device position predicted by movable body position predictor 49.

Figure 98:
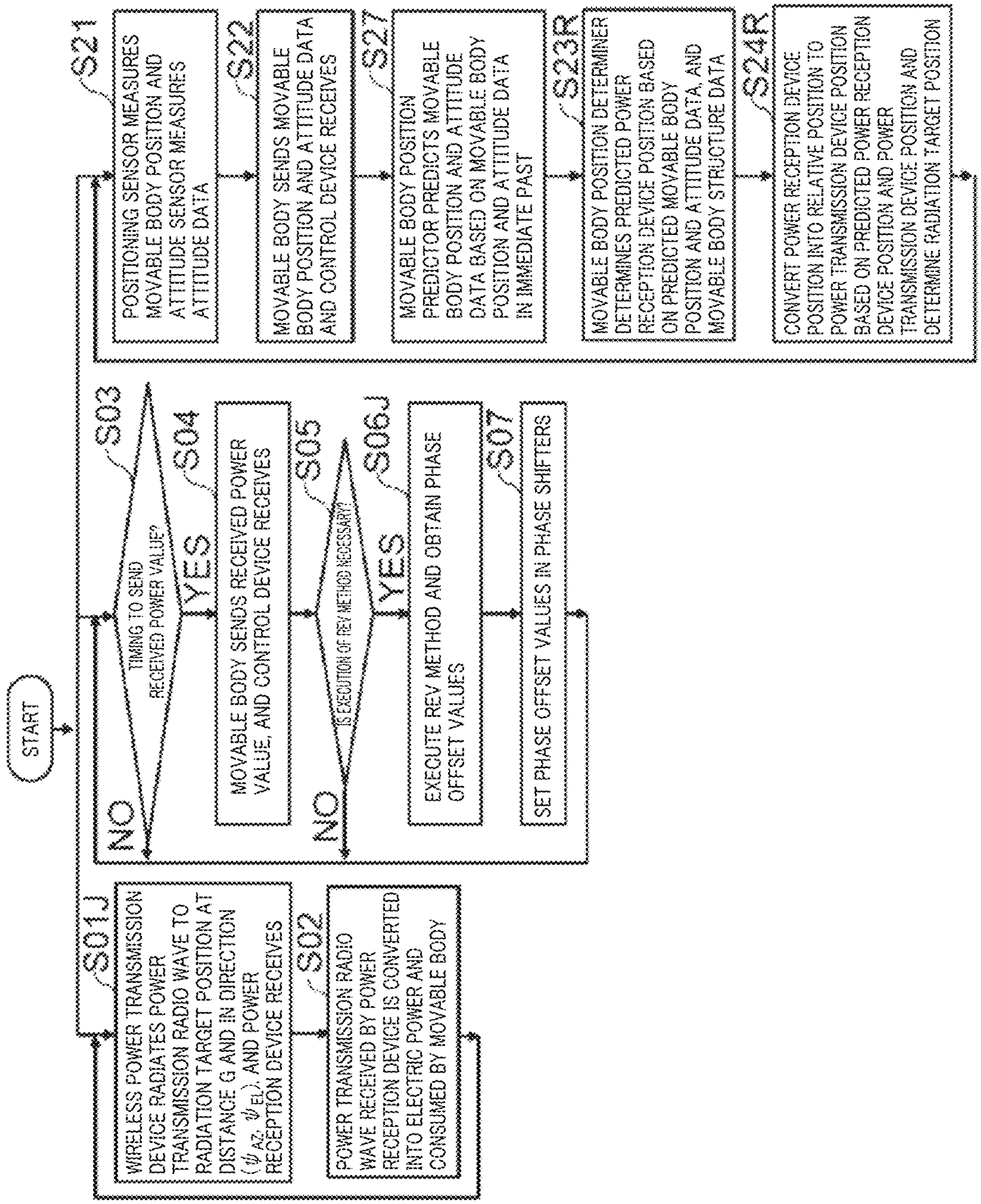
FIG. 98 is a flowchart illustrating a power transmission procedure to a movable body by the wireless power transmission device according to the seventeenth embodiment.

The operation is described. FIG. 98 is a flowchart illustrating a power transmission procedure to a movable body by the wireless power transmission device according to the seventeenth embodiment. In FIG. 98, points different from FIG. 86 in the fourteenth embodiment are described. S23 is changed to S23R. S27 is added before S23R.

At S27R, a movable body position and attitude data are predicted based on movable body position 81R and attitude data 82R in the immediate past (period having length TR). The predicted movable body position and attitude data are stored as predicted movable body position 55 in data storage 25R.

At S23R, movable body position determiner 41R determines a power reception device position based on predicted movable body position 55 (including the predicted attitude data) and movable body structure data 83. The determined power reception device position is stored as predicted power reception device position 85R in data storage 25R.

At S24R, a radiation target position is determined such that the radiation target position includes the predicted power reception device position. Power transmission radio waves 2 are radiated at S01J and S06J such that the phase of power transmission radio waves 2 are matched at the radiation target position.

Wireless power transmission device 1R operates similarly to wireless power transmission device 1J and a similar effect can be obtained. Since the power transmission beam tracks movable body 60 during execution of the REV method, the accuracy of the REV method can be increased. Since the phase of element radio wave 2$E_p$ radiated by each element antenna $\mathbf{8}_p$ is controlled also in consideration of the distance to movable body 60, the power transmission efficiency can be made higher than when the phase is controlled such that only the radiation direction tracks the movable body when power transmission antenna 50 is large or the distance to movable body 60 is small.

The position and the attitude of the movable body are predicted, and the position of the power reception device is predicted based on the predicted position and attitude of the movable body. Since the radiation target position is determined such that the radiation target position includes the predicted position of the power reception device, power can be transmitted to the power reception device more efficiently even when the process of detecting the positions of the movable body and the power reception device or the computation for obtaining a phase correction value takes time. The position of the movable body may be predicted, and the radiation target position may be determined such that the radiation target position includes the predicted position of the movable body.

The presence direction may be predicted based on the predicted power reception device position and the power transmission antenna position. The position of the power reception device may be predicted, and the direction from the power transmission antenna position toward the predicted power reception device may be predicted as the presence direction. The radiation direction changer may direct the radiation direction in the predicted presence direction that is the presence direction predicted.

The method of predicting a movable body position may be the method in the tenth embodiment and other embodiments or may be a method not mentioned in the present description.

These are applicable to the other embodiments.

Eighteenth Embodiment

Figure 99:
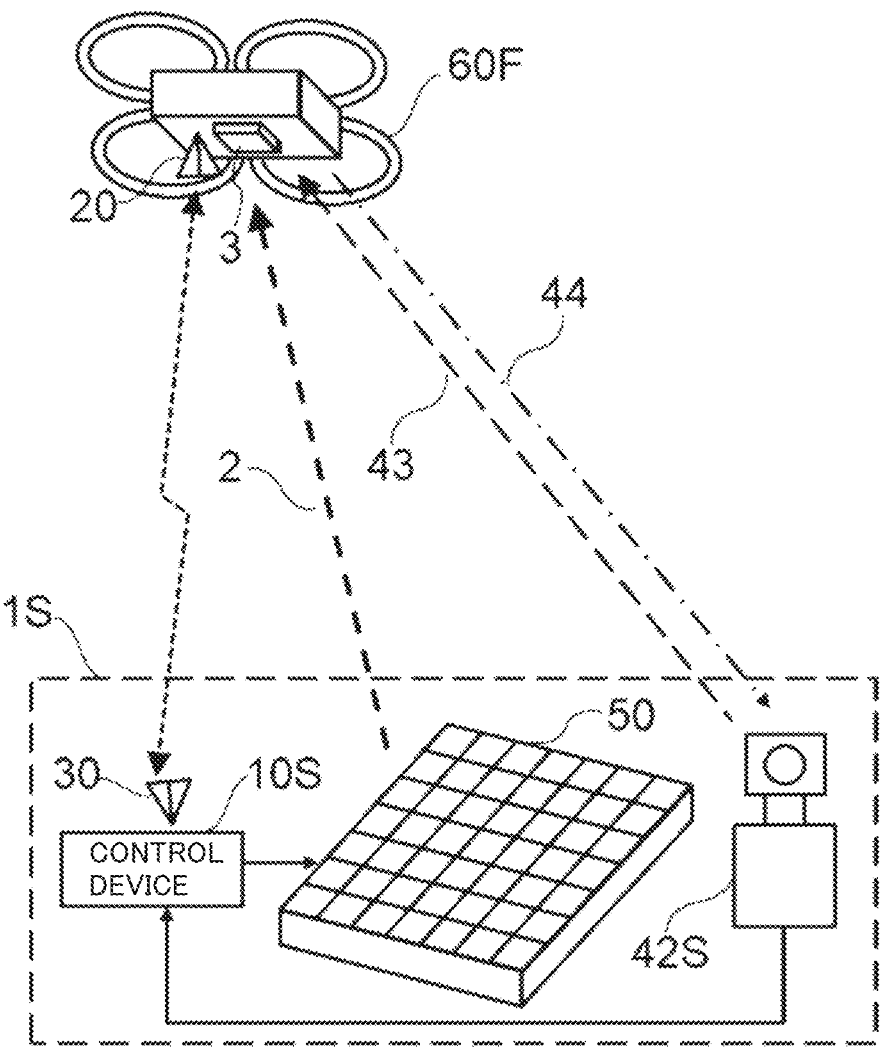
FIG. 99 is a schematic diagram illustrating a configuration of a wireless power transmission system for a movable body using a wireless power transmission device according to an eighteenth embodiment.
Figure 100:
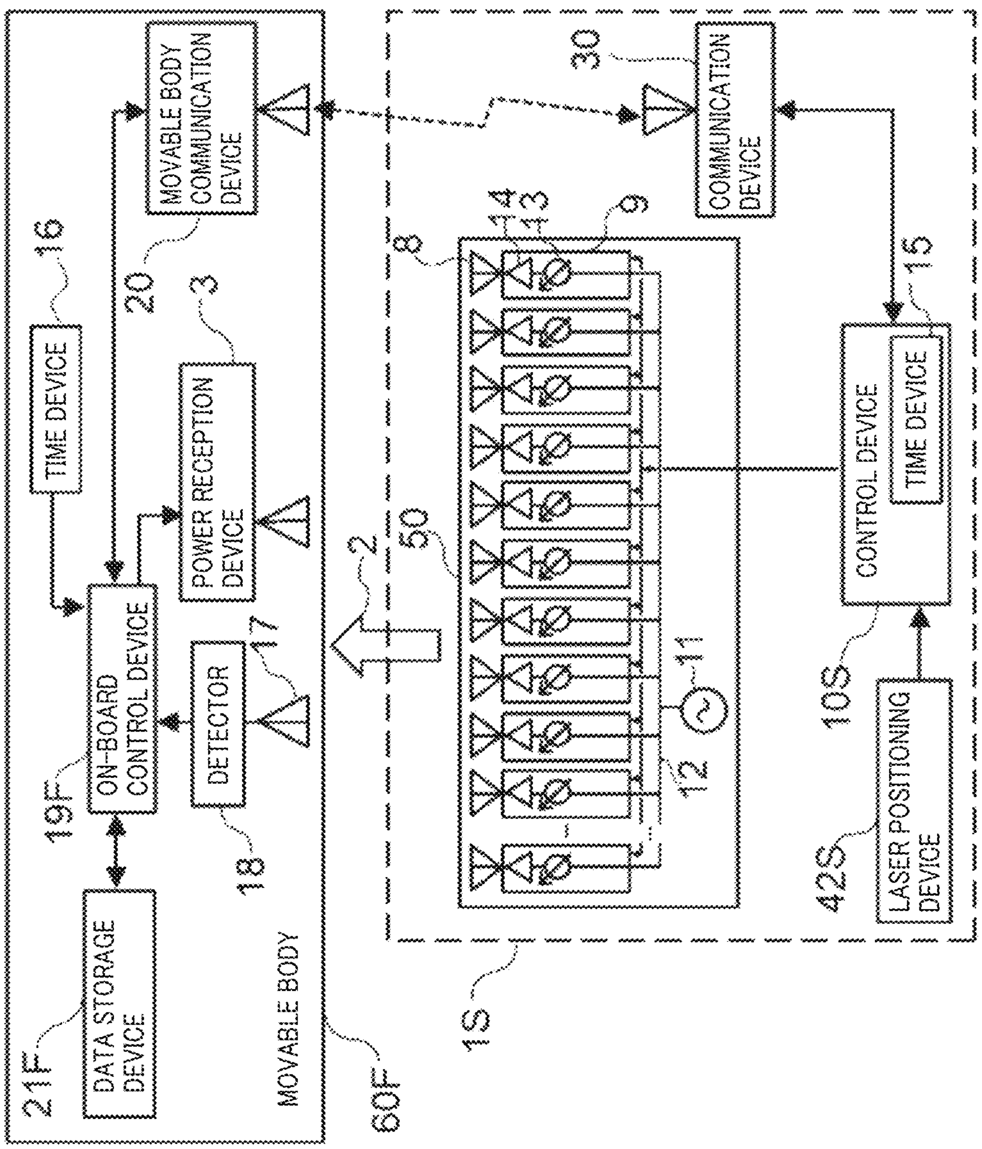
FIG. 100 is a diagram illustrating an overall configuration of the wireless power transmission system for a movable body using a wireless power transmission device according to the eighteenth embodiment.
Figure 101:
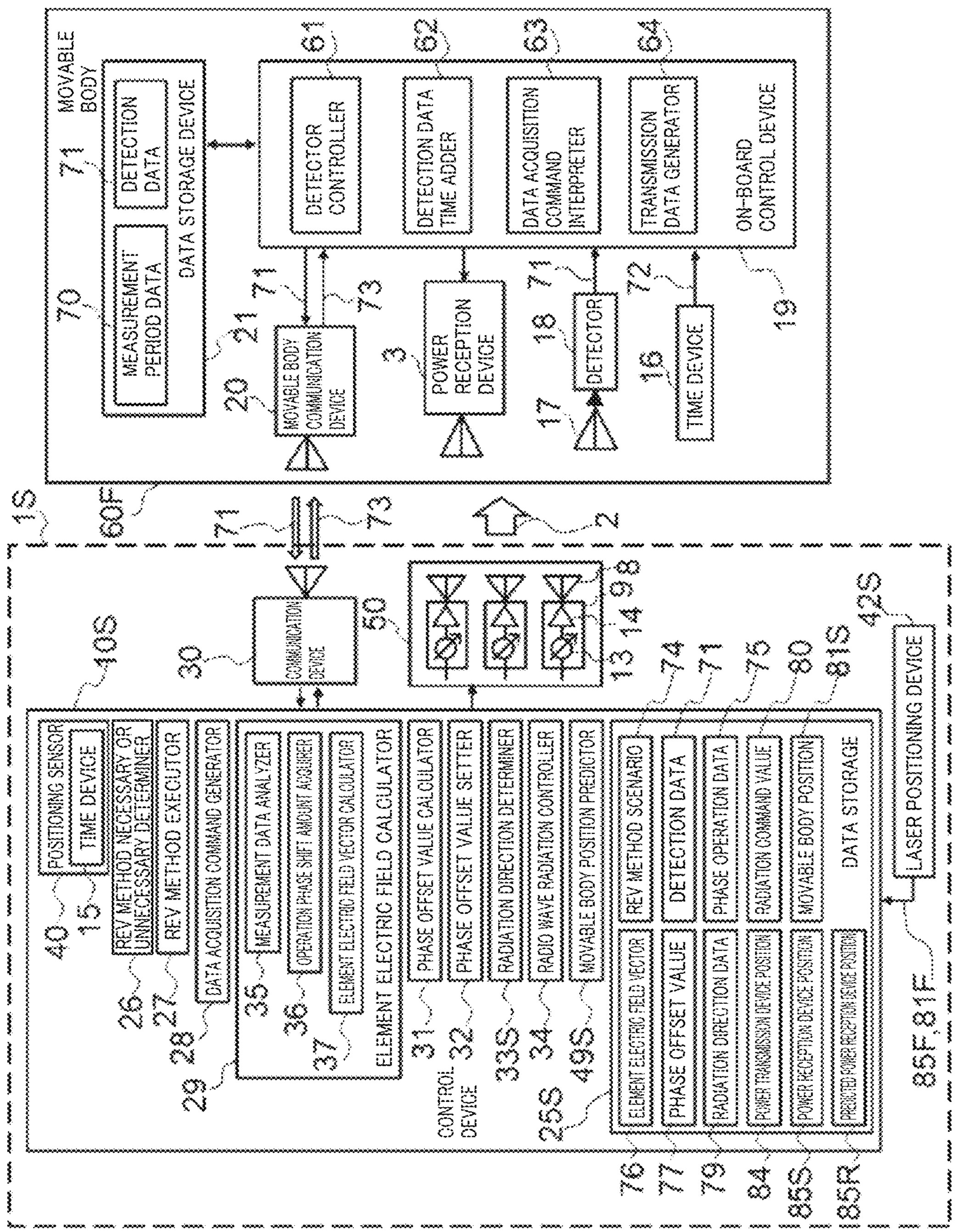
FIG. 101 is a block diagram illustrating a functional configuration of the wireless power transmission device and the movable body according to the eighteenth embodiment.

In an eighteenth embodiment, the sixth embodiment is modified such that the position of the movable body is predicted and the radiation direction is determined such that the predicted position of the movable body is directed at. Another embodiment may be modified. Referring to FIG. 99 to FIG. 101, a configuration of a wireless power transmission system for a movable body, and the structure of a wireless power transmission device and a movable body according to the eighteenth embodiment is described. In the sixth embodiment, the movable body position measuring device is installed near the wireless power transmission device, and the wireless power transmission device directs the radiation direction of a power transmission beam in the power reception device position measured by the movable body position measuring device.

In FIG. 99, points different from FIG. 42 in the sixth embodiment are described. In FIG. 100, points different from FIG. 43 in the sixth embodiment are described. In FIG. 101, points different from FIG. 44 in the sixth embodiment are described. A wireless power transmission device 1S is modified. Movable body 60F is not modified.

In wireless power transmission device 1S, a control device 10S and a laser positioning device 42S are modified. Laser positioning device 42S measures not only power reception device position 85F but also movable body position 81F. Laser positioning device 42S is a movable body position measuring device that measures the movable body position and the power reception device position. Movable body position 81F is the position of the center of gravity of a spatial range in which movable body 60F is present that is measured by laser positioning device 42S. Instead of the center of gravity, the position of the center in the range of each of the horizontal direction, the vertical direction, and the depth direction of a spatial range in which movable body 60F is present may be set as the movable body position. Movable body position 81F may be determined to be any position included in a spatial range in which movable body 60F is present. Power reception device position 85F and movable body position 81F measured by laser positioning device 42S are inputted to control device 10S. Power reception device position 85F is converted in a relative position to movable body position 81F.

Control device 10S includes a movable body position predictor 49S that predicts the positions of movable body 60F and power reception device 3. In control device 10S, a data storage 25S and a radiation direction determiner 33S are modified. In data storage 25S, power reception device position 85S is modified and data storage 25S includes movable body position 81S and predicted power reception device position 85R. Power reception device position 85S is data that stores power reception device position 85F measured by laser positioning device 42S in an immediate period having length TR. Movable body position 81S is data that stores movable body position 81F measured by laser positioning device 42S in an immediate period having length TR. Predicted power reception device position 85R is data representing the position of power reception device 3 predicted by movable body position predictor 49S. Radiation direction determiner 33S determines the presence direction of predicted power reception device position 85R viewed from power transmission device position 84, that is, the presence direction that is the direction from power transmission device position 84 toward predicted power reception device position 85R. Further, radiation direction determiner 33S determines the radiation direction from the presence direction.

Movable body position predictor 49S predicts the movable body position and the power reception device position after prediction time TS. Movable body position predictor 49S predicts the movable body position after prediction time TS by approximating the movable body position in a period having length TR stored as movable body position 81S by a linear or quadratic equation with respect to time. Movable body position predictor 49S predicts the power reception device position after prediction time TS by approximating the power reception device position in a period having length TR stored as power reception device position 85S by a linear or quadratic equation with respect to time. The position obtained by adding the predicted power reception device position to the predicted movable body position is stored as predicted power reception device position 85R in data storage 25S. Laser positioning device 42S converts power reception device position 85F into a relative position with respect to movable body position 81F. Therefore, the position obtained by adding the predicted power reception device position to the predicted movable body position is the predicted position of power reception device 3 after prediction time TS.

In order to reduce noise effects, the moving averages of the movable body position and the power reception device position may be obtained, and linear or quadratic approximate equations of the moving average values with respect to time may be obtained. The power reception device position may be measured by the laser positioning device as a position in three-dimensional space, and only the power reception device position may be processed to predict the power reception device position. It can be thought that the power reception device position can be predicted more precisely by predicting both of the movable body position and the power reception device position, for example, when the movable body changes its attitude while moving. The movable body position may be predicted instead of the power reception device position.

Data storage 25S is a movable body position history storage that stores movable body position 81S that is data representing the movable body position measured in an immediate period having length TR. Data storage 25S is a power reception device position history storage that stores power reception device position 85S that is data representing the power reception device position measured in an immediate period having length TR.

Movable body position predictor 49S is a movable body position predictor that predicts a movable body position. Movable body position predictor 49S is also a power reception device position predictor that predicts a power reception device position. Movable body position predictor 49S is a power reception device predictor that predicts a power reception device position based on movable body position 81S and power reception device position 85S. Predicted power reception device position 85R is a power reception device position predicted by movable body position predictor 49S.

Radiation direction determiner 33S is a presence direction determiner that determines the presence direction based on predicted power reception device position 85R and the power transmission antenna position.

Figure 102:
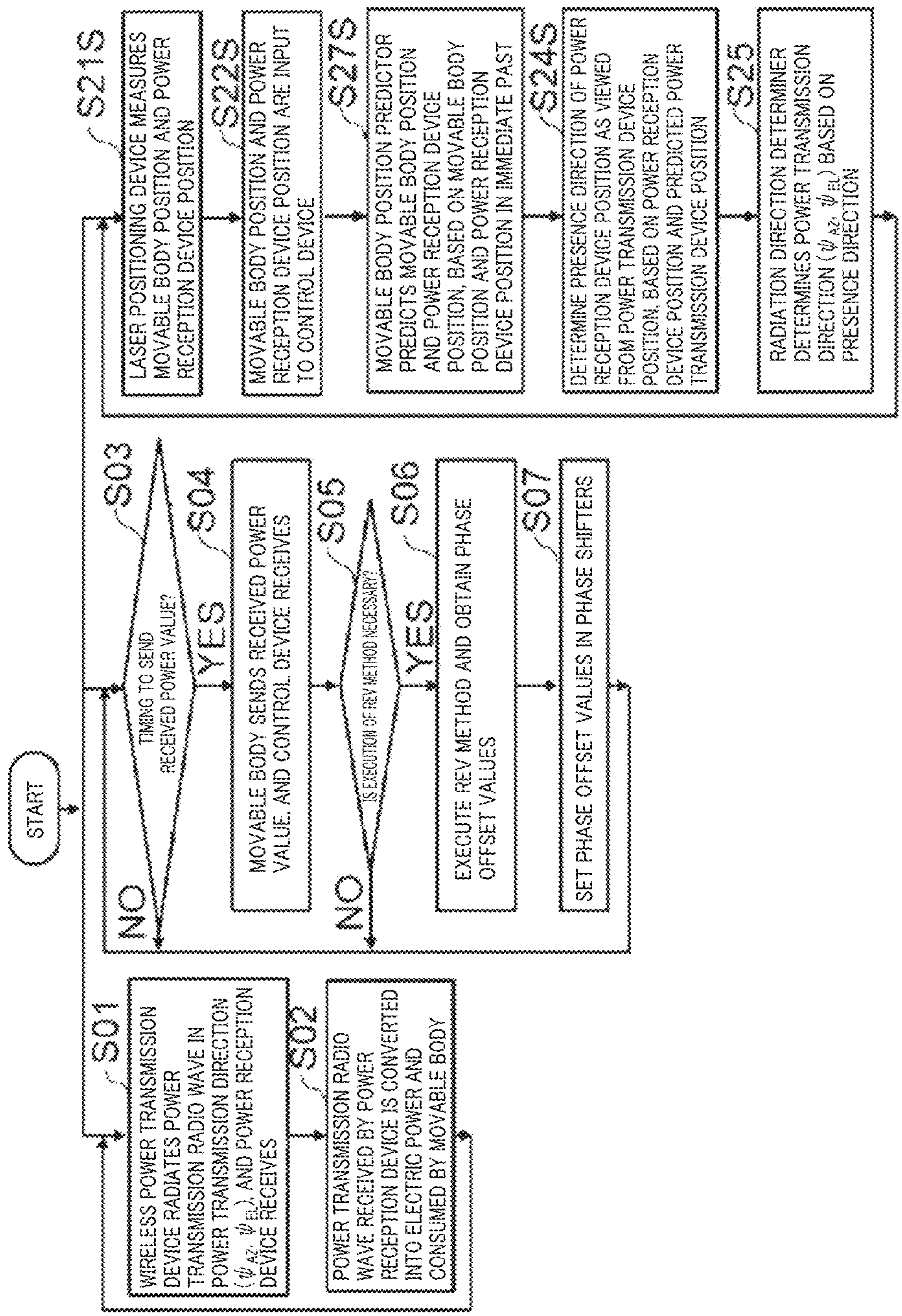
FIG. 102 is a flowchart illustrating a power transmission procedure to a movable body by the wireless power transmission device according to the eighteenth embodiment.

The operation is described. FIG. 102 is a flowchart illustrating a power transmission procedure to a movable body by the wireless power transmission device according to the eighteenth embodiment. In FIG. 102, points different from FIG. 45 in the sixth embodiment are described.

Steps S21S, S22S, and S24S are modified, and step S27S is added before S24S. S26 is removed. At S21S, laser positioning device 42S measures power reception device position 85F and movable body position 81F. At S22S, power reception device position 85F and movable body position 81F are inputted to control device 10S. The control device stores the input power reception device position 85F and movable body position 81F for a period equal to or longer than length TR.

At S27S, movable body position predictor 49S predicts a movable body position and a power reception device position, based on movable body position 81S and power reception device position 85S in the immediate past (period having length TR). The predicted power reception device position is stored as predicted power reception device position 85R in data storage 25S.

At S24S, the presence direction of predicted power reception device position 85R viewed from power transmission device position 84 is determined. At S25, radiation direction determiner 33S determines the power transmission direction ($\psi_{AZ}$, $\psi_{EL}$) from the presence direction. At S01J and S06J, power transmission radio wave 2 is radiated in the radiation direction set to the direction toward the predicted position of power reception device 3.

Wireless power transmission device 1S operates similarly to wireless power transmission device 1J and a similar effect can be obtained. Since the power transmission beam tracks movable body 60 during execution of the REV method, the accuracy of the REV method can be increased.

The position of the power reception device is predicted, the direction toward the predicted position of the power reception device is set as the presence direction of the movable body, and the radiation direction of power transmission radio wave 2 is determined from the presence direction. Since the position of the power reception device is predicted, power can be transmitted to the power reception device more efficiently. The position of the movable body may be predicted, and the direction toward the predicted position of the movable body may be set as the presence direction of the movable body.

The power reception device position may be predicted based on the power reception device position in a predetermined range of time, and the presence direction may be determined based on the predicted power reception device position and the power transmission antenna position.

The radiation target position may be determined such that the radiation target position includes the movable body position or the power reception device position, and the power transmission radio waves may be radiated such that the phases of the power transmission radio waves are matched at the radiation target position.

These are applicable to the other embodiments.

Nineteenth Embodiment

Figure 103:
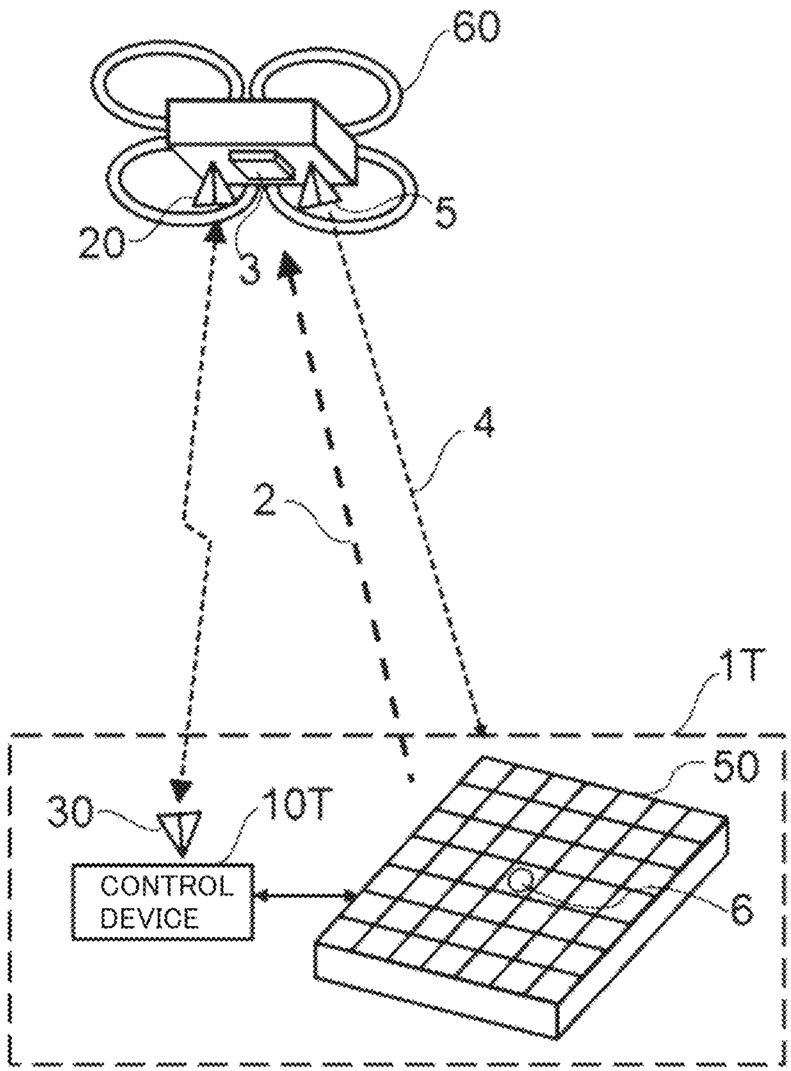
FIG. 103 is a schematic diagram illustrating a configuration of a wireless power transmission system for a movable body using a wireless power transmission device according to a sixteenth embodiment.
Figure 104:
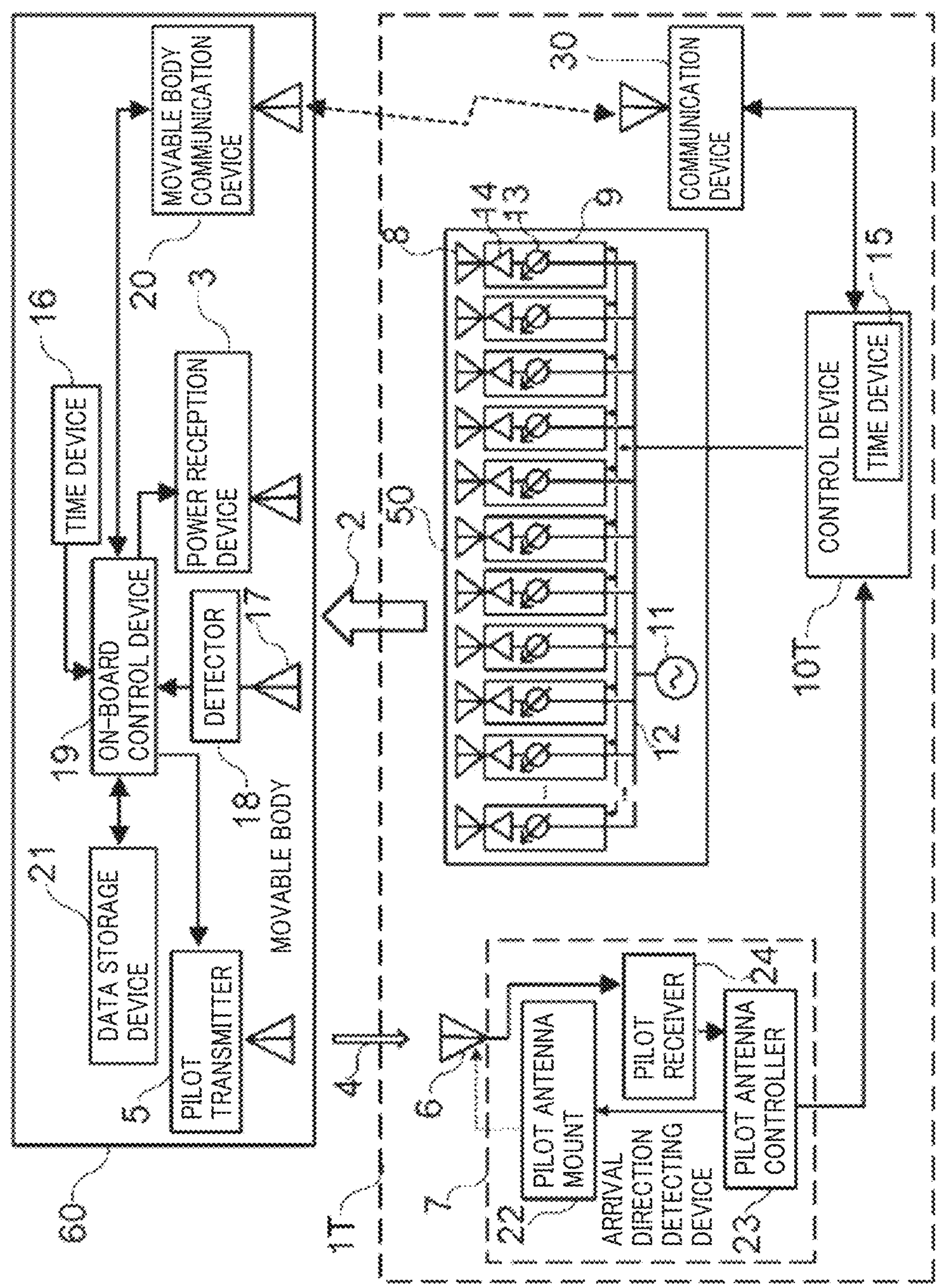
FIG. 104 is a diagram illustrating an overall configuration of the wireless power transmission system for a movable body using a wireless power transmission device according to the nineteenth embodiment.
Figure 105:
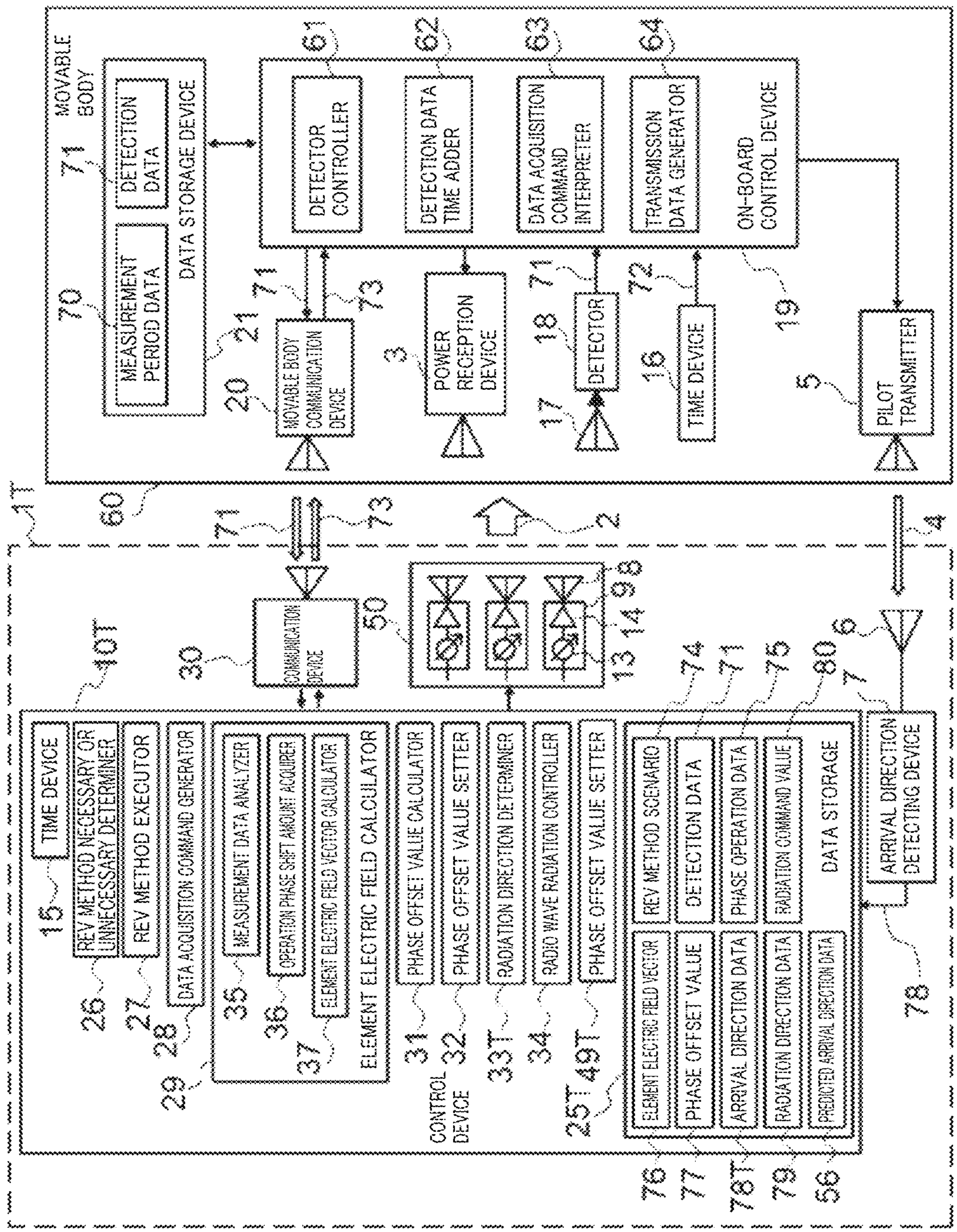
FIG. 105 is a block diagram illustrating a functional configuration of the wireless power transmission device and the movable body according to the nineteenth embodiment.

In a nineteenth embodiment, the first embodiment is modified such that the arrival direction of a pilot signal is predicted and the radiation direction of the power transmission radio wave is determined based on the predicted arrival direction. Another embodiment may be modified. Referring to FIG. 103 to FIG. 105, a configuration of a wireless power transmission system for a movable body, and the structure of a wireless power transmission device and a movable body according to the nineteenth embodiment is described.

In FIG. 103, points different from FIG. 1 in the first embodiment are described. In FIG. 104, points different from FIG. 2 in the first embodiment are described. In FIG. 105, points different from FIG. 5 in the first embodiment are described. A wireless power transmission device 1T is modified. Movable body 60 is not modified.

In wireless power transmission device 1T, only a control device 10T is modified. Control device 10T includes an arrival direction predictor 49T that predicts the arrival direction of pilot signal 4 after prediction time TS. In control device 10T, a data storage 25T and a radiation direction determiner 33T are modified. In data storage 25T, arrival direction data 78T is modified and data storage 25T includes predicted arrival direction data 56. Arrival direction data 78T is data that stores arrival direction data 78 detected by arrival direction detecting device 7 in an immediate period having length TR. Predicted arrival direction data 56 is data representing the arrival direction predicted by arrival direction predictor 49T. The arrival direction is also the presence direction that is the direction in which movable body 60 is present. Radiation direction determiner 33T refers to predicted arrival direction data 56 to determine the radiation direction.

Arrival direction predictor 49T predicts the arrival direction of pilot signal 4 after prediction time TS based on arrival direction data 78T. Arrival direction predictor 49T predicts the arrival direction after prediction time TS by approximating the arrival direction in a period having length TR stored as arrival direction data 78T by a linear or quadratic equation with respect to time. The predicted arrival direction is stored as predicted arrival direction data 56 in data storage 25T. In order to reduce noise effects, the moving average of the arrival direction may be obtained, and a linear or quadratic approximate equation of the moving average value with respect to time may be obtained.

Arrival direction predictor 49T is a presence direction predictor that predicts the presence direction based on the pilot reception signal. Predicted arrival direction data 56 is data representing the predicted presence direction that is the presence direction predicted by arrival direction predictor 49T. Radiation direction determiner 33T directs the radiation direction in the predicted presence direction. The presence direction predictor may predict the presence direction based on any other than the pilot reception signal.

Arrival direction data 78T is the presence direction determined in a predetermined range of time. Data storage 25T is a presence direction history storage that stores the presence direction determined in a predetermined range of time. Data storage 25T is also an arrival direction history storage that stores the arrival direction determined in a predetermined range of time.

Figure 106:
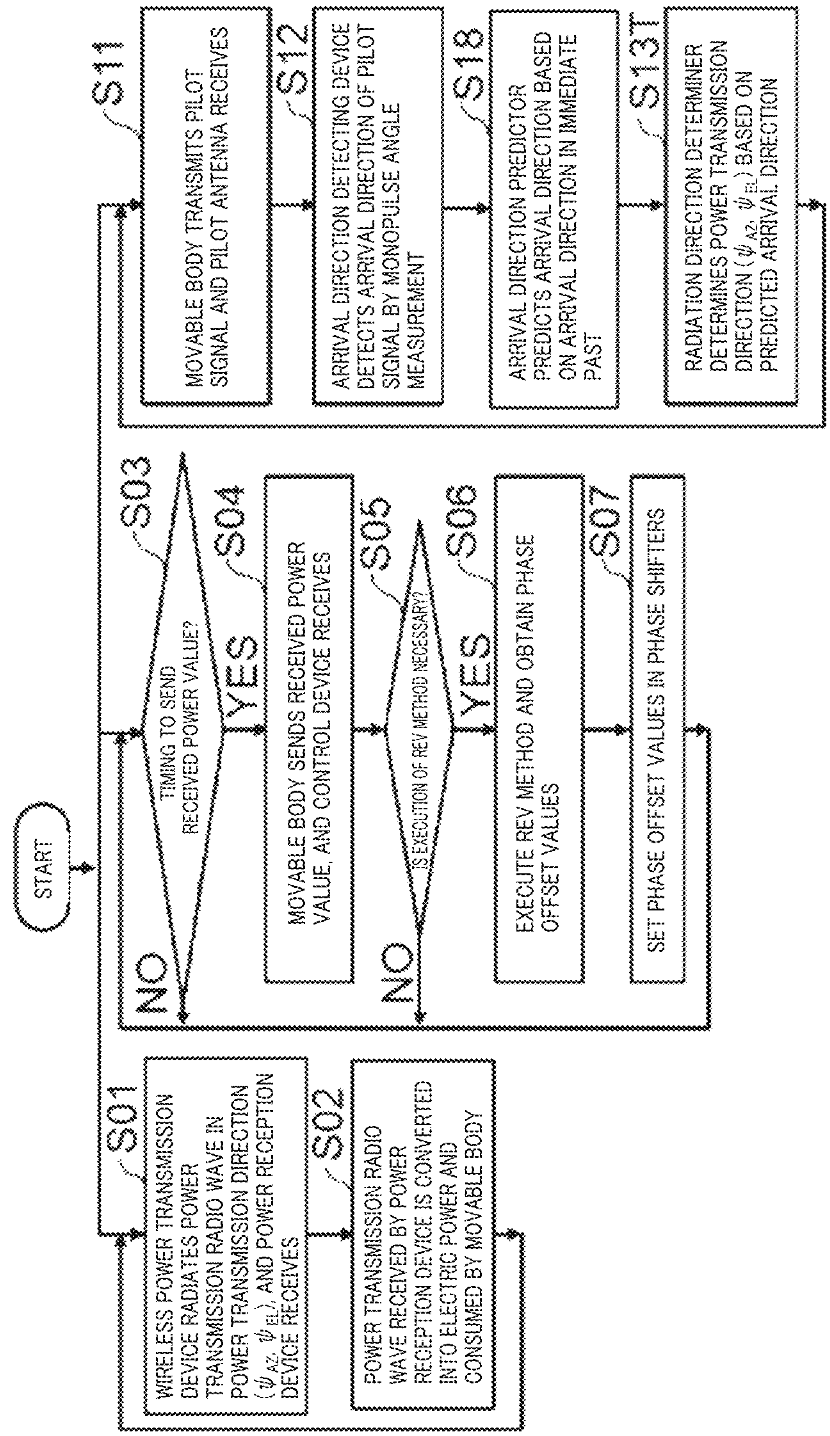
FIG. 106 is a flowchart illustrating a power transmission procedure to a movable body by the wireless power transmission device according to the nineteenth embodiment.

The operation is described. FIG. 106 is a flowchart illustrating a power transmission procedure to a movable body by the wireless power transmission device according to the nineteenth embodiment. In FIG. 106, points different from FIG. 8 in the first embodiment are described.

Step S131 is modified, and step S18 is added before S13T. At S18, arrival direction predictor 49T predicts the arrival direction after prediction time TS based on arrival direction data 78T in the immediate past (period having length TR). At S13T, radiation direction determiner 33T determines the radiation direction based on the predicted arrival direction.

Wireless power transmission device 1T operates similarly to wireless power transmission device 1 and a similar effect can be obtained. Since the power transmission beam tracks movable body 60 during execution of the REV method, the accuracy of the REV method can be increased.

Since the arrival direction of the pilot signal is predicted and the presence direction is determined based on the predicted arrival direction, power can be transmitted to the power reception device more efficiently. The presence direction may be predicted even when the presence direction of the movable body is determined from data different from the arrival direction of the pilot signal. Predicting the presence direction enables more efficient power transmission to the power reception device.

The embodiments may be combined as desired, or the embodiments may be modified or constituent elements thereof may be partially omitted, or the embodiments with constituent elements partially omitted or modified may be combined as desired.

REFERENCE SIGNS LIST

1, 1A, 1B, 1C, 1D, 1E, 1F, 1G, 1H, 1J, 1K, 1L, 1M, 1N, 1P, 1Q, 1R, 1S, 1T wireless power transmission device,
2, 2J power transmission radio wave (radio wave),
2E element radio wave
2$E_p$ element radio wave radiated by element antenna $\mathbf{8}_p$
3 power reception device,
4, 4J pilot signal,
5 pilot transmitter,
6, $\mathbf{6}_2$ pilot antenna,
7, 7C, 7D, $\mathbf{7}_2$ arrival direction detecting device,
8 element antenna,
9, 9J element module,
9P first-stage element module,
9S second-stage element module,
10, 10A, 10B, 10C, 10D, 10E, 10F, 10G, 10H, 10J, 10K, 10L, 10M, 10N, 10P, 10Q, 10R, 10S, 10T control device,
11 transmission signal generator,
12 distribution circuit,
13 phase shifter,
14 amplifier,
15 time device,
16 time device,
17 monitor antenna (measurement antenna),
18 detector (radio wave measurer),

19, 19E, 19F, 19J, 19Q on-board control device,
20 movable body communication device,
21, 21E, 21F data storage device,
22 pilot antenna mount,
23 pilot antenna controller,
24 pilot receiver (presence direction determiner),
24J pilot receiver (presence direction determiner, movable body position determiner),
25, 25A, 25F, 25G, 25H, 25J, 25N, 25P, 25Q data storage,
25E, 25M data storage (movable body data storage),
25K, 25L data storage (installation location data storage),
25R data storage (movable body data storage, movable body position history storage, attitude data history storage),
25S data storage (movable body position history storage, power reception device position history storage),
26 REV method necessary or unnecessary determiner,
27, 27A, 28C, 28H REV method executor (REV method phase controller),
28, 28C, 28H data acquisition command generator,
29, 29G, 29H element electric field calculator (REV method analyzer),
30 communication device (power transmitting-side communication device),
31 phase offset value calculator (phase reference adjuster),
32 phase offset value setter (phase reference adjuster),
33, 33B, 33C, 33E, 33T radiation direction determiner,
33S radiation direction determiner (presence direction determiner),
34, 34A, 34E radio wave radiation controller (radiation direction changer),
34J radio wave radiation controller (radiation direction changer, radiation target position changer),
35, 35G measurement data analyzer,
36, 36H operation phase shift amount acquirer,
37, 37H element electric field vector calculator,
38 azimuth mount controller,
39 signal strength meter,
40 positioning sensor,
41 movable body position determiner (presence direction determiner, power reception device position determiner),
42 laser positioning device (movable body position measuring device),
43, $\mathbf{43_1}$, $\mathbf{43_2}$, $\mathbf{43_3}$ laser beam,
44, $\mathbf{44_1}$, $\mathbf{44_2}$, $\mathbf{44_3}$ reflected laser beam,
45 pulse modulation switch,
46 distance meter (movable body distance measurer, movable body position determiner),
47, 47K, 47L, 47N radiation target position determiner,
47K, 47L radiation target position determiner (movable body position determiner, presence direction determiner, movable body distance measurer),
47M radiation target position determiner (movable body position determiner, presence direction determiner, movable body distance measurer, power reception device position determiner),
$\mathbf{48_1}$, $\mathbf{48_2}$, $\mathbf{48_3}$ laser distance measuring instrument (distance measuring instrument, movable body position measuring device),
49, 49S movable body position predictor (power reception device position predictor),
49T arrival direction predictor (presence direction predictor),
50, 50A, 50B, 50J power transmission antenna (phased array antenna),
51 power transmission antenna unit,
52 azimuth rotating mount,
53 distance measurement signal,
54 distance measurement response signal,
55 predicted movable body position,
56 predicted arrival direction data,
60, 60E, 60F, 60G, 60H, 60J, 60M, 60Q movable body,
61 detector controller,
62 detection data time adder,
63, 63C, 63H data acquisition command interpreter,
64, 64C transmission data generator,
65 positioning sensor,
66 attitude sensor,
67 movable body position sender,
68 pulse modulation manager,
68Q distance measurement communication manager,
69 attitude data sender,
70, 70C measurement period data
71 detection data (received radio wave data, REV method run-time radio wave data),
72 time data,
73, 73C, 73H data acquisition command,
74, 74A, 74C, 74H REV method scenario,
75 phase operation data,
76 element electric field vector,
77 phase offset value,
78, $\mathbf{78_2}$, 78T arrival direction data,
79 radiation direction data,
80 radiation command value,
81, 81F, 81R, 81S movable body position,
82, 82R attitude data,
83 movable body structure data,
84 power transmission device position (power transmission antenna position),
85, 85F, 85S power reception device position,
85R predicted power reception device position,
86 maximum/minimum time,
87 maximum/minimum amplitude value,
88 REV method start time,
89 pulse modulation detection signal,
90 period while REV method is being executed,
91 movable body direction,
92, 92A power transmission direction,
93, 93A received power strength,
94 radiation target position data,
95 pulse transmission time,
96 pulse reception time,
95Q distance measurement transmission time,
96Q distance measurement reception time,
97, $\mathbf{97_1}$, $\mathbf{97_2}$, $\mathbf{97_3}$ target position distance data,
98 pilot antenna position (pilot antenna installation location data)
99 distance measuring instrument position (distance measuring instrument installation location data).

The invention claimed is:

1. A wireless power transmission device comprising:

a power transmission antenna to transmit electric power by radiating a radio wave and being capable of changing a radiation direction in which the radio wave is radiated, the power transmission antenna being a phased array antenna including a plurality of element antennas to radiate the radio wave and a plurality of element modules each provided for a predetermined number of element antennas included within the plurality of element antennas, each of the plurality of element modules including a phase shifter to change a phase of an element transmission signal radiated as the radio wave and an amplifier to amplify the element transmission signal, the element transmission signal outputted by each of the plurality of element modules being inputted to a corresponding element antenna, the plurality of element antennas each radiating an element radio wave, a plurality of element radio waves radiated by the plurality of element antennas being the radio wave, the plurality of element modules including a plurality of phase shifters;

a transmission signal generator to generate an input transmission signal inputted to each of the plurality of element modules, the plurality of element modules outputting a plurality of element transmission signals, the plurality of element transmission signals being radiated from the power transmission antenna as the radio wave;

a presence direction determiner to determine a presence direction in which a movable body is present, the movable body being equipped with a power reception device to receive the radio wave, a measurement antenna to receive the radio wave, a radio wave measurer to measure received radio wave data including an electric field strength being an amplitude of the radio wave received by the measurement antenna, and a movable body communication device;

a radiation direction changer to direct the radiation direction of the power transmission antenna to the presence direction by controlling phase shift amounts, each of the phase shift amounts being a phase shift amount by which each of the plurality of phase shifters changes the phase of each of the plurality of element transmission signals;

a rotating element electric field vector (REV) method phase controller to change the phase of the element transmission signal by the phase shift amount obtained by adding an operation phase shift amount and a direction change phase shift amount being the phase shift amount changed by the radiation direction changer, for an operating phase shifter being part of the plurality of phase shifters, based on an REV method scenario, the operation phase shift amount being the phase shift amount defined by a phase operating pattern, the phase operating pattern being defined by the REV method scenario and describing operation of changing the phase shift amount of the operating phase shifter, the operation being repeated while changing the operating phase shifter, and being performed in a first state in which at least some of the plurality of element antennas radiate the element radio wave;

a phase reference adjuster to equalize phase references of the plurality of element transmission signals outputted by the plurality of element modules, based on element electric field phases, each of the element electric field phases being a phase of an element electric field vector detected by the measurement antenna receiving the element radio wave radiated by an element antenna in the plurality of element antennas and supplied with the element transmission signal outputted by one element module, each of the element electric field phases being calculated based on electric field change data generated based on REV method run-time radio wave data being the received radio wave data received by the movable body, in a second state in which the REV method phase controller changes the operation phase shift amount of the operating phase shifter based on the REV method scenario; and a power transmitting-side communication device to communicate with the movable body communication device.

2. The wireless power transmission device according to claim 1, further comprising, a movable body position measuring device to measure a movable body position being a position of the movable body, wherein the presence direction determiner determines the presence direction based on a power transmission antenna position being a position of the power transmission antenna and the movable body position.

3. The wireless power transmission device according to claim 2, wherein the movable body position measuring device measures a power reception device position being a position of the power reception device mounted on the movable body, as the movable body position.

4. The wireless power transmission device according to claim 3, further comprising a power reception device position predictor to predict the power reception device position, wherein the presence direction determiner determines the presence direction based on a predicted power reception device position being the power reception device position predicted by the power reception device position predictor and the power transmission antenna position.

5. The wireless power transmission device according to claim 3, wherein the movable body position measuring device measures the movable body position and the power reception device position, the wireless power transmission device further comprises:

a movable body position history storage to store the movable body position measured in a predetermined range of time;

a power reception device position history storage to store the power reception device position measured in the range of time; and a power reception device position predictor to predict the power reception device position based on the movable body position stored in the movable body position history storage and the power reception device position stored in the power reception device position history storage, wherein the presence direction determiner determines the presence direction based on a predicted power reception device position being the power reception device position predicted by the power reception device position predictor and the power transmission antenna position.

6. The wireless power transmission device according to claim 2, wherein the radiation direction changer determines the direction change phase shift amount also in consideration of a distance between the movable body position and the power transmission antenna position.

7. The wireless power transmission device according to claim 2, further comprising a movable body position predictor to predict the movable body position, wherein the presence direction determiner determines the presence direction based on a predicted movable body position being the movable body position predicted by the movable body position predictor and the power transmission antenna position.

8. The wireless power transmission device according to claim 1, further comprising:

a movable body data storage to store movable body structure data representing a position of the power reception device with respect to a movable body position being a position of the movable body; and a power reception device position determiner to determine a power reception device position being a position of the power reception device, based on a movable body position measured by a positioning sensor mounted on the movable body to measure the movable body position being a position of the movable body and sent from the movable body communication device, the movable body structure data, and attitude data measured by an attitude sensor mounted on the movable body to measure the attitude data representing an attitude of the movable body and sent from the movable body communication device, wherein the presence direction determiner determines the presence direction based on a position of the power transmission antenna and the power reception device position.

9. The wireless power transmission device according to claim 8, wherein the radiation direction changer determines the direction change phase shift amount also in consideration of a distance between the power reception device position and the power transmission antenna position.

10. The wireless power transmission device according to claim 8, further comprising:

a movable body position history storage to store the movable body position measured in a predetermined range of time;

an attitude data history storage to store the attitude data measured in the range of time; and a power reception device position predictor to predict the power reception device position based on the movable body position stored in the movable body position history storage, the attitude data stored in the attitude data history storage, and the movable body structure data, wherein the presence direction determiner determines the presence direction based on a predicted power reception device position being the power reception device position predicted by the power reception device position predictor and the power transmission antenna position.

11. The wireless power transmission device according to claim 1, further comprising a pilot antenna having directivity and to receive a pilot signal transmitted by a pilot transmitter mounted on the movable body and generate a pilot reception signal, and a presence direction predictor to predict the presence direction, wherein the presence direction determiner determines the presence direction based on the pilot reception signal;

the radiation direction changer directs the radiation direction in a predicted presence direction being the presence direction predicted by the presence direction predictor.

12. The wireless power transmission device according to claim 1, further comprising:

a movable body distance measurer to measure a movable body distance being a distance from the power transmission antenna to the movable body;

a radiation target position determiner to determine a radiation target position being a range of position in three-dimensional space set to be a target for radiating the radio wave as a relative position to a power transmission antenna position being a position of the power transmission antenna, and including a movable body position being a position of the movable body in three-dimensional space determined by the presence direction and the movable body distance; and a radiation target position changer to radiate the radio wave such that phases of the plurality of element radio waves are matched at the radiation target position by controlling phase shift amounts, each of the phase shift amounts being a phase shift amount by which each of the plurality of phase shifters changes the phase of each of the plurality of element transmission signals, wherein the REV method phase controller changes the phase of the element transmission signal outputted by the operating phase shifter by the phase shift amount obtained by adding the operation phase shift amount being the phase shift amount defined by the phase operating pattern and a target position change phase shift amount being the phase shift amount changed by the radiation target position changer.

13. The wireless power transmission device according to claim 12, further comprising a movable body position determiner to determine the movable body position, wherein the presence direction determiner determines the presence direction based on the power transmission antenna position and the movable body position, and the movable body distance measurer measures the movable body distance based on the power transmission antenna position and the movable body position.

14. The wireless power transmission device according to claim 13, wherein the movable body position determiner is a movable body position measuring device to radiate a distance measurement wave being light, radio wave, or ultrasonic wave, to receive a distance measurement reflected wave being the distance measurement wave reflected by the movable body, to measure a distance to the movable body based on an elapsed time from transmission of the distance measurement wave to reception of the distance measurement reflected wave, and to measure the movable body position from the measured distance and a direction in which the distance measurement reflected wave arrives, and the movable body position measuring device measures a power reception device position being a position of the power reception device mounted on the movable body, as the movable body position.

15. The wireless power transmission device according to claim 12, further comprising:

a movable body data storage to store movable body structure data representing a position of the power reception device with respect to the movable body position; and a power reception device position determiner to determine a power reception device position being a position of the power reception device, based on the movable body structure data and attitude data measured by an attitude sensor mounted on the movable body to measure the attitude data representing an attitude of the movable body and sent from the movable body communication device, wherein the presence direction determiner determines the presence direction based on the power transmission antenna position and the power reception device position, and the movable body distance measurer measures the movable body distance based on the power transmission antenna position and the power reception device position.

16. The wireless power transmission device according to claim 15, further comprising a power reception device position predictor to predict the power reception device position, wherein the radiation target position determiner determines the radiation target position such that the radiation target position includes a predicted power reception device position being the power reception device position predicted by the power reception device position predictor.

17. The wireless power transmission device according to claim 15, further comprising:

a movable body position history storage to store the movable body position measured in a predetermined range of time;

an attitude data history storage to store the attitude data measured in the range of time; and a power reception device position predictor to predict the power reception device position based on the movable body position stored in the movable body position history storage, the attitude data stored in the attitude data history storage, and the movable body structure data, wherein the radiation target position determiner determines the radiation target position such that the radiation target position includes a predicted power reception device position being the power reception device position predicted by the power reception device position predictor.

18. The wireless power transmission device according to claim 12, further comprising a movable body position predictor to predict the movable body position, wherein the radiation target position determiner determines the radiation target position such that the radiation target position includes a predicted movable body position being the movable body position predicted by the movable body position predictor.

19. The wireless power transmission device according to claim 12, further comprising:

a movable body position measuring device to radiate a distance measurement wave being light, radio wave, or ultrasonic wave, to receive a distance measurement reflected wave being the distance measurement wave reflected by the movable body, to measure a distance to the movable body based on an elapsed time from transmission of the distance measurement wave to reception of the distance measurement reflected wave, and to measure the movable body position from the measured distance and a direction in which the distance measurement reflected wave arrives;

a movable body position history storage to store the movable body position measured in a predetermined range of time;

a power reception device position history storage to store the power reception device position measured in the range of time; and a power reception device position predictor to predict the power reception device position based on the movable body position stored in the movable body position history storage and the power reception device position stored in the power reception device position history storage, wherein the radiation target position determiner determines the radiation target position such that the radiation target position includes a predicted power reception device position being the power reception device position predicted by the power reception device position predictor.

20. The wireless power transmission device according to claim 1, further comprising an REV method analyzer to calculate the element electric field phase for each of the plurality of element modules, based on the electric field change data and the REV method scenario.

21. The wireless power transmission device according to claim 20, wherein the electric field change data is the REV method run-time radio wave data, and the REV method analyzer includes:

a measurement data analyzer to detect, for the operating phase shifter, a phase shift amount detection time being a time when the electric field strength takes a maximum value or a minimum value in operating phase shifter-corresponding radio wave data being the REV method run-time radio wave data while the operating phase shifter taking each of the operation phase shift amounts, based on the REV method scenario;

an operation phase shift amount acquirer to obtain the operation phase shift amount at the phase shift amount detection time; and an element electric field phase calculator to calculate the element electric field phase based on at least the operation phase shift amount.

22. The wireless power transmission device according to claim 21, wherein the electric field change data is the REV method nm-time radio wave data obtained in a period including at least one operating phase shifter-corresponding period being a period in which the operating phase shifter takes all of the operation phase shift amounts.

23. The wireless power transmission device according to claim 21, wherein the electric field change data is the REV method run-time radio wave data obtained in a period in which the operating phase shifter takes one operation phase shift amount, and the measurement data analyzer analyzes the operating phase shifter-corresponding radio wave data being a set of the REV method nm-time radio wave data sent from the movable body communication device while the operating phase shifter takes each of the operation phase shift amounts and detects the phase shift amount detection time for the operating phase shifter.

24. The wireless power transmission device according to claim 21, wherein the measurement data analyzer detects, for the operating phase shifter, an electric field strength change ratio being a ratio between a maximum value and a minimum value of the electric field strength in the operating phase shifter-corresponding radio wave data, and the element electric field phase calculator calculates, for the operating phase shifter, the element electric field phase based on the operation phase shift amount and the electric field strength change ratio.

25. The wireless power transmission device according to claim 21, further comprising a phase operation recorder to record phase operation data being temporal change of the operation phase shift amount of the operating phase shifter during execution of the REV method, wherein the operation phase shift amount acquirer refers to the phase operation data by the phase shift amount detection time to obtain the operation phase shift amount.

26. The wireless power transmission device according to claim 21, wherein in the REV method scenario, the phase operating pattern is represented by one or more reference events with a designated time and a non-reference event in which time is represented by a relative time from any one of the reference events, and the operation phase shift amount acquirer obtains the operation phase shift amount based on the time of the reference event, the REV method scenario, and the phase shift amount detection time.

27. The wireless power transmission device according to claim 20, wherein the electric field change data is a phase shift amount detection time detected in a period including at least one operating phase shifter-corresponding period being a period in which the operating phase shifter takes all of the operation phase shift amounts, and for each operating phase shifter-corresponding period, the phase shift amount detection time being a time when the electric field strength takes a maximum value or a minimum value in operating phase shifter-corresponding radio wave data being a set of the REV method nm-time radio wave data, each in the set of the REV method run-time radio wave data being received while the operating phase shifter takes each of the operation phase shift amounts, and the REV method analyzer includes an operation phase shift amount acquirer to obtain the operation phase shift amount at the phase shift amount detection time, and an element electric field phase calculator to calculate the element electric field phase based on at least the operation phase shift amount.

28. The wireless power transmission device according to claim 27, wherein the electric field change data includes an electric field strength change ratio being a ratio between a maximum value and a minimum value of the electric field strength in the operating phase shifter-corresponding radio wave data, and the element electric field phase calculator calculates, for the operating phase shifter, the element electric field phase based on the operation phase shift amount and the electric field strength change ratio.

29. The wireless power transmission device according to claim 1, wherein the movable body includes a data storage device to store the REV method scenario and an REV method analyzer to calculate the element electric field phase for each of the plurality of element modules, based on the REV method scenario and the REV method run-time radio wave data, and the phase reference adjuster equalizes phase references of the plurality of element transmission signals outputted by the plurality of element modules, based on the element electric field phases sent from the movable body.

30. The wireless power transmission device according to claim 1, wherein the phase operating pattern is defined such that a time in which the operating phase shifter takes each of a plurality of different operation phase shift amounts is equal to or longer than a predetermined duration time.

31. A wireless power transmission device comprising:

a power transmission antenna to transmit electric power by radiating a radio wave and being capable of changing a radiation target position being a range of position in three-dimensional space set to be a target for radiating the radio wave, the power transmission antenna being a phased array antenna including a plurality of element antennas to radiate the radio wave and a plurality of element modules each provided for a predetermined number of element antennas included within the plurality of element antennas, each of the plurality of element modules including a phase shifter to change a phase of an element transmission signal radiated as the radio wave and an amplifier to amplify the element transmission signal, the element transmission signal outputted by each of the plurality of element modules being inputted to a corresponding element antenna, the plurality of element antennas each radiating an element radio wave, a plurality of element radio waves radiated by the plurality of element antennas being the radio wave, the plurality of element modules including a plurality of phase shifters;

a transmission signal generator to generate an input transmission signal inputted to each of the plurality of element modules, the plurality of element modules outputting a plurality of element transmission signals, the plurality of element transmission signals being radiated from the power transmission antenna as the radio wave;

a presence direction determiner to determine a presence direction in which a movable body is present, the movable body being equipped with a power reception device to receive the radio wave, a measurement antenna to receive the radio wave, a radio wave measurer to measure received radio wave data including an electric field strength being an amplitude of the radio wave received by the measurement antenna, and a movable body communication device;

a movable body distance measurer to measure a movable body distance being a distance from the power transmission antenna to the movable body;

a radiation target position determiner to determine the radiation target position as a relative position to a power transmission antenna position being a position of the power transmission antenna, and including a movable body position being a position of the movable body in three-dimensional space determined by the presence direction and the movable body distance;

a radiation target position changer to radiate the radio wave such that phases of the plurality of element radio waves are matched at the radiation target position by controlling phase shift amounts, each of the phase shift amounts being a phase shift amount by which each of the plurality of phase shifters changes the phase of each of the plurality of element transmission signals;

a rotating element electric field vector (REV) method phase controller to change the phase of the element transmission signal by the phase shift amount obtained by adding an operation phase shift amount and a target position change phase shift amount being the phase shift amount changed by the radiation target position changer, for an operating phase shifter being part of the plurality of phase shifters, based on an REV method scenario, the operation phase shift amount being the phase shift amount defined by a phase operating pattern, the phase operating pattern being defined by the REV method scenario and describing operation of changing the phase shift amount of the operating phase shifter, the operation being repeated while changing the operating phase shifter, and being performed in a first state in which at least some of the plurality of element antennas radiate the element radio wave;

a phase reference adjuster to equalize phase references of the plurality of element transmission signals outputted by the plurality of element modules, based on element electric field phases, each of the element electric field phases being a phase of an element electric field vector detected by the measurement antenna receiving the element radio wave radiated by an element antenna in the plurality of element antennas and supplied with the element transmission signal outputted by one element module, each of the element electric field phases being calculated based on electric field change data generated based on REV method run-time radio wave data being the received radio wave data received by the movable body, in a second state in which the REV method phase controller changes the operation phase shift amount of the operating phase shifter based on the REV method scenario; and a power transmitting-side communication device to communicate with the movable body communication device.

32. A wireless power transmission device comprising;

a power transmission antenna to transmit electric power by radiating a radio wave and being capable of changing a radiation target position being a range of position in three-dimensional space set to be a target for radiating the radio wave, the power transmission antenna being a phased array antenna including a plurality of element antennas to radiate the radio wave received by a power reception device mounted on a movable body and a plurality of element modules each provided for a predetermined number of element antennas included within the plurality of element antennas, each of the plurality of element modules including a phase shifter to change a phase of an element transmission signal radiated as the radio wave and an amplifier to amplify the element transmission signal, the element transmission signal outputted by each of the plurality of element modules being inputted to a corresponding element antenna, the plurality of element antennas each radiating an element radio wave, a plurality of element radio waves radiating by the plurality of element antennas being the radio wave, the plurality of element modules including a plurality of phase shifters;

a transmission signal generator to generate an input transmission signal inputted to each of the plurality of element modules, the plurality of element modules outputting a plurality of element transmission signals, the plurality of element transmission signals being radiated from the power transmission antenna as the radio wave;

a movable body position measuring device to radiate a distance measurement wave being light, radio wave, or ultrasonic wave, to receive a distance measurement reflected wave being the distance measurement wave reflected by the movable body equipped with the power reception device to receive the radio wave, to measure a distance to the movable body based on an elapsed time from transmission of the distance measurement wave to reception of the distance measurement reflected wave, and to measure a movable body position being a position of the movable body and a power reception device position being a position of the power reception device from the measured distance and a direction in which the distance measurement reflected wave arrives, a radiation target position determiner to determine the radiation target position as a relative position to a power transmission antenna position being a position of the power transmission antenna, and including the power reception device position;

a radiation target position changer to radiate the radio wave such that phases of the plurality of element radio waves are matched at the radiation target position by controlling phase shift amounts, each of the phase shift amounts being a phase shift amount by which each of the plurality of phase shifters changes the phase of each of the plurality of element transmission signals;

a movable body position history storage to store the movable body position measured in a predetermined range of time;

a power reception device position history storage to store the power reception device position measured in the predetermined range of time; and a power reception device position predictor to predict the power reception device position based on the movable body position stored in the movable body position history storage and the power reception device position stored in the power reception device position history storage, wherein the radiation target position determiner determines the radiation target position such that the radiation target position includes a predicted power reception device position being the power reception device position predicted by the power reception device position predictor.

33. The wireless power transmission device according to claim 32, wherein, the power reception device position history storage stores the power reception device position being a relative position to the movable body position, the power reception device position predictor predicts the movable body position based on the movable body position stored in the movable body position history storage, predicts the power reception device position being the relative position to the movable body position based on the power reception device position stored in the power reception device position history storage, and predicts the prediction power reception device position by adding the predicted relative position of the power reception device position to the predicted movable body position.

34. A wireless power transmission device comprising:

a power transmission antenna to transmit electric power by radiating a radio wave and being capable of changing a radiation direction in which the radio wave is radiated, the power transmission antenna being a phased array antenna including a plurality of element antennas to radiate the radio wave received by a power reception device mounted on a movable body and a plurality of element modules each provided for a predetermined number of element antennas included within the plurality of element antennas, each of the plurality of element modules including a phase shifter to change an element phase of a transmission signal radiated as the radio wave and an amplifier to amplify the element transmission signal, the element transmission signal outputted by each of the plurality of element modules being inputted to a corresponding element antenna, the plurality of element modules including a plurality of phase shifters;

a transmission signal generator to generate an input transmission signal inputted to each of the plurality of element modules, the plurality of element modules outputting a plurality of element transmission signals, the plurality of element transmission signals being radiated from the power transmission antenna as the radio wave;

a presence direction determiner to determine a presence direction in which the movable body is present, the movable body being equipped with the power reception device to receive the radio wave;

a movable body position measuring device to radiate a distance measurement wave being light, radio wave, or ultrasonic wave, to receive a distance measurement reflected wave being the distance measurement wave reflected by the movable body, to measure a distance to the movable body based on an elapsed time from transmission of the distance measurement wave to reception of the distance measurement reflected wave, and to measure a movable body position being a position of the movable body and a power reception device position being a position of the power reception device from the measured distance and a direction in which the distance measurement reflected wave arrives;

a radiation direction changer to direct the radiation direction of the power transmission antenna to the presence direction by controlling phase shift amounts, each of the phase shift amounts being a phase shift amount by which each of the plurality of phase shifters changes the phase of each of the plurality of element transmission signals;

a movable body position history storage to store the movable body position measured in a predetermined range of time;

a power reception device position history storage to store the power reception device position measured in the predetermined range of time; and a power reception device position predictor to predict the power reception device position based on the movable body position stored in the movable body position history storage and the power reception device position stored in the power reception device position history storage, wherein the presence direction determiner determines the presence direction as a direction toward a predicted power reception device position being the power reception device position predicted by the power reception device position predictor.

* * * * *